US012350237B2

(12) United States Patent
Fangrow

(10) Patent No.: US 12,350,237 B2
(45) Date of Patent: Jul. 8, 2025

(54) PRESSURE-REGULATING VIAL ADAPTORS

(71) Applicant: ICU Medical, Inc., San Clemente, CA (US)

(72) Inventor: Thomas F. Fangrow, Mission Viejo, CA (US)

(73) Assignee: ICU Medical, Inc., San Clemente, CA (US)

(*) Notice: Subject to any disclaimer, the term of this patent is extended or adjusted under 35 U.S.C. 154(b) by 0 days.

(21) Appl. No.: 18/308,500

(22) Filed: Apr. 27, 2023

(65) Prior Publication Data

US 2024/0091104 A1 Mar. 21, 2024

Related U.S. Application Data

(63) Continuation of application No. 17/445,705, filed on Aug. 23, 2021, now Pat. No. 11,672,734, which is a
(Continued)

(51) Int. Cl.
*A61J 1/20* (2006.01)
*B65B 3/00* (2006.01)
*A61J 1/10* (2006.01)

(52) U.S. Cl.
CPC ............. *A61J 1/2096* (2013.01); *A61J 1/201* (2015.05); *A61J 1/2048* (2015.05); *A61J 1/2075* (2015.05);
(Continued)

(58) Field of Classification Search
CPC .. A61J 1/2096; A61J 1/20; A61J 3/00; A61M 5/32
See application file for complete search history.

(56) References Cited

U.S. PATENT DOCUMENTS

| | | | |
|---|---|---|---|
| 2,074,223 | A | 3/1937 | Horiuchi et al. |
| 2,409,734 | A | 10/1946 | Bucher et al. |

(Continued)

FOREIGN PATENT DOCUMENTS

| | | | |
|---|---|---|---|
| AU | 2013200393 A1 | 2/2013 | |
| CA | 1037428 | 8/1978 | |

(Continued)

OTHER PUBLICATIONS

International Search Report and Written Opinion dated Oct. 22, 2012, International Application No. PCT/US2012/051226, filed Aug. 16, 2012.

(Continued)

*Primary Examiner* — Timothy P. Kelly
(74) *Attorney, Agent, or Firm* — Knobbe, Martens, Olson & Bear, LLP

(57) ABSTRACT

In certain embodiments, a vial adaptor comprises a housing configured to couple the adaptor with a vial, an access channel, a regulator channel, and a regulator assembly. The access channel is configured to facilitate withdrawal of fluid from the vial when the adaptor is coupled to the vial. The regulator channel is configured to facilitate a flow of a regulating fluid from the regulator assembly to compensate for changes in volume of a medical fluid in the vial. In some embodiments, the regulator assembly includes a flexible member configured to expand and contract in accordance with changes in the volume of the medical fluid in the vial. In some embodiments, the flexible member is substantially free to expand and contract. In some embodiments, the flexible member is not partly or completely located in a rigid enclosure.

25 Claims, 41 Drawing Sheets

Related U.S. Application Data continuation of application No. 16/872,754, filed on May 12, 2020, now Pat. No. 11,129,773, which is a continuation of application No. 15/932,248, filed on Feb. 16, 2018, now Pat. No. 10,688,022, which is a continuation of application No. 14/789,806, filed on Jul. 1, 2015, now Pat. No. 9,895,291, which is a continuation of application No. 14/179,475, filed on Feb. 12, 2014, now Pat. No. 9,132,062, which is a continuation of application No. PCT/US2012/051226, filed on Aug. 16, 2012.

(60) Provisional application No. 61/614,250, filed on Mar. 22, 2012, provisional application No. 61/525,126, filed on Aug. 18, 2011.

(52) U.S. Cl.
CPC ........... *A61J 1/2082* (2015.05); *A61J 1/2086* (2015.05); *B65B 3/003* (2013.01); *A61J 1/10* (2013.01); *Y10T 29/49826* (2015.01)

(56) References Cited

U.S. PATENT DOCUMENTS

| | | | |
|---|---|---|---|
| 2,419,401 | A | 4/1947 | Hinds |
| 2,668,533 | A | 2/1954 | Evans |
| 2,673,013 | A | 3/1954 | Hester |
| 2,852,024 | A | 7/1954 | Ryan |
| 2,793,758 | A | 3/1961 | Murrish |
| 2,999,499 | A | 9/1961 | Willet |
| 2,999,500 | A | 9/1961 | Schurer |
| 3,291,151 | A | 12/1966 | Loken |
| RE26,488 | E | 11/1968 | Bull |
| 3,542,240 | A | 11/1970 | Solowey |
| 3,557,778 | A | 1/1971 | Hughes |
| 3,584,770 | A | 6/1971 | Taylor |
| 3,797,521 | A | 3/1974 | King |
| 3,822,700 | A | 7/1974 | Pennington |
| 3,844,283 | A | 10/1974 | Dabney |
| 3,853,157 | A | 12/1974 | Madaio |
| 3,923,058 | A | 12/1975 | Weingarten |
| 3,938,520 | A | 2/1976 | Scislowcz et al. |
| 3,940,003 | A | 2/1976 | Larson |
| 3,941,167 | A | 3/1976 | Haury-Wirtz et al. |
| 3,957,082 | A | 5/1976 | Fuson et al. |
| 3,980,082 | A | 9/1976 | Miller |
| 3,993,063 | A | 11/1976 | Larrabee |
| 4,046,291 | A | 9/1977 | Goda |
| 4,058,121 | A | 11/1977 | Choski et al. |
| 4,143,853 | A | 3/1979 | Abramson |
| 4,207,923 | A | 6/1980 | Giurtino |
| 4,219,021 | A | 8/1980 | Fink |
| 4,240,433 | A | 12/1980 | Bordow |
| 4,240,833 | A | 12/1980 | Myles |
| 4,253,459 | A | 3/1981 | Willis |
| 4,262,671 | A | 4/1981 | Kersten |
| 4,301,799 | A | 11/1981 | Pope, Jr. et al. |
| 4,312,349 | A | 1/1982 | Cohen |
| 4,314,586 | A | 2/1982 | Folkman |
| 4,334,551 | A | 6/1982 | Pfister |
| 4,349,035 | A | 9/1982 | Thomas et al. |
| 4,376,634 | A | 3/1983 | Prior et al. |
| 4,381,776 | A | 5/1983 | Latham, Jr. |
| 4,396,016 | A | 8/1983 | Becker |
| 4,410,321 | A | 10/1983 | Pearson et al. |
| 4,458,733 | A | 7/1984 | Lyons |
| 4,475,915 | A | 10/1984 | Sloane |
| 4,493,348 | A | 1/1985 | Lemmons |
| 4,505,709 | A | 3/1985 | Froning et al. |
| 4,534,758 | A | 8/1985 | Akers et al. |
| 4,564,054 | A | 1/1986 | Gustavsson |
| 4,573,993 | A | 3/1986 | Hoag et al. |
| 4,576,211 | A | 3/1986 | Valentini et al. |
| 4,588,403 | A | 5/1986 | Weiss et al. |
| 4,600,040 | A | 7/1986 | Naslund |
| 4,645,073 | A | 2/1987 | Homan |
| 4,673,404 | A | 6/1987 | Gustavsson |
| 4,730,635 | A | 3/1988 | Linden |
| 4,735,608 | A | 4/1988 | Sardam |
| 4,743,243 | A | 5/1988 | Vaillancourt |
| 4,768,568 | A | 9/1988 | Fournier et al. |
| 4,785,859 | A | 11/1988 | Gustavsson et al. |
| 4,798,578 | A | 1/1989 | Ranford |
| 4,857,068 | A | 8/1989 | Kahn |
| 4,929,230 | A | 5/1990 | Pfleger |
| 4,981,464 | A | 1/1991 | Suzuki |
| 5,006,114 | A | 4/1991 | Rogers |
| 5,060,704 | A | 10/1991 | Rohrbough |
| 5,169,393 | A | 12/1992 | Moorehead et al. |
| 5,176,673 | A | 1/1993 | Marrucchi |
| 5,334,163 | A | 8/1994 | Sinnett |
| 5,349,984 | A | 9/1994 | Weinheimer et al. |
| 5,405,331 | A | 4/1995 | Behnke et al. |
| 5,445,630 | A | 8/1995 | Richmond |
| 5,478,337 | A | 12/1995 | Okamoto et al. |
| 5,580,351 | A | 12/1996 | Helgren et al. |
| 5,660,796 | A | 8/1997 | Sheehy |
| 5,685,866 | A | 11/1997 | Lopez |
| 5,700,245 | A | 12/1997 | Sancoff et al. |
| 5,725,500 | A | 3/1998 | Micheler |
| 5,749,394 | A | 5/1998 | Boehmer et al. |
| 5,766,147 | A | 6/1998 | Sancoff et al. |
| 5,772,079 | A | 6/1998 | Gueret |
| 5,776,125 | A | 7/1998 | Dudar et al. |
| 5,803,311 | A | 9/1998 | Fuchs |
| 5,833,213 | A | 11/1998 | Ryan |
| 5,890,610 | A | 4/1999 | Jansen et al. |
| 6,003,553 | A | 12/1999 | Wahlberg |
| 6,013,051 | A | 1/2000 | Nelson |
| 6,071,270 | A | 6/2000 | Fowles et al. |
| 6,139,534 | A | 10/2000 | Niedospial et al. |
| 6,159,192 | A | 12/2000 | Fowles et al. |
| 6,221,041 | B1 | 4/2001 | Russo |
| 6,238,372 | B1 | 5/2001 | Zinger et al. |
| 6,358,236 | B1 | 3/2002 | DeFoggi et al. |
| 6,457,488 | B2 | 10/2002 | Loo |
| 6,478,788 | B1 | 11/2002 | Aneas |
| 6,503,240 | B1 | 1/2003 | Niedospial, Jr. et al. |
| 6,544,246 | B1 | 4/2003 | Niedospial, Jr. |
| 6,551,299 | B2 | 4/2003 | Miyoshi et al. |
| 6,572,256 | B2 | 6/2003 | Seaton et al. |
| 6,679,290 | B2 | 1/2004 | Matthews et al. |
| 6,692,478 | B1 | 2/2004 | Paradis |
| 6,715,520 | B2 | 4/2004 | Andreasson et al. |
| 6,719,719 | B2 | 4/2004 | Carmel et al. |
| 6,890,328 | B2 | 5/2005 | Fowles et al. |
| 6,989,002 | B2 | 1/2006 | Guala |
| 6,997,910 | B2 | 2/2006 | Howlett et al. |
| 6,997,917 | B2 | 2/2006 | Niedospial, Jr. et al. |
| 7,004,926 | B2 | 2/2006 | Navia et al. |
| 7,048,720 | B1 | 5/2006 | Thorne, Jr. et al. |
| 7,086,431 | B2 | 8/2006 | D'Antonio et al. |
| 7,101,354 | B2 | 9/2006 | Thorne, Jr. et al. |
| 7,140,401 | B2 | 11/2006 | Wilcox et al. |
| 7,192,423 | B2 | 3/2007 | Wong |
| 7,213,702 | B2 | 5/2007 | Takimoto et al. |
| 7,291,131 | B2 | 11/2007 | Call |
| 7,306,584 | B2 | 12/2007 | Wessman et al. |
| 7,354,427 | B2 | 4/2008 | Fangrow |
| 7,507,227 | B2 | 3/2009 | Fangrow |
| 7,510,547 | B2 | 3/2009 | Fangrow |
| 7,510,548 | B2 | 3/2009 | Fangrow |
| 7,513,895 | B2 | 4/2009 | Fangrow |
| 7,534,238 | B2 | 5/2009 | Fangrow |
| 7,547,300 | B2 | 6/2009 | Fangrow |
| 7,569,043 | B2 | 8/2009 | Fangrow |
| 7,618,408 | B2 | 11/2009 | Yandell |
| 7,632,261 | B2 | 12/2009 | Zinger et al. |
| 7,645,271 | B2 | 1/2010 | Fangrow |
| 7,654,995 | B2 | 2/2010 | Warren et al. |
| 7,658,733 | B2 | 2/2010 | Fangrow |
| 7,678,333 | B2 | 3/2010 | Reynolds et al. |

(56) References Cited

U.S. PATENT DOCUMENTS 7,703,486 B2 4/2010 Costanzo
7,743,799 B2 6/2010 Mosler et al.
7,744,580 B2 6/2010 Reboul
7,758,560 B2 7/2010 Connell et al.
7,789,871 B1 9/2010 Yandell
D630,732 S 1/2011 Lev et al.
7,862,537 B2 1/2011 Zinger et al.
7,879,018 B2 2/2011 Zinger et al.
7,883,499 B2 2/2011 Fangrow
7,887,528 B2 2/2011 Yandell
7,900,659 B2 3/2011 Whitley et al.
D637,713 S 5/2011 Nord et al.
7,963,954 B2 6/2011 Kavazov
D641,080 S 7/2011 Zinger et al.
7,972,321 B2 7/2011 Fangrow
7,981,089 B2 7/2011 Weilbacher
7,981,101 B2 7/2011 Walsh
7,998,106 B2 8/2011 Thorne, Jr. et al.
8,021,325 B2 9/2011 Zinger et al.
8,025,653 B2 9/2011 Capitqaine et al.
8,029,747 B2 10/2011 Helmerson
8,074,964 B2 12/2011 Mansour et al.
8,100,154 B2 1/2012 Reynolds et al.
8,109,285 B2 2/2012 Ehrman et al.
8,122,923 B2 2/2012 Kraus et al.
8,123,736 B2 2/2012 Kraushaar et al.
8,141,601 B2 3/2012 Fehr et al.
8,156,971 B2 4/2012 Costanzo
8,162,006 B2 4/2012 Guala
8,162,013 B2 4/2012 Rosenquist et al.
8,162,914 B2 4/2012 Kraushaar et al.
8,167,863 B2 5/2012 Yow
8,167,864 B2 5/2012 Browne
8,172,794 B2 5/2012 Lum et al.
8,177,768 B2 5/2012 Leinsing
8,196,614 B2 6/2012 Kriheli
8,197,459 B2 6/2012 Jansen et al.
8,206,367 B2 6/2012 Warren et al.
8,211,082 B2 7/2012 Hasegawa et al.
8,221,382 B2 7/2012 Moy et al.
8,225,826 B2 7/2012 Horppu et al.
8,231,567 B2 7/2012 Tennican et al.
8,241,265 B2 8/2012 Moy et al.
8,262,643 B2 9/2012 Tennican
8,267,127 B2 9/2012 Kriheli
8,267,913 B2 9/2012 Fangrow
8,281,807 B2 10/2012 Trombley, III et al.
8,286,936 B2 10/2012 Kitani et al.
8,287,513 B2 10/2012 Ellstrom et al.
8,317,741 B2 * 11/2012 Kraushaar ............ A61J 1/2096
604/82
8,336,587 B2 12/2012 Rosenquist et al.
8,356,644 B2 1/2013 Chong et al.
8,356,645 B2 1/2013 Chong et al.
8,357,137 B2 1/2013 Yandell
8,381,776 B2 2/2013 Horppu
8,403,905 B2 3/2013 Yow
8,409,164 B2 4/2013 Fangrow
8,409,165 B2 4/2013 Niedospial et al.
8,414,554 B2 4/2013 Garfield et al.
8,414,555 B2 4/2013 Garfield et al.
8,425,487 B2 4/2013 Beiriger et al.
8,449,521 B2 5/2013 Thorne, Jr. et al.
8,454,579 B2 6/2013 Fangrow, Jr.
8,469,939 B2 6/2013 Fangrow
8,506,548 B2 8/2013 Okiyama
8,511,352 B2 8/2013 Kraus et al.
8,512,307 B2 8/2013 Fangrow
8,522,832 B2 9/2013 Lopez et al.
8,523,838 B2 9/2013 Tornqvist
8,540,692 B2 9/2013 Fangrow
8,602,067 B2 12/2013 Kuhni et al.
8,608,723 B2 12/2013 Lev et al.
8,622,985 B2 1/2014 Ellstrom
8,641,656 B2 2/2014 Bene
8,657,803 B2 2/2014 Helmerson et al.
8,667,996 B2 3/2014 Gonnelli et al.
8,684,992 B2 4/2014 Sullivan et al.
8,684,994 B2 4/2014 Lev et al.
8,701,696 B2 4/2014 Guala
8,702,675 B2 4/2014 Imai
8,720,496 B2 5/2014 Huwiler et al.
8,721,614 B2 5/2014 Takemoto
8,753,325 B2 6/2014 Lev et al.
8,795,231 B2 8/2014 Chong et al.
8,821,436 B2 9/2014 Mosler et al.
8,827,977 B2 9/2014 Fangrow
8,864,725 B2 10/2014 Ranalletta et al.
8,864,737 B2 10/2014 Hasegawa et al.
8,870,832 B2 10/2014 Raday et al.
8,870,846 B2 10/2014 Davis et al.
8,882,738 B2 11/2014 Fangrow et al.
8,900,212 B2 12/2014 Kubo
8,910,919 B2 12/2014 Bonnal et al.
8,926,554 B2 1/2015 Okuda et al.
8,945,084 B2 2/2015 Warren et al.
8,973,622 B2 3/2015 Lopez
8,974,433 B2 3/2015 Fangrow
8,979,792 B2 3/2015 Lev et al.
8,986,262 B2 3/2015 Young et al.
8,992,501 B2 3/2015 Siefert et al.
9,005,179 B2 4/2015 Fangrow et al.
9,005,180 B2 4/2015 Siefert et al.
9,060,921 B2 6/2015 Siefert et al.
9,067,049 B2 6/2015 Panian et al.
9,072,657 B2 7/2015 Siefert et al.
9,089,474 B2 7/2015 Cederschiöld
9,089,475 B2 7/2015 Fangrow
9,101,717 B2 8/2015 Mansour et al.
9,107,808 B2 8/2015 Fangrow
9,117,012 B2 8/2015 Basaglia
9,132,062 B2 9/2015 Fangrow
9,132,063 B2 9/2015 Lev et al.
9,144,646 B2 9/2015 Barron, III et al.
9,198,832 B2 12/2015 Moy et al.
9,205,248 B2 12/2015 Wu et al.
9,211,231 B2 12/2015 Mansour et al.
9,237,986 B2 1/2016 Mansour et al.
9,278,206 B2 3/2016 Fangrow
9,345,640 B2 5/2016 Mosler et al.
9,345,641 B2 5/2016 Kraus et al.
9,351,905 B2 5/2016 Fangrow et al.
9,358,182 B2 6/2016 Garfield et al.
9,381,135 B2 7/2016 Reynolds et al.
9,381,137 B2 7/2016 Garfield et al.
9,381,339 B2 7/2016 Wu et al.
9,440,060 B2 9/2016 Fangrow
9,511,989 B2 12/2016 Lopez
9,572,750 B2 2/2017 Mansour et al.
9,585,812 B2 3/2017 Browka et al.
9,597,260 B2 3/2017 Ivosevic
9,610,217 B2 4/2017 Fangrow
9,615,997 B2 4/2017 Fangrow
9,662,272 B2 5/2017 Warren et al.
9,763,855 B2 9/2017 Fangrow et al.
9,827,163 B2 11/2017 Lopez et al.
9,895,291 B2 2/2018 Fangrow
9,919,826 B2 3/2018 Ivosevic
9,931,275 B2 4/2018 Fangrow
9,931,276 B2 4/2018 Lopez
9,987,195 B2 6/2018 Fangrow
9,993,390 B2 6/2018 Seifert et al.
9,993,391 B2 6/2018 Warren et al.
9,999,569 B2 6/2018 Kriheli
10,016,339 B2 7/2018 Guala
10,022,302 B2 7/2018 Warran et al.
10,071,020 B2 9/2018 Warren et al.
10,086,188 B2 10/2018 Fangrow
10,117,807 B2 11/2018 Fangrow
10,201,476 B2 2/2019 Fangrow
10,292,904 B2 5/2019 Fangrow
10,299,989 B2 5/2019 Fangrow
10,327,989 B2 6/2019 Fangrow
10,327,991 B2 6/2019 Seifert et al.

(56) References Cited

U.S. PATENT DOCUMENTS 10,327,992 B2 6/2019 Fangrow et al.
10,327,993 B2 6/2019 Fangrow et al.
10,369,349 B2 8/2019 Nelson
10,391,293 B2 8/2019 Fangrow
10,406,072 B2 9/2019 Chhikara et al.
10,492,993 B2 12/2019 Seifert et al.
10,688,022 B2 6/2020 Fangrow
10,806,672 B2 10/2020 Fangrow
10,918,573 B2 2/2021 Fangrow
10,987,277 B2 4/2021 Fangrow
11,013,664 B2 5/2021 Fangrow et al.
11,129,773 B2 9/2021 Fangrow
11,185,471 B2 11/2021 Fangrow
11,504,302 B2 11/2022 Chhikara et al.
11,529,289 B2 12/2022 Fangrow
11,648,181 B2 5/2023 Chhikara et al.
11,654,086 B2 5/2023 Fangrow
11,672,734 B2 6/2023 Fangrow
11,696,871 B2 7/2023 Seifert et al.
11,744,775 B2 9/2023 Chhikara et al.
11,857,499 B2 1/2024 Fangrow
11,963,932 B2 4/2024 Seifert et al.
2002/0095133 A1 7/2002 Gillis et al.
2002/0193777 A1 12/2002 Aneas
2003/0153895 A1 8/2003 Leinsing
2003/0216695 A1 11/2003 Yang
2003/0229330 A1 12/2003 Hickle
2004/0073169 A1 4/2004 Amisar et al.
2004/0073189 A1 4/2004 Wyatt et al.
2004/0123868 A1 7/2004 Rutter
2005/0087715 A1 4/2005 Doyle
2005/0131357 A1 6/2005 Denton et al.
2005/0148992 A1 7/2005 Simas, Jr. et al.
2005/0203481 A1 9/2005 Orlu et al.
2006/0025747 A1 2/2006 Sullivan et al.
2006/0106360 A1 5/2006 Wong
2006/0111667 A1 5/2006 Matsuura et al.
2006/0149309 A1 7/2006 Paul et al.
2006/0184103 A1 8/2006 Paproski et al.
2006/0184139 A1 8/2006 Quigley et al.
2007/0071243 A1 3/2007 Nanda
2007/0093775 A1 4/2007 Daly
2007/0106244 A1 5/2007 Mosler et al.
2007/0112324 A1 5/2007 Hamedi-Sangsari
2007/0208320 A1 9/2007 Muramatsu et al.
2008/0045919 A1 2/2008 Jakob et al.
2008/0067462 A1 3/2008 Miller et al.
2008/0140021 A1 6/2008 Richmond
2008/0172003 A1 7/2008 Plishka et al.
2008/0208159 A1 8/2008 Stanus et al.
2008/0249498 A1 10/2008 Fangrow
2008/0287914 A1 11/2008 Wyatt et al.
2008/0311007 A1* 12/2008 Helmerson ........... A61J 1/2096 422/112
2009/0057258 A1 3/2009 Tornqvist
2009/0326506 A1* 12/2009 Hasegawa ............. A61J 1/2096 604/407
2010/0000035 A1 1/2010 Lee
2010/0049157 A1 2/2010 Fangrow
2010/0059474 A1 3/2010 Brandenburger et al.
2010/0076397 A1 3/2010 Reed et al.
2010/0084397 A1 4/2010 Kubo et al.
2010/0106129 A1 4/2010 Goeckner et al.
2010/0147402 A1 6/2010 Tornqvist
2010/0160889 A1 6/2010 Smith et al.
2010/0179506 A1 7/2010 Shemesh et al.
2010/0241088 A1 9/2010 Ranalletta et al.
2010/0249723 A1 9/2010 Fangrow, Jr.
2010/0305548 A1 12/2010 Kraushaar
2011/0004183 A1 1/2011 Carrez et al.
2011/0062703 A1 3/2011 Lopez et al.
2011/0087164 A1 4/2011 Mosler et al.
2011/0125104 A1 5/2011 Lynn
2011/0125128 A1 5/2011 Nord et al.
2011/0175347 A1 7/2011 Okiyama
2011/0184382 A1 7/2011 Cady
2011/0190723 A1 8/2011 Fangrow
2011/0208128 A1 8/2011 Wu et al.
2011/0224611 A1 9/2011 Lum et al.
2011/0240158 A1 10/2011 Py
2011/0257621 A1 10/2011 Fangrow
2011/0264037 A1 10/2011 Foshee et al.
2012/0022493 A1 1/2012 Warren
2012/0046636 A1 2/2012 Kriheli
2012/0053555 A1 3/2012 Ariagno et al.
2012/0059346 A1 3/2012 Sheppard et al.
2012/0065609 A1 3/2012 Seifert et al.
2012/0065610 A1 3/2012 Seifert et al.
2012/0067429 A1 3/2012 Mosler et al.
2012/0078091 A1 3/2012 Suchecki
2012/0078214 A1 3/2012 Finke et al.
2012/0078215 A1 3/2012 Finke et al.
2012/0109077 A1 5/2012 Ryan
2012/0152392 A1 6/2012 Guala
2012/0157964 A1 6/2012 Haimi
2012/0165779 A1 6/2012 Seifert et al.
2012/0172830 A1 7/2012 Yokoyama et al.
2012/0215181 A1 8/2012 Lee
2012/0220977 A1 8/2012 Yow
2012/0220978 A1 8/2012 Lev et al.
2012/0296306 A1 11/2012 Seifert et al.
2012/0298254 A1 11/2012 Brem et al.
2012/0302986 A1 11/2012 Brem et al.
2012/0323172 A1 12/2012 Lev et al.
2012/0330269 A1 12/2012 Fangrow et al.
2013/0033034 A1 2/2013 Trombley, III et al.
2013/0053815 A1 2/2013 Mucientes et al.
2013/0060226 A1 3/2013 Fini et al.
2013/0066293 A1 3/2013 Garfield et al.
2013/0130197 A1 5/2013 Jessop et al.
2013/0180618 A1 7/2013 Py
2013/0218121 A1 8/2013 Waller et al.
2013/0226099 A1 8/2013 Fangrow
2013/0226128 A1 8/2013 Fangrow
2013/0228239 A1 9/2013 Cederschiöld
2013/0289515 A1 10/2013 Barron, III et al.
2013/0306169 A1 11/2013 Weibel
2014/0014210 A1 1/2014 Cederschiöld
2014/0020792 A1 1/2014 Kraus et al.
2014/0107588 A1 4/2014 Fangrow
2014/0124087 A1 5/2014 Anderson et al.
2014/0124092 A1 5/2014 Gonnelli et al.
2014/0124528 A1 5/2014 Fangrow
2014/0150925 A1 6/2014 Sjogren et al.
2014/0261860 A1 9/2014 Heath et al.
2014/0261877 A1 9/2014 Ivosevic et al.
2014/0276649 A1 9/2014 Ivosevic et al.
2014/0358073 A1 12/2014 Panian et al.
2015/0000787 A1 1/2015 Fangrow
2015/0011963 A1 1/2015 Fangrow
2015/0065987 A1 3/2015 Fangrow
2015/0082746 A1 3/2015 Ivosevic et al.
2015/0123398 A1 5/2015 Sanders et al.
2015/0126958 A1 5/2015 Sanders et al.
2015/0202121 A1 7/2015 Seifert
2015/0209230 A1 7/2015 Lev et al.
2015/0209232 A1 7/2015 Haindl
2015/0209233 A1 7/2015 Fukuoka
2015/0250680 A1 9/2015 Browka et al.
2015/0250681 A1 9/2015 Lev et al.
2015/0265500 A1 9/2015 Russo et al.
2015/0297451 A1 10/2015 Marici et al.
2015/0297453 A1 10/2015 Kim et al.
2015/0297454 A1 10/2015 Sanders et al.
2015/0297456 A1 10/2015 Marici et al.
2015/0297459 A1 10/2015 Sanders et al.
2015/0297817 A1 10/2015 Guala
2015/0297839 A1 10/2015 Sanders et al.
2015/0320642 A1 11/2015 Fangrow
2015/0320992 A1 11/2015 Bonnet et al.
2015/0359709 A1 12/2015 Kriheli et al.
2015/0366758 A1 12/2015 Noguchi et al.
2016/0000653 A1 1/2016 Kramer
2016/0008534 A1 1/2016 Cowan et al.

(56) References Cited

U.S. PATENT DOCUMENTS

| | | | |
|---|---|---|---|
| 2016/0038373 | A1 | 2/2016 | Ohlin |
| 2016/0038374 | A1 | 2/2016 | Merhold et al. |
| 2016/0051446 | A1 | 2/2016 | Lev et al. |
| 2016/0058667 | A1 | 3/2016 | Kriheli |
| 2016/0081878 | A1 | 3/2016 | Marks et al. |
| 2016/0081879 | A1 | 3/2016 | Garfield et al. |
| 2016/0101020 | A1 | 4/2016 | Guala |
| 2016/0106970 | A1 | 4/2016 | Fangrow |
| 2016/0120753 | A1 | 5/2016 | Warren |
| 2016/0120754 | A1 | 5/2016 | Warren |
| 2016/0136051 | A1 | 5/2016 | Lavi |
| 2016/0136412 | A1 | 5/2016 | McKinnon et al. |
| 2016/0206511 | A1 | 7/2016 | Garfield et al. |
| 2016/0206512 | A1 | 7/2016 | Chhikara et al. |
| 2016/0213568 | A1 | 7/2016 | Mansour et al. |
| 2016/0250102 | A1 | 9/2016 | Garfield et al. |
| 2016/0262981 | A1 | 9/2016 | Carrez et al. |
| 2016/0262982 | A1 | 9/2016 | Cederschiold |
| 2016/0338911 | A1 | 11/2016 | Fangrow |
| 2017/0007501 | A1 | 1/2017 | Schuldt-Lieb et al. |
| 2017/0027820 | A1 | 2/2017 | Okiyama et al. |
| 2017/0095404 | A1 | 4/2017 | Fangrow |
| 2017/0196772 | A1 | 7/2017 | Seifert |
| 2017/0196773 | A1 | 7/2017 | Fangrow |
| 2017/0202742 | A1 | 7/2017 | Cheng et al. |
| 2017/0202744 | A1 | 7/2017 | Fangrow |
| 2017/0202745 | A1 | 7/2017 | Seifert |
| 2017/0239140 | A1 | 8/2017 | Fangrow |
| 2017/0258682 | A1 | 9/2017 | Kriheli |
| 2018/0028402 | A1 | 2/2018 | Kriheli et al. |
| 2018/0099137 | A1 | 4/2018 | Fangrow |
| 2018/0125759 | A1 | 5/2018 | Fangrow |
| 2018/0161245 | A1 | 6/2018 | Kriheli |
| 2018/0193227 | A1 | 7/2018 | Marci et al. |
| 2018/0207063 | A1 | 7/2018 | Lopez et al. |
| 2018/0221572 | A1 | 8/2018 | Schlitt et al. |
| 2018/0280240 | A1 | 10/2018 | Fangrow et al. |
| 2019/0001114 | A1 | 1/2019 | Fangrow |
| 2019/0117515 | A1 | 4/2019 | Fangrow |
| 2019/0254926 | A1 | 8/2019 | Seifert et al. |
| 2019/0269900 | A1 | 9/2019 | Fangrow |
| 2019/0350812 | A1 | 11/2019 | Chhikara et al. |
| 2019/0358125 | A1 | 11/2019 | Chhikara et al. |
| 2020/0006372 | A1 | 1/2020 | Zhang et al. |
| 2020/0038293 | A1 | 2/2020 | Chhikara et al. |
| 2020/0069519 | A1 | 3/2020 | Fangrow |
| 2020/0069520 | A1 | 3/2020 | Fangrow |
| 2020/0093695 | A1 | 3/2020 | Seifert |
| 2020/0337948 | A1 | 10/2020 | Fangrow |
| 2021/0106499 | A1 | 4/2021 | Fangrow |
| 2021/0205175 | A1 | 7/2021 | Fangrow |
| 2021/0228444 | A1 | 7/2021 | Fangrow |
| 2021/0353500 | A1 | 11/2021 | Warren |
| 2022/0000798 | A1 | 1/2022 | Robbins et al. |
| 2022/0071848 | A1 | 3/2022 | Fangrow |
| 2022/0079843 | A1 | 3/2022 | Fangrow |
| 2023/0075991 | A1 | 3/2023 | Chhikara |
| 2023/0225943 | A1 | 7/2023 | Fangrow |
| 2023/0355476 | A1 | 11/2023 | Fangrow |
| 2024/0024197 | A1 | 1/2024 | Chhikara |
| 2024/0156685 | A1 | 5/2024 | Fangrow |
| 2024/0252399 | A1 | 8/2024 | Seifert |
| 2024/0315926 | A1 | 9/2024 | Fangrow |

FOREIGN PATENT DOCUMENTS

| | | |
|---|---|---|
| CN | 101801440 A | 8/2010 |
| EP | 0 829 250 | 3/1998 |
| EP | 2 036 529 | 3/2009 |
| EP | 2 744 469 | 10/2022 |
| GB | 2 000 685 | 1/1979 |
| JP | 39-17386 | 8/1961 |
| JP | 45-20604 | 8/1970 |
| JP | 57-208362 | 12/1982 |
| JP | H02-193677 | 7/1990 |
| JP | H06-66682 | 9/1994 |
| JP | 2001-505083 | 4/2001 |
| JP | 2011-516172 | 5/2011 |
| JP | 2012-228332 | 11/2012 |
| JP | 2015-077217 | 4/2015 |
| JP | 2015-211763 | 11/2015 |
| RU | 2264231 | 2/2005 |
| WO | WO 1984/004673 | 12/1984 |
| WO | WO 1997/02853 | 1/1997 |
| WO | WO 2000/035517 | 6/2000 |
| WO | WO 2005/041846 | 5/2005 |
| WO | WO 2005/065626 | 7/2005 |
| WO | WO 2008/036101 | 3/2008 |
| WO | WO 2008/129550 | 10/2008 |
| WO | WO 2008/153459 | 12/2008 |
| WO | WO 2008/153460 | 12/2008 |
| WO | WO 2009/105489 | 8/2009 |
| WO | WO 2009/146088 | 12/2009 |
| WO | WO 2010/069359 | 6/2010 |
| WO | WO 2010/093581 | 8/2010 |
| WO | WO 2010/120953 | 10/2010 |
| WO | WO 2013/025946 | 2/2013 |
| WO | WO 2013/104736 | 7/2013 |
| WO | WO 2013/106757 | 7/2013 |
| WO | WO 2013/134246 | 9/2013 |
| WO | WO 2013/142618 | 9/2013 |
| WO | WO 2014/116602 | 7/2014 |
| WO | WO 2014/163851 | 10/2014 |
| WO | WO 2015/029018 | 3/2015 |
| WO | WO 2015/118432 | 8/2015 |
| WO | WO 2015/166993 | 11/2015 |
| WO | WO 2016/147178 | 9/2016 |
| WO | WO 2018/064206 | 4/2018 |
| WO | WO 2018/186361 | 10/2018 |

OTHER PUBLICATIONS

International Preliminary Report on Patentability and Written Opinion issued Feb. 28, 2014, International Application No. PCT/US2012/051226, filed Aug. 16, 2012.

International Search Report and Written Opinion mailed Jun. 17, 2013, International Application No. PCT/US2013/33183.

B. Braun Medical, Inc., OnGuard Contained Medication System with Tevadaptor Components, Apr. 2007.

Phaseal, The PhaSeal® Solution, http://www.phaseal.com/siteUS/page.asp?menuitem=145&right=0, dated Jan. 9, 2006.

Phaseal, How to Use PhaSeal®, http://www.phaseal.com/siteUS/movies.asp?main=filmsmain&right=filmsright, dated Jul. 25, 2005.

Baxter Healthcare Corporation, "Protection Safety Products", IV Sets and Access Devices Medication Delivery Catalog, CHEMO-AIDE Dispensing Pin, Dec. 2002, pp. 7,21.

Wehmeir, Sally: "Oxford Advanced Learner's" Oxford University Press, 2000—in two pages.

Wikipedia, "Check Valve," [https://en.wikipedia.org/wiki/Check_valve], Aug. 16, 2011, in four pages.

Minutes, Oral Proceedings, re EP App., 12823375.6, dated Nov. 25, 2024.

EPO Decision on Opposition filed against European Patent No. EP 2 744 469, dated Nov. 25, 2024, in 30 pages.

EPO Withdrawal of the appeal filed against European Patent No. EP 2 744 469, dated Feb. 11, 2025.

ICU's Response dated Dec. 8, 2023 to European Opposition (dated Jul. 24, 2023), re EP Application No. 12823375.6.

Opposer's Response to ICU's Response to the Opposition, dated Mar. 4, 2024, re EP Application No. 12823375.6.

Summons to attend oral proceedings, dated Apr. 12, 2024, re EP Application No. 12823375.6.

English translation of Notice of Opposition filed by B. Braun Melsungen AG against European Patent No. EP 2 744 469 B1, dated Jul. 19, 2023.

Reply to Opposition filed against European Patent No. EP 2 744 469 B1, dated Dec. 8, 2023.

Auxiliary Requests filed with Reply to Opposition filed against European Patent No. EP 2 744 469 B1, dated Dec. 8, 2023.

(56) References Cited

OTHER PUBLICATIONS

Opposer's Response to Reply to Opposition filed against European Patent No. EP 2 744 469 B1, dated Feb. 27, 2024.
Preliminary Opinion of the European Patent Office in Opposition filed against European Patent No. EP 2 744 469 B1, dated Apr. 12, 2024.
ICU's Response Letter dated Aug. 5, 2024, regarding the Preliminary Opinion of the EPO Opposition (Opposition filed against European Patent No. EP 2 744 469 B1).
Braun's response/comments with English translation dated Sep. 6, 2024, to ICU's response dated Aug. 5, 2024 (Opposition filed against European Patent No. EP 2 744 469 B1).

* cited by examiner

PRESSURE-REGULATING VIAL ADAPTORS

RELATED APPLICATIONS

This application is a continuation of U.S. application Ser. No. 17/445,705, filed Aug. 23, 2021, titled "PRESSURE-REGULATING VIAL ADAPTORS," now U.S. Pat. No. 11,672,734, which is a continuation of U.S. application Ser. No. 16/872,754, filed May 12, 2020, titled "PRESSURE-REGULATING VIAL ADAPTORS," now U.S. Pat. No. 11,129,773, which is a continuation of U.S. application Ser. No. 15/932,248, filed Feb. 16, 2018, titled "PRESSURE-REGULATING VIAL ADAPTORS," now U.S. Pat. No. 10,688,022, which is a continuation of U.S. application Ser. No. 14/789,806, filed Jul. 1, 2015, titled "PRESSURE-REGULATING VIAL ADAPTORS," now U.S. Pat. No. 9,895,291, which is a continuation of U.S. application Ser. No. 14/179,475, filed Feb. 12, 2014, titled "PRESSURE-REGULATING VIAL ADAPTORS," now U.S. Pat. No. 9,132,062, which claims the benefit under 35 U.S.C. § 120 and 35 U.S.C. § 365 (c) as a continuation of International Application No. PCT/US2012/051226, designating the United States, with an international filing date of Aug. 16, 2012, titled "PRESSURE-REGULATING VIAL ADAPTORS," which claims the benefit under 35 U.S.C. § 119 (e) of U.S. Provisional Application No. 61/525,126, filed Aug. 18, 2011, titled "PRESSURE-REGULATING VIAL ADAPTORS," and of U.S. Provisional Application No. 61/614,250, filed Mar. 22, 2012, titled "PRESSURE-REGULATING VIAL ADAPTORS." The entire contents of each of the above-identified patent applications are incorporated by reference herein and made a part of this specification.

BACKGROUND

Field

Certain embodiments disclosed herein relate to adaptors for coupling with medicinal vials, and components thereof, and to methods that contain vapors and/or aid in regulating pressure within medicinal vials.

Description of the Related Art

It is a common practice to store medicines or other medically related fluids in vials or other containers. In some instances, the medicines or fluids so stored are therapeutic if injected into the bloodstream, but harmful if inhaled or if contacted by exposed skin. Certain known systems for extracting potentially harmful medicines from vials suffer from various drawbacks.

SUMMARY

In some embodiments, an adaptor is configured to couple with a sealed vial and includes a housing apparatus. In some instances, the housing apparatus includes a distal extractor aperture configured to permit withdrawal of fluid from the sealed vial when the adaptor is coupled to the sealed vial. In certain cases, at least a portion of an extractor channel and at least a portion of a regulator channel pass through the housing apparatus. The adaptor can also include an enclosure, such as a regulator enclosure, in fluid communication with the regulator channel. In some configurations, the regulator enclosure is configured to move between a first orientation, in which at least a portion of the regulator enclosure is at least partially expanded or unfolded, and a second orientation, in which at least a portion of the regulator enclosure is at least partially unexpanded or folded, when a fluid is withdrawn from the sealed vial via the extractor channel. Further, the adaptor can include a volume component, such as a filler, disposed within the regulator enclosure. The filler need not fill the entire enclosure. In some embodiments, the volume occupied or encompassed by the filler can be less than the majority of the interior volume of the enclosure, or at least the majority of the interior volume of the enclosure, or substantially all of the interior volume of the enclosure. In some instances, the filler is configured to ensure an initial volume of regulator fluid within the regulator enclosure, thereby permitting the adaptor to supply regulator fluid to the sealed vial from the regulator enclosure when fluid is withdrawn from the sealed vial via the extractor aperture.

In certain configurations, the adaptor is configured such that the regulator enclosure is outside the sealed vial when the adaptor is coupled with the sealed vial. In some cases, at least a majority of the volume of the regulator enclosure is not within a rigid housing or at least a substantial portion of the regulator enclosure is not within a rigid housing.

In certain instances, the housing apparatus comprises a medical connector interface in fluid communication with the extractor channel and is configured to couple with a syringe configured to hold a defined volume of fluid within a barrel. In some such cases, the filler is configured to ensure that the initial volume of regulator fluid is greater than or equal to the defined volume of fluid. In certain of such cases, the initial volume of regulator fluid within the regulator enclosure is greater than or equal to about 60 mL. In some embodiments, the regulator enclosure is configured to hold a maximum volume of regulator fluid when the regulator enclosure is fully expanded or unfolded, wherein the maximum volume is greater than or equal to about 180 mL.

In some embodiments, the regulator enclosure is constructed from a material system including a film, such as a polyethylene terephthalate film. In some instances, the film includes a metalized coating or metal component. For example, in some cases, the metalized coating comprises aluminum.

In certain embodiments, the pressure regulating vial adaptor includes a piercing member connected to the housing apparatus, and the enclosure is at least partially disposed within the piercing member. In some configurations, the pressure within the sealed vial is regulated by permitting the regulator enclosure to contract or fold in order to substantially equilibrate pressure on opposite sides of the regulator enclosure as the medicinal fluid is withdrawn from the sealed vial. In some instances, the regulator enclosure comprises a layer that is substantially impermeable to a medicinal fluid disposed within the vial, thereby impeding the passage of the medicinal fluid between an outer surface and an inner surface of the regulator enclosure.

In various embodiments, the adaptor further includes a hydrophobic filter disposed between the regulator enclosure and a distal regulator aperture. The hydrophobic filter can be configured to permit regulator fluid to flow between the regulator enclosure and the vial when the adaptor is coupled with the vial. In some arrangements, the hydrophobic filter is disposed within the regulator channel, which is itself disposed between the distal regulator aperture and the regulator enclosure. The filter can, for example, be a foamed material. For instance, in some configurations, the filler is made of polyurethane-ether foam.

In some embodiments, a method of withdrawing fluid from a sealed vial includes connecting a pressure regulating vial adaptor to the sealed vial, and withdrawing fluid from the sealed vial through the pressure regulating vial adaptor. In certain aspects, the pressure regulating vial adaptor includes a housing apparatus including a distal extractor aperture. In some cases, the distal extractor aperture is configured to permit withdrawal of fluid from the sealed vial when the adaptor is coupled to the sealed vial. In certain instances, at least a portion of an extractor channel and at least a portion of a regulator channel pass through the housing apparatus.

In certain configurations, the pressure regulating vial adaptor also includes a regulator enclosure in fluid communication with the regulator channel. In some instances, the regulator enclosure is configured to move between a first orientation, in which at least a portion of the regulator enclosure is at least partially expanded or unfolded, and a second orientation, in which at least a portion of the regulator enclosure is at least partially unexpanded or folded, when a fluid is withdrawn from the sealed vial via the extractor channel.

In some embodiments, the pressure regulating vial adaptor further includes a filler disposed within the regulator enclosure. The filler can be configured to provide an initial volume of regulator fluid within the regulator enclosure, thereby permitting the adaptor to supply regulator fluid to the sealed vial from the regulator enclosure when fluid is withdrawn from the sealed vial via the extractor aperture.

In various embodiments, a method of manufacturing an adaptor for coupling with a sealed vial includes providing a housing apparatus including a distal extractor aperture. In some cases, the distal extractor aperture is configured to permit withdrawal of fluid from the sealed vial when the adaptor is coupled to the sealed vial. In certain instances, at least a portion of an extractor channel and at least a portion of a regulator channel pass through the housing apparatus.

The method can also include disposing a filler within a regulator enclosure. The filler can be configured to ensure an initial volume of regulator fluid within the regulator enclosure, thereby permitting the adaptor to supply regulator fluid to the sealed vial from the regulator enclosure when fluid is withdrawn from the sealed vial via the extractor aperture.

In certain configurations, the method further includes placing the regulator enclosure in fluid communication with the regulator channel, such that the regulator enclosure is configured to move between a first orientation, in which at least a portion of the regulator enclosure is at least partially expanded or unfolded, and a second orientation, in which at least a portion of the regulator enclosure is less expanded or substantially or entirely unexpanded, or folded, when a fluid is withdrawn from the sealed vial via the extractor channel.

In some embodiments of the method, disposing the filler within a regulator enclosure includes forming or providing a fill opening in the regulator enclosure configured to allow the filler to pass therethrough, filling the regulator enclosure with the filler through the fill opening, and closing the fill opening. In certain embodiments of the method, placing the regulator enclosure in fluid communication with the regulator channel comprises aligning an enclosure opening in the regulator enclosure with a proximal regulator aperture of the housing apparatus, and fastening the regulator enclosure to the housing apparatus.

In various embodiments, an adaptor configured to couple with a sealed vial includes a housing apparatus including a distal extractor aperture configured to permit withdrawal of fluid from the sealed vial when the adaptor is coupled to the sealed vial. In some cases, at least a portion of an extractor channel and at least a portion of a regulator channel pass through the housing apparatus. Also, the adaptor can include a regulator enclosure in fluid communication with the regulator channel. In some cases, the regulator enclosure is configured to move between a first orientation, in which at least a portion of the regulator enclosure is at least partially expanded or unfolded, and a second orientation, in which at least a portion of the regulator enclosure is at least partially unexpanded or folded, when a fluid is withdrawn from the sealed vial via the extractor channel. In certain embodiments, a rigid housing does not contain a substantial volume of the regulator enclosure.

In some embodiments, the regulator enclosure comprises a first side and a second side opposite the first side. In some instances, each of the first and second sides is configured to expand, contract, fold, or unfold as regulator fluid flows between the regulator channel and the regulator enclosure. In certain cases, the second side is configured to move away from the housing apparatus or towards the housing apparatus when regulator fluid passes through the regulator channel. In some cases, the first side comprises an inner surface forming a portion of the regulator enclosure interior and an outer surface forming a portion of the regulator enclosure exterior. In certain of such cases, the outer surface of the first side is oriented towards the housing apparatus.

In some embodiments, pressure within the sealed vial is regulated by allowing the regulator enclosure to contract or fold in order to substantially equilibrate pressure on opposite sides of the regulator enclosure as the medicinal fluid is withdrawn from the sealed vial. In some embodiments, the regulator enclosure comprises a layer that is substantially impermeable to a medicinal fluid disposed within the vial, thereby impeding the passage of the medicinal fluid between an outer surface and an inner surface of the enclosure.

The adaptor can further include a hydrophobic filter disposed between the regulator enclosure and a distal regulator aperture. The hydrophobic filter can be configured to permit regulator fluid to flow between the regulator enclosure and the vial when the adaptor is coupled with the vial.

The adaptor can also include a filler disposed within the regulator enclosure. The filler can be configured to ensure an initial volume of regulator fluid within the regulator enclosure, thereby permitting the adaptor to supply regulator fluid to the sealed vial from the regulator enclosure when fluid is withdrawn from the sealed vial via the extractor aperture.

In some embodiments, a vial adaptor configured to couple with a sealed vial includes a housing apparatus including a distal extractor aperture configured to permit withdrawal of fluid from the sealed vial when the adaptor is coupled to the sealed vial. In some instances, at least a portion of an extractor channel and at least a portion of a regulator channel pass through the housing apparatus. In certain embodiments, the vial adaptor further includes a regulator enclosure in fluid communication with the regulator channel. In some cases, the regulator enclosure is configured to move between a first orientation, in which at least a portion of the regulator enclosure is at least partially expanded or unfolded, and a second orientation, in which at least a portion of the regulator enclosure is at least partially unexpanded or folded, when a fluid is withdrawn from the sealed vial via the extractor channel.

In some embodiments of the vial adaptor, the regulator enclosure has a first side and a second side generally opposite the first side. The first side can comprise an inner surface forming a portion of the regulator enclosure interior and an outer surface forming a portion of the regulator enclosure exterior. The outer surface of the first side can be oriented towards the housing apparatus. In some instances, each of the first and second sides is configured to expand, contract, fold, or unfold when regulator fluid, such as air, gas, or vapors, passes through the regulator channel. In certain configurations, the second side is configured to move away from the housing apparatus or towards the housing apparatus when regulator fluid passes through the regulator channel. In various cases, the regulator enclosure is not entirely contained within a rigid housing.

In some embodiments, a vial adaptor configured to couple with a sealed vial includes a housing apparatus including a distal extractor aperture configured to permit withdrawal of fluid from the sealed vial when the adaptor is coupled to the sealed vial. In various configurations, at least a portion of an extractor channel and at least a portion of a regulator channel pass through the housing apparatus. In certain embodiments, the vial adaptor includes a regulator enclosure in fluid communication with the regulator channel and configured to receive a volume of regulating fluid. The regulator enclosure can be configured to move between a first orientation, in which at least a portion of the regulator enclosure is at least partially expanded or unfolded, and a second orientation, in which at least a portion of the regulator enclosure is at least partially unexpanded or folded, when a fluid is withdrawn from the sealed vial via the extractor channel.

In some embodiments, the regulator enclosure has a first layer connected with a second layer opposite the first layer. The first and second layers can be configured to receive the volume of regulating fluid therebetween. In certain configurations, each of the first and second sides is configured to expand, contract, fold, or unfold when regulator fluid passes through the regulator channel. In some instances, the second side is configured to move away from the housing apparatus or towards the housing apparatus when regulator fluid passes through the regulator channel. In some cases, the regulator enclosure is not entirely contained within a rigid housing.

In certain configurations, the first layer is made of a first sheet of material, and the second layer is made of a second sheet of material. In some instances, the first and second layers are connected at a periphery of the first and second layers. In some cases, the first and second layers each comprise a central portion, and the first and second layers are not connected at the central portions.

In some embodiments, a modular vial adaptor configured to couple with a sealed vial includes a pressure regulating vial adaptor module and a regulator fluid module. In some instances, the pressure regulating vial adaptor module includes a housing apparatus including a distal extractor aperture configured to permit withdrawal of fluid from the sealed vial when the adaptor is coupled to the sealed vial. In certain cases, at least a portion of an extractor channel and at least a portion of a regulator channel pass through the housing apparatus.

The pressure regulating vial adaptor module can include a proximal regulator aperture in fluid communication with the regulator channel. In some configurations, the proximal regulator aperture is configured to permit ingress or egress of regulator fluid therethrough when the vial adaptor module is coupled with the sealed vial and fluid is withdrawn from the vial.

In certain instances, the regulator fluid module is configured to couple with the proximal regulator aperture and includes a regulator enclosure configured to move between a first orientation, in which at least a portion of the regulator enclosure is at least partially expanded or unfolded, and a second orientation, in which at least a portion of the regulator enclosure is at least partially unexpanded or folded, when regulator fluid passes through an enclosure opening in the regulator enclosure.

The regulator fluid module can include a fastener configured to couple the regulator enclosure with the proximal regulator aperture. In some instances, the regulator enclosure is not entirely contained within a rigid housing. In certain cases, the fastener includes a bonding member having first and second surfaces coated with adhesive. In some such cases, the bonding member is constructed from a material system comprising resilient material.

In some embodiments, the method of manufacturing a vial adaptor configured to couple with a sealed vial includes providing a pressure regulating vial adaptor module, and providing a regulator fluid module. The pressure regulating vial adaptor module can include a housing apparatus. The housing apparatus can include a distal extractor aperture configured to permit withdrawal of fluid from the sealed vial when the adaptor is coupled to the sealed vial. In certain instances, at least a portion of an extractor channel and at least a portion of a regulator channel pass through the housing apparatus.

The pressure regulating vial adaptor module can include a proximal regulator aperture in fluid communication with the regulator channel. The proximal regulator aperture can be configured to permit ingress or egress of regulator fluid therethrough when the vial adaptor module is coupled with the sealed vial and fluid is withdrawn from the vial.

In some embodiments, the regulator fluid module includes a regulator enclosure. The regulator enclosure can be configured to move between a first orientation, in which at least a portion of the regulator enclosure is at least partially expanded or unfolded, and a second orientation, in which at least a portion of the regulator enclosure is at least partially unexpanded or folded, when regulator fluid passes through an enclosure opening in the regulator enclosure. The regulator fluid module can include a fastener configured to couple the regulator enclosure with the proximal regulator aperture. In some cases, the regulator enclosure is not entirely contained within a rigid housing.

The method can further include aligning the enclosure opening of the regulator enclosure with the proximal regulator aperture of the pressure regulating vial adaptor module. In certain embodiments, the method also includes fastening the regulator fluid module to the pressure regulating vial adaptor module.

In certain instances, the fastener comprises a bonding member having first and second surfaces coated with adhesive. In some such cases, the bonding member is constructed from a material system comprising resilient material. In some cases, the bonding member has a thickness greater than or equal to about 0.01 inches and less than or equal to about 0.03 inches.

In some embodiments, a regulator fluid module is configured to fasten to a pressure regulating vial adaptor module to form a vial adaptor for coupling with a sealed vial. The pressure regulating vial adaptor module can include a housing apparatus including a distal extractor aperture configured to permit withdrawal of fluid from the sealed vial when the adaptor is coupled to the sealed vial. In some cases, at least a portion of an extractor channel and at least a portion of a regulator channel pass through the housing apparatus. In certain instances, the housing apparatus also includes a proximal regulator aperture in fluid communication with the regulator channel. The proximal regulator aperture can be configured to permit ingress or egress of regulator fluid therethrough when the vial adaptor module is coupled with a sealed vial and fluid is withdrawn from the vial.

The regulator fluid module can include a regulator enclosure configured to move between a first orientation, in which at least a portion of the regulator enclosure is at least partially expanded or unfolded, and a second orientation, in which at least a portion of the regulator enclosure is at least partially unexpanded or folded, when regulator fluid passes through an enclosure opening in the regulator enclosure.

The regulator fluid module can include a filler within the regulator enclosure. The filler can be configured to supply an initial volume of regulator fluid within the regulator enclosure, thereby permitting the adaptor to supply regulator fluid to the sealed vial from the regulator enclosure when fluid is withdrawn from the sealed vial via the extractor aperture.

In various embodiments, the regulator fluid module includes a fastener configured to couple the regulator enclosure with the proximal regulator aperture such that the regulator fluid module is permitted to move small distances with respect to the pressure regulating vial adaptor module without causing the fastener to become ripped, torn, or otherwise damaged during routine manipulation of the vial adaptor. In some cases, the regulator enclosure is not entirely contained within a rigid housing. In certain configurations, the fastener substantially airtightly couples the regulator enclosure and the proximal regulator aperture.

In some embodiments, a method of manufacturing a modular adaptor for coupling with and regulating the pressure in a sealed vial includes forming a housing apparatus including a distal access aperture. The distal access aperture can be configured to permit transfer of fluid between a medical device and the sealed vial when the adaptor is coupled to the sealed vial. In some instances, at least a portion of an access channel and at least a portion of a regulator channel pass through the housing apparatus. The regulator channel can be in fluid communication with the sealed vial when the adaptor is coupled to the sealed vial.

The method can include connecting a coupling assembly such that the coupling assembly is in fluid communication with the regulator channel. The coupling assembly can include a membrane and a cover, which in turn can include an aperture. The coupling assembly can be configured to allow a flow of regulating fluid between the aperture and the regulator channel. In some instances, the flow of regulating fluid passes through the membrane.

In some embodiments, the method includes providing a regulator enclosure configured to be positioned in fluid communication with the aperture, such that the regulator enclosure is configured to move between a first orientation, in which at least a portion of the regulator enclosure is at least partially expanded or unfolded, and a second orientation, in which at least a portion of the regulator enclosure is at least partially unexpanded or folded, when a regulator fluid passes through an opening in the regulator enclosure.

In various cases, the method further includes selecting the regulator enclosure from a variety of sizes of regulator enclosures. In some embodiments, the selection can be based on the volume of the medicinal fluid to be withdrawn from the sealed vial. In some instances, the flow of regulating fluid passes between the aperture and the sealed vial when the medicinal fluid is withdrawn from the sealed vial via the access channel. In certain cases, the aperture is in fluid communication with ambient air prior to the regulator enclosure being positioned in fluid communication with the aperture In certain embodiments, a vial adaptor comprises a housing configured to couple the adaptor with a vial, an access channel, a regulator channel, and a regulator assembly. The access channel is configured to facilitate withdrawal of fluid from the vial when the adaptor is coupled to the vial. The regulator channel is configured to facilitate a flow of a regulating fluid from the regulator assembly to compensate for changes in volume of a medical fluid in the vial. In some embodiments, the regulator assembly includes a flexible member configured to expand and contract in accordance with changes in the volume of the medical fluid in the vial. In some embodiments, the flexible member is substantially free to expand and contract. In some embodiments, the flexible member is not partly or completely located in a rigid enclosure. In some embodiments, at least a majority of the flexible member is located in a rigid enclosure. In some embodiments, the regulator assembly includes a filter within the regulator channel. In some embodiments, the regulator assembly includes a check valve which can prevent liquid communication between a filter within the regulator channel and the vial. In some embodiments, the check valve can prevent liquid communication between the vial and a flexible member on the end of the regulator channel.

In some embodiments, a vial adaptor has an axial centerline and is configured to be used in an area with a floor. The vial adaptor can be configured to couple with a sealed vial. The vial adaptor can have a piercing member and an extractor channel, the extractor channel extending between a proximal extractor aperture and a distal extractor aperture and configured to permit withdrawal of fluid from the sealed vial when the vial adaptor is coupled to the sealed vial. In some variants, at least a portion of the extractor channel passes through at least a portion of the piercing member. The vial adaptor can include a regulator channel that extends between a proximal regulator aperture and a distal regulator aperture. In some embodiments, at least a portion of the regulator channel passes through at least a portion of the piercing member.

An occluder valve can be housed in the regulator channel and can be configured to transition between a closed configuration and an opened configuration in response to rotation of the vial adaptor about an axis of rotation between an upright position and an upside down position. In some configurations, the proximal extractor aperture is further from the floor than the distal aperture when the vial adaptor is in the upright position and the proximal extractor aperture is closer to the floor than the distal extractor aperture when the vial adaptor is in the upside down position. Furthermore, the occluder valve can inhibit passage of fluid past the occluder valve toward the proximal regulator aperture when the occluder valve is in the closed configuration. The axis of rotation can be perpendicular to the axial centerline of the vial adaptor and the manner in which the occluder valve transitions between the closed configuration and the opened configuration can be substantially independent of the axis of rotation about which the vial adaptor is rotated.

In certain cases, the occluder valve transitions to the closed configuration when the vial adaptor is rotated to the upside down position. Furthermore, in some certain cases, the occluder valve transitions to the opened configuration when the vial adaptor is rotated to the upright position. The occluder valve can have a generally cylindrical shape and an axial centerline. In some embodiments, the occluder valve is rotatable about the axial centerline of the occluder valve with respect to the regulator channel.

The vial adaptor can include a valve chamber in fluid communication with the regulator channel, an occluding member within the valve chamber, and a valve seat. In some embodiments, the occluder valve is configured to transition to the closed configuration upon engagement between the occluding member and the valve seat and is configured to transition to the opened configuration upon disengagement of the occluding member from the valve seat. In some cases, the occluding member moves within the valve chamber under the influence of gravity. The occluding member can be a spherical ball, have a cylindrical body with a tapered end, have an ellipsoidal shape, can have a generally cylindrical shape with an axial centerline, or can have some other suitable shape or combination of shapes.

In certain embodiments, the vial adaptor includes a filter. The filter can be positioned in the regulator channel between the occluder valve and the proximal regulator aperture. In some embodiments, the filter is a hydrophobic filter.

In some certain embodiments, a vial adaptor has an axial centerline and is configured to couple with a sealed vial. The vial adaptor can include a piercing member and an extractor channel. At least a portion of the extractor channel can pass through at least a portion of the piercing member. In some embodiments, the vial adaptor includes a regulator channel that can extend between a proximal regulator aperture and a distal regulator aperture, wherein at least a portion of the regulator channel passes through at least a portion of the piercing member.

The vial adaptor can include an occluder valve configured to be installed in at least a portion of the regulator channel via an installation path. The occluder valve can be further configured to transition between a closed configuration and an opened configuration. In some embodiments, the occluder valve includes a valve chamber in fluid communication with the regulator channel. The valve chamber can have an occluding member, a movement path for the occluding member, and a valve seat. In some embodiments, the occluder valve includes a valve channel in fluid communication with the valve chamber and the regulator channel, the valve channel having a flow path. The occluder valve can be configured to transition to the closed configuration when the occluding member is engaged with the valve seat. In some embodiments, the occluder valve is configured to transition to the opened configuration when the occluding member is disengaged from the valve seat. The angle formed between the movement path of the occluding member and the installation path of the occluder valve can be greater than 0° and less than 180°. In some embodiments, the movement path for the occluding member is not substantially parallel to the installation path of the occluder valve.

In some embodiments, the occluding member can be a spherical ball, have a cylindrical shape with one tapered end, have an ellipsoidal shape, or can have any other appropriate shape or combination of shapes. In some embodiments, the angle formed between the movement path of the occluding member and the installation path of the occluder valve is greater than about 45° and less than about 135°. In some embodiments, the angle formed between the movement path and the installation path is about 90°. The angle formed between the movement path and the installation path can be substantially the same as the angle formed between the axial centerline of the vial adaptor and the installation path. In some embodiments, the vial adaptor includes a filter in the regulator channel between the occluder valve and the proximal regulator aperture. The filter can be a hydrophobic filter.

A method of manufacturing a modular vial adaptor configured to couple with a sealed vial can include selecting a connector interface having an axial centerline. The connector interface can have a piercing member and an extractor channel, wherein the extractor channel passes through at least a portion of the piercing member. In some embodiments, the connector interface has a regulator channel extending between a proximal regulator aperture and a distal regulator aperture, wherein at least a portion of the regulator channel passes through at least a portion of the piercing member.

In some embodiments, the method of manufacturing can include coupling a regulator assembly with the proximal regulator aperture of the connector interface. The regulator assembly can include a regulator path configured to be in fluid communication with the regulator channel when the regulator assembly is couple with the connector interface. In some embodiments, the regulator includes an occluder valve installed at least partially within one or more of the regulator channel and the regulator path via an installation path. The occluder valve can be configured to transition between a closed configuration and an opened configuration. In some embodiments, the occluder valve includes a valve chamber in fluid communication with one or more of the regulator channel and the regulator path. The valve chamber can have an occluding member, a movement path for the occluding member, and a valve seat. In some embodiments, the occluder valve can have a valve channel in fluid communication with the valve chamber and one or more of the regulator channel and the regulator path. Furthermore, the valve channel can have a flow path.

The occluder valve can be configured to transition to the closed configuration when the occluding member is engaged with the valve seat. In some embodiments, the occluder valve is configured to transition to the opened configuration when the occluding member is disengaged from the valve seat. An angle formed between the movement path for the occluding member and the installation path of the occluder valve can be greater than 0° and less than 180°.

The method of manufacturing the modular vial adaptor could include installing the occluder valve at least partially into one or more of the regulator channel and the regulator path via an installation path. In some embodiments, the method includes selecting an occluder valve wherein the angle between the movement path in the occluder valve and the installation path of the occluder valve is substantially the same as the angle between the installation path and the axial centerline of the coupling interface. The method can include matching a protrusion of the regulator assembly with the proximal regulator aperture of the connector interface, wherein the protrusion and proximal regulator aperture are keyed. In some embodiments, the method includes matching an alignment feature on the occluder valve with an alignment feature of the regulator channel. Matching the alignment feature of the occluder valve with the alignment feature of the regulator channel can orient the occluder valve such that the movement path is substantially parallel to the axial centerline of the connector interface when the regulator assembly is coupled to the connector interface and the occluder valve is at least partially installed in one or more of the regulator channel and the regulator path.

BRIEF DESCRIPTION

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

FIG. 1 schematically illustrates a system for removing fluid from and/or injecting fluid into a vial.

FIG. 2 schematically illustrates another system for removing fluid from and/or injecting fluid into a vial.

FIG. 2A schematically illustrates another system for removing fluid from and/or injecting fluid into a vial.

DETAILED DESCRIPTION

Figure 1:
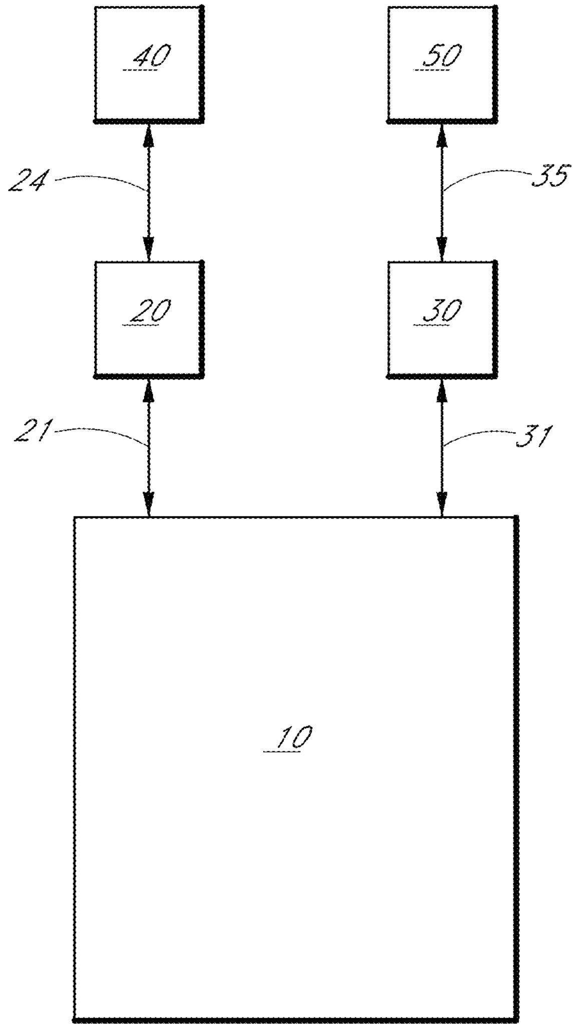

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The drawing showing certain embodiments can be semi-diagrammatic and not to scale and, particularly, some of the dimensions are for the clarity of presentation and are shown greatly exaggerated in the drawings.

For expository purposes, the term “horizontal” as used herein is defined as a plane parallel to the plane or surface of the floor of the area in which the device being described is used or the method being described is performed, regardless of its orientation. The term “floor” floor can be interchanged with the term “ground.” The term “vertical” refers to a direction perpendicular to the horizontal as just defined. Terms such as “above,” “below,” “bottom,” “top,” “side,” “higher,” “lower,” “upper,” “over,” and “under,” are defined with respect to the horizontal plane.

Numerous medicines and other therapeutic fluids are stored and distributed in medicinal vials or other containers of various shapes and sizes. These vials are hermetically sealed to prevent contamination or leaking of the stored fluid. The pressure differences between the interior of the sealed vials and the particular atmospheric pressure in which the fluid is later removed often give rise to various problems, as well as the release of potentially harmful vapors.

For instance, introducing a piercing member of a vial adaptor through the septum of a vial can cause the pressure within the vial to rise. This pressure increase can cause fluid to leak from the vial at the interface of the septum and piercing member or at the attachment interface of the adaptor and a medical device, such as a syringe. Also, it can be difficult to withdraw an accurate amount of fluid from a sealed vial using an empty syringe, or other medical instrument, because the fluid may be naturally urged back into the vial once the syringe plunger is released. Furthermore, as the syringe is decoupled from the vial, pressure differences can often cause an amount of fluid to spurt from the syringe or the vial.

Moreover, in some instances, introducing a fluid into the vial can cause the pressure to rise in the vial. For example, in certain cases it can be desirable to introduce a solvent (such as sterile saline) into the vial, e.g., to reconstitute a lyophilized pharmaceutical in the vial. Such introduction of fluid into the vial can cause the pressure in the vial to rise above the pressure of the surrounding environment, which can result in fluid leaking from the vial at the interface of the septum and piercing member or at the attachment interface of the adaptor and a medical device, such as a syringe. Further, the increased pressure in the vial can make it difficult to introduce an accurate amount of the fluid into the vial with a syringe, or other medical instrument. Also, should the syringe be decoupled from the vial when the pressure inside the vial is greater than the surrounding pressure (e.g., atmospheric), the pressure gradient can cause a portion of the fluid to spurt from the vial.

Additionally, in many instances, air bubbles are drawn into the syringe as fluid is withdrawn from the vial. Such bubbles are generally undesirable as they could result in an embolus if injected into a patient. To rid a syringe of bubbles after removal from the vial, medical professionals often flick the syringe, gathering all bubbles near the opening of the syringe, and then forcing the bubbles out. In so doing, a small amount of liquid is usually expelled from the syringe as well. Medical personnel generally do not take the extra step to re-couple the syringe with the vial before expelling the bubbles and fluid. In some instances, this may even be prohibited by laws and regulations. Such laws and regulations may also necessitate expelling overdrawn fluid at some location outside of the vial in certain cases. Moreover, even if extra air or fluid were attempted to be reinserted in the vial, pressure differences can sometimes lead to inaccurate measurements of withdrawn fluid.

To address these problems caused by pressure differentials, medical professionals frequently pre-fill an empty syringe with a precise volume of ambient air corresponding to the volume of fluid that they intend to withdraw from the vial. The medical professionals then pierce the vial and expel this ambient air into the vial, temporarily increasing the pressure within the vial. When the desired volume of fluid is later withdrawn, the pressure differential between the interior of the syringe and the interior of the vial is generally near equilibrium. Small adjustments of the fluid volume within the syringe can then be made to remove air bubbles without resulting in a demonstrable pressure differential between the vial and the syringe. However, a significant disadvantage to this approach is that ambient air, especially in a hospital setting, may contain various airborne viruses, bacteria, dust, spores, molds, and other unsanitary and harmful contaminants. The pre-filled ambient air in the syringe may contain one or more of these harmful substances, which may then mix with the medicine or other therapeutic fluid in the vial. If this contaminated fluid is injected directly into a patient's bloodstream, it can be particularly dangerous because it circumvents many of the body's natural defenses to airborne pathogens. Moreover, patients who need the medicine and other therapeutic fluids are more likely to be suffering from a diminished infection-fighting capacity.

In the context of oncology and certain other drugs, all of the foregoing problems can be especially serious. Such drugs, although helpful when injected into the bloodstream of a patient, can be extremely harmful if inhaled or touched. Accordingly, such drugs can be dangerous if allowed to spurt unpredictably from a vial due to pressure differences. Furthermore, these drugs are often volatile and may instantly aerosolize when exposed to ambient air. Accordingly, expelling a small amount of such drugs in order to clear a syringe of bubbles or excess fluid, even in a controlled manner, is generally not a viable option, especially for medical personnel who may repeat such activities numerous times each day.

Some devices use rigid enclosures for enclosing all or a portion of a volume-changing component or region for assisting in regulating pressure within a container. Although such enclosures can provide rigidity, they generally make the devices bulky and unbalanced. Coupling such a device with a vial generally can create a top-heavy, unstable system that is prone to tipping-over and possibly spilling the contents of the device and/or the vial.

Indeed, certain of such coupling devices include relatively large and/or heavy, rigid components that are cantilevered or otherwise disposed a distance from of the axial center of the device, thereby exacerbating the tendency for the device to tip-over.

Additionally, such rigid enclosures can increase the size of the device, which can require an increase in material to form the device and otherwise increase costs associated manufacturing, transporting, and/or storing the device. Further, such rigid enclosures can hamper the ability of the device to expand or contract to deliver a regulating fluid to the vial. No feature, structure, or step disclosed herein is essential or indispensible.

FIG. 1 is a schematic illustration of a container 10, such as a medicinal vial, that can be coupled with an accessor 20 and a regulator 30. In certain arrangements, the regulator 30 allows the removal of some or all of the contents of the container 10 via the accessor 20 without a significant change of pressure within the container 10.

In general, the container 10 is hermetically sealed to preserve the contents of the container 10 in a sterile environment. The container 10 can be evacuated or pressurized upon sealing. In some instances, the container 10 is partially or completely filled with a liquid, such as a drug or other medical fluid. In such instances, one or more gases can also be sealed in the container 10. In some instances, a solid or powdered substance, such as a lyophilized pharmaceutical, is disposed in the container 10.

The accessor 20 generally provides access to contents of the container 10 such that the contents may be removed or added to. In certain arrangements, the accessor 20 includes an opening between the interior and exterior of the container 10. The accessor 20 can further comprise a passageway between the interior and exterior of the container 10. In some configurations, the passageway of the accessor 20 can be selectively opened and closed. In some arrangements, the accessor 20 comprises a conduit extending through a surface of the container 10. The accessor 20 can be integrally formed with the container 10 prior to the sealing thereof or introduced to the container 10 after the container 10 has been sealed.

In some configurations, the accessor 20 is in fluid communication with the container 10, as indicated by an arrow 21. In certain of these configurations, when the pressure inside the container 10 varies from that of the surrounding environment, the introduction of the accessor 20 to the container 10 causes a transfer through the accessor 20. For example, in some arrangements, the pressure of the environment that surrounds the container 10 exceeds the pressure within the container 10, which may cause ambient air from the environment to ingress through the accessor 20 upon insertion of the accessor 20 into the container 10. In other arrangements, the pressure inside the container 10 exceeds that of the surrounding environment, causing the contents of the container 10 to egress through the accessor 20.

In some configurations, the accessor 20 is coupled with an exchange device 40. In certain instances, the accessor 20 and the exchange device 40 are separable. In some instances, the accessor 20 and the exchange device 40 are integrally formed. The exchange device 40 is configured to accept fluids and/or gases from the container 10 via the accessor 20, to introduce fluids and/or gases to the container 10 via the accessor 20, or to do some combination of the two. In some arrangements, the exchange device 40 is in fluid communication with the accessor 20, as indicated by an arrow 24. In certain configurations, the exchange device 40 comprises a medical instrument, such as a syringe.

In some instances, the exchange device 40 is configured to remove some or all of the contents of the container 10 via the accessor 20. In certain arrangements, the exchange device 40 can remove the contents independent of pressure differences, or lack thereof, between the interior of the container 10 and the surrounding environment. For example, in instances where the pressure outside of the container 10 exceeds that within the container 10, an exchange device 40 comprising a syringe can remove the contents of the container 10 if sufficient force is exerted to extract the plunger from the syringe. The exchange device 40 can similarly introduce fluids and/or gases to the container 10 independent of pressure differences between the interior of the container 10 and the surrounding environment.

In certain configurations, the regulator 30 is coupled with the container 10. The regulator 30 generally regulates the pressure within the container 10. As used herein, the term "regulate," or any derivative thereof, is a broad term used in its ordinary sense and includes, unless otherwise noted, any active, affirmative, or positive activity, or any passive, reactive, respondent, accommodating, or compensating activity that tends to effect a change. In some instances, the regulator 30 substantially maintains a pressure difference, or equilibrium, between the interior of the container 10 and the surrounding environment. As used herein, the term "maintain," or any derivative thereof, is a broad term used in its ordinary sense and includes the tendency to preserve an original condition for some period, with some small degree of variation permitted as may be appropriate in the circumstances. In some instances, the regulator 30 maintains a substantially constant pressure within the container 10. In certain instances, the pressure within the container 10 varies by no more than about 1 psi, no more than about 2 psi, no more than about 3 psi, no more than about 4 psi, or no more than about 5 psi. In still further instances, the regulator 30 equalizes pressures exerted on the contents of the container 10. As used herein, the term "equalize," or any derivative thereof, is a broad term used in its ordinary sense and includes the tendency for causing quantities to be the same or close to the same, with some small degree of variation permitted as may be appropriate in the circumstances. In certain configurations, the regulator 30 is coupled with the container 10 to allow or encourage equalization of a pressure difference between the interior of the container 10 and some other environment, such as the environment surrounding the container 10 or an environment within the exchange device 40. In some arrangements, a single device comprises the regulator 30 and the accessor 20. In other arrangements, the regulator 30 and the accessor 20 are separate units.

The regulator 30 is generally in communication with the container 10, as indicated by an arrow 31, and a reservoir 50, as indicated by another arrow 35. In some configurations, the reservoir 50 comprises at least a portion of the environment surrounding the container 10. In certain configurations, the reservoir 50 comprises a container, canister, bag, or other holder dedicated to the regulator 30. As used herein, the term "bag," or any derivative thereof, is a broad term used in its ordinary sense and includes, for example, any sack, balloon, bladder, receptacle, enclosure, diaphragm, or membrane capable of expanding and/or contracting, including structures comprising a flexible, supple, pliable, resilient, elastic, and/or expandable material. In some embodiments, the reservoir 50 includes a gas and/or a liquid. As used herein, the term "flexible," or any derivative thereof, is a broad term used in its ordinary sense and describes, for example, the ability of a component to bend, expand, contract, fold, unfold, or otherwise substantially deform or change shape when fluid is flowing into or out of the container 10 (e.g., via the accessor 20). Also, as used herein, the term "rigid," or any derivative thereof, is a broad term used in its ordinary sense and describes, for example, the ability of a component to generally avoid substantial deformation under normal usage when fluid is flowing into or out of the container 10 (e.g., via the accessor 20).

In certain embodiments, the regulator 30 provides fluid communication between the container 10 and the reservoir 50. In certain of such embodiments, the fluid in the reservoir 50 includes mainly gas so as not to appreciably dilute liquid contents of the container 10. In some arrangements, the regulator 30 comprises a filter to purify or remove contaminants from the gas or liquid entering the container 10, thereby reducing the risk of contaminating the contents of the container 10. In certain arrangements, the filter is hydrophobic such that air can enter the container 10 but fluid cannot escape therefrom. In some configurations, the regulator 30 comprises an orientation-actuated or orientation-sensitive check valve which selectively inhibits fluid communication between the container 10 and the filter. In some configurations, the regulator 30 comprises a check valve which selectively inhibits fluid communication between the container 10 and the filter when the valve and/or the container 10 are oriented so that the regulator 30 is held above (e.g., further from the floor than) the regulator 30.

In some embodiments, the regulator 30 prevents fluid communication between the container 10 and the reservoir 50. In certain of such embodiments, the regulator 30 serves as an interface between the container 10 and the reservoir 50. In some arrangements, the regulator 30 comprises a substantially impervious bag for accommodating ingress of gas and/or liquid to the container 10 or egress of gas and/or liquid from the container 10.

Figure 2:
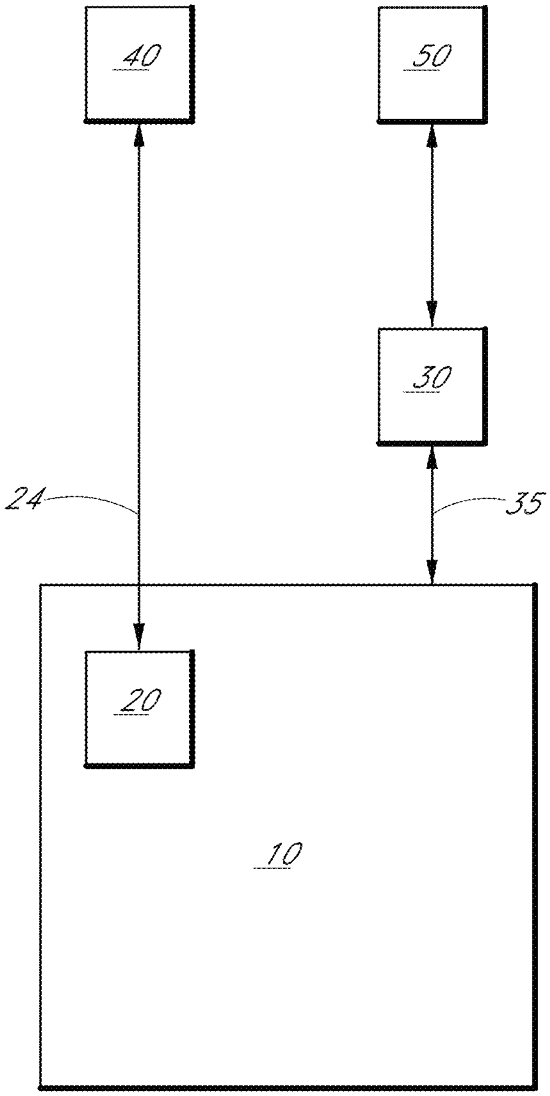

As schematically illustrated in FIG. 2, in certain embodiments, the accessor 20, or some portion thereof, is located within the container 10. As detailed above, the accessor 20 can be integrally formed with the container 10 or separate therefrom. In some embodiments, the regulator 30, or some portion thereof, is located outside the container 10. In some arrangements, the regulator 30 is integrally formed with the container 10. It is possible to have any combination of the accessor 20, or some portion thereof, entirely within, partially within, or outside of the container 10 and/or the regulator 30, or some portion thereof, entirely within, partially within, or outside of the container 10.

In certain embodiments, the accessor 20 is in fluid communication with the container 10. In further embodiments, the accessor 20 is in fluid communication with the exchange device 40, as indicated by the arrow 24.

The regulator 30 can be in fluid or non-fluid communication with the container 10. In some embodiments, the regulator 30 is located entirely outside the container 10. In certain of such embodiments, the regulator 30 comprises a closed bag configured to expand or contract external to the container 10 to maintain a substantially constant pressure within the container 10. In some embodiments, the regulator 30 is in communication, either fluid or non-fluid, with the reservoir 50, as indicated by the arrow 35.

Figure 2A:
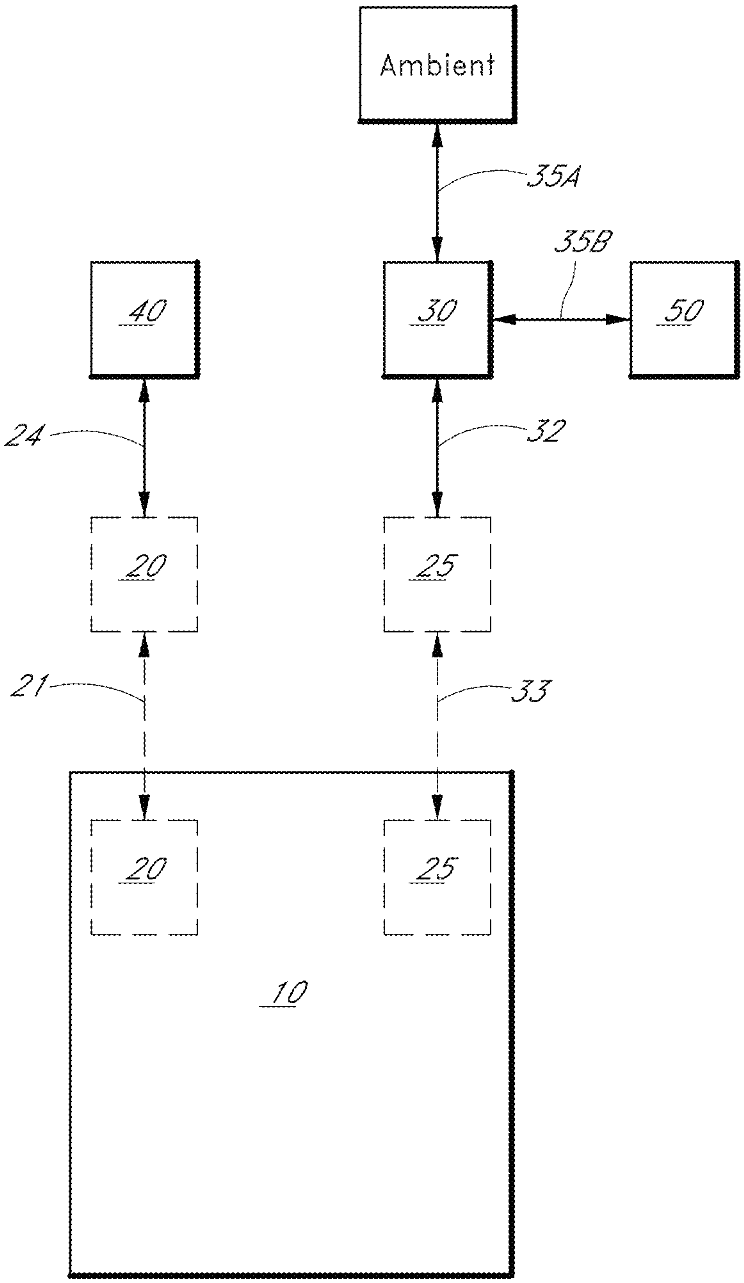

As schematically illustrated in FIG. 2A, in certain embodiments, the accessor 20, or some portion thereof, can be located within the container 10. In some embodiments, the accessor 20, or some portion thereof, can be located outside the container 10. In some embodiments, a valve 25, or some portion thereof, can be located outside the container 10. In some embodiments, the valve 25, or some portion thereof, can be located within the container 10. In some embodiments, the regulator 30 is located entirely outside the container 10. In some embodiments, the regulator 30, or some portion thereof, can be located within the container 10. It is possible to have any combination of the accessor 20, or some portion thereof, entirely within, partially within, or outside of the container 10 and/or the valve 25, or some portion thereof, entirely within, partially within, or outside of the container 10. It is also possible to have any combination of the accessor 20, or some portion thereof, entirely within, partially within, or outside of the container 10 and/or the regulator 30, or some portion thereof, entirely within, partially within, or outside of the container 10.

The accessor 20 can be in fluid communication with the container 10, as indicated by the arrow 21. In some embodiments, the accessor 20 can be in fluid communication with the exchange device 40, as indicated by the arrow 24.

In certain embodiments, the regulator 30 can be in fluid or non-fluid communication with a valve 25, as indicated by the arrow 32. In some embodiments, the valve 25 can be integrally formed with the container 10 or separate therefrom. In some embodiments, the valve 25 can be integrally formed with the regulator 30 or separate therefrom. In certain embodiments, the valve 25 can be in fluid or non-fluid communication with the container 10, as indicated by the arrow 33.

In some embodiments the regulator 30 can be in fluid or non-fluid communication with the ambient surroundings, as indicated by the arrow 35A. In some embodiments, the regulator 30 can be in fluid or non-fluid communication with a reservoir 50, as indicated by the arrow 35B. In some embodiments, the reservoir 50 can comprise a bag or other flexible enclosure. In some embodiments, the reservoir 50 comprises a rigid container surrounding a flexible enclosure. In some embodiments, the reservoir 50 comprises a partially-rigid enclosure.

According to some configurations, the regulator 30 can comprise a filter. In some embodiments, the filter can selectively inhibit passage of liquids and/or contaminants between the valve 25 and the reservoir 50 or the ambient surroundings. In some embodiments, the filter can selectively inhibit passage of liquids and/or contaminants between the reservoir 50 or ambient surroundings and the valve 25.

Figure 3:
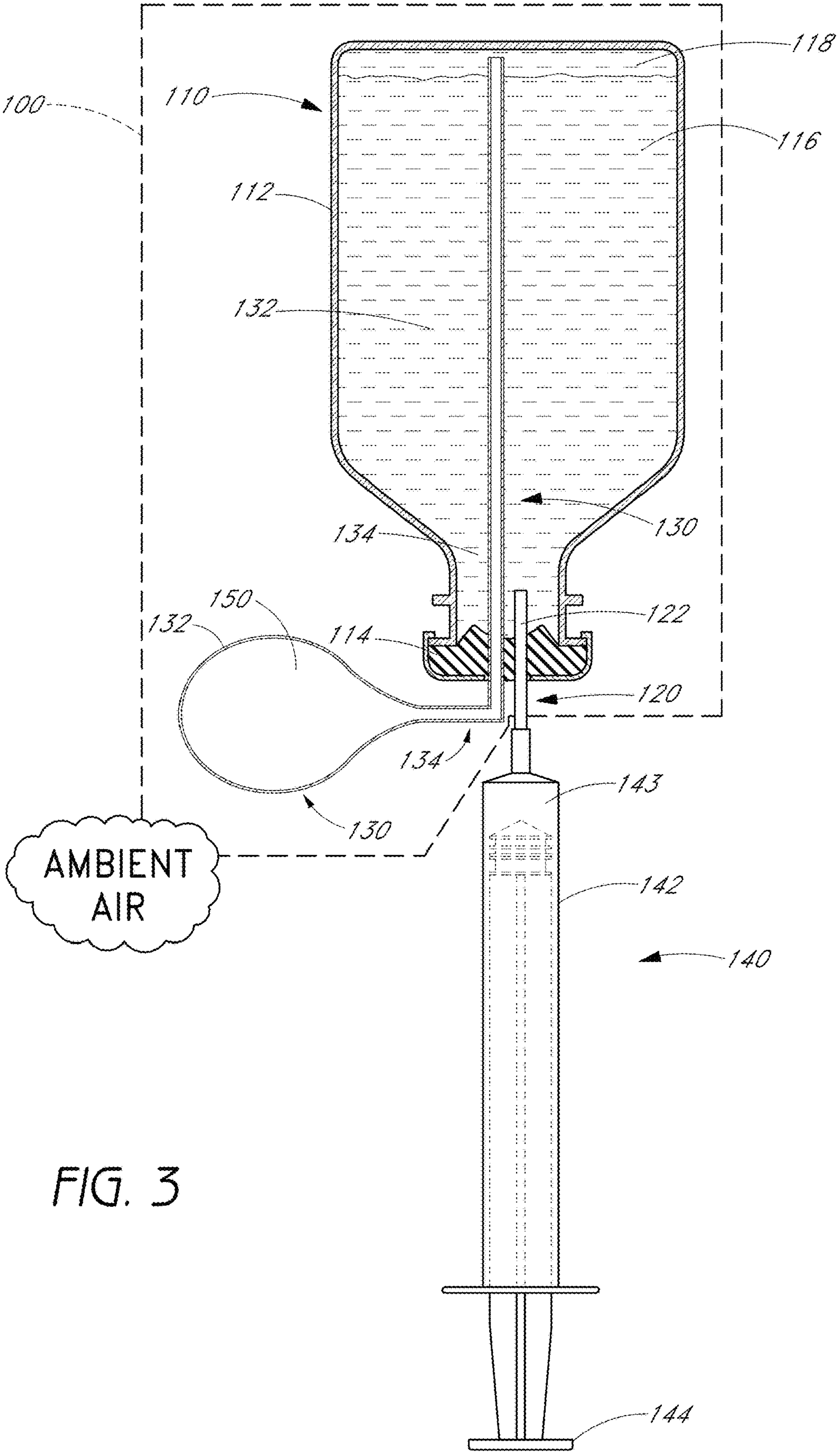
FIG. 3 illustrates another system for removing fluid from and/or injecting fluid into a vial.

In some embodiments, the valve 25 can be a one-way check valve. In some embodiments, the valve 25 can be a two-way valve. According to some configurations, the valve 25 can selectively inhibit liquid communication between the filter and/or reservoir 50 and the container 10. In some embodiments, the valve 25 can selectively inhibit liquid communication between the container 10 and the filter and/or reservoir 50 when the container 10 is oriented above the exchange device 40. FIG. 3 illustrates an embodiment of a system 100 comprising a vial 110, an accessor 120, and a regulator 130. The vial 110 comprises a body 112 and a cap 114. In the illustrated embodiment, the vial 110 contains a medical fluid 116 and a relatively small amount of sterilized air 118. In certain arrangements, the fluid 116 is removed from the vial 110 when the vial 110 is oriented with the cap 114 facing downward (e.g., the cap 114 is between the fluid and the floor). The accessor 120 comprises a conduit 122 fluidly connected at one end to an exchange device 140, such as a standard syringe 142 with a plunger 144. The conduit 122 extends through the cap 114 and into the fluid 116. The regulator 130 comprises a bag 132 and a conduit 134. The bag 132 and the conduit 134 are in fluid communication with a reservoir 150, which comprises an amount of cleaned and/or sterilized air. The outside surface of the bag 132 is generally in contact with the ambient air surrounding both the system 100 and the exchange device 140. The bag 132 comprises a substantially impervious material such that the fluid 116, the air 118 inside the vial 110, and the reservoir 150 do not contact the ambient air.

In the illustrated embodiment, areas outside of the vial 110 are at atmospheric pressure. Accordingly, the pressure on the syringe plunger 144 is equal to the pressure on the interior of the bag 132, and the system 100 is in general equilibrium. The plunger 144 can be withdrawn to fill a portion of the syringe 142 with the fluid 116. Withdrawing the plunger 144 increases the effective volume of the vial 110, thereby decreasing the pressure within the vial 110. Such a decrease of pressure within the vial 110 increases the difference in pressure between the vial 110 and the syringe 142, which causes the fluid 116 to flow into the syringe 142 and the reservoir 150 to flow into the vial 110. Additionally, the decrease of pressure within the vial 110 increases the difference in pressure between the interior and exterior of the bag 132, which causes the bag 132 to decrease in internal volume or contract, which in turn encourages an amount of regulatory fluid through the conduit 134 and into the vial 110. In effect, the bag 132 contracts outside the vial 110 to a new volume that compensates for the volume of the fluid 116 withdrawn from the vial 110. Thus, once the plunger 144 ceases from being withdrawn from the vial 110, the system is again in equilibrium. As the system 100 operates near equilibrium, withdrawal of the fluid 116 can be facilitated. Furthermore, due to the equilibrium of the system 100, the plunger 144 remains at the position to which it has been withdrawn, thereby allowing removal of an accurate amount of the fluid 116 from the vial 110.

In certain arrangements, the decreased volume of the bag 132 is approximately equal to the volume of liquid removed from the vial 110. In some arrangements, the volume of the bag 132 decreases at a slower rate as greater amounts of fluid are withdrawn from the vial 110 such that the volume of fluid withdrawn from the vial 110 is greater than the decreased volume of the bag 132.

In some arrangements, the bag 132 can be substantially and/or completely deflated, such that there is substantially no volume inside the bag 132. In some instances, such deflation of the bag 132 effectively creates a difference in pressure between the inside of the bag 132 and the inside of the vial 110. For example, a vacuum (relative to ambient) inside the vial 110 can be created when the bag 132 is deflated. In some instances, such deflation of the bag 132 creates substantially no restoring force that tends to create a pressure differential between the inside of the bag 132 and the inside of the vial 110, such as when the bag 132 is generally non-resilient.

In certain embodiments, the syringe 142 comprises fluid contents 143. A portion of the fluid contents 143 can be introduced into the vial 110 by depressing (e.g., toward the vial) the plunger 144, which can be desirable in certain instances. For example, in some instances, it is desirable to introduce a solvent and/or compounding fluid into the vial 110. In certain instances, more of the fluid 116 than desired initially might be withdrawn inadvertently. In some instances, some of the air 118 in the vial 110 initially might be withdrawn, creating unwanted bubbles within the syringe 142. It may thus be desirable to inject some of the withdrawn fluid 116 and/or air 118 back into the vial 110.

Depressing the plunger 144 encourages the fluid contents 143 of the syringe into the vial 110, which decreases the effective volume of the vial 110, thereby increasing the pressure within the vial 110. An increase of pressure within the vial 110 increases the difference in pressure between the exterior and interior of the bag 132, which causes the air 118 to flow into the bag 132, which in turn causes the bag 132 to expand. In effect, the bag 132 expands or increases to a new volume that compensates for the volume of the contents 143 of the syringe 142 introduced into the vial 110. Thus, once the plunger 144 ceases from being depressed, the system is again in equilibrium. As the system 100 operates near equilibrium, introduction of the contents 143 can be facilitated. Moreover, due to the equilibrium of the system 100, the plunger 144 generally remains at the position to which it is depressed, thereby allowing introduction of an accurate amount of the contents 143 of the syringe 142 into the vial 110.

In certain arrangements, the increased volume of the bag 132 is approximately equal to the volume of air 118 removed from the vial 110. In some arrangements, the volume of the bag 132 increases at a slower rate as greater amounts of the contents 143 are introduced into the vial 110, such that the volume of the contents 143 introduced into the vial 110 is greater than the increased volume of the bag 132.

In some arrangements, the bag 132 can stretch to expand beyond a resting volume. In some instances, the stretching gives rise to a restorative force that effectively creates a difference in pressure between the inside of the bag 132 and the inside of the vial 110. For example, a slight overpressure (relative to ambient) inside the vial 110 can be created when the bag 132 is stretched.

Figure 4:
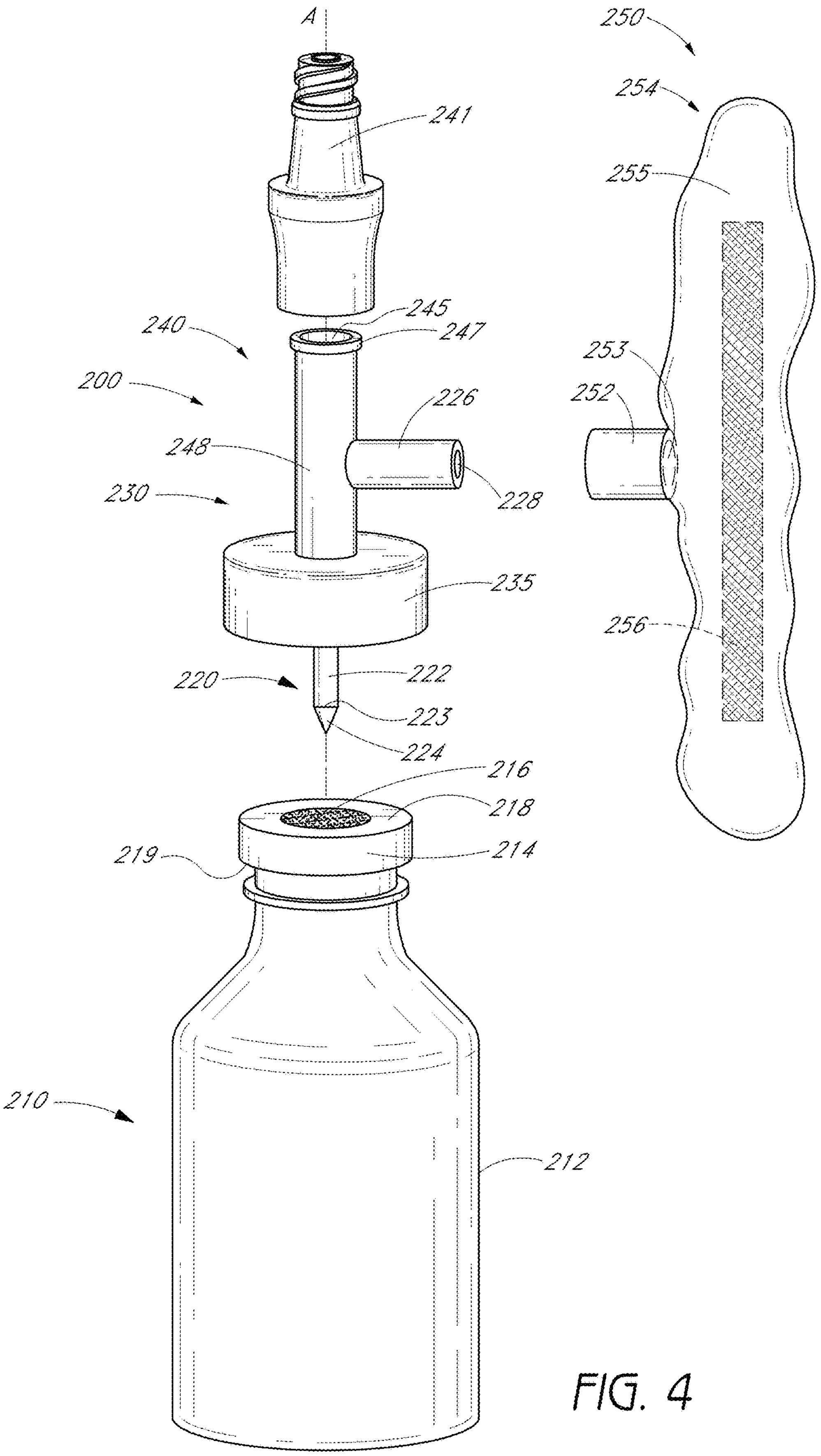
FIG. 4 illustrates a perspective view of a vial adaptor and a vial.

FIG. 4 illustrates an embodiment of a vial adaptor 200 for coupling with a vial 210. The vial 210 can comprise any suitable container for storing medical fluids. In some instances, the vial 210 comprises any of a number of standard medical vials known in the art, such as those produced by Abbott Laboratories of Abbott Park, Illinois. In some embodiments, the vial 210 is capable of being hermetically sealed. In some configurations, the vial 210 comprises a body 212 and a cap 214. The body 212 preferably comprises a rigid, substantially impervious material, such as plastic or glass. In some embodiments, the cap 214 comprises a septum 216 and a casing 218. The septum 216 can comprise an elastomeric material capable of deforming in such a way when punctured by an item that it forms a substantially airtight seal around that item. For example, in some instances, the septum 216 comprises silicone rubber or butyl rubber. The casing 218 can comprise any suitable material for sealing the vial 210. In some instances, the casing 218 comprises metal that is crimped around the septum 216 and a portion of the body 212 in order to form a substantially airtight seal between the septum 216 and the vial 210. In certain embodiments, the cap 214 defines a ridge 219 that extends outwardly from the top of the body 212.

In certain embodiments, the adaptor 200 comprises an axial centerline A and a piercing member 220 having a proximal end 221 (see FIG. 5) and a distal end 223. As used herein the term, "proximal," or any derivative thereof, refers to a direction along the axial length of the piercing member 220 that is toward the cap 214 when the piercing member 220 is inserted in the vial 210; the term "distal," or any derivative thereof, indicates the opposite direction. In some configurations, the piercing member 220 comprises a sheath 222. The sheath 222 can be substantially cylindrical, as shown, or it can assume other geometric configurations. In some instances, the sheath 222 tapers toward the distal end 223. In some arrangements, the distal end 223 defines a point that can be centered with respect to the axial centerline A or offset therefrom. In certain embodiments, the distal end 223 is angled from one side of the sheath 222 to the opposite side. The sheath 222 can comprise a rigid material, such as metal or plastic, suitable for insertion through the septum 216. In certain embodiments the sheath 222 comprises polycarbonate plastic.

In some configurations, the piercing member 220 comprises a tip 224. The tip 224 can have a variety of shapes and configurations. In some instances, the tip 224 is configured to facilitate insertion of the sheath 222 through the septum 216 via an insertion axis. In some embodiments, the insertion axis corresponds to the direction in which the force required to couple the adaptor 200 with the vial 210 is applied when coupling the adaptor 200 with the vial 210. The insertion axis can be substantially perpendicular to a plane in which the cap 214 lies. In some embodiments, as illustrated in FIG. 4, the insertion axis is substantially parallel to the axial centerline A of the adaptor 200. Furthermore, in some embodiments, the insertion axis is substantially parallel to the piercing member 220. As illustrated, the tip 224, or a portion thereof, can be substantially conical, coming to a point at or near the axial center of the piercing member 220. In some configurations, the tip 224 angles from one side of the piercing member 220 to the other. In some instances, the tip 224 is separable from the sheath 222. In other instances, the tip 224 and the sheath 222 are permanently joined, and can be unitarily formed. In various embodiments, the tip 224 comprises acrylic plastic, ABS plastic, or polycarbonate plastic.

In some embodiments, the adaptor 200 comprises a cap connector 230. As illustrated, the cap connector 230 can substantially conform to the shape of the cap 214. In certain configurations, the cap connector 230 comprises a rigid material, such as plastic or metal, that substantially maintains its shape after minor deformations. In some embodiments, the cap connector 230 comprises polycarbonate plastic. In some arrangements, the cap connector 230 comprises a sleeve 235 configured to snap over the ridge 219 and tightly engage the cap 214. As more fully described below, in some instances, the cap connector 230 comprises a material around an interior surface of the sleeve 235 for forming a substantially airtight seal with the cap 214. The cap connector 230 can be or can include adhesive tape, as known to those of skill in the art. In some embodiments, the cap connector 230 comprises an elastic material that is stretched over the ridge 219 to form a seal around the cap 214. In some embodiments, the cap connector 230 resembles or is identical to the structures shown in FIGS. 6 and 7 of and described in the specification of U.S. Pat. No. 5,685,866, the entire contents of which are hereby incorporated by reference herein and are made a part of this specification.

In certain embodiments, the adaptor 200 comprises a connector interface 240 for coupling the adaptor 200 with a medical connector 241, another medical device (not shown), or any other instrument used in extracting fluid from or injecting fluid into the vial 210. In certain embodiments, the connector interface 240 comprises a sidewall 248 that defines a proximal portion of an access channel 245 through which fluid may flow. In some instances, the access channel 245 extends through the cap connector 230 and through a portion of the piercing member 220 such that the connector interface 240 is in fluid communication with the piercing member 220. The sidewall 248 can assume any suitable configuration for coupling with the medical connector 241, a medical device, or another instrument. In the illustrated embodiment, the sidewall 248 is substantially cylindrical and extends generally proximally from the cap connector 230.

In certain configurations, the connector interface 240 comprises a flange 247 to aid in coupling the adaptor 200 with the medical connector 241, a medical device, or another instrument. The flange 247 can be configured to accept any suitable medical connector 241, including connectors capable of sealing upon removal of a medical device therefrom. In some instances, the flange 247 is sized and configured to accept the Clave® connector, available from ICU Medical, Inc. of San Clemente, California. Certain features of the Clave® connector are disclosed in U.S. Pat. No. 5,685,866, the entire contents of which are incorporated by reference herein. Connectors of many other varieties, including other needle-less connectors, can also be used. The connector 241 can be permanently or separably attached to the connector interface 240. In other arrangements, the flange 247 is threaded, configured to accept a Luer connector, or otherwise shaped to attach directly to a medical device, such as a syringe, or to other instruments.

In certain embodiments, the connector interface 240 is generally centered on the axial center of the adaptor 200. Such a configuration provides vertical stability to a system comprising the adaptor 200 coupled with the vial 210, thereby making the coupled system less likely to tip-over. Accordingly, the adaptor 200 is less likely to cause leaks, or spills, or disorganization of supplies occasioned by accidental bumping or tipping of the adaptor 200 or the vial 210.

In some embodiments, the piercing member 220, the cap connector 230, and the connector interface 240 are integrally formed of a unitary piece of material, such as polycarbonate plastic. In other embodiments, one or more of the piercing member 220, the cap connector 230, and the connector interface 240 comprise a separate piece. The separate pieces can be joined in any suitable manner, such as by glue, epoxy, ultrasonic welding, etc. Connections between joined pieces can create substantially airtight bonds between the pieces. In some arrangements, any of the piercing member 220, the cap connector 230, or the connector interface 240 can comprise more than one piece. Details and examples of some embodiments of piercing members 220, cap connectors 230, and connector interfaces 240 are provided in U.S. Pat. No. 7,547,300 and U.S. Patent Application Publication No. 2010/0049157, the entirety of each of which is incorporated herein by reference.

Figure 5:
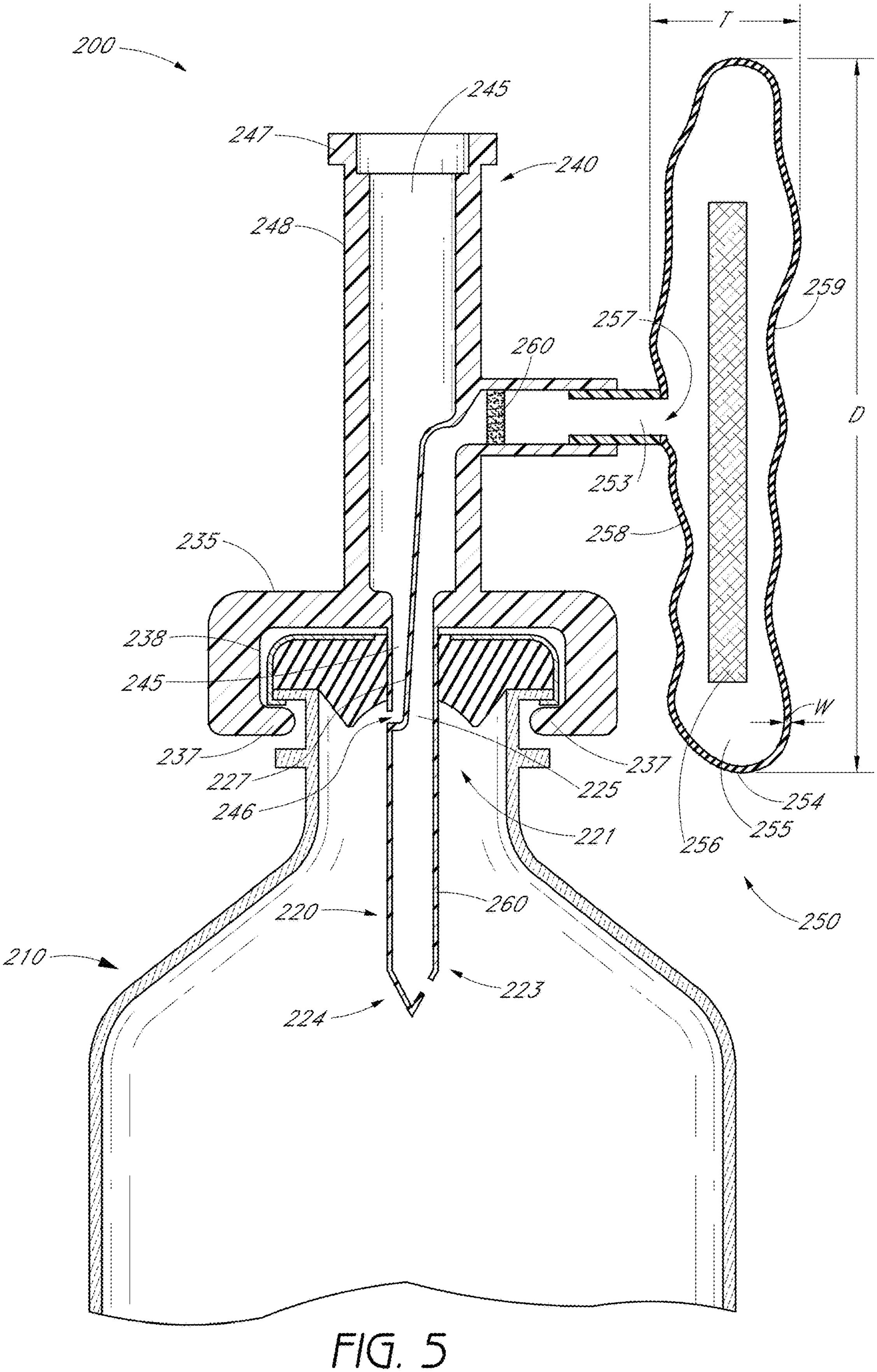
FIG. 5 illustrates a partial cross-sectional view of the vial adaptor of FIG. 4, coupled with a vial, in a high-volume stage.

In certain embodiments, the adaptor 200 comprises a regulator channel 225, which extends through the connector interface 240 and/or the cap connector 230, and through the piercing member 220 (see, e.g., FIG. 5). In the illustrated embodiment, the regulator channel 225 passes through a lumen 226 that extends radially outward from the connector interface 240. In some embodiments, the channel 225 is formed as a part of the cap connector 230. In certain embodiments, the regulator channel 225 terminates in a regulator aperture 228.

In some embodiments, the adaptor 200 includes a regulator assembly 250. In certain embodiments, the regulator assembly 250 comprises a coupling 252. The coupling 252 can be configured to connect the regulator assembly 250 with the remainder of the adaptor 200. For example, the coupling 252 can connect with the lumen 226 in substantially airtight engagement, thereby placing the coupling 252 in fluid communication with the regulator channel 225. In some instances, the coupling 252 and the lumen 226 engage with a slip or interference fit. In certain embodiments, the coupling 252 and the lumen 226 comprise complimentary threads, such that the coupling 252 can be threadably connected with the lumen 226. In some embodiments, the coupling 252 includes a passage 253 that extends through the coupling 252.

In the illustrated embodiment, the regulator assembly comprises a bag 254 with an interior chamber 255. The bag 254 is generally configured to stretch, flex, unfold, or otherwise expand and contract or cause a change in interior volume. In some cases, the bag 254 includes one or more folds, pleats, or the like. In certain arrangements, the interior chamber 255 of the bag 254 is in fluid communication with the regulator channel 225, thereby allowing fluid to pass from the regulator channel 225 into the interior chamber 255 and/or from the interior chamber 255 into the regulator channel 225. In some arrangements, the interior chamber 255 is in fluid communication with the passage 253 of the coupling 252.

In certain embodiments, the regulator assembly 250 comprises a filler 256, which can be located in the inner chamber 255 of the bag 254. As used herein, the term “filler,” or any derivative thereof, is a broad term used in its ordinary sense and includes, for example, any support, stuffing, spacing, wadding, padding, lining, enclosure, reservoir, or other structure configured to inhibit or prevent the bag 254 from fully deflating at ambient pressure, or a combination of structures. In certain configurations, the filler 256 occupies substantially the entire volume of the entire inner chamber 255. In other arrangements, the filler 256 occupies only a portion of the volume of the inner chamber 255. In some configurations, the filler 256 comprises a network of woven or non-woven fibers. In some embodiments, the filler 256 is porous, such that regulating fluid (e.g., air) in the inner chamber 255 can enter a network or plurality of hollows within the filler 256. For example, in some cases, the filler 256 is a sponge-like material. In certain configurations, the filler 256 is configured to be compressed by the bag 254, without causing damage to the bag 254. In some embodiments the filler 256 has a lower durometer than the bag 254.

As illustrated, the filler 256 can be positioned in the bag 254. In certain embodiments, the filler 256 is positioned at about the radial center in the bag 254. In other instances, the position of the filler 256 is offset with respect to the center of the bag 254. In some embodiments, the position of the filler 256 changes relative to the bag 254. For example, in some embodiments, the filler 256 moves (e.g., by force of gravity) relative to the bag 254 when the bag 254 changes volume, such as when the bag 254 expands. Such a configuration can, for example, enhance the ability of the bag 254 to expand and can decrease the likelihood of the bag 254 becoming snagged on or bound-up by the filler 256.

In other embodiments, the position of the filler 256 is substantially constant with respect to the bag 254 and/or a coupling 252. In some such embodiments, the filler 256 moves substantially in unison with the bag 254. For example, the filler 256 can be configured to expand and contract at substantially the same rate as the bag 254. In certain embodiments, the filler 256 is bonded with the bag 254. In some such cases, the filler 256 is adhered or at least partially adhered to at least a portion of the bag 254. In some cases, at least a portion of the filler 256 is formed as a part of the bag 254. In certain embodiments, at least a portion of the filler 256 is maintained in position by one or more flexible legs that abut an inner surface of the bag 254. In some configurations, at least a portion of the filler 256 is maintained in position by one or more beams that connect with the coupling 252. In certain arrangements, at least a portion of the filler 256 is joined with the coupling 252.

Figure 6:
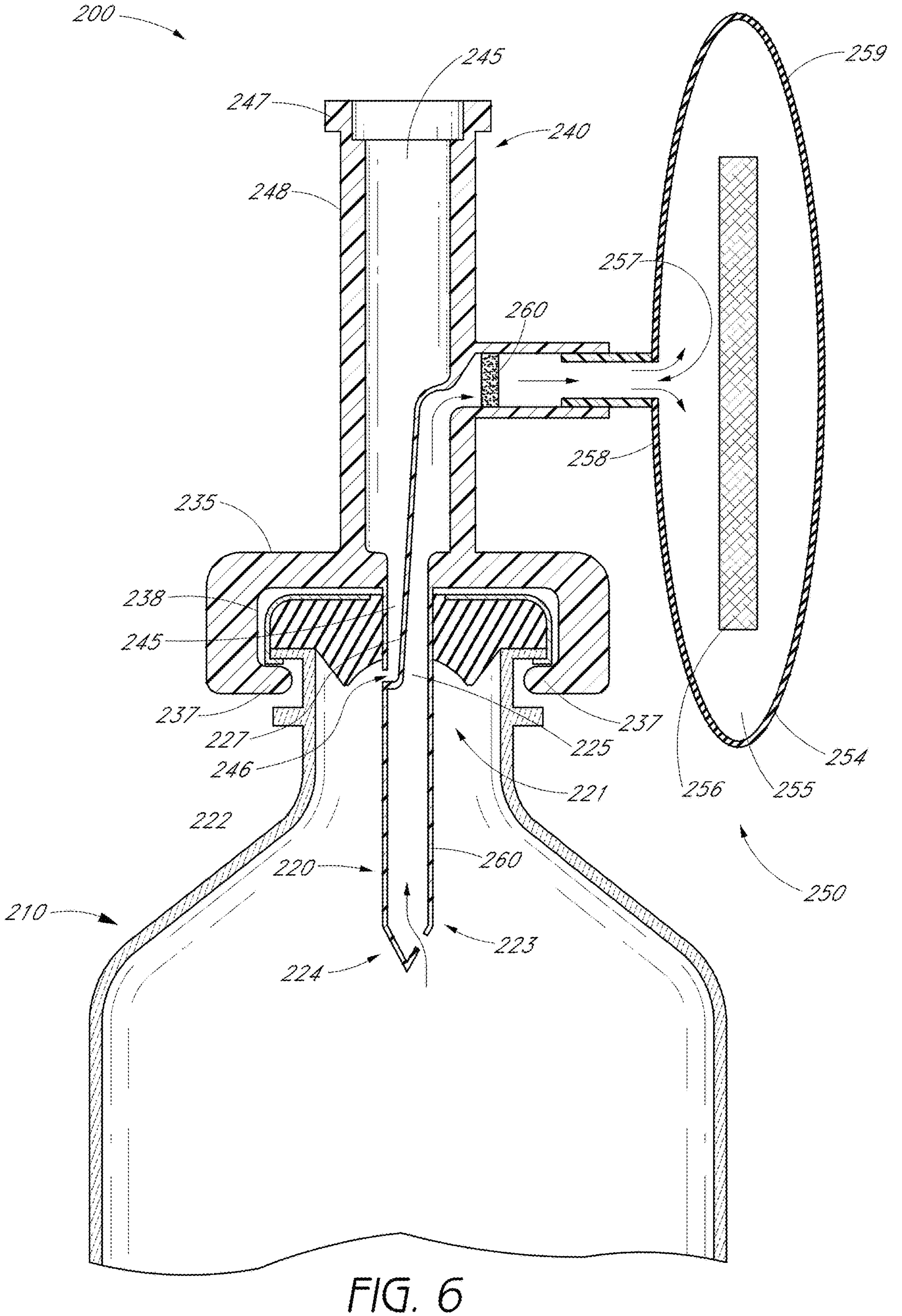
FIG. 6 illustrates a partial cross-sectional view of the vial adaptor of FIG. 4 coupled with a vial in an expanded stage.

FIGS. 5 and 6 illustrate cross-sections of the vial adaptor 200 coupled with the vial 210. FIG. 5 illustrates a non-fully expanded condition and FIG. 6 illustrates a fully-expanded condition. In the illustrated embodiment, the cap connector 230 firmly secures the adaptor 200 to the cap 214 and the piercing member 220 extends through the septum 216 into the interior of the vial 210. Additionally, the regulator assembly 250 is engaged with the connector interface 240 such that the inner chamber 255 of the bag 254 is in fluid communication with the regulator channel 255 through the coupling 252. In some embodiments, the piercing member 220 is oriented substantially perpendicularly with respect to the cap 214 when the adaptor 200 and the vial 210 are coupled. Other configurations are also contemplated.

In certain embodiments, the cap connector 230 comprises one or more projections 237 that aid in securing the adaptor 200 to the vial 210. The one or more projections 237 extend toward an axial center of the cap connector 230. In some configurations, the one or more projections 237 comprise a single circular flange extending around the interior of the cap connector 230. The cap connector 230 can be sized and configured such that an upper surface of the one or more projections 237 abuts a lower surface of the ridge 219, helping secure the adaptor 200 in place.

The one or more projections 237 can be rounded, chamfered, or otherwise shaped to facilitate the coupling of the adaptor 200 and the vial 210. For example, as the adaptor 200 having rounded projections 237 is introduced to the vial 210, a lower surface of the rounded projections 237 abuts a top surface of the cap 214. As the adaptor 200 is advanced onto the vial 210, the rounded surfaces cause the cap connector 230 to expand radially outward. As the adaptor 200 is advanced further onto the vial 210, a resilient force of the deformed cap connector 220 seats the one or more projections 237 under the ridge 219, securing the adaptor 200 in place.

In some embodiments, the cap connector 230 is sized and configured such that an inner surface 238 of the cap connector 230 contacts the cap 214. In some embodiments, a portion of the cap connector 230 contacts the cap 214 in substantially airtight engagement. In certain embodiments, a portion of the inner surface 238 surrounding either the septum 216 or the casing 218 is lined with a material, such as rubber or plastic, to ensure the formation of a substantially airtight seal between the adaptor 200 and the vial 210.

In the embodiment illustrated, the piercing member 220 comprises the sheath 222 and the tip 224. The sheath 222 is generally sized and dimensioned to be inserted through the septum 216 without breaking and, in some instances, with relative ease. Accordingly, in various embodiments, the sheath 222 has a cross-sectional area of between about 0.025 and about 0.075 square inches, between about 0.040 and about 0.060 square inches, or between about 0.045 and about 0.055 square inches. In other embodiments, the cross-sectional area is less than about 0.075 square inches, less than about 0.060 square inches, or less than or equal to about 0.055 square inches. In still other embodiments, the cross-sectional area is greater than or equal to about 0.025 square inches, greater than or equal to about 0.035 square inches, or greater than or equal to about 0.045 square inches. In some embodiments, the cross-sectional area is about 0.050 square inches.

The sheath 222 can assume any of a number of cross-sectional geometries, such as, for example, oval, ellipsoidal, square, rectangular, hexagonal, or diamond-shaped. The cross-sectional geometry of the sheath 222 can vary along a length thereof in size and/or shape. In some embodiments, the sheath 222 has substantially circular cross-sections along a substantial portion of a length thereof. A circular geometry provides the sheath 222 with substantially equal strength in all radial directions, thereby preventing bending or breaking that might otherwise occur upon insertion of the sheath 222. The symmetry of an opening created in the septum 216 by the circular sheath 222 prevents pinching that might occur with angled geometries, allowing the sheath 222 to more easily be inserted through the septum 216. Advantageously, the matching circular symmetries of the piercing member 220 and the opening in the septum 216 ensure a tight fit between the piercing member 220 and the septum 216, even if the adaptor 200 is inadvertently twisted. Accordingly, the risk of dangerous liquids or gases escaping the vial 210, or of impure air entering the vial 210 and contaminating the contents thereof, can be reduced in some instances with a circularly symmetric configuration.

In some embodiments, the sheath 222 is hollow. In the illustrated embodiment, the inner and outer surfaces of the sheath 222 substantially conform to each other such that the sheath 222 has a substantially uniform thickness. In various embodiments, the thickness is between about 0.015 inches and about 0.040 inches, between about 0.020 inches and about 0.030 inches, or between about 0.024 inches and about 0.026 inches. In other embodiments, the thickness is greater than or equal to about 0.015 inches, greater than or equal to about 0.020 inches, or greater than or equal to about 0.025 inches. In still other embodiments, the thickness is less than or equal to about 0.040 inches, less than or equal to about 0.035 inches, or less than or equal to about 0.030 inches. In some embodiments, the thickness is about 0.025 inches.

In some embodiments, the inner surface of the sheath 222 varies in configuration from that of the outer surface of the sheath 222. Accordingly, in some arrangements, the thickness varies along the length of the sheath 222. In various embodiments, the thickness at one end, such as a proximal end, of the sheath is between about 0.015 inches and about 0.050 inches, between about 0.020 inches and about 0.040 inches, or between about 0.025 inches and about 0.035 inches, and the thickness at another end, such as the distal end 223, is between about 0.015 inches and 0.040 inches, between about 0.020 inches and 0.030 inches, or between about 0.023 inches and about 0.027 inches. In some embodiments, the thickness at one end of the sheath 222 is greater than or equal to about 0.015 inches, greater than or equal to about 0.020 inches, or greater than or equal to about 0.025 inches, and the thickness at another end thereof is greater than or equal to about 0.015 inches, greater than or equal to about 0.020 inches, or greater than or equal to about 0.025 inches. In still other embodiments, the thickness at one end of the sheath 222 is less than or equal to about 0.050 inches, less than or equal to about 0.040 inches, or less than or equal to about 0.035 inches, and the thickness at another end thereof is less than or equal to about 0.045 inches, less than or equal to about 0.035 inches, or less than or equal to about 0.030 inches. In some embodiments, the thickness at a proximal end of the sheath 222 is about 0.030 inches and the thickness at the distal end 223 is about 0.025 inches. In some arrangements, the cross-section of the inner surface of the sheath 222 is shaped differently from that of the outer surface. The shape and thickness of the sheath 222 can be altered, e.g., to optimize the strength of the sheath 222.

In some instances, the length of the sheath 222, as measured from a distal surface of the cap connector 230 to the distal end 223, is between about 0.8 inches to about 1.4 inches, between about 0.9 inches and about 1.3 inches, or between about 1.0 inches and 1.2 inches. In other instances, the length is greater than or equal to about 0.8 inches, greater than or equal to about 0.9 inches, or greater than or equal to about 1.0 inches. In still other instances, the length is less than or equal to about 1.4 inches, less than or equal to about 1.3 inches, or less than or equal to about 1.2 inches. In some embodiments, the length is about 1.1 inches.

In certain embodiments, the sheath 222 at least partially encloses one or more channels. For example, in the embodiment of FIG. 5, the sheath 22 partially encloses the regulator channel 225 and the access channel 245. In some arrangements, the sheath 222 defines the outer boundary of a distal portion of the regulator channel 225 and the outer boundary of a distal portion of the access channel 245. An inner wall 227 extending from an inner surface of the sheath 222 to a distal portion of the medical connector interface 240 defines an inner boundary between the regulator channel 225 and the access channel 245.

In the embodiment shown, the access channel 245 extends from an access aperture 246 formed in the sheath 222, through the cap connector 230, and through the connector interface 240. Thus, when a medical device, such as a syringe, is connected with the medical connector 241, which in turn is coupled with the connector interface 240, the medical device is in fluid communication with the inside of the vial 210. In such arrangements, the contents of the vial 210 and the contents of the medical device can be exchanged between the vial 210 and the medical device.

In the illustrated embodiment, the regulator channel 225 extends from a distal end 223 of the sheath 222, through the cap connector 230, through a portion of the connector interface 240, through the lumen 226, and terminates at the regulator aperture 228. In certain arrangements, such as in the arrangement shown, the regulator aperture 228 is in fluid communication with the passage 253 of the coupling 252, which is in fluid communication with the inner chamber 255 of the bag 254. Thus, in such arrangements, the inner chamber 255 is in fluid communication with the regulator channel 225. Additionally, because in the illustrated embodiment the filler 256 is located in the inner chamber 255, the filler 256 is also in fluid communication with the regulator channel 225.

In certain configurations, the adaptor 200 comprises a filter 260. In the embodiment illustrated, the filter 260 is located in the regulator channel 225 within the lumen 226. In other embodiments, the filter 260 is located in the regulator channel 225 in the sheath 222. In yet other embodiments, the filter 260 is located in the passage 253 in the coupling 252. Still further embodiments have the filter 260 positioned in the inner chamber 255 of the bag 254. Generally, the filter 260 is chemically or mechanically held in position, e.g., by adhesive or a snap ring. Certain embodiments include a plurality of filters 260. For example, certain embodiments have a first filter located in the lumen 226 and a second filter located in the coupling 252.

In some arrangements, the filter 260 is a hydrophobic membrane, which is generally configured to allow gases to pass therethrough, but to inhibit or prevent passage of liquids therethrough. In some configurations, gases (e.g., sterilized air) are able to pass through the filter 260 so as to move between the vial 210 and the bag 254, but liquid from the vial 210 is blocked by the filter 260. Embodiments of the adaptor 200 in which the filter 260 is located in the regulator channel 225 can therefore reduce the likelihood of liquid spilling from the vial 210 even if the regulator assembly 250 is detached.

In certain configurations, the filter 260 can remove particles and/or contaminants from the gas that passes through the filter. For example, in certain embodiments, the filter 260 is configured to remove nearly all or about 99.9% of airborne particles 0.3 micrometers in diameter. In some cases, the filter 260 is configured to remove microbes. In some embodiments, the filter 260 comprises nylon, polypropylene, polyvinylidene fluoride, polytetrafluoroethylene, or other plastics. In some embodiments, the filter 260 includes activated carbon, e.g., activated charcoal. In certain configurations, the filter 260 comprises a mat of regularly or randomly arranged fibers, e.g., fiberglass. In some arrangements, the filter 260 comprises Gortex® material or Teflon® material.

In the illustrated embodiment, the lumen 226 is a hollow cylindrical member extending radially outward from the connector interface 240. In other embodiments, the lumen 226 comprises other shapes, such as conical. The lumen 226 can have a variety of cross-sectional shapes, such as circular, square, rectangular, elliptical, diamond, star-shaped, polygonal, or irregular. As shown, in some embodiments, the lumen 226 extends radially outward less than the sleeve 235 of the cap connector 230. However, in certain configurations, the lumen 226 extends radially outward beyond the sleeve 235 of the cap connector 230. Such a configuration can, for example, facilitate a connection with the regulator assembly 250 such that the regulator assembly 250 is spaced-apart from the remainder of the adaptor 200 and from the vial 210.

In some embodiments, the coupling 252 has a shape that is corresponding or complementary with the shape of the lumen 226. For example, in some cases, the lumen 226 has a triangular shape and the coupling 252 has a triangular shape as well. The coupling 252 can have most any cross-sectional shape, such as circular, square, rectangular, elliptical, diamond, star-shaped, polygonal, or irregular. In certain configurations, the coupling 252 and the lumen 226 are correspondingly shaped to promote an orientation of the coupling 252 (and thus the regulator assembly 250) relative to the lumen 226 (and thus the remainder of the adaptor 200), as discussed below.

The coupling 252 can be configured to engage the lumen 226. For example, in the embodiments illustrated, the coupling 252 is configured to be received by the lumen 226. In other cases, the coupling 252 is configured to receive the lumen 226. In some instances, the coupling 252 and the lumen 226 connect with a slip fit or a press fit. In some configurations, the coupling 252 and the lumen 226 connect with a hose-barb connection. In certain arrangements, the coupling 252 and the lumen 226 connect with a threaded connection. For example, in certain cases the coupling 252 and the lumen 226 have corresponding standard luer lock connections. In some embodiments, the connection between the coupling 252 and the lumen 226 is substantially airtight, so as to inhibit or prevent outside air from entering the regulator channel 225. Such a configuration can reduce the likelihood that microbes or impurities will enter vial 210, thereby enhancing patient safety by reducing the likelihood of contaminating the medical fluid.

In some arrangements, the connection between the coupling 252 and the lumen 226 includes a feedback device to alert the user that the connection has been made. For example, in certain arrangements, the connection between the coupling 252 and the lumen 226 includes a detent mechanism, e.g., a ball detent, which can provide a tactile indication that the connection has been made. Some embodiments include an audible signal, e.g., a click, snap, or the like, to indicate that coupling 252 has been connected with the lumen 226.

In some embodiments, the connection between the coupling 252 and the lumen 226 is substantially permanent. For example, in certain configurations, the coupling 252 and lumen 226 are sonically welded. In some cases, the coupling 252 and lumen 226 are permanently attached with an adhesive, such as glue, epoxy, double-sided tape, solvent bond, or otherwise. In some embodiments, the coupling 252 and lumen 226 joined with a permanent snap fit mechanism (e.g., a generally 90° hook and a corresponding generally 90° valley), such that the coupling 252 and lumen 226 are substantially restrained from being separated after the snap mechanism has been engaged. Permanent connection of the coupling 252 and lumen 226 can encourage one-time-use of the adaptor 200, including one-time-use of the regulator assembly 250. Further, permanent connection of the regulator assembly 250 and with the remainder of the adaptor 200 reduces the total number of unique parts to be inventoried, maintained, and prepared prior to use. In some embodiments, the coupling 252 is formed substantially monolithically with (e.g., molded during the same operation as) the remainder of the adaptor 200.

In some cases, the coupling 252 and lumen 226 are connected during the process of manufacturing the adaptor 200, e.g., at the factory. In some configurations, the regulator assembly 250 is a separate item from the remainder of the adaptor 200 and is configured to be connected with the remainder of the adaptor 200 by a user. For example, the piercing member 220, cap connector 230, and connector interface 240 may be provided in a first package and the regulator assembly 250 may be provided in a second package. In some user-connected configurations, the connection is substantially permanent. For example, in some cases one of the coupling 252 and the lumen 226 includes an adhesive (e.g., double-sided tape) which substantially permanently bonds the coupling 252 and the lumen 226 when the user connects the coupling 252 and the lumen 226. On the other hand, in certain user-connected embodiments, the coupling 252 is configured to be detachable from the lumen 226, even after the coupling 252 has been connected with the lumen 226. For example, in certain embodiments the coupling 252 and the lumen 226 are releasably joined with threads or a release mechanism, such as a detent or a set-screw. Such a configuration can facilitate operations (e.g., voluminous pharmaceutical compounding operations) in which the transfer of a volume of regulating fluid from the regulator assembly 250 into the vial 210 is desired that is greater that the volume of regulating fluid contained in the regulator assembly 250, as discussed below. In some embodiments, when the regulator assembly 250 is detached, the contents therein are sealed off from the environment, such as by way of a one-way valve.

In the illustrated embodiment, the coupling 252 is joined with the bag 254. In some cases, the bag 254 and coupling 252 are welded or joined with adhesive. As shown, the connection of the bag 254 and the coupling 252 generally fluidly connects the passage 253 with the inner chamber 255 of the bag 254. To facilitate fluid communication, the bag 254 can include a bag aperture 257, such as a slit or hole. In some cases, the bag aperture 257 is produced with a hot implement, such as a soldering iron.

The bag 254 is generally configured to unfold, unroll, expand, contract, inflate, deflate, compress, and/or decompress. The bag 254 can comprise any of a wide variety of flexible and/or expandable materials. For example, in certain embodiments, the bag 254 comprises polyester, polyethylene, polypropylene, saran, latex rubber, polyisoprene, silicone rubber, vinyl, polyurethane, or other materials. In certain embodiments, the bag 254 comprises a material having a metal component to further inhibit fluid (including gas or air) leakage through the material of the bag, e.g., metalized biaxially-oriented polyethylene terephthalate (also known as PET and available under the trade name Mylar®). In some embodiments, the bag 254 comprises a laminate. For example, the bag 254 can be constructed of a layer of 0.36 Mil (7.8 #) metalized (e.g., aluminum) PET film and a layer of 0.65 Mil (9.4 #) linear low-density polyethylene. In some embodiments, the bag 254 comprises a material capable of forming a substantially airtight seal with the coupling 252. In certain embodiments, the bag 254 is transparent or substantially transparent. In other embodiments, the bag 254 is opaque. In many instances, the bag 254 comprises a material that is generally impervious to liquid and air. In certain embodiments, the bag 254 comprises a material that is inert with respect to the intended contents of the vial 210. For example, in certain cases, the bag 254 comprises a material that does not react with certain drugs used in chemotherapy. In some embodiments, the bag 254 comprises latex-free silicone having a durometer between about 10 and about 40.

In certain configurations, the bag 254 includes a coating. For example, in some embodiments, the bag 254 includes a coating that reduces the porosity of the bag 254. In some cases, the coating is evaporated aluminum or gold. In some cases, the coating includes a water soluble plastic configured to form a barrier to inhibit passage of gases thereacross. In certain instances, the coating is applied to the outside of the bag 254. In other instances, the coating is applied to the inside of the bag 254. In some cases, the coating is applied to the inside and the outside of the bag 254. In some embodiments, the coating is a polyolefin.

In certain embodiments, the bag 254 is located entirely outside of the vial 210. In certain arrangements, the bag 254 is positioned entirely outside of the remainder of the adaptor (e.g., the piercing member 220, cap connector 230, and connector interface 240). In some embodiments, the bag 254 is substantially free to expand in generally any direction. For example, in the embodiment illustrated, there is no rigid enclosure surrounding or partially surrounding a portion of the bag 254. In some instances, a rigid housing does not contain a substantial portion of the bag 254. In some embodiments, in the fully deflated state, the bag 254 is not within a rigid enclosure. In certain configurations, the bag 254 is substantially free to expand in generally any direction, e.g., proximally, distally, radially away from the vial 210, radially toward the vial 210, etc.

In some embodiments, the bag 254 is configured to freely expand without being constrained by, for example, a rigid enclosure. Such unconstrained expansion of the bag 254 can reduce the force needed to expand the bag 254. For instance, as the bag 254 does not contact a rigid enclosure, there is no frictional force between the bag 254 and such an enclosure, which could otherwise increase the force needed to expand the bag 254. In certain aspects, unconstrained expansion of the bag 254 reduces the likelihood of the bag 254 being damaged during expansion. For example, because the bag 254 does not contact a rigid enclosure, there is less risk of the bag 254 being damaged (e.g., pierced, torn, or snagged on a burr or other defect of such an enclosure) during expansion or deflation. Further, unconstrained movement of the bag 254 lessens the chance of a coating on the bag 254 being smeared or rubbed-off. In some embodiments, the bag 254 does not bump, rub, slide against, or otherwise statically or dynamically contact a rigid surface of the adaptor 200 during expansion. In certain configurations, the bag 254 contacts only the coupling 252, regulating fluid, and ambient air.

In certain embodiments, the bag 254 includes a first side 258 and a second side 259. In some instances, the first side 258 is closer to the connector interface 240 than the second side 259. In some cases, the first side 258 is bonded with the coupling 252, but the second side 259 is not. In certain configurations, the first side 258 connects with the second side 259. In some such cases, the first side 258 connects with the second side 259 at a peripheral edge of each of the sides 258, 259. In certain instances, the second side 259 does not touch a rigid surface during expansion of the bag 254. In some configurations, substantially all or a majority of the surface area of the bag 254 that is exposed to the ambient environment is flexible. In certain embodiments, generally the entire bag 254 is flexible.

In some embodiments, each of the sides 258, 259 includes an inner surface and an outer surface. As illustrated in FIG. 6, the inner surface of each of the sides 258, 259 can be in contact with the inner chamber 255, and the outer surface of each of the sides 258, 259 can be in contact with the ambient environment.

In certain instances, the inner surface of each of the sides 258, 259 is oriented towards the inside of the bag 254. As used herein, the phrase "oriented towards," or any derivative thereof, is a broad term used in its ordinary sense and describes, for example, generally aligning or positioning something in the direction of the member indicated. For example, if a first member is oriented towards a second member, then the first member is generally aligned or positioned in the direction of the second member. In the case of a side or a surface being oriented toward a member, the side or surface is aligned or positioned such that a normal from the side or surface intersects the member. In certain configurations, the first side 258 is oriented towards the connector interface 240.

In certain instances, the outer surface of each of the sides 258, 259 is oriented outwardly from the bag 254. In some cases, the second side 259 is oriented away from the connector interface 240. In some such cases, a normal extending from the outer surface of the second side 259 does not intersect the connector interface 240.

In certain embodiments, the second side 259 is oriented opposite from the first side 258. As used herein, the term "opposite," or any derivative thereof, is a broad term used in its ordinary sense and describes, for example, something at the other end, side, or region from a member. For example, each side in a rectangle is opposite one other side and non-opposite two other sides. In some instances, the second side 259 is oriented away from the connector interface 240. In such instances, a normal extending from the outer surface of the second side 259 does not intersect the connector interface 240.

In some embodiments, the bag 254 includes a first layer and a second layer. As used herein, the term "layer," or any derivative thereof, is a broad term used in its ordinary sense and describes, for example, a thickness, ply, or stratum of material. In some embodiments, a layer can include multiple components, plies, or strata of material. In some instances, the first layer is the first side 258 and the second layer is the second side 259. In certain configurations, the first and second layers are connected. For example, a periphery of the first layer can be connected to or formed unitarily or monolithically with a periphery of the second layer. Such configurations can, for example, aid in forming the bag 254, e.g., by rendering the bag 254 substantially airtight at the periphery. In some instances, the first layer is a first sheet of metalized PET and the second layer is a second sheet of metalized PET, and the first and second layers are bonded (e.g., heat sealed) together at the peripheries. In certain embodiments, the first and second layers each have a central portion. For example, in a configuration in which the first and second layers are each substantially circular in peripheral shape, the central portions can be at about the radial center of each of the first and second layers. In certain instances, the central portion of the first layer is unattached or not connected with the central portion of the second layer. Thus, in some such instances, the first and second portions can move relative to each other.

In some embodiments, one or both of the first and second layers include one or more sub-layers. For example, the first and/or second layers can each include a plastic sub-layer and a metal sub-layer. In certain embodiments, the first and second sub-layers have interfacing surfaces that are bonded together. In some cases, substantially the entire area of the interfacing are bonded. Generally, the sub-layers are not configured to receive a substantial volume or any appreciable volume (e.g., of regulating fluid) therebetween. On the other hand, in some embodiments, the first and second layers are configured to receive the regulating fluid therebetween. For example, in a configuration in which the first layer is the first side 258 and the second layer is the second side 259, the regulating fluid can be received between the first and second layers (see FIG. 6).

In various embodiments, the adaptor 200 does not include a rigid enclosure that wholly or partially contains the bag 254. For example, any volume of the bag inside a rigid enclosure may encompass (if at all) less than half of the bag 254 or a very small portion of the volume of the bag (e.g., smaller than or equal to the volume inside the piercing member on the adapter or smaller than or equal to the volume inside the cap of the connector). In some embodiments, any volume of the bag inside a rigid enclosure (if at all) is less than or equal to half of the volume inside a vial or vials to which the adapter is configured to be connected. A rigid enclosure can increase the weight and total material of the adaptor 200, thereby increasing material and manufacturing costs. Moreover, since rigid enclosures may be positioned a distance apart from the axial center of the adaptor, omitting a rigid enclosure can eliminate the moment of force that is imposed by the weight of such an enclosure. Thus, the adaptor 200 can promote stability and reduce the chance of tipping-over. Stability of the adaptor and vial can be particularly important in dealing with cytotoxic drugs, as tipping could increase the likelihood of spills or other unintended exposure and/or release.

Certain embodiments of the adaptor 200 have a center of mass that is not substantially disposed from the axial center of the adaptor 200, when the regulator assembly 250 is connected with the remainder of the adaptor 200 and the adaptor 200 is mated with the vial 210. For instance, some embodiments of the adaptor 200 have center of mass that is less than or equal to about 0.50 inches, less than or equal to about 0.25 inches, less than or equal to about 0.125 inches, or less than or equal to about 0.063 inches apart from the axial center of the adaptor 200.

In some instances, the bag 254 is expandable to substantially fill a range of volumes such that a single adaptor 200 can be configured to operate with vials 210 of various sizes. In some embodiments, the bag 254 is configured to hold a volume equal to at least about 30, at least about 70, or at least about 90 percent of the volume of fluid contained within the vial 210 prior to the coupling of the adaptor 200 and the vial 210. In some embodiments, the bag 254 is configured to hold a volume equal to about 70 percent of the volume of fluid contained within the vial 210 prior to the coupling of the adaptor 200 and the vial 210. In various embodiments, the fluid in the bag 254 is a gas. For example, air, sterilized air, cleaned air, nitrogen, oxygen, inert gas (e.g., argon) or otherwise. In some embodiments, the sterilized air can be supplied by providing ambient air within the bag and then sterilizing the bag and air together.

The bag 254 has a fully expanded configuration (FIG. 6) and at least one non-fully expanded configuration (FIG. 5). In certain instances, in the fully expanded configuration, the volume of the inner chamber 255 of the bag 254 is at its maximum recommended volume. In certain instances, in the fully expanded configuration, the bag 254 contains at least about 100 mL, at least about 200 mL, or at least about 300 mL of fluid. In certain instances, in the fully expanded configuration, the bag 254 holds at least about 250 mL of fluid. In certain embodiments, in the fully expanded configuration, the bag 254 contains at least 180 mL of fluid In certain instances, in a non-fully expanded configuration, the bag 254 contains less than or equal to about 5 mL, less than or equal to about 40 mL, less than or equal to about 100 mL, or less than or equal to about 250 mL of fluid. In some instances, a non-fully expanded configuration of the bag 254 is a fully deflated configuration, in which the volume of the inner chamber 255 of the bag 254 is about zero. In some such instances, in the fully deflated configuration, the bag 254 contains substantially no fluid.

The bag 254 further has an initial configuration (e.g., the configuration prior to any regulating fluid being transferred between the vial 210 and the bag 254). Generally, the bag 254 contains a volume of fluid in the initial configuration to facilitate rapid and accurate withdrawal of fluid from the vial 210 upon connection of the adaptor 200 with the vial 210. In certain embodiments, in the initial configuration, the bag 254 contains at least about 10 mL, at least about 50 mL, or at least about 90 mL of fluid. In certain embodiments, in the initial configuration, the bag 254 contains at least about 60 mL of fluid. In some embodiments, in the initial configuration, the bag 254 contains a volume of fluid that generally corresponds to the volume of a standard medical device or devices to which the adapter is configured to attach. For example, in certain instances, in the initial configuration, the bag 254 holds at least about 30 mL of fluid, which corresponds to the volume of a 30 mL syringe. In such instances, upon connection of the adaptor 200 with the vial 210, about 30 mL of fluid are immediately available to be transferred between the bag 254 to the vial 210, thereby allowing 30 mL of fluid to be immediately transferred between the vial 210 and the syringe. In some embodiments, the bag 254 has an initial volume of at least about the volume inside the cap plus inside of the piercing member, or at least about twice as large as the volume insider the cap plus inside of the piercing member In various arrangements, the bag 254 has an outer dimension (e.g., diameter or cross-sectional width or height) D of between about 1.0 inches and about 6.0 inches, between about 2.0 inches and about 5.0 inches, or between about 3.0 inches and about 4.0 inches. In some arrangements, the outer dimension is greater than or equal to about 3.0 inches, greater than or equal to about 4.0 inches, or greater than or equal to about 6.0 inches. In other arrangements, the outer diameter is less than or equal to about 8.0 inches, less than or equal to about 7.5 inches, or less than or equal to about 7.0 inches. In some embodiments, an outer dimension of the bag is greater than or equal to about the height or cross-sectional width of the vial or vials to which the adapter is configured to attach. In various arrangements, the bag 254 has a maximum total thickness T of between about 0.50 inches and about 2.00 inches, between about 0.60 inches and about 0.90 inches, and between about 0.70 inches and about 0.80 inches. In other arrangements, the maximum total thickness is less than about 1.00 inches, less than about 0.90 inches, or less than about 0.80 inches. In some arrangements, the maximum total thickness is about 0.75 inches. In certain instances, the diameter of the bag 254 is greater than the maximum total thickness of the bag 254. In certain instances, the diameter of the bag 254 is greater than twice the maximum total thickness of the bag 254. In some instances, it is desirable to prevent the bag 254 from bearing against the vial 210. Accordingly, in some instances, the bag 254 is configured (e.g., dimensioned) such that even in the fully expanded state, the bag 254 is spaced apart from the vial 210.

In some configurations, the bag 254 has a wall thickness W between about 0.001 and about 0.025 inches, between about 0.001 and about 0.010 inches, or between about 0.010 and about 0.025 inches. In other configurations, the wall thickness is greater than about 0.001 inches, greater than about 0.005 inches, greater than about 0.010 inches, greater than about 0.015 inches, or greater than about 0.020 inches. In still other configurations, the wall thickness is less than about 0.025 inches, less than about 0.020 inches, less than about 0.015 inches, less than about 0.010 inches, or less than about 0.005 inches. In some configurations, the wall thickness is about 0.015 inches. In some embodiments, the wall thickness is substantially constant. In some embodiments, the wall thickness can vary. For example, in some configurations, the wall thickness increases in an area of the bag 254 around the coupling 252.

In some configurations, such as in the non-fully expanded configuration, the bag 254 is substantially irregularly shaped, as shown in FIG. 5. In other configurations, the bag 254 has shape that is generally spherical, generally conical, generally cylindrical, generally torroidal, or otherwise. For example, in some embodiments, in the fully expanded configuration, the bag 254 is shaped as a generally oblate spheroid. In certain instances, the bag 254 is substantially bulbous. In some arrangements, the bag 254 has a convex shape. In some configurations, the bag 254 has a concave shape. In some configurations, the shape of the bag 254 generally conforms to the shape of the filler 256. In some arrangements, the bag 254 generally conforms to the shape of the filler 256 in a non-fully expanded configuration and deviates from the shape of the filler 256 in the fully expanded configuration.

The filler 256 can be configured to occupy various volumes within the bag 254. For example, in some arrangements, the filler 256 occupies a volume greater than or equal to about 30, about 75, or about 90 percent of the volume of the bag 254. In certain arrangements, the filler 256 is configured to maintain a space between the first and second sides 258, 259 of the bag 254. In certain arrangements, the filler 256 is configured to ensure that the volume of the inner chamber 255 is not zero.

In general, the filler 256 is configured to provide a ready supply of regulating fluid, e.g., sterilized air, to the vial 210. As discussed above, when the adaptor 200 is engaged with the vial 210 and a medical device (such as a syringe), and a portion of the fluid in the vial 210 is transferred from the vial 210 through the adaptor 200 into the medical device, the reduction in fluid volume in the vial 210 causes a pressure decrease in the vial 210, thereby creating a pressure gradient between the interior and exterior of the vial 210. This pressure gradient can cause surrounding air—which can contain microbes, impurities, and other contaminants—to leak into the vial 210 at the interface of the septum 216 and piercing member 220 or at the attachment interface of the adaptor 200 and a medical device. Further, such a pressure gradient can produce a restoring force that hinders the ability to withdraw an accurate amount of fluid from the vial 210. However, the filler 256 can provide a ready supply of regulating fluid to the adaptor 200 to replace some or all of the fluid volume that has been transferred out to generally maintain equilibrium in the vial 210, thereby lessening or preventing the aforementioned problems.

In certain arrangements, as fluid is removed from the vial 210 though the extraction channel 245, a corresponding amount of regulating fluid from the filler 256 can substantially concurrently be introduced through the bag aperture 257, the passage 253 in the coupling 252, the regulator channel 225, and into the vial 210, thereby maintaining equilibrium. In some arrangements, the filler 256 includes a ready supply of regulating fluid prior to the regulator assembly 250 being connected with the remainder of the adaptor 200. In some aspects, the filler 256 provides a reservoir of regulating fluid to the adaptor 200. In certain arrangements, the filler 256 is configured such that a substantial portion of the first and second sides 258, 259 of the bag 254 do not contact each other.

In some configurations, the filler 256 has a similar shape as the bag 254. For example, in some cases, in the fully expanded configuration, the bag 254 and the filler 256 are each generally shaped as an oblate spheroid. In other configurations, the filler 256 has a shape that is different than the bag 254. For example, in certain instances, in the fully expanded configuration, the bag 254 has a substantially spheroidal shape and the filler 256 has a substantially cylindrical shape. In some such instances, the longitudinal axis of the cylindrically shaped filler 256 is generally parallel with the axial centerline of the adaptor 200. In other such instances, the longitudinal axis of the cylindrically shaped filler 256 is orthogonal to the axial centerline of the adaptor 200.

In certain embodiments, the filler 256 is configured to be deformed by the bag 254 when the bag 254 deflates. For example, in some instances, when the bag 254 deflates, the filler 256 decreases in volume by at least about 30, at least about 50, or at least about 90 percent. In certain instances, when the bag 254 is in the fully expanded configuration, the filler 256 has a first shape (e.g., spheroidal) and when the bag 254 is in the fully deflated configuration, the filler 256 has a second shape (e.g., disk-like).

In some such embodiments, the filler 256 is configured to be crushable or compressible and then return substantially to its original shape. For example, when the bag 254 deflates from the fully deflated configuration, the bag 254 substantially collapses the filler 256, but during subsequent expansion of the bag 254, the filler 256 returns to about its original shape. In other embodiments, the filler 256 is configured to be permanently deformed when it is crushed. For example, in some cases, the filler 256 comprises a thin-walled hollow member (e.g., an aluminum foil ball), which is configured to be permanently or irreversibly deformed, crushed, or otherwise decreased in volume during deflation of the bag 254. This can provide an indicator that the adaptor 200 has already been used. In some embodiments, the filler 256 substantially maintains its shape when the bag 254 deflates.

In certain arrangements, the filler 256 is configured to contain a volume of gas, such as sterilized air. In certain cases, the filler 256 is porous. In some instances, the filler 256 is a sponge or sponge-like material. In certain arrangements, the filler 256 comprises cotton wadding. In certain configurations, the filler 256 comprises a mat of regularly or randomly arranged fibers configured to provide a network of chambers or spaces therein. In some embodiments, the filler 256 is made of low density foam. For example, in certain embodiments, the filler 256 is made of polyurethane-ether foam, and has a weight of, for example, about 1.05 pounds per cubic foot and an indentation load deflection (ILD) of, for example, about 38. In some embodiments, the filler 256 is made of polyether, polyester, polyethylene, or ether-like-ester (ELE). In some cases, the filler 256 is made of nylon, polypropylene, polyvinylidene fluoride, polytetrafluoroethylene, or other plastics. In certain embodiments, the filler 256 is a metal, e.g., aluminum or stainless steel. In certain embodiments, the filler 256 is treated with an anti-microbial or other compound to enhance sterility. In certain cases, the filler 256 comprises a sealed chamber, e.g., containing sterilized air, which is configured to open when a fluid is withdrawn from the vial 210. In some embodiments, the filler 256 can be configured to bind with, absorb, generally neutralize, or otherwise chemically and/or mechanically interact with the fluid (such as vapors) entering the bag.

In various arrangements, at ambient pressure, the filler 256 has an outer dimension (e.g., a diameter or cross-sectional width or height) of between about 1.0 inches and about 6.0 inches, between about 2.0 inches and about 5.0 inches, or between about 3.0 inches and about 4.0 inches. In some arrangements, at ambient pressure the outer diameter of the filler 256 is greater than or equal to about 3.0 inches, greater than or equal to about 4.0 inches, or greater than or equal to about 6.0 inches. In certain embodiments, the diameter of the filler 256 at ambient pressure is about 4.00 inches. In other arrangements, at ambient pressure the outer diameter is less than or equal to about 8.0 inches, less than or equal to about 7.5 inches, or less than or equal to about 7.0 inches. In various arrangements, at ambient pressure the filler 256 has a maximum total thickness of between about 0.05 inches and about 0.99 inches, between about 0.20 inches and about 0.60 inches, and between about 0.25 inches and about 0.35 inches. In certain embodiments, the thickness of the filler 256 at ambient pressure is about 0.30 inches. In some arrangements, the maximum total thickness of the filler 256 at ambient pressure is about 1.00 inches. In some embodiments, at ambient pressure the diameter and thickness of the filler 256 are about the same as the diameter D and thickness T of the bag 254.

With continued reference to FIGS. 5 and 6, certain processes for using the adaptor 200 comprise inserting the piercing member 220 through the septum 216 until the cap connector 230 is firmly in place. Accordingly, the coupling of the adaptor 200 and the vial 210 can be accomplished in one simple step. In certain instances, the medical connector 241 is coupled with the medical connector interface 240. A medical device or other instrument (not shown), such as a syringe, can be coupled with the interface 240 or, if present, with the medical connector 241 (see FIG. 4). For convenience, reference will be made hereafter only to a syringe as an example of a medical device suitable for attachment to the medical connector interface 240, although numerous medical devices or other instruments can be used in connection with the adaptor 200 or the medical connector 241. In some instances, the syringe is placed in fluid communication with the vial 210. In some instances, the vial 210, the adaptor 200, the syringe, and, if present, the medical connector 241 are inverted such that the cap 214 is pointing downward (e.g., toward the floor). Any of the above procedures, or any combination thereof, can be performed in any possible order.

In some instances, a volume of fluid is withdrawn from the vial 210 into the syringe. As described above, the pressure within the vial 210 decreases as the fluid is withdrawn. Accordingly, in some instances, the regulating fluid in the filler 256 in the bag 254 flows through the regulator channel 225 and into the vial 210. In some instances, the regulating fluid passes through the filter 260. In some instances, the transfer of the regulating fluid from the filler 256 causes the bag 254 to deflate. In some arrangements, the transfer of the regulating fluid from the filler 256 and/or elsewhere in the bag 254 into the vial 210 generally maintains equilibrium in the vial 210. In some cases, the volume of regulating fluid transferred from the filler 256 into the vial 210 is about equal to the volume of fluid withdrawn from the vial 210 into the syringe.

In certain instances, a volume of fluid is introduced into the vial 210 from the syringe. For example, in certain cases, a volume of fluid is introduced into the vial 210 to reconstitute a freeze-dried drug or for drug compounding purposes. As another example, in some instances, more fluid than is desired may inadvertently be withdrawn from the vial 210 by the syringe. As discussed above, as the fluid is introduced into the vial 210, the pressure in the vial 210 increases. Thus, in some instances, regulating fluid in the vial 210 flows through the regulator channel 225 and into the bag 254, as shown by the arrows in FIG. 6. In some instances, the regulating fluid passes through the filter 260. In some instances, the transfer of the regulating fluid from the vial 210 causes the bag 254 to inflate. In certain of such instances, as the bag 254 inflates, it stretches, unfolds, or unrolls outward. In certain embodiments, the bag 254 is sufficiently flexible so as to substantially avoid producing a restoring force (e.g., a force in opposition to expansion or contraction of the bag 254). In some embodiments, the bag 254 does exert a restoring force. In some arrangements, the transfer of the regulating fluid from the vial 210 into the bag 254 maintains equilibrium in the vial 210. In some cases, the volume of regulating fluid transferred from the vial 210 into the bag 254 is about equal to the volume of fluid introduced into the vial 210 from the syringe.

Thus, in certain embodiments, the adaptor 200 accommodates the withdrawal of fluid from, or the addition of fluid to, the vial 210 in order to maintain the pressure within the vial 210. In various instances, the pressure within the vial 210 changes no more than about 1 psi, no more than about 2 psi, no more than about 3 psi, no more than about 4 psi, or no more than about 5 psi.

In some embodiments, a process for containing gases and/or vapors includes providing the piercing member 220, cap connector 230, and connector interface 240. Generally, the process also includes piercing the septum of the vial 210 with the piercing member 220. The piercing member 220 can provide access to medical fluid in the vial 210. In certain embodiments, the process includes joining the regulator assembly 250 with the cap connector 230 or connector interface 240, thereby fluidly connecting the regulator assembly 250 and the vial 210. In some embodiments, the process also includes storing gases and/or or vapors displaced by a fluid that is introduced into the vial 210. In certain configurations, all or a portion of the gases and/or vapors are stored in the regulator assembly 250. Thus, the gases and/or vapors—which may pose substantial health hazards—can be sequestered and generally maintained apart from the ambient environment. In some embodiments, the process can include detaching the regulator assembly 250.

As is evident from the embodiments and processes described above, the adaptor 200 allows a user to introduce liquid into (including returning unwanted liquid and/or air) and withdrawn liquid from the vial 210 without significantly changing the pressure within the vial 210. As previously discussed, the capability to inject liquid into the vial can be particularly desirable in the reconstitution of lyophilized drugs. Also, as detailed earlier, the ability to inject air bubbles and excess fluid into the vial 210 can be particularly desirable in the context of oncology drugs.

Furthermore, the above discussion demonstrates that certain embodiments of the adaptor 200 can be configured to regulate the pressure within the vial 210 without introducing outside or ambient air into the vial 210. For example, in some embodiments, the bag 254 comprises a substantially impervious material that serves as a barrier, rather than a passageway, between interior of the vial 210 and the ambient environment. Some embodiments of the adaptor 200 substantially reduce the risk of introducing airborne contaminants into the bloodstream of a patient.

As noted above, in some instances, the vial 210 is oriented with the cap 214 pointing downward when liquid is removed from the vial 210. In certain embodiments, the access aperture 246 is located adjacent a bottom surface of the cap 214, thereby allowing removal of most or substantially all of the liquid in the vial 210. In other embodiments, access aperture 246 is located near the distal end 223 of the piercing member 220. In some arrangements, the adaptor 200 comprises more than one access aperture 246 to aid in the removal of substantially all of the liquid in the vial 210.

FIGS. 7-12 illustrate another embodiment of an adaptor 300. The adaptor 300 resembles or is identical to the adaptor 200 discussed above in many respects. Accordingly, numerals used to identify features of the adaptor 200 are incremented by a factor of 100 to identify like features of the adaptor 300. This numbering convention generally applies to the remainder of the figures. Any component or step disclosed in any embodiment in this specification can be used in other embodiments.

In certain embodiments, the adaptor 300 comprises a piercing member 320, a cap connector 330, a connector interface 340, and a regulator assembly 350. Further details and examples regarding some embodiments of piercing members 320, cap connectors 330, and connector interfaces 340 are provided in U.S. Patent Application Publication No. 2009/0216212, the entirety of each of which is incorporated herein by reference and is made a part of this specification. For clarity, the vial 210 is not illustrated. The adaptor 300 can mate with the vial 210 in a similar manner as the adaptor 200. For example, when the adaptor 300 is mated with the vial 210, the piercing member 320 extends through the septum 216 into the interior of the vial 210.

In some embodiments, such as in the illustrated embodiment, the cap connector 330 comprises a body portion 380, which in turn comprises a central portion 381 (that can be curved) and one or more tabs 382 (which can be opposing) attached to the central portion 381. Each of the tabs 382 can be supported at a proximal end of the tab 382 by the central portion 381 of the body portion 380. As shown, the distal end of the tabs 382 can each be unrestrained so as to allow the tab to deflect outward.

The body portion 380, including the central portion 381 and tabs 382, can help removably secure the vial adaptor 300 to the outside surface of the vial 210 and can help facilitate the removal of the vial adaptor 300 from the vial 210. In some embodiments, the body portion 380 defines only one tab 382, as opposed to a pair of opposing tabs 382, the single tab being configured to removably secure the vial adaptor 300 to the outside surface of the vial 210 and to facilitate the removal of the vial adaptor 300 from the vial 210. The single tab 382 can be of any suitable configuration, including those set forth herein.

Figure 7:
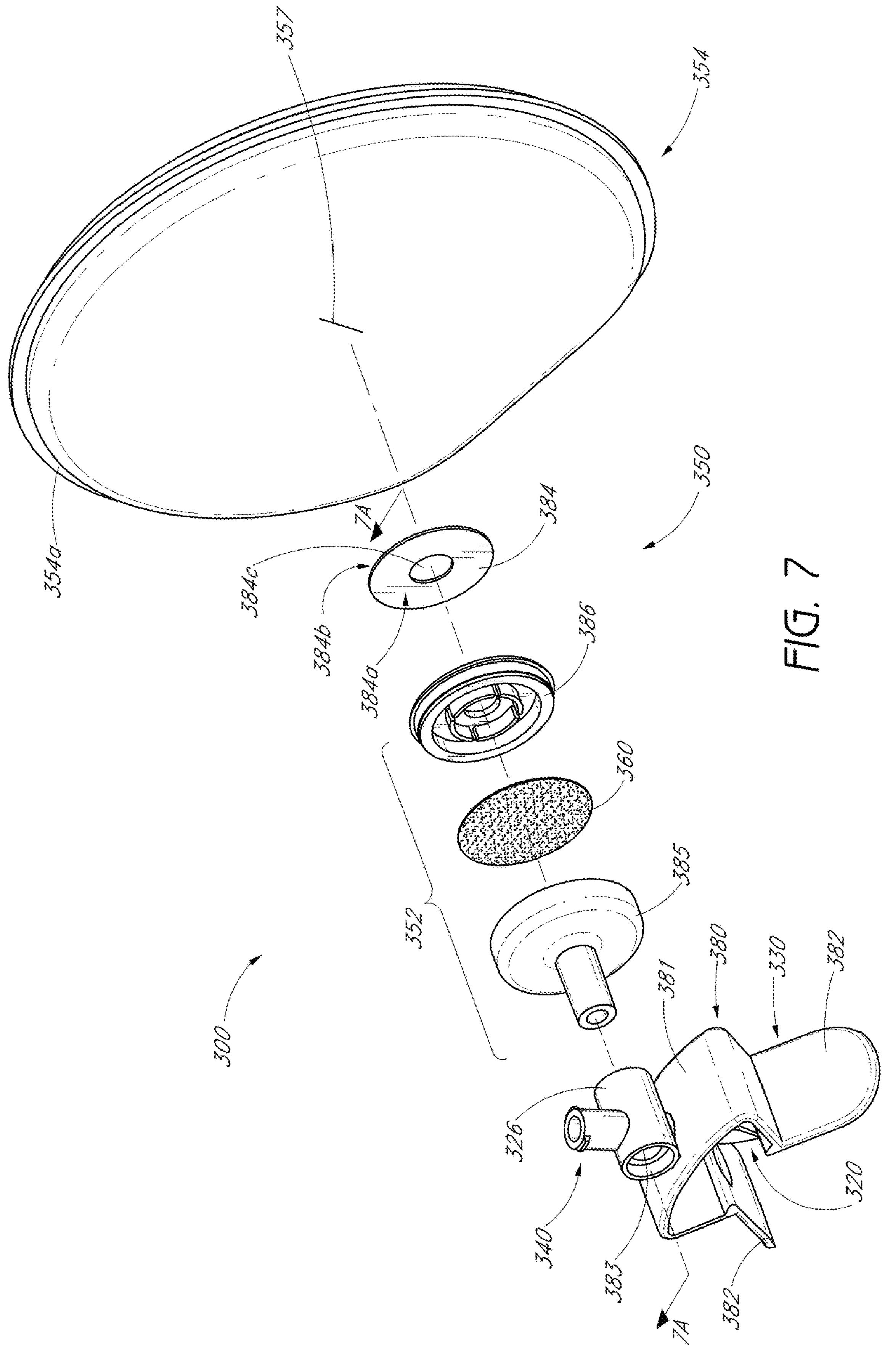
FIG. 7 illustrates an exploded perspective view of a vial adaptor.
Figure 7A:
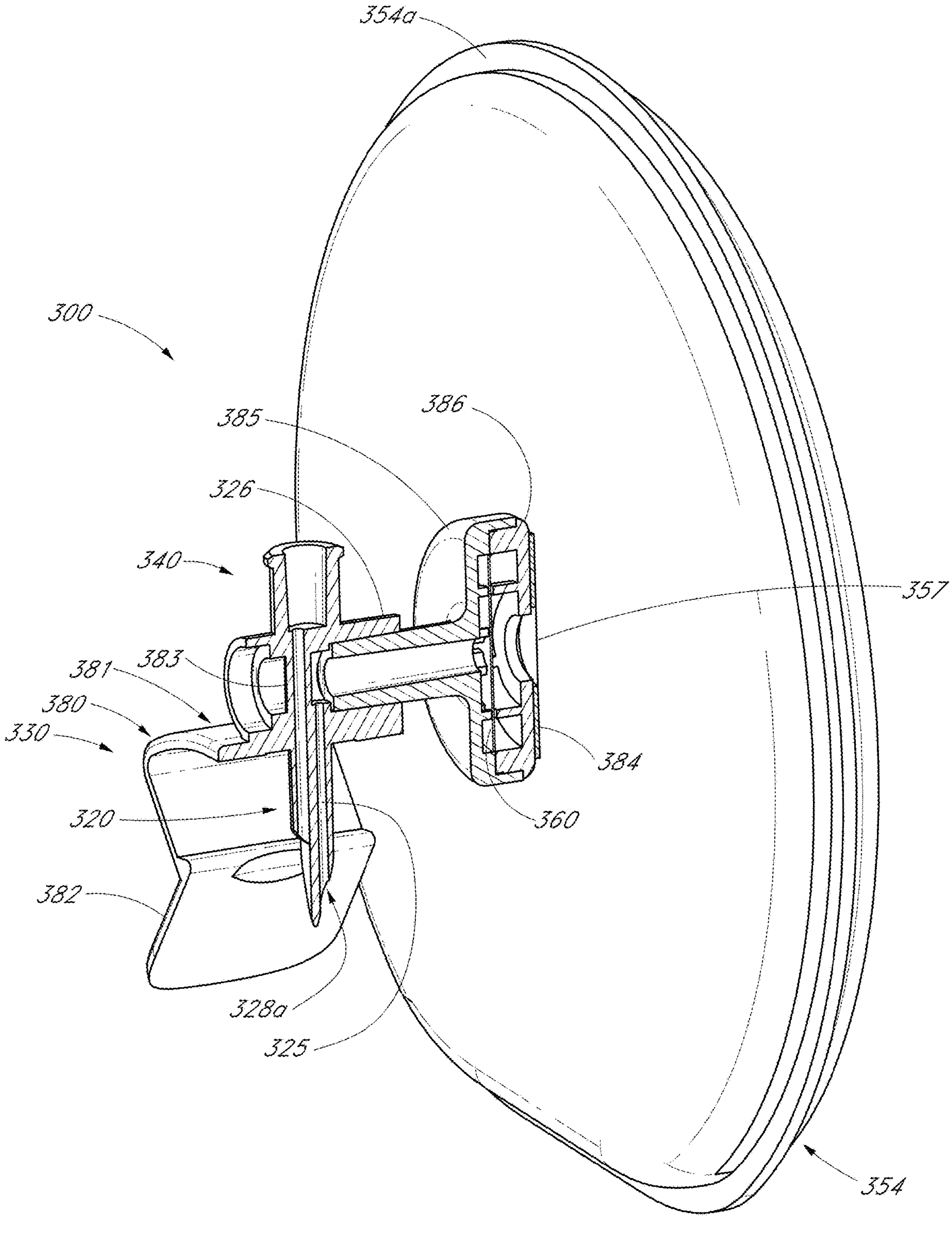
FIG. 7A illustrates an assembled perspective view of the vial adaptor of FIG. 7, including a partial cross-sectional view taken through line 7A-7A in FIG. 7.
Figure 8:
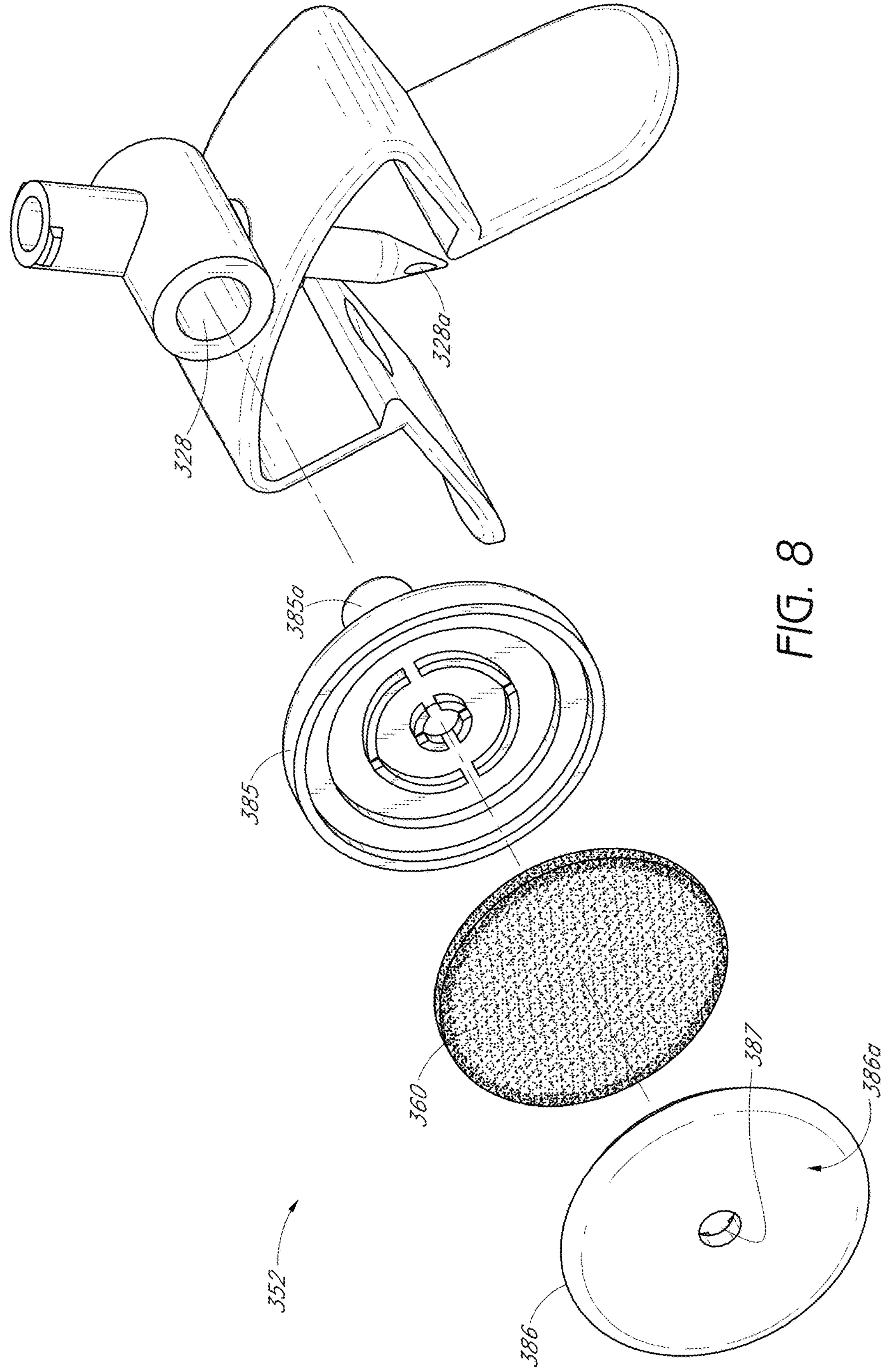
FIG. 8 illustrates an exploded perspective view of a portion of the vial adaptor of FIG. 7.

In certain configurations, such as in the configuration illustrated in FIG. 7A, the piercing member 320 is supported by the body portion 380. As illustrated, the piercing member 320 can project distally from the central portion 381 of the body portion 380. The piercing member 320 can comprise an access channel 345 and a regulator channel 325. In some embodiments, the regulator channel 325 begins at a distal regulator aperture 328*a*, passes generally through the piercing member 320, passes through a lumen 326 that extends radially outward from the connector interface 340, and terminates at a proximal regulator aperture 328 (FIG. 8). In certain instances, the lumen 326 extends radially outward from the connector interface 340 in only one direction. In some instances, the lumen 326 extends radially outward from the connector interface 340 in more than one direction, e.g., in two opposite directions.

In certain embodiments, the lumen 326 includes a barrier 383, such as a wall, cap, plug, dam, cork, partition, or otherwise. In other configurations, the barrier 383 is configured to permit fluid to flow thereacross. For example, in some cases the barrier 383 is a filter, such as a hydrophobic or activated charcoal filter. In certain configurations, the barrier is configured to inhibit or prevent fluid flow thereacross. For example, in some cases the barrier is a continuous wall. In some such configurations, the barrier 383 blocks regulating fluid from exiting the adaptor 300.

The regulator assembly 350 can include a coupling 352, a bonding member 384, and a bag 354. In some instances, the bag includes a filler (not shown), such as the filler 254 discussed above. The bag 354 can include a bag aperture 357, which is illustrated as a linear slit but can take the form of most any opening in the bag. In certain configurations, the bag 354 is constructed of multiple sheets of material that have been joined (e.g., heat sealed) around the periphery. In some such configurations, such as shown in FIG. 8, the sealing operation produces a peripheral ridge 354*a* on the bag 354. In cases, the bag 354 is produced from a balloon having a narrowing neck portion (such as the "4 Inch Round" balloon produced by Pioneer Balloon Company of Wichita, Kansas), wherein the neck portion is removed and the bag 354 is heat sealed around the periphery to enclose (aside from the bag aperture 357) a volume therein. In some instances, removal of the neck portion produces a flattened, truncated, or otherwise asymmetrical portion of the bag 359, as shown in FIG. 7.

In certain embodiments, the bonding member 384 joins the coupling 352 with the bag 354. For example, in certain instances, the bonding member 384 includes a double-sided adhesive, e.g., a member with an adhesive surface facing the coupling 352 and an adhesive surface facing the bag 354. In the illustrated embodiment, the bonding member 384 comprises an adhesive first surface 834*a* and an adhesive second surface 834*b*. As shown, the bonding member 384 can include an aperture 384*c*. In some embodiments, the bonding member 384 is about 0.015 inches thick. In some embodiments, the bonding member 384 has a thickness of at least 0.01 inches and/or equal to or less than 0.03 inches.

In certain embodiments, the bonding member 384 is made of a flexible material, which can, for example, provide resiliency in the connection between the bonding member 384 and the coupling 352 and the bonding member 384 and the bag 354. Such resiliency can allow the coupling 352 to slightly move relative to the bag 350. Likewise, such resiliency can reduce the likelihood of the bag 354 being ripped, torn, or otherwise damaged during manipulation of the regulator assembly 350, such as in the process of connecting the regulator assembly 350 with the remainder of the adaptor 300. In certain configurations, the bonding member 384 is a foam (e.g., urethane, polyethylene, or otherwise), non-rigid plastic, rubber, paper, or cloth (e.g., cotton) material. In certain aspects, the bonding member 384 is made of doubled-sided foam tape.

In certain instances, the coupling 352 includes a base 385 and a cover 386, which in turn can include an outer face 386*a* (FIG. 8). In some embodiments, the bonding member 384 is configured to adhere to or otherwise join with the outer face 386*a*. In some embodiments, the bonding member 384 is configured to adhere to or otherwise join with the bag 354. The connections between the bonding member 384 and the outer face 386*a*, as well as the connection between the bonding member 384 and the bag 354, is substantially fluid tight (e.g., airtight) so that fluid passing between the coupling 352 and the bag 354 is inhibited from escaping. In some embodiments, the connection between the bonding member 384 and the coupling 352, and the bonding member 384 and the bag 354, is substantially permanent, such that once these components are joined they are not intended to be separated. In some embodiments, the connection between the bonding member 384 and the coupling 352, and the bonding member 384 and the bag 354, is configured to be temporary or detachable.

As shown in FIG. 8, a filter 360 can be housed between the base 385 and the cover 386. The cover 386 can be substantially sealingly received by the base 385 so that substantially all of the fluid that is permitted to flow through the filter 360 flows through an opening 387 formed in the cover 386. The base 385 and the cover 386 can be formed from any suitable material, such as plastic or metal. In some embodiments, the perimeter of the coupling 352 defines a non-circular shape, such as a square, triangular, polygonal, or other suitable or desired shape.

Figure 12:
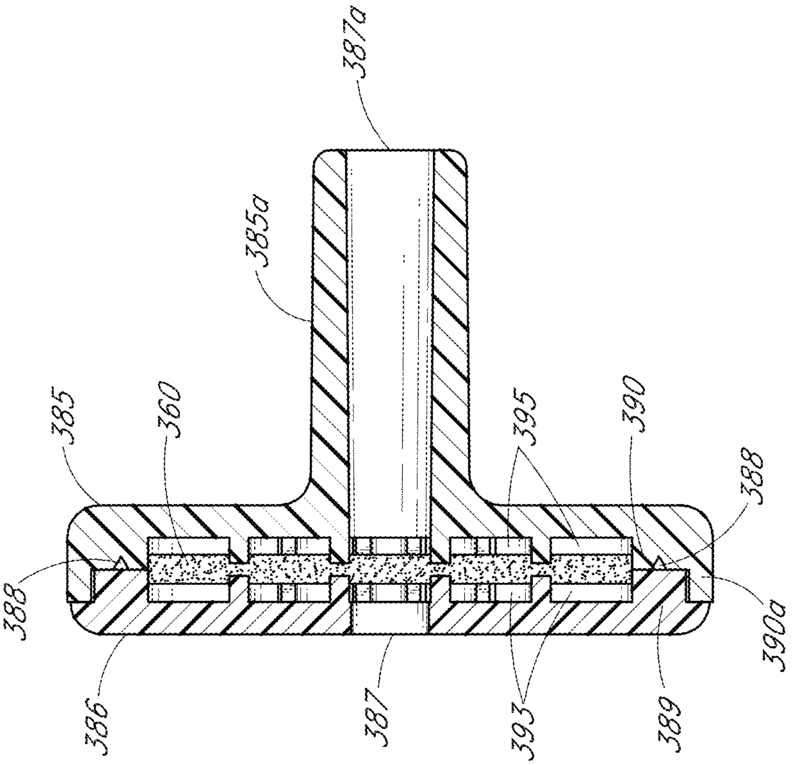
FIG. 12 illustrates a cross-sectional view of the coupling of FIG. 11, taken through line 12-12 in FIG. 11.

The cover 386 can be press-fit with or otherwise attached to the base 385 using adhesive, sonic welds, or by any other similar or suitable means. For example, as illustrated in FIG. 12, the cover 386 can be attached to the base 385 with one or more sonic welds 388. The cover 385 and the base 386 can be joined together so that an annular protrusion 389 of the cover 385 is adjacent to an annular protrusion 390 on the base 385. The protrusion 390 can have a stepped or extended lip portion 390*a* that can overlap the protrusion 389 formed on the cover 386 in the assembled configuration. The base 385 and the cover 386 can be made of various materials, such as metal or plastic. In some cases, the base 385 and the cover 386 are made of polycarbonate plastic.

In some embodiments, the cross-sectional area of the filter 360 is substantially larger than the cross-sectional area of the proximal regulator aperture 328. Such a configuration can increase the rate that regulating fluid flows through the filter 360, thereby providing sufficient regulating fluid to compensate for the introduction or withdrawal of fluid from the vial 210. As discussed above, providing sufficient regulating fluid can inhibit or avoid a pressure gradient (e.g., a vacuum) between the inside and outside of the vial and can reduce or eliminate a restoring force on the plunger of the syringe. In some embodiments, the cross-sectional area of the filter 360 is at least about 5 times greater than the cross-sectional area of the proximal regulator aperture 328. In some embodiments, the cross-sectional area of the filter 360 is between approximately 2 times greater and approximately 9 times greater than the cross-sectional area of the proximal regulator aperture 328, or to or from any values within these ranges. Similarly, in some embodiments, the cross-sectional area of the filter 360 can be approximately 400 times greater than the cross-sectional area of the distal regulator aperture 328*a*. In some embodiments, the cross-sectional area of the filter 360 can be between approximately 100 times greater and approximately 250 times greater, or between approximately 250 times greater and approximately 400 times greater, or between approximately 400 times greater and approximately 550 times greater than the cross-sectional area of the distal regulator aperture 328*a*, or to or from any values within these ranges.

The filter 360 can be configured to remove or diminish particulate matter such as dirt or other debris, germs, viruses, bacteria, and/or other forms of contamination from fluid flowing into the vial adaptor 300. The filter 360 can be formed from any suitable filter material. In some embodiments, the filter 360 can be hydrophobic and can have a mean pore size of approximately 0.1 micron, or between approximately 0.1 micron and approximately 0.5 micron.

Figure 9:
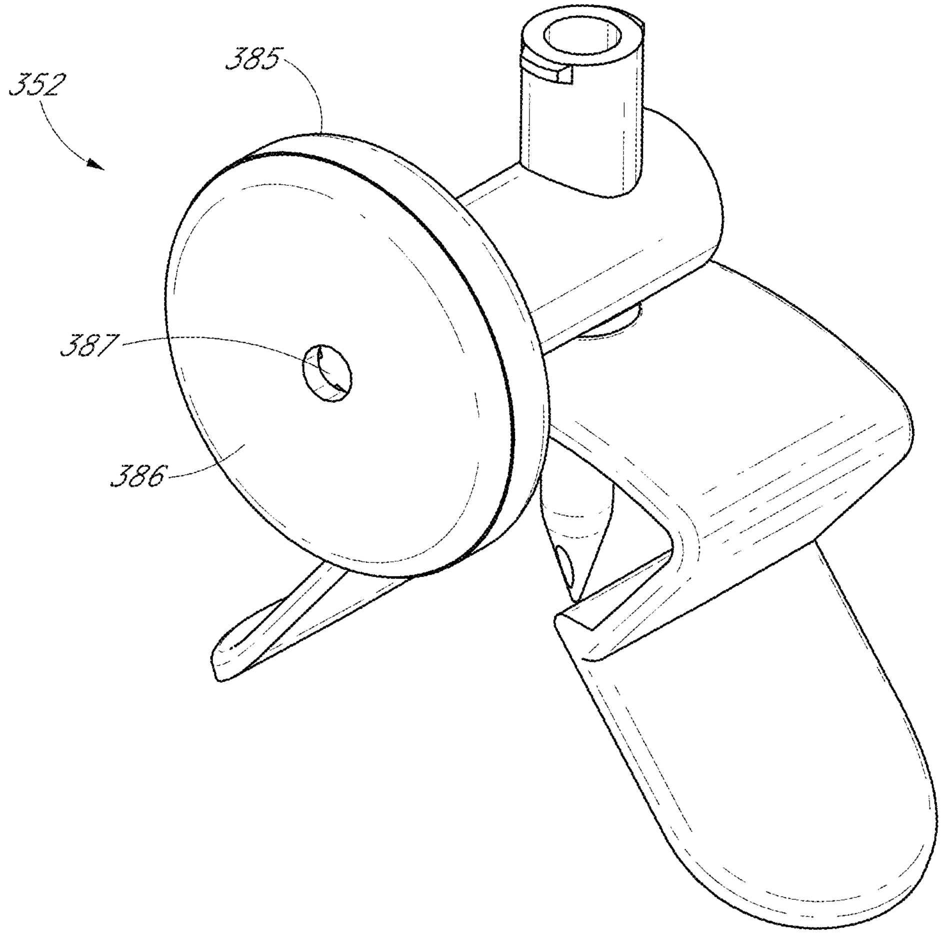
FIG. 9 illustrates an assembled perspective view of the portion of the vial adaptor of FIG. 8.

As illustrated in FIG. 9, in certain configurations, the coupling 352 can be received in the proximal regulator aperture 328. In some embodiments, a protrusion 385*a* (e.g., a boss) extending from the base 385 is configured to be substantially sealingly received within or around the outer perimeter of the proximal regulator aperture 328. The protrusion 385*a* can generally define a regulator path. In some embodiments, the protrusion 385*a* is press-fit into the proximal regulator aperture 328 so as to create a generally sealed connection between the protrusion 385*a* and the proximal regulator aperture 328. In some embodiments, adhesive, welds, or other materials or features can be used to provide the connection between the protrusion 385*a* and the proximal regulator aperture 328. In some instances, the protrusion 385*a* and the proximal regulator aperture 328 are bonded with a solvent. The protrusion 385*a* can be sized and configured to have a sufficient wall thickness and diameter to ensure that the protrusion 385*a* is not inadvertently broken during use by an inadvertent contact with coupling 352. In some embodiments, the regulator path can be in fluid communication with the regulator channel 425 when the protrusion 385*a* is connected to the proximal regulator aperture 328.

An opening 387*a* can be formed through the protrusion 385*a* so that fluid flowing between the base 385 and the cover 386 will be filtered by the filter 360 before flowing through the opening 387 or 387*a*. The size of the opening 387*a* formed through the protrusion 385*a*, as well as the opening 387 formed in the cover 386, can be designed to ensure a sufficient amount of fluid flow through the filter 360. The diameter of the proximal regulator aperture 328 can be adjusted to accommodate any desired or suitable outside diameter of the protrusion 385*a*.

Figure 10:
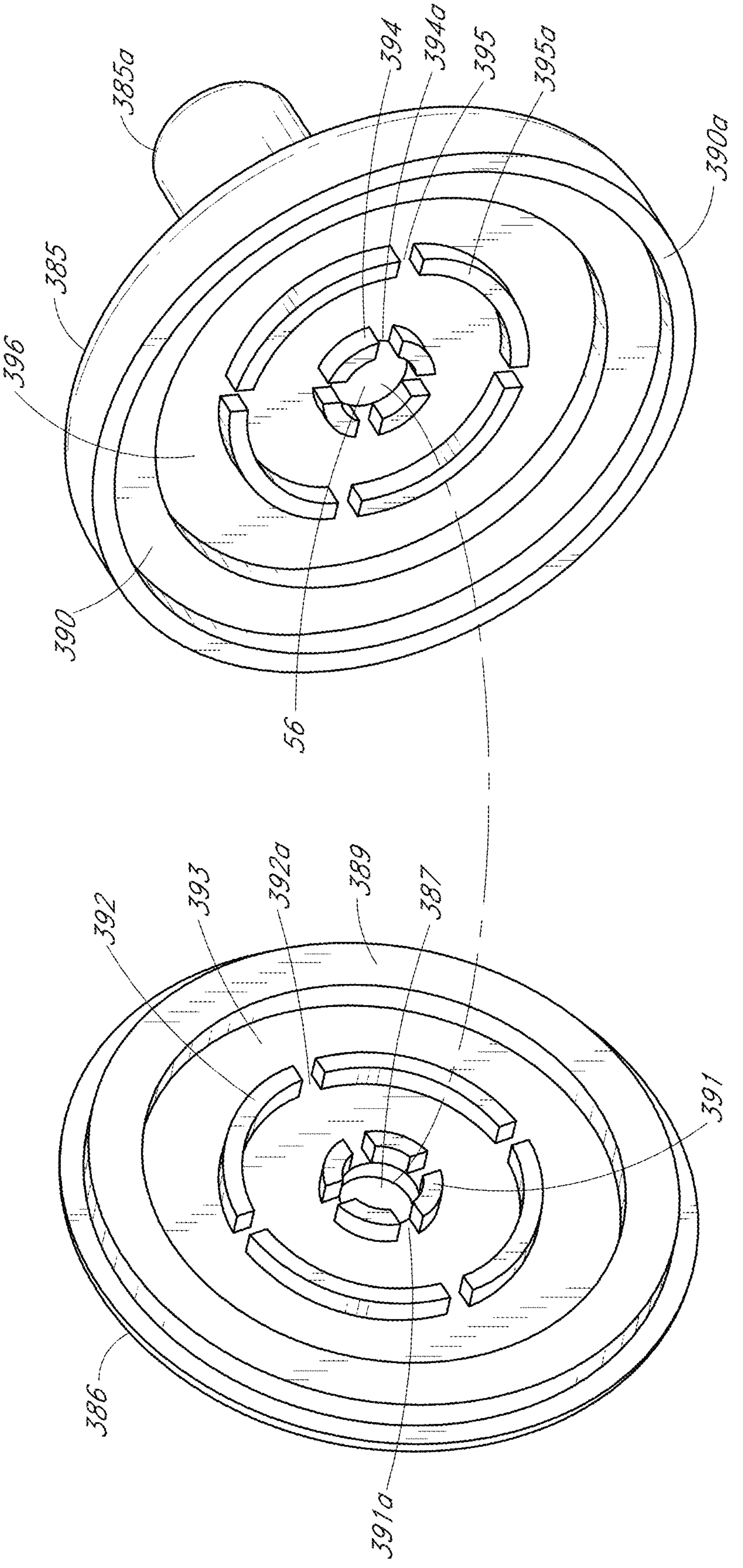
FIG. 10 illustrates an exploded perspective view of a base and a cover of a coupling of the vial adaptor of FIG. 7.
Figure 11:
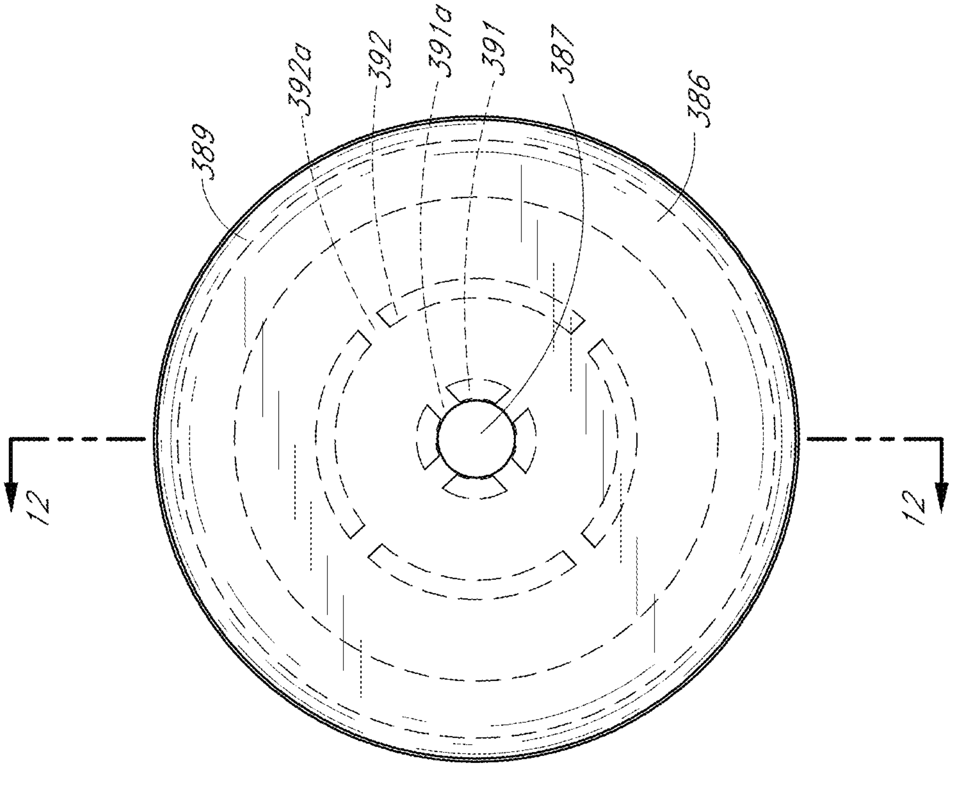
FIG. 11 illustrates a top view of the coupling of FIG. 10.

With reference to FIGS. 10, 11, and 12, the cover 386 can have a first inner annular protrusion 391 having one or more openings 391*a* therethrough, a second inner annular protrusion 392 having one or more openings 392*a* therethrough, and an outer annular protrusion 389. In some embodiments, when the cover 386 is assembled with the base 385 and the filter 360, the annular protrusions 389, 391, 392 and the openings 391*a*, 392*a* form a volume of space 393 between the inner surface of the cover 386 and the surface of the filter 360 into which regulating fluid can flow and circulate before or after passing through the filter 360. Similarly, the base 385 can have a first inner annular protrusion 394 having one or more openings 394*a* therethrough, a second inner annular protrusion 395 having one or more openings 395*a* therethrough, and an outer annular protrusion 390. In some embodiments, when the base 385 is assembled with the cover 386 and the filter 360, the annular protrusions 390, 394, 395 and the openings 394*a*, 395*a* form a volume of space 396 between the inner surface of the base 386 and the surface of the filter 360 into which the regulating fluid can flow and circulate before or after passing through the filter 360. In some configurations, the regulating fluid can access substantially the entire surface area of the filter 360.

In some embodiments, regulating fluid can flow through the opening 387 formed in the cover 386 into the space 393 defined between the cover 386 and the filter 360, through the filter 360, into the space 395 defined between the filter 360 and the base 385, through the opening 385*a* formed in the base 385, through the proximal regulator aperture 382, and into the regulator channel 325 formed in the vial adaptor 300. Likewise, in certain embodiments, regulating fluid can flow through the regulator channel 325 formed in the vial adaptor 300, through the proximal regulator aperture 382, through the opening 385*a* formed in the base 385, into the space 395 defined between the filter 360 and the base 385, through the filter 360, into the space 393 defined between the cover 386 and the filter 360, and through the opening 387 formed in the cover 386. In some instances, the opening 387 is in fluid communication with ambient air.

In some instances, the annular protrusions 390, 394, 395 are configured to maintain the shape and position of the filter 360 relative to the base 385 and the cover 386. For example, the annular protrusion 390 can be configured to maintain the filter 360 about radially centered in the base 385 and the cover 386, which can reduce the chance of fluid passing around (rather than through) the filter 360. In some configurations, the annular protrusions 394, 395 are configured to substantially inhibit the filter 360 from becoming concave shaped as regulating fluid passes through the filter 360, which can reduce the likelihood of the filter 360 being torn or otherwise damaged.

In certain embodiments, the adaptor 300 is modularly configured. Such a configuration can, for example, facilitate manufacturability and promote user convenience by standardizing one or more parts of the adaptor 300. For example, in some instances, the configuration of the piercing member 320, cap connector 330, the connector interface 340, and the coupling 352 is substantially unchanged regardless of the volume of fluid to be transferred between the medical device and the vial 210. Such standardization can, for example, reduce the number of unique components to be purchased, stored, and inventoried, while maintaining the functionality of the adaptor 300.

In some modular embodiments, the adaptor 300 includes a first portion (e.g., the piercing member 320, cap connector 330, connector interface 340, and coupling 352—such as is shown in FIG. 9) and a second portion (e.g., the bag 354). In certain embodiments, the first portion is separate and spaced-apart from the second portion in a first arrangement, and the first portion is connected with the second portion in a second arrangement. Some embodiments can allow for variety of configurations (e.g., sizes) of the bag 354 to be mated with a common configuration of the remainder of the adaptor 300. For example, in some embodiments, 20 mL, 40 mL, and 60 mL configurations of the bag 354 are each connectable with a common configuration of the remainder of the adaptor 300. In certain embodiments, the bag 354 configuration is selectable while the remainder of the adaptor 300 is unchanged. In some cases, the configuration of the bag 354 is selected based on the volume of fluid to be transferred between the medical device (e.g., syringe) and the vial 210. For example, if about 25 mL of fluid is to be transferred from the medical device into the vial 210, then a configuration of the bag 354 that is able to contain greater than or equal to about 25 mL of fluid can be selected and connected to the remainder of the adaptor 300; if, however, it is determined that a different volume of fluid is to be transferred from the medical device into the vial 210, then the selection of the bag 354 can be changed without the need to change the remainder of the adaptor 300.

Certain modular embodiments can provide a ready supply of filtered or otherwise cleaned regulating fluid without being connected with the bag 354. For example, in some embodiments, the opening 387 of the cover 386 of the coupling 352 is in fluid communication with ambient air, thereby providing a supply of filtered air through the coupling 352, the regulator channel 325, and into the vial 210, when the piercing member 320 is disposed in the vial 210 and fluid is withdrawn through the access channel 345. In certain instances, the adaptor 300 does not include the bag 354 and/or the bonding member 384. In some embodiments, the lumen 326 is configured to connect with a filtered or otherwise cleaned regulating fluid source. For example, the lumen 326 can be configured to connect with a tube in fluid communication with a tank of sterilized air.

In some embodiments, a process of manufacturing the vial adaptor 300 includes forming the piercing member 320, cap connector 330, and connector interface 340 in a first assembly. For example, in certain embodiments, the piercing member 320, a cap connector 330, a connector interface 340 are produced by the same operation (e.g., molding, machining, or otherwise). The process can also include forming the coupling 352. For example, in some configurations, the base 385 and cover 386 are assembled with the filter 360 therebetween, as discussed above. In certain embodiments, the process also includes mating the coupling 352 with the lumen 326, such as is shown in FIG. 9. Further, the process can include joining the bonding member 384 with the outer face 386*a* of the cover 386. In some instances, the bonding member 384 is joined with the bag 354. As shown in FIG. 7, the lumen 326, the opening 387*a* in the base, the opening 387 in the cover 386, and the bag aperture 357 can be aligned, thereby allowing regulating fluid to flow between the vial 210 and the bag 354.

In some instances, the process of manufacturing the vial adaptor 300 can, for example, enable production of the adaptor 300 in discrete sub-assemblies, which can facilitate manufacturability. For example, a first sub-assembly can include the piercing member 320, cap connector 330, and connector interface 340; a second sub-assembly can include the coupling 352 (including the base 385, the cover 386, and the filter 360); and a third sub-assembly can include the bag 354 and bonding member 384. Of course, other sub-assemblies are contemplated; for example, the second sub-assembly can include the coupling 352 and the bonding member 384. In some cases, one or more of the sub-assemblies are supplied separately to the user (e.g., a healthcare worker).

Figure 13:
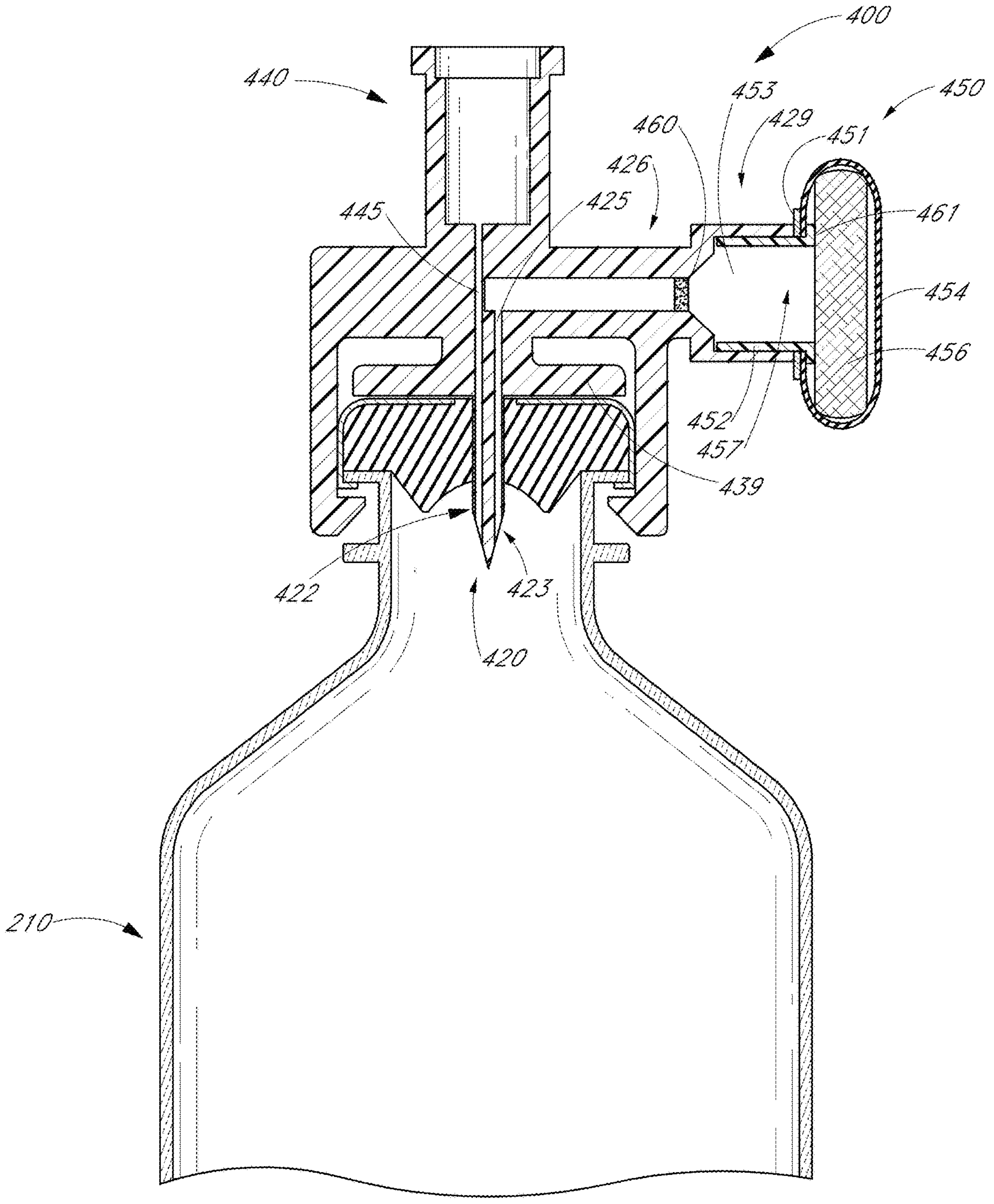
FIG. 13 illustrates a partial cross-sectional view of a vial adaptor coupled with a vial in an initial stage.
Figure 14:
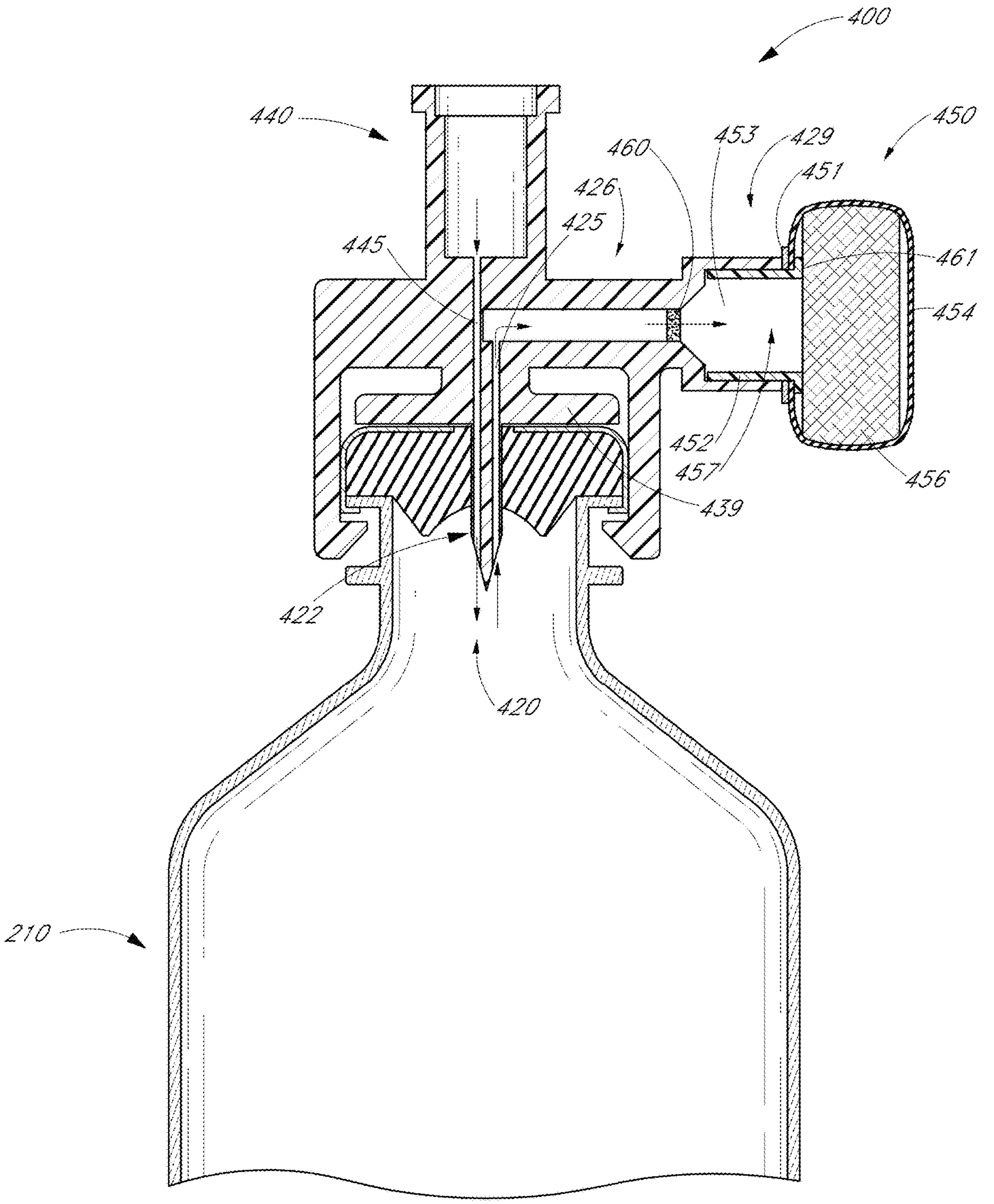
FIG. 14 illustrates a partial cross-sectional view of the vial adaptor of FIG. 13 coupled with a vial in an expanded or a higher-volume stage.
Figure 15:
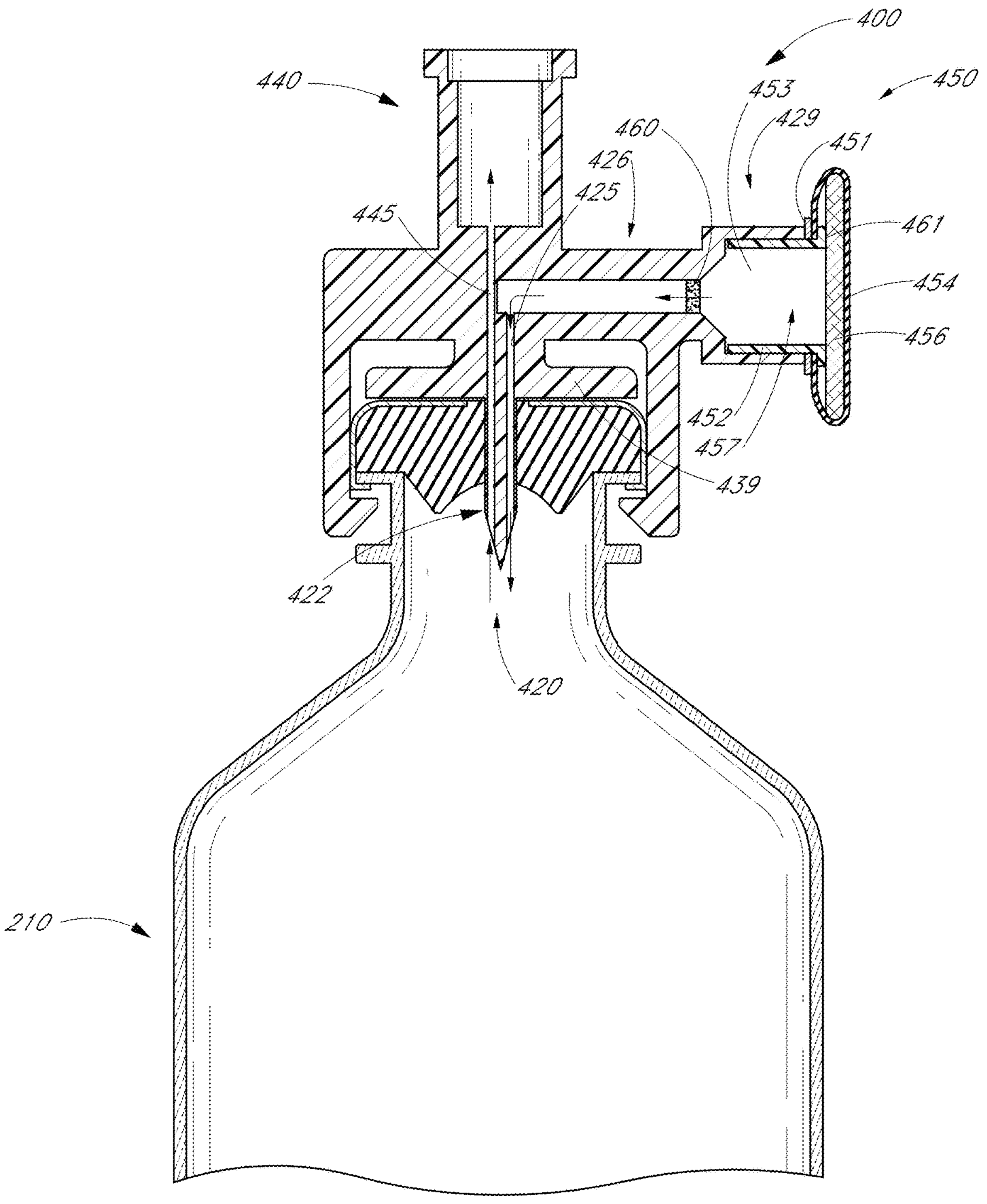
FIG. 15 illustrates a partial cross-sectional view of the vial adaptor of FIG. 13 coupled with a vial in a deflated or lower-volume stage.

FIGS. 13, 14, and 15 illustrate another embodiment of an adaptor 400. The adaptor 400 can have components or portions that are the same as or similar to the components or portions of other vial adaptors disclosed herein. In certain embodiments, the adaptor 400 comprises a piercing member 420, a cap connector 430, a connector interface 440, and a regulator assembly 450. In the illustrated embodiment, the cap connector 430 comprises a platform 439.

The piercing member 420 comprises a sheath 422 having a distal end 423. As shown, the piercing member 420 is relatively short (compared with the piercing member 220 of FIGS. 5 and 6), which can provide enhanced strength and can aid in extracting fluid from the neck region of the vial 210 when the vial 210 is inverted, as discussed above. Also, as illustrated, the piercing member 420 has an access channel 445 and a regulator channel 425, each of which terminate near the distal end 423 of the piercing member 420.

As shown, the cap connector 430 can include a lumen 426, such that the regulator channel 425 routes through the cap connector 430. The lumen 426 extends radially outward through a connection member 429. The illustrated connection member 429 is a slip-fit flange, however many other configurations are contemplated, such as threads, press fit, barb connection, or otherwise. A filter 460, which can be hydrophobic, is disposed in the lumen 426. The regulator assembly 450 comprises an annular washer 451, a coupling 452, a bag 454, and a filler 456. The coupling 452 comprises a passage 453 therethrough and an outwardly extending flange 461. The coupling 452 is positioned through a bag aperture 457 with the flange 461 inside the bag 454. The washer 451 is positioned external to the bag 454 and generally opposite the flange 461. In some instance, the bag 454 is compressed or otherwise held between the washer 451 and the flange 461. For example, in some embodiments, the outside of the coupling 452 is threaded and the center of the annular washer is correspondingly threaded, thereby allowing the washer to be threaded on the coupling 452 and to compress the bag 454 between the washer 451 and the flange 461. As shown, the coupling 452 is received into connection member 429, thereby placing the bag 454 in fluid communication with the vial 210 through the regulator channel 425.

In FIG. 13, the bag 454 is illustrated in an initial state, which can be, for example, the state of the bag 454 when the regulator assembly 450 is initially connected with the cap connector 430. The filler 456 can contain a volume of regulating fluid, such as sterilized air. As shown, in this embodiment and in this state, the filler 456 substantially fills the volume of the bag 454. In some aspects, the bag 454 substantially follows the shape of the filler 456.

In FIG. 14, the bag 454 is illustrated in an at least partly inflated state, which can be, for example, the state of the bag 456 after a volume of fluid has been introduced into the vial 210 through the access channel 445. Such introduction of fluid generally encourages a volume of regulating fluid in the vial 210 to move through the regulator channel 425, lumen 426, filter 460, connection member 429, passage 453, bag aperture 457 and into the bag 454, as shown by the arrows in FIG. 14. In many embodiments, the filter 460 substantially blocks liquids in the vial 210 from entering the bag 454. As shown, such a transfer of regulating fluid can expand the bag 454. In certain embodiments, such as in the illustrated embodiment, the filler 456 is configured to expand as the bag 454 expands.

In FIG. 15, the bag 454 is illustrated in an at least partly deflated state, which can be, for example, the state of the bag 456 after a volume of fluid has been withdrawn from the vial 210 through the access channel 445. Such withdrawal of fluid generally encourages a volume of regulating fluid in the bag 454 to move through the bag aperture 457, passage 453, connection member 429, filter 460, lumen 426, regulator channel 425, and into the vial 210, as shown by the arrows in FIG. 15. As shown, such a transfer of regulating fluid can at least partly deflate the bag 454. In certain embodiments, such as in the illustrated embodiment, the filler 456 is configured to compress as the bag 454 deflates. As shown, in some arrangements, the filler 456 is configured to provide a structural framework for the bag 454 (even in a deflated state), which can inhibit sagging of the bag 454. In some embodiments, the bag 354 comprises a material having sufficient rigidity to inhibit sagging of the bag 454.

In various embodiments, the adaptor 400 is configured to transition between the various states illustrated in FIGS. 13, 14, and 15. In some instances, the adaptor 400 begins at the state illustrated in FIG. 13 and transitions to the state illustrated in FIG. 14 (e.g., fluid is introduced from the syringe into the vial 210). In certain instances, the adaptor 400 begins at the state illustrated in FIG. 13 and transitions to the state illustrated in FIG. 15 (e.g., fluid is withdrawn from the vial 210 into the syringe). In some instances, the adaptor 400 begins at the state illustrated in FIG. 13, transitions to the state illustrated in FIG. 14, then transitions to the state illustrated in FIG. 15 (e.g., fluid is introduced from the syringe into the vial 210, then a greater volume of fluid than was introduced is withdrawn from the vial 210 into the syringe). In certain instances, the adaptor 300 begins at the state illustrated in FIG. 13, transitions to the state illustrated in FIG. 15, then transitions to the state illustrated in FIG. 14 (e.g., fluid is withdrawn from the vial 210 into the syringe, then a greater volume of fluid than was withdrawn is introduced into the vial 210).

Figure 16:
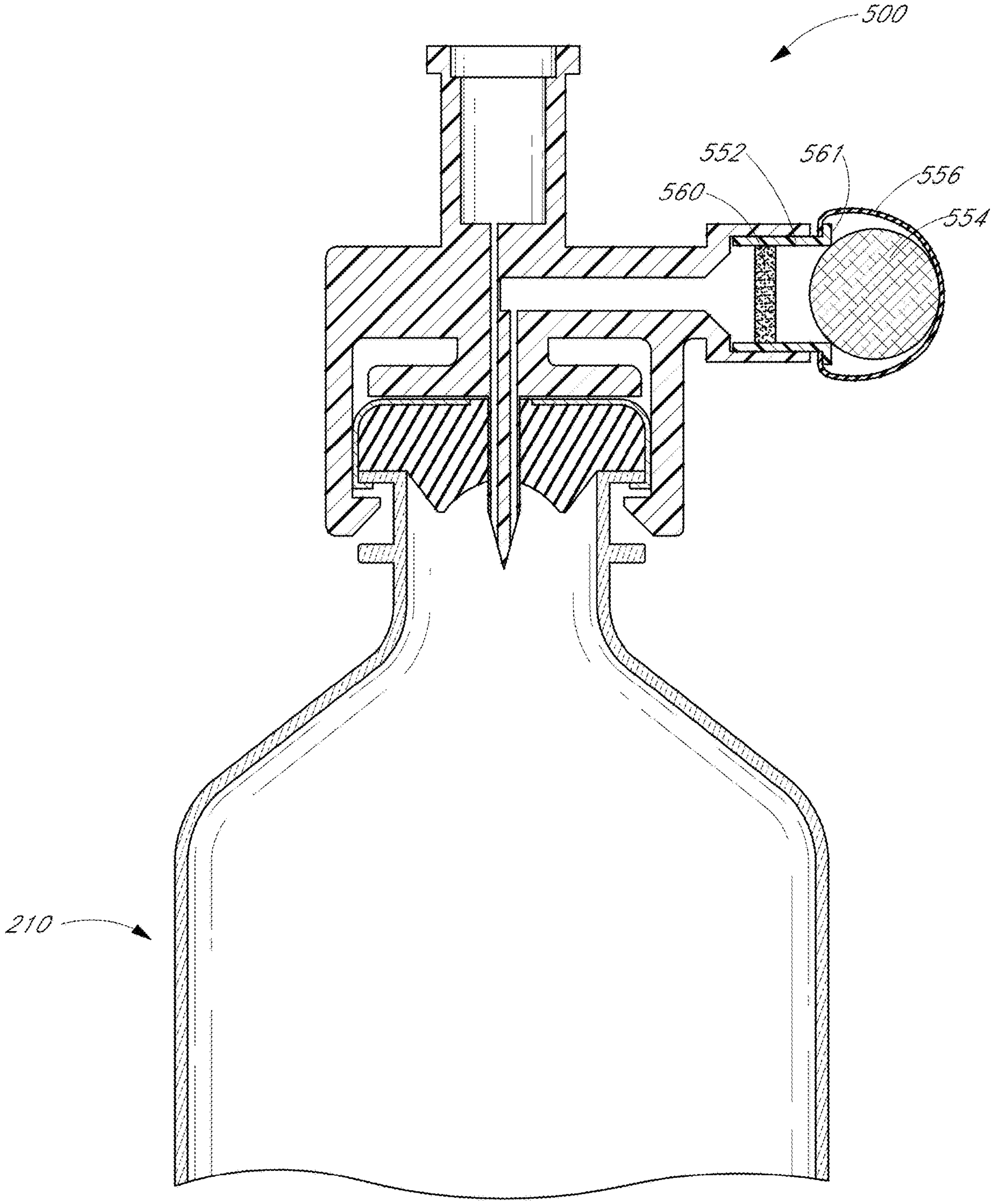
FIG. 16 illustrates a partial cross-sectional view of a vial adaptor coupled with a vial.

FIG. 16 illustrates an embodiment of an adaptor 500 that can have components or portions that are the same as or similar to the components or portions of other vial adaptors disclosed herein. Adaptor 500 comprises a filter 560 located in a coupling 552. Additionally, the adaptor 500 comprises a filler 556, which is substantially round in cross-section. In some embodiments, the filler 556 is spheroidal. In other embodiments, the filler 556 is substantially cylindrical. The adaptor 500 also comprises a bag 554 and a coupling 552 with a flange 561. As shown, the bag 554 can be joined, e.g., welded, adhered, or otherwise, with the flange 561. In certain embodiments, the filler 556 is also joined with the flange 561, which can facilitate keeping the bag 554 stationary with respect to the coupling 552. In some arrangements, the filler 556 acts as a secondary filter for the gases passing between the vial 210 and the bag 554. For example, in some cases, certain impurities that passed through the filter 560 are trapped by the filler 556 before such impurities enter the bag 554. In some arrangements, the filler 556 acts as a pre-filter with respect to the filter 560, thereby reducing the amount of impurities passing through the filter 560 and into the vial 210.

Figure 17:
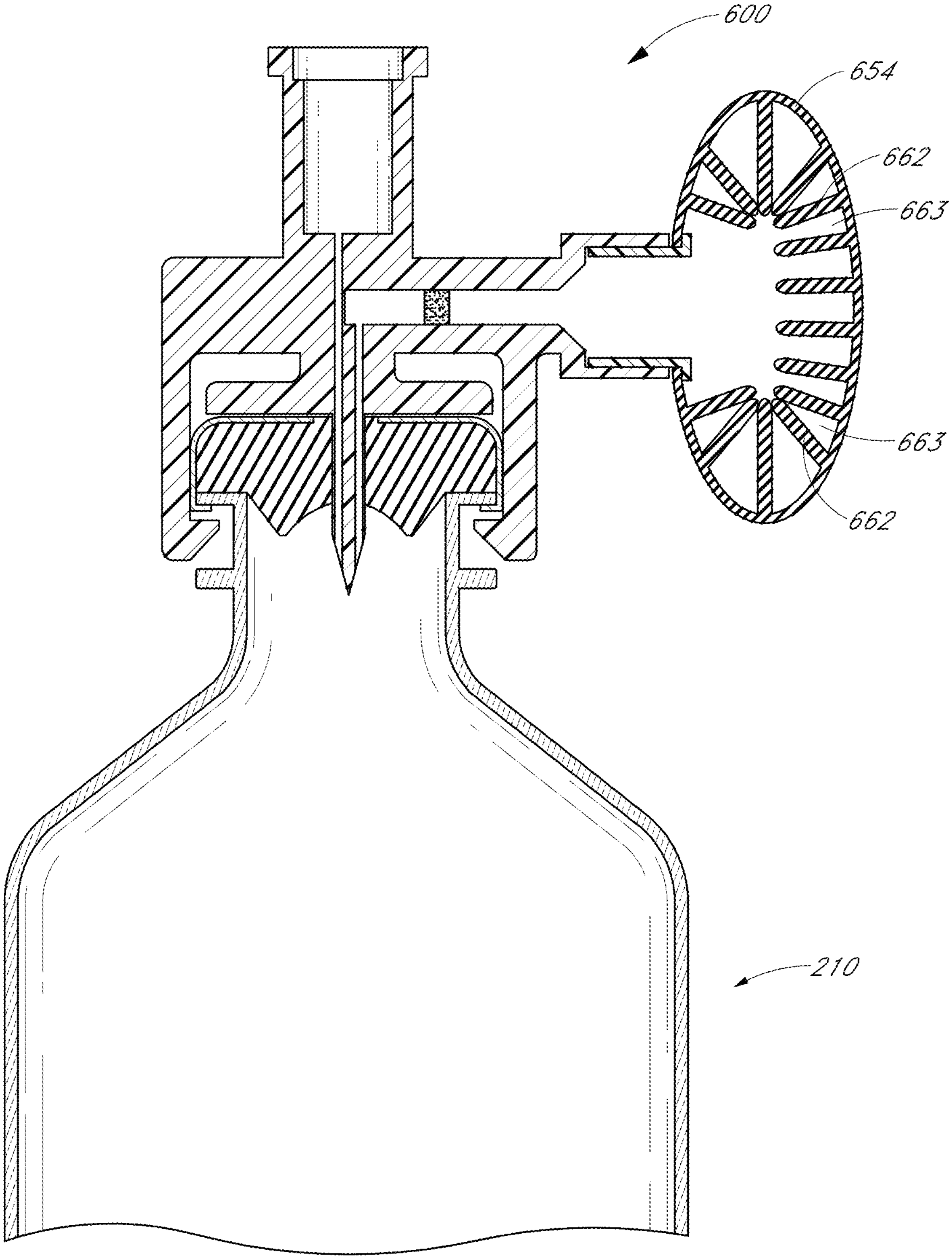
FIG. 17 illustrates a partial cross-sectional view of a vial adaptor coupled with a vial, the adaptor including an internal structure.

FIG. 17 illustrates an embodiment of an adaptor 600 that can have components or portions that are the same as or similar to the components or portions of other vial adaptors disclosed herein. Adaptor 600 comprises a bag 654 comprising an internal structure, rather than, or in addition to, a filler. Such internal structure can, for example, inhibit or prevent complete deflation of the bag 654, in order to provide an initial supply of regulating fluid. In the illustrated embodiment, the internal structure comprises a plurality of inwardly extending elongate members 662. In some configurations, the elongate members are generally flexible. In other configurations, the elongate members are substantially rigid. As shown, the elongate members 662 can contact and interfere with each other as the bag 654 deflates, which can hinder the bag 654 from fully deflating. In some embodiments, the regulating fluid is stored in a network of voids 663, so as to provide an initial readily available supply of the regulating fluid to the vial 210. In some such arrangements, the voids 663 are located between the elongate members 662.

Other embodiments include various other types of internal structure. For example, in some embodiments, the internal structure includes a plurality of inwardly-projecting bumps, ridges, rings, hemispheres, or the like. In some embodiments, the internal structure divides the bag 654 into segments. For example, in certain configurations, the internal structure is a membrane that divides the bag 654 into a first portion and a second portion, each of which can include an amount of regulating fluid. In some arrangements, when the bag 654 changes volume, the amount of regulating fluid in the first portion changes (e.g., decreases) more rapidly than in the second portion. In certain configurations, the first and second portions are fluidly connected by a valve. In some such configurations, the valve permits the regulating fluid to flow from the second portion into the first portion once a desired pressure difference between the portions has been achieved. In certain instances, the first portion inflates or deflates completely before the second portion begins to inflate or deflate.

Figure 18:
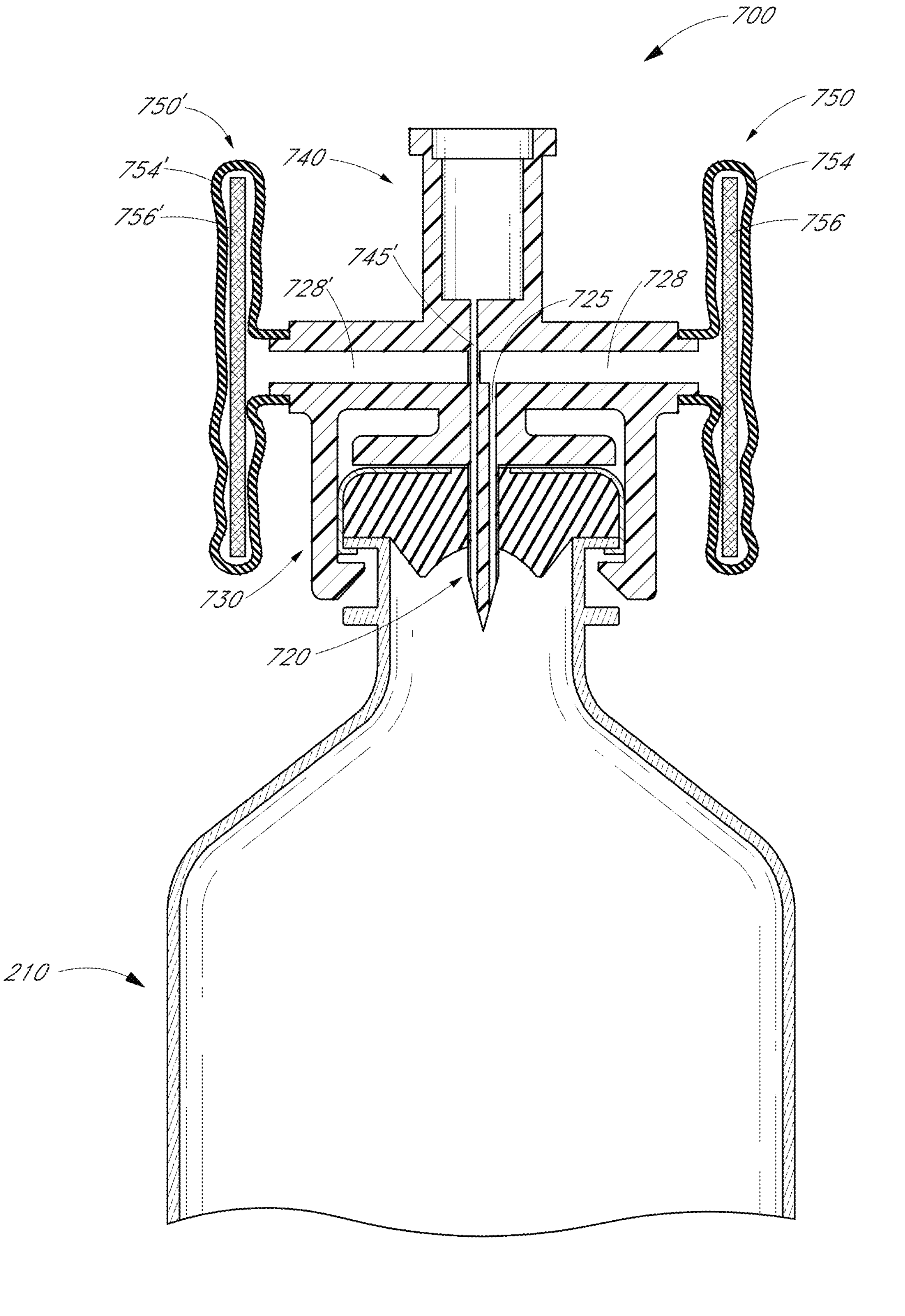
FIG. 18 illustrates a partial cross-sectional view of a vial adaptor coupled with a vial, the adaptor including a plurality of regulator assemblies.

Another embodiment of an adaptor 700 is illustrated in FIG. 18. The adaptor 700 that can have components or portions that are the same as or similar to the components or portions of other vial adaptors disclosed herein. In the illustrated embodiment, the adaptor 700 comprises a piercing member 720, a cap connector 730, a connector interface 740, and a plurality of regulator assemblies 750, 750'. In certain embodiments, the expansion assemblies 750, 750' each include a bag 754, 754' and a filler 756, 756'. In some embodiments, as in the embodiment shown, the piercing member 720, cap connector 730, and connector interface 740 are substantially monolithic. In certain embodiments, each bag 754, 754' connects with the cap connector 730, such as with an adhesive, pipe clamp, snap ring, or otherwise.

In some configurations, the plurality of regulator assemblies 750, 750' provide a greater total volume of regulating fluid than a single regulator assembly. In certain embodiments, because the volume of regulating fluid is divided between the plurality of regulator assemblies 750, 750', the size of each of the regulator assemblies 750, 750' (and thus adaptor 600 overall) can be reduced, compared with, for example, embodiments with a single regulator assembly. Furthermore, the regulator assemblies 750, 750' can be symmetrically spaced with respect to the remainder of the adaptor 600, thereby enhancing stability and reducing the likelihood of tipping.

Various embodiments have various numbers of regulator assemblies. For example, some embodiments have greater than or equal to three regulator assemblies. Some embodiments have at least four regulator assemblies. Generally, the regulator assemblies are equally radially spaced around the circumference of the adaptor 700 or are otherwise positioned to facilitate stability of the adaptor 700.

In certain configurations, when the piercing member 720 is disposed into the vial 210, the interior of each of the regulator assemblies 750, 750' is in fluid communication with the vial 210 via outwardly extending passages 728, 728' and a regulator channel 725. Thus, when fluid is withdrawn from the vial 210 through an access channel 745, regulating fluid can flow from each of the regulator assemblies 750, 750' into the vial 210 and thereby maintain equilibrium in the vial 210. Similarly, when fluid is introduced into the vial 210 through an access channel 745, regulating fluid can flow from the vial 210 into each of the regulator assemblies 750, 750', thereby maintaining equilibrium in the vial 210.

In some embodiments, the regulator assemblies 750, 750' operate in tandem, e.g., they change volume substantially simultaneously and in about equal amounts. For example, in certain cases, when about 5.0 mL of fluid is withdrawn from the vial 210, about 2.5 mL of regulating fluid flows from regulator assembly 750 into the vial 210 and concurrently about 2.5 mL of regulating fluid flows from regulator assembly 750' into the vial 210.

In some embodiments, the regulator assemblies 750, 750' do not operate in tandem. For instance, in some arrangements, the regulator assemblies 750, 750' operate in series. In some such instances, a first regulator assembly fully expands or fully deflates before the second regulator assembly begins expanding or deflating. In certain instances, the first regulator assembly changes volume initially, then, after a condition has been achieved, the second regulator assembly changes volume. In some cases, the condition is a certain pressure difference (e.g., at least about 1 psi, at least about 2 psi, or at least about 5 psi) between the interior of the second regulator assembly and the vial 210. In certain configurations, a valve (e.g., a duckbill valve) is configured to open when the condition has been achieved.

Figure 19:
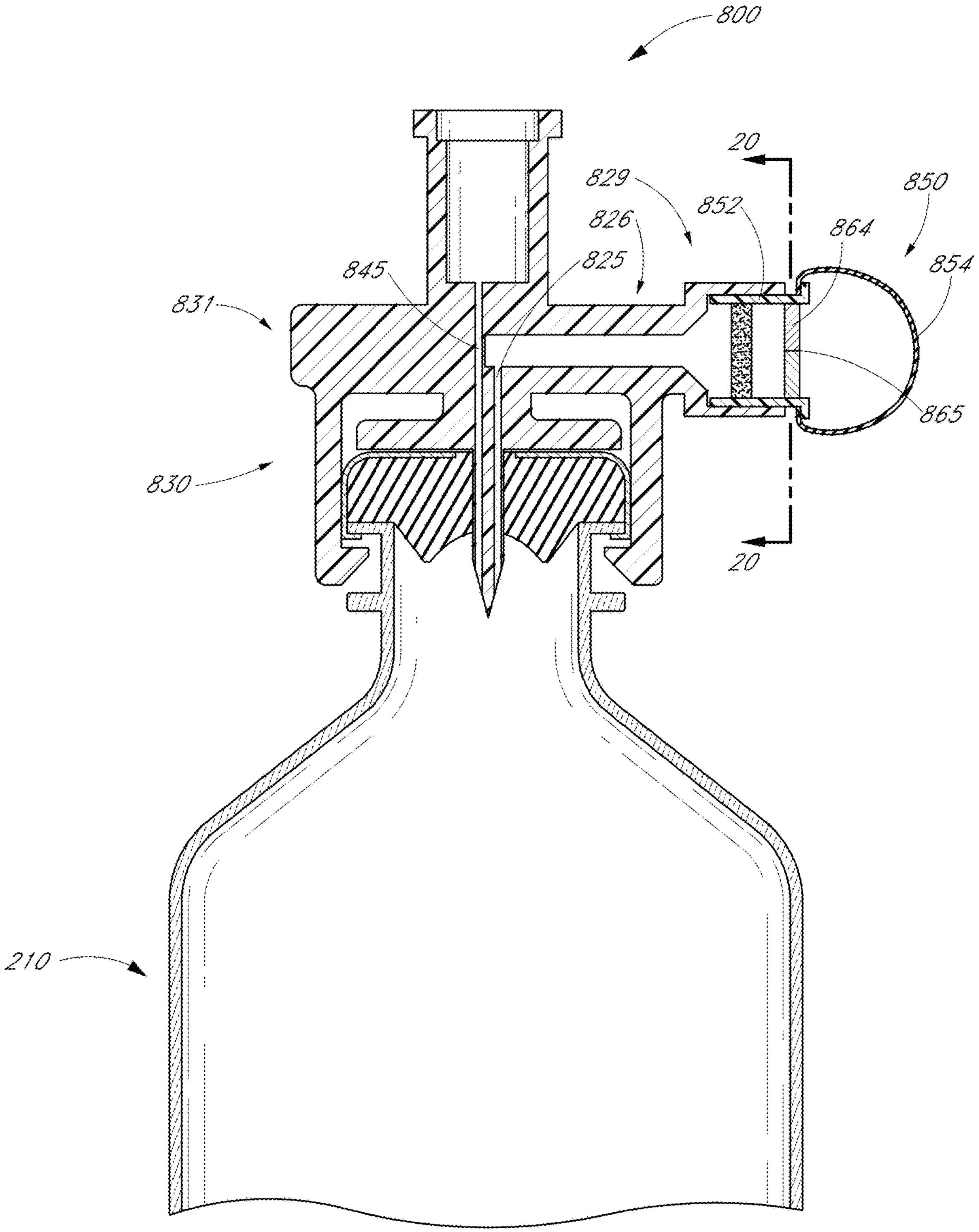
FIG. 19 illustrates a partial cross-sectional view of a vial adaptor coupled with a vial, the adaptor including a counterweight.

FIG. 19 illustrates an embodiment of an adaptor 800 that can have components or portions that are the same as or similar to the components or portions of other vial adaptors disclosed herein. The adaptor comprises a regulator assembly 850 with a seal 864, a counterweight 831, and a keyed coupling 852. As used herein, a "keyed coupling" is used in its broad and ordinary sense and includes couplings having a shape configured to match another coupling in one or more orientations. Furthermore, the illustrated embodiment of the adaptor 800 does not include a filler. In some such embodiments, the adaptor 800 includes a bag 854 that is sufficiently rigid to substantially inhibit the bag 854 from fully deflating (e.g., enclosing about zero volume).

In some embodiments, the seal 864 is configured to inhibit or prevent unintended transfer of regulating fluid out of the regulator assembly 850 and/or unintended transfer of ambient air into the regulator assembly 850. For example, in the embodiment shown, prior to the regulator assembly 850 being connected with the remainder of the adaptor 800, the seal 864 generally blocks the initial volume of regulating fluid (which may be at a pressure above ambient pressure) contained in the regulator assembly 850 from escaping into the ambient environment. Additionally, the seal 864 can generally block ambient air, which may contain microbes or impurities, from entering the regulator assembly 850.

In the illustrated embodiment, the seal 864 comprises a membrane with a slit 865. In certain instances, such as when the regulator assembly 850 is connected with the adaptor 800 and fluid is introduced or withdrawn through an access channel 845, the pressure difference between the vial 210 and the bag 854 causes the slit 865 to open, thereby allowing regulating fluid to flow between the regulator assembly 850 and the vial 210. Various other kinds and configurations of the seal 864 are contemplated. For example, in some embodiments, the seal 864 is a duck-bill valve. As another example, in some embodiments, the seal 864 comprises a substantially continuous (e.g., without a slit) membrane that is configured to rupture at a certain pressure differential (e.g., at least about 1 psi, at least about 2 psi, at least about 5 psi).

In the embodiment shown, the seal 864 is located in the coupling 852. In some other embodiments, the seal 864 is disposed in alternate locations. For example, the seal 864 can be located in a passage 826. In some arrangements, the seal 864 is configured to dislodge or detach from the adaptor 800 when fluid is introduced or withdrawn through the access channel 845. For example, in certain instances, when fluid is withdrawn from the vial 210 through the access channel 845, the seal 864 is dislodged from the regulator channel 825, thereby allowing regulating fluid to flow into the vial 210. In some such cases, the seal 864 is a tab or a sticker. In some such cases, the seal 864 separates from the adaptor 800 and falls into the vial 210.

As shown, certain configurations of the adaptor 800 include a cap connector 830, which in turn includes the counterweight 831. The counterweight 831 can, for example, enhance the stability of the mated vial 210 and adaptor 800 and reduce the chances of the combination tipping. In certain arrangements, the counterweight 831 is configured to locate the center of mass of the adaptor 800 substantially on the axial centerline of the adaptor 800 when the regulator assembly 850 is connected to the adaptor 800. In certain arrangements, the counterweight 831 has a mass that is about equal to the sum of the mass of an outwardly extending connection member 829 plus the mass of the regulator assembly 850 in the initial configuration. In some instances, the counterweight 831 comprises a mass of material generally located on the opposite side of the axial centerline as the regulator assembly 850. In some instances, the counterweight 831 comprises an area of reduced mass (e.g., grooves, notches, or thinner walls) on the same side of the axial centerline as the regulator assembly 850.

As shown in FIGS. 20A-20F, which illustrate cross-sectional views of various examples of the coupling 852, the coupling 852 can be keyed or otherwise specially shaped. The connection member 829 typically is correspondingly keyed or otherwise specially shaped. Such a configuration can be useful to signal, control, or restrict the regulator assemblies 850 that can be connected with a given adaptor 800. For example, a relatively large regulator assembly 850 (e.g., initially containing at least about 100 mL of regulating fluid) may be keyed so at not to mate with a relatively small adaptor 800 (e.g., sized and configured for to mate with vials 210 containing less than about 3 mL of fluid). In certain cases, the combination of a large regulator assembly and a small vial could be unstable and could exhibit an increased tendency to tip-over, and thus would be undesirable. However, by keying sizes of the regulator assembly 850 so as to mate only with appropriate sizes of the adaptor 800, such concerns can be reduced or avoided. In various embodiments, the coupling 852 can be male or female and the connection member 829 can be correspondingly female or male.

Figure 20A:
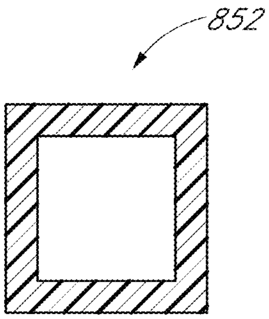
FIGS. 20A-20F illustrate cross-sectional views of a keyed coupling of the vial adaptor of FIG. 19, taken through line 20-20 in FIG. 19.
Figure 20B:
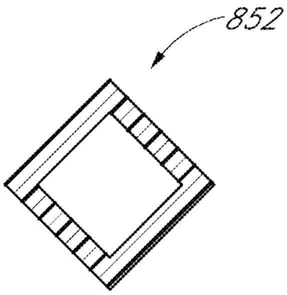
Figure 20C:
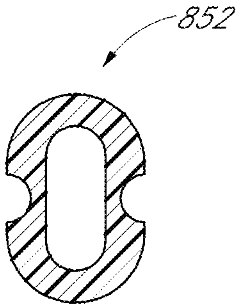
Figure 20D:
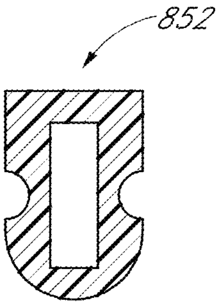
Figure 20E:
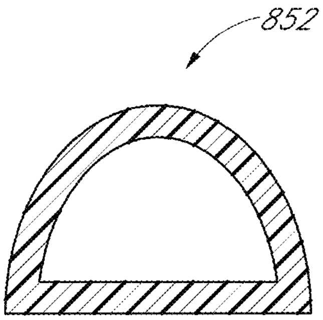
Figure 20F:
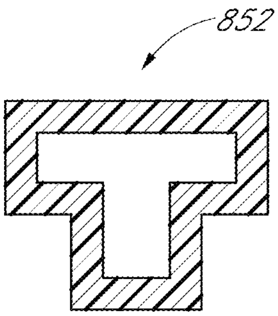

Various types of keyed couplings 852 are contemplated. In some embodiments, the shape of the coupling 852 inhibits or prevents rotation of the regulator assembly in relation to the remainder of the adaptor 800. For example, as shown in FIG. 20A, the coupling 852 can be substantially rectangular. The connection member 829 can be correspondingly rectangular to matingly engage with the coupling 852. Similarly, as shown in FIG. 20B, the coupling 852 can be substantially diamond-shaped. The connection member 829 can be correspondingly diamond-shaped to matingly engage with the coupling 852. Likewise, as shown in FIG. 20C, the coupling 852 can include notches, grooves, bumps or the like. The connection member 829 can be correspondingly shaped to matingly engage with the notches, grooves, bumps or the like of the coupling 852.

In certain embodiments, the shape of the coupling 852 establishes the orientation of the regulator assembly 850 with regard to the remainder of the adaptor 800. For example, in the embodiment illustrated in FIG. 20C, the coupling 852 (and thus the regulator assembly 850) are configured to mate with the connection member 829 in only two possible orientations. In some embodiments, such as the embodiments illustrated in FIGS. 20D, 20E, and 20F, the coupling 852 (and thus the regulator assembly 850) is configured to mate with the connection member 829 in only a single possible orientation.

Some embodiments provide feedback to alert the user that mating engagement of the coupling 852 and the connection member 829 has been achieved. For example, in certain instances, the connection between the coupling 852 and the connection member 829 includes a detent mechanism, e.g., a ball detent, which can provide tactile indication of engagement. Some embodiments include an audible signal, e.g., a click, snap, or the like, to indicate engagement.

Certain embodiments link the coupling 852 and the connection member 829 so as to inhibit or prevent subsequent separation. For example, some arrangements include an adhesive in one or both of the coupling 852 and connection member 829, such that mating engagement adheres the coupling 852 and the connection member 829 together. In certain other arrangements, mating engagement of the coupling 852 and connection member 829 engages one-way snap-fit features.

Figure 21:
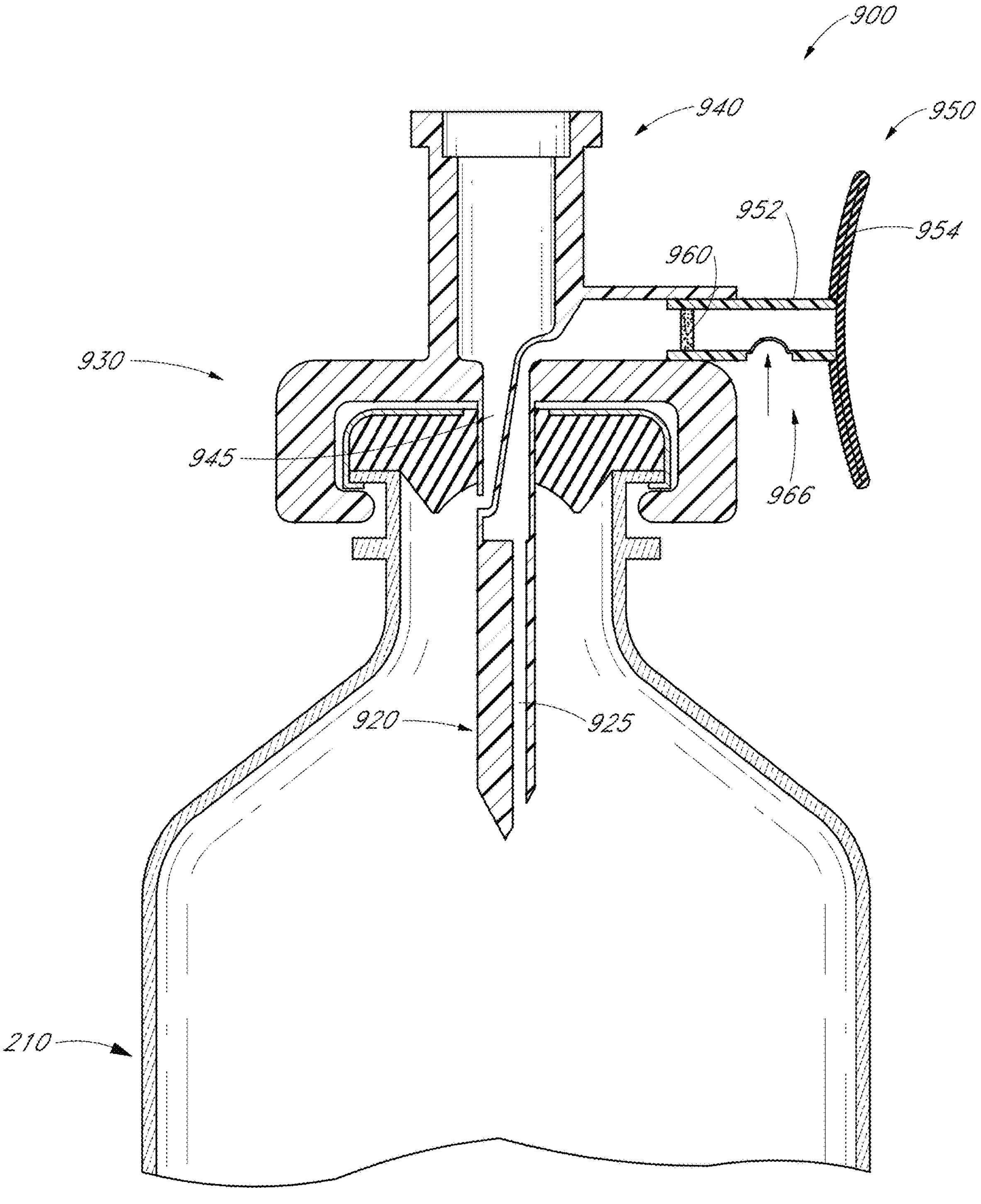
FIG. 21 illustrates a partial cross-sectional view of a vial adaptor coupled with a vial, the adaptor including a check valve.

FIG. 21 illustrates another embodiment of an adaptor 900. The adaptor 900 that can have components or portions that are the same as or similar to the components or portions of other vial adaptors disclosed herein. In the illustrated embodiment, the adaptor 900 comprises a piercing member 920, a cap connector 930, a connector interface 940, and a regulator assembly 950. As shown, aside from a regulator channel 925, the piercing member 920 is substantially solid, which can provide additional strength and rigidity for piercing vials having stiff or unyielding septums. Such a configuration for the piercing member 920 can also facilitate manufacturability.

In the illustrated embodiment, the regulator assembly 950 includes a coupling 952, bag 954, filter 960, and check valve 966. Various types and kinds of check valves can be used, such as a duckbill valve, flapper valve, diaphragm-check valve, lift-check-valve, or other. In some configurations, the check valve 966 permits fluid to flow from the ambient surroundings into the coupling 952. Such a configuration can provide regulating fluid to the vial 210 even when the bag 954 is substantially empty of regulating fluid. Such a scenario could be encountered, for example, when the bag 954 contains a volume $V_1$ of regulating fluid, a volume $V_2$ of fluid is withdrawn from the vial 210 via an access channel 945, and wherein $V_1$ is less than $V_2$. Thus, in such a scenario the bag 954 would have insufficient regulating fluid to compensate for the fluid withdrawn from the vial 210. To provide the regulating fluid deficiency (e.g., the difference between $V_2$ and $V_1$) the check valve 966 can allow ambient air to enter the vial 210 via the adapter 800.

Generally, the check valve 966 is opened by a certain pressure gradient (e.g., at least about 1 psi, at least about 2 psi, at least about 5 psi) from one side of the valve to the other, also known as the cracking pressure. As discussed above, the withdrawal of fluid from the vial 210 can decrease the pressure in the vial 210. Generally, the regulating fluid in the bag 954 maintains equilibrium in the vial 210, but when the volume of regulating fluid in the bag 954 is exhausted, the pressure in the vial 210 can begin to decrease. However, when the pressure difference between the inside and outside of the vial 210 exceeds the cracking pressure of the check valve 966, the check valve 966 opens, thereby permitting ambient air to enter the vial 210 (via the adaptor 900), thus substantially maintaining equilibrium therein. Accordingly, the check valve 966 can facilitate the withdrawal of fluid from the vial 210 even when the bag 954 is fully deflated.

Figure 22:
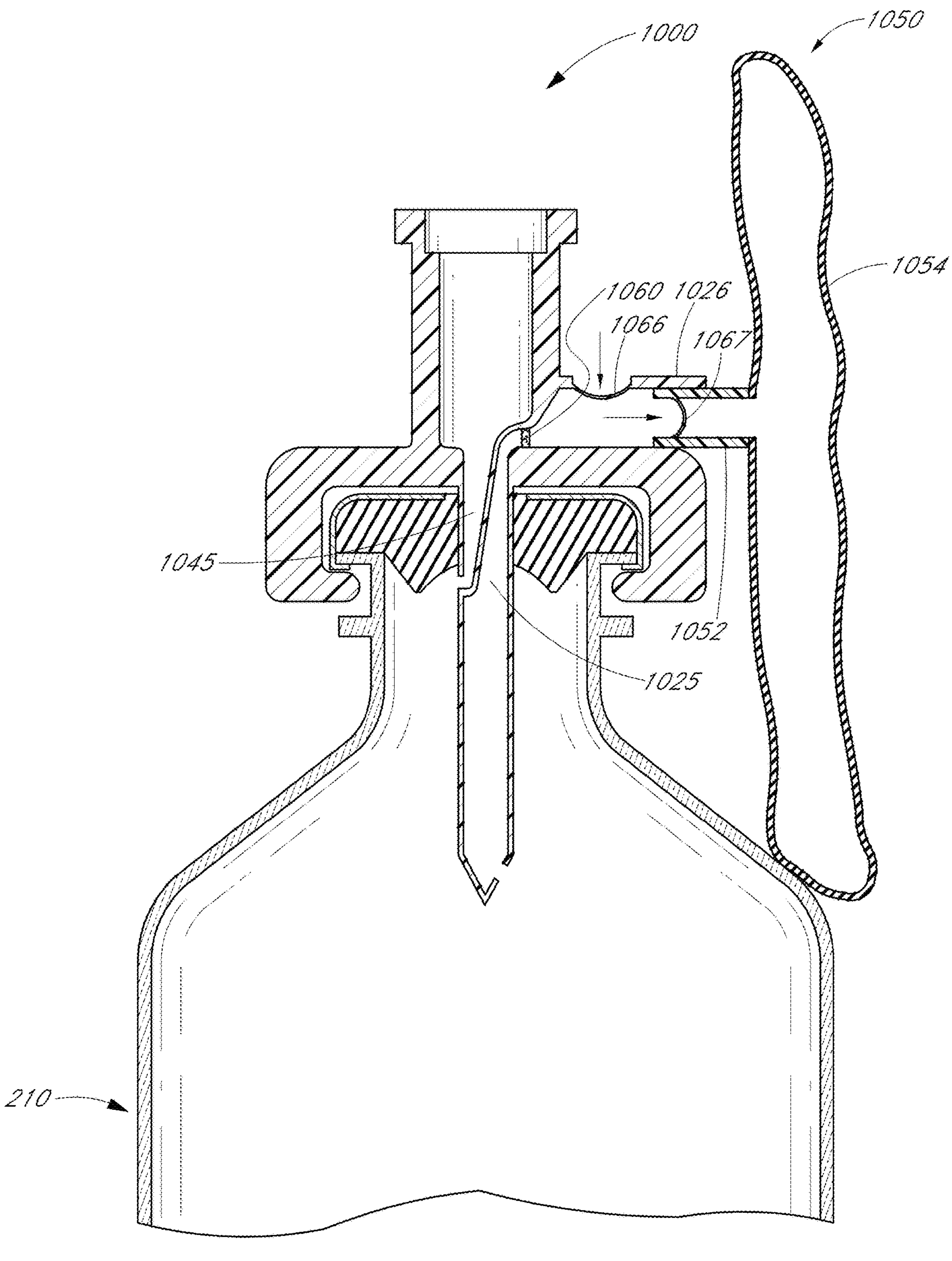
FIG. 22 illustrates a partial cross-sectional view of a vial adaptor coupled with a vial, the adaptor including a plurality of check valves.

FIG. 22 illustrates an embodiment of an adaptor 1000 that can have components or portions that are the same as or similar to the components or portions of other vial adaptors disclosed herein. The adaptor 1000 comprises a first check valve 1066 and a second check valve 1067. Similar to the check valve 966 discussed above in connection with the adaptor 900, the first check valve 1066 can allow ambient air to compensate for a regulating fluid deficiency. Thus, in the case that a regulator assembly 1050 is fully deflated, the first check valve 1066 can facilitate maintaining equilibrium in the vial 210. In some cases, the first check valve 1066 is positioned in a lumen 1026. In other cases, the first check valve 1066 is located in a coupling 1052.

As shown, in some arrangements, the second check valve 1067 is positioned to permit regulating fluid to enter the regulator assembly 1050 and to block such fluid from exiting the regulator assembly 1050. Such a configuration can provide a trap for aerosolized or gaseous components of the contents of the vial 210. In some cases, when fluid is introduced into the vial 210 through an access channel 1045, regulating fluid flows from the vial 210, through a regulator channel 1025 and a filter 1060, through the second check valve 1067 and into the regulator assembly 1050. As the second check valve 1067 inhibits or prevents such regulating fluid from exiting the regulator assembly 1050, to the extent that the regulator fluid includes noxious components, such components are substantially trapped in the regulator assembly 1050 and can be disposed-of. In the illustrated embodiment, in the case in which fluid is withdrawn from the vial 210 through the access channel 1045, because the second check valve 1067 substantially blocks regulating fluid from flowing out of the bag 1054, the first check valve 1066 opens to supply regulating fluid (e.g., ambient air) to the vial 210 in order maintain equilibrium therein.

In some embodiments, as in the embodiment shown, the adaptor 1000 includes the first and the second check valve, 1066, 1067. Some other instances include only the first check valve 1066. Certain other instances include only the second check valve 1066.

As illustrated, in certain configurations, a bag 1054 of the regulator assembly 1050 contacts the vial 210. This can, for example, allow for a wider array of geometries of the bag 1054. In some cases, in the fully expanded state, the bag 1054 contacts vial 210. In other configurations, the bag 1054 remains spaced apart from the vial 210. This can, for example, decrease stress on the bag 1054 and reduce the likelihood that the structural integrity of the bag 1054 will be compromised, e.g., by a burr or label on the vial 210 piercing the bag 1054.

Figure 23:
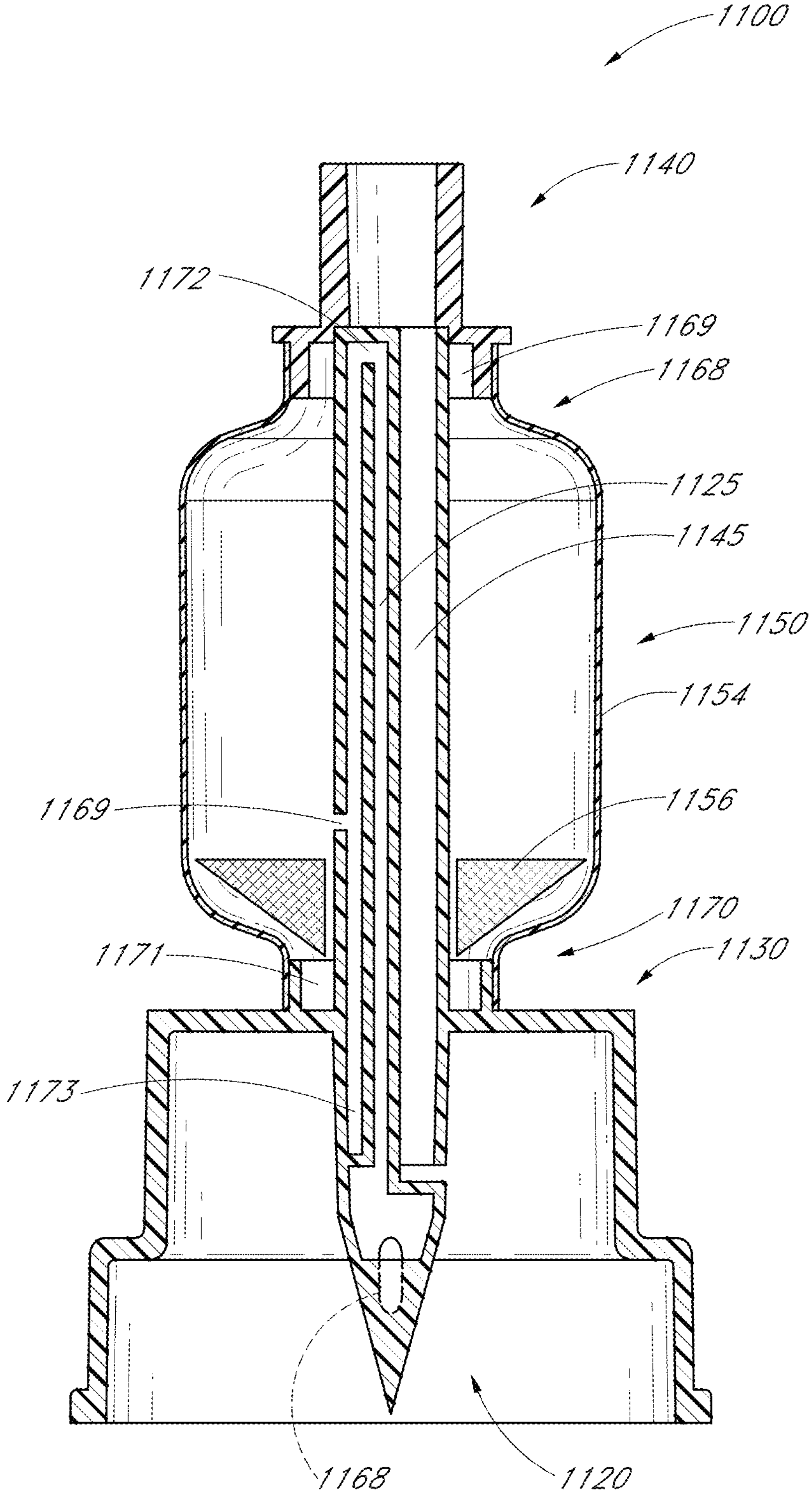
FIG. 23 illustrates a partial cross-sectional view of a substantially axially centered vial adaptor.

FIG. 23 illustrates another embodiment of an adaptor 1100. The adaptor 1100 can have components or portions that are the same as or similar to the components or portions of other vial adaptors disclosed herein. In the illustrated embodiment, the adaptor 1100 comprises a piercing member 1120, a cap connector 1130, a connector interface 1140, and a regulator assembly 1150. In some configurations, the piercing member 1120 includes a first regulator aperture 1168, which is in fluid communication with a regulator channel 1125, which in turn is in fluid communication with a second regulator aperture 1169.

In the illustrated embodiment, the regulator assembly 1150 includes a bag 1154 and a filler 1156. However, in certain implementations, the regulator assembly 1150 does not include the filler 1156. The filler 1156 is shown as annular and having a triangular cross-section, but can have various other configurations. In some embodiments, the bag 1154 is annular. In some embodiments, the bag 1154 has a proximal end 1168 with a proximal aperture 1169 and a distal end 1170 with a distal aperture 1171. In some arrangements, the distal end 1170 connects with the cap connector 1130 in substantially airtight engagement and the proximal end 1168 connects with the connector interface 1140 in substantially airtight engagement. As shown, the regulator channel 1125 and an extraction channel 1145 can extend through some or the entire axial length of the bag 1154. Also as shown, the interior of the bag 1154 can be in fluid communication with the regulator channel 1125 via the second regulator aperture 1169. The bag 1154 can include a regulating fluid, such as a sterilized gas.

In some arrangements, the regulator channel 1125 includes a portion that is substantially tortuous (e.g., winding, bending, undulating, or the like). Such a configuration can, for example, inhibit or prevent liquid in the vial 210 from flowing into the bag 1154 without the use of a liquid-rejecting filter. In some embodiments, such as in the embodiment illustrated, the regulator channel 1125 includes a hairpin turn 1172, which causes fluid flowing in the regulator channel 1125 to reverse direction (e.g., from the proximal direction to the distal direction). In some configurations, the regulator channel 1125 is substantially sinusoidally shaped. In certain embodiments, the regulator channel 1125 extends distally beyond the second regulator aperture 1169, thereby providing a catch-basin 1173 for liquid flowing through the tortuous portion of the regulator channel 1125.

In the illustrated embodiment, the bag 1154 is substantially centered with respect to the axial center of the adaptor 1100. Such a configuration can, for example, promote stability of the adaptor 1100 and reduce the chance of tipping when the adaptor 1100 is coupled with a vial (not shown). In certain arrangements, such a configuration can reduce the radial size of the adaptor 1100. In some embodiments, in the fully deflated state, the bag 1154 is axially taller than diametrically wide. In some embodiments, the bag 1154 is axially taller than diametrically wide in the fully expanded state. In some embodiments, in the fully expanded state, the bag 1154 does not extend radially outward beyond the radially widest point of the cap connector 1130, which can provide a more compact adaptor 1100. In other embodiments, in some states (such as the fully expanded state), the bag 1154 comprises the radially widest portion of the adaptor 1100. In such embodiments, should the adaptor 1100 tip-over, the bag 1154 will generally be the first portion of the adaptor 1100 to contact another surface (e.g., a table top). In some such embodiments, the bag 1154 acts as a pillow, cushion, damper, or shock-absorber to reduce the likelihood of damage to the adaptor 1100 or the vial.

In various embodiments, the regulator assembly 1150 is positioned in a rigid housing (not shown), which can support, provide structure for, and/or protect the regulator assembly 1150. For example, the rigid housing can inhibit or prevent the regulator assembly 1150 from being punctured or otherwise damaged. Certain variants of the rigid housing have an internal space in which some of the regulator assembly 1150 is located. In some implementations, the regulator assembly 1150 is located entirely within the internal space. In certain embodiments, a portion of the internal space is in fluid communication with the ambient environment, such as via an opening in the rigid housing. Some embodiments of the rigid housing extend between the cap connector 1130 and the connector interface 1140.

As noted above, the bag 1154 of the regulator assembly 1150 can include a regulating fluid. Some embodiments of the bag 1154 include the regulating fluid prior to coupling of the adaptor 1100 and the vial 210. In certain implementations, the regulator assembly 1150 has a sufficient volume of regulating fluid upon (e.g., immediately thereafter) coupling of the adaptor 1100 and the vial 210. Some embodiments of the regulator assembly 1150 have a sufficient volume of regulating fluid to offset an amount of medicinal fluid that is withdrawn from the vial 210. For example, the bag 1154 can contain about 5 mL of regulating fluid to offset the withdrawal of about 5 mL of medicinal fluid from the vial 210. In certain embodiments, at the time of that the adaptor 1100 is coupled with the vial 210, the regulator assembly 1150 includes a volume of regulating fluid that is greater than or equal to the volume of medicinal fluid in the vial 210. In certain implementations, the bag 1154 contracts within the rigid enclosure as the regulating fluid exits of the bag 1154.

In some embodiments, the bag 1154 can expand within the rigid housing. For example, when an amount of diluent fluid (e.g., saline) is introduced into the vial 210, the bag 1154 can expand within the rigid housing to accept a corresponding amount of regulating fluid from the vial 210. In certain implementations, the bag 1154 expands completely within the rigid housing. In some variants, a portion of the bag 1154 expands out of the rigid housing, such that some of the bag is not in the internal space of the rigid housing.

Certain implementations of the bag 1154 expand and contract between a maximum size and minimum size based on the volume of the regulating fluid contained in the bag 1154. For example, in certain variants of the regulator assembly 1150, the maximum size of the bag 1154 is sufficient to contain a volume that is greater than or equal to the volume of the vial 210. In some embodiments, at the maximum size, the bag 1154 has a volume that is at least about: 25%, 50%, 75%, 99%, 200%, 300%, values in between, or otherwise, of the volume of the vial 210. In some embodiments, the rigid housing is configured to partly contain the bag 1154 when the bag 1154 is at the maximum size. Certain variants of the rigid housing are configured to completely contain the bag 1154 when the bag 1154 is at the maximum size. In certain embodiments, the bag 1154 contains substantially no regulating fluid in the minimum size. In some embodiments, at the minimum size, the bag 1154 has a volume that is at least about: 0.1%, 1%, 5%, 10%, 25%, values in between, or otherwise, of the volume of the vial 210.

Figure 24:
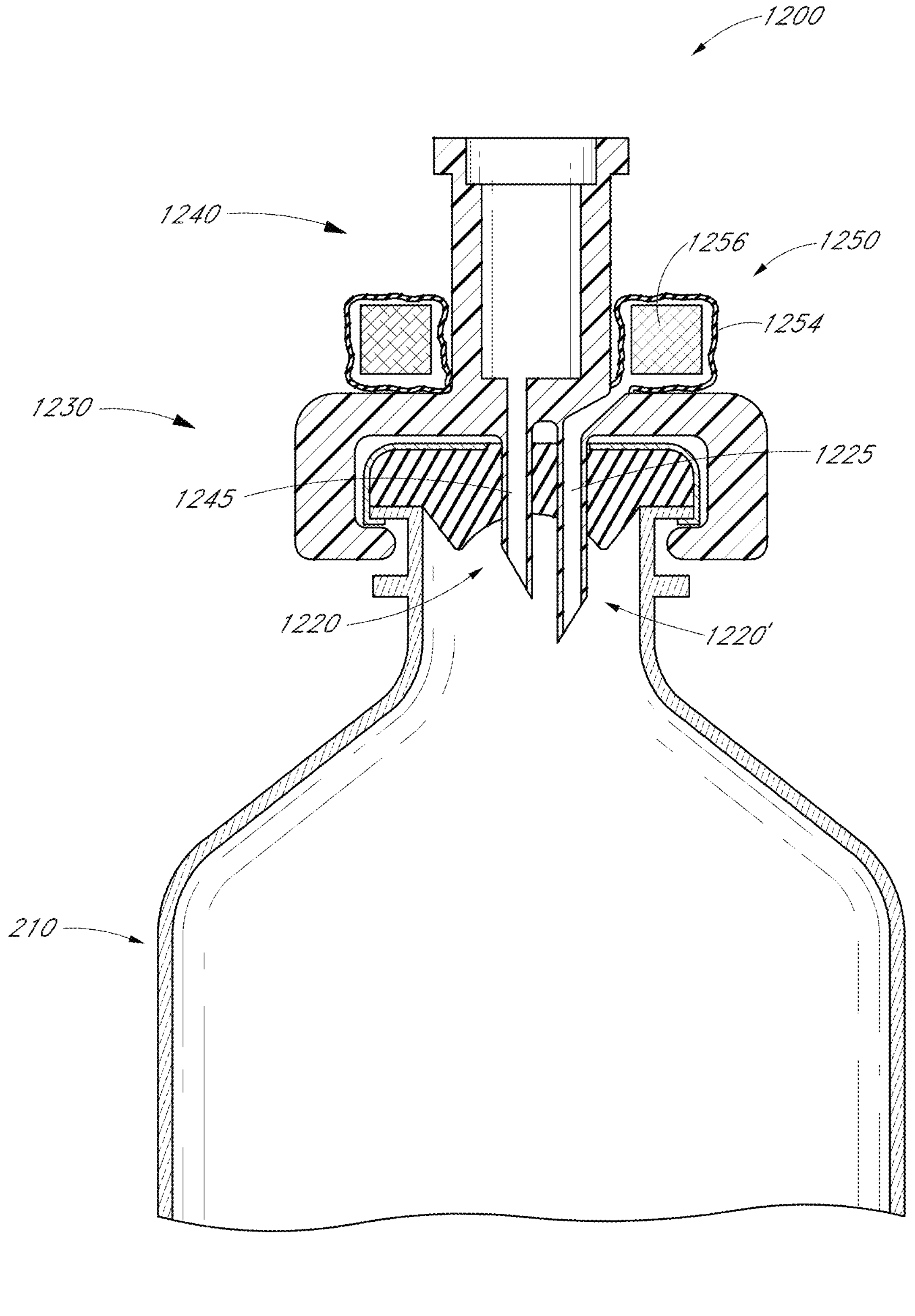
FIG. 24 illustrates a partial cross-sectional view of a vial adaptor coupled with a vial, the adaptor including an annular bag.

FIG. 24 illustrates a further embodiment of an adaptor 1200. The adaptor 1200 can have components or portions that are the same as or similar to the components or portions of other vial adaptors disclosed herein. In the illustrated embodiment, the adaptor 1200 comprises a first piercing member 1220, a second piercing member 1220', a cap connector 1230, a connector interface 1240, and a regulator assembly 1250. In some embodiments, the first piercing member 1220 includes an access channel 1245. In certain embodiments, the second piercing member 1220' includes a regulator channel 1225. In some arrangements, the regulator channel 1225 extends through the cap connector 1230 at an angle (e.g., at least about 45°) with respect to the axial centerline of the adaptor 1200. In various embodiments, the first and second piercing members 1220, 1220' each pierce the septum of the vial 210 when the adaptor 1200 is coupled with the vial 210. In certain embodiments, a distal end of one or both of the first and second piercing members 1220, 1220' is angled from one side of to the opposite side.

As illustrated, the regulator assembly 1250 can include a filler 1256 and a bag 1254 in fluid communication with the regulator channel 1225. As shown, the bag 1254 can be annular, which can facilitate the adaptor 1200 having a center of mass that is about on the axial centerline of the adaptor 1200, and thus provides enhanced stability.

Figure 25A:
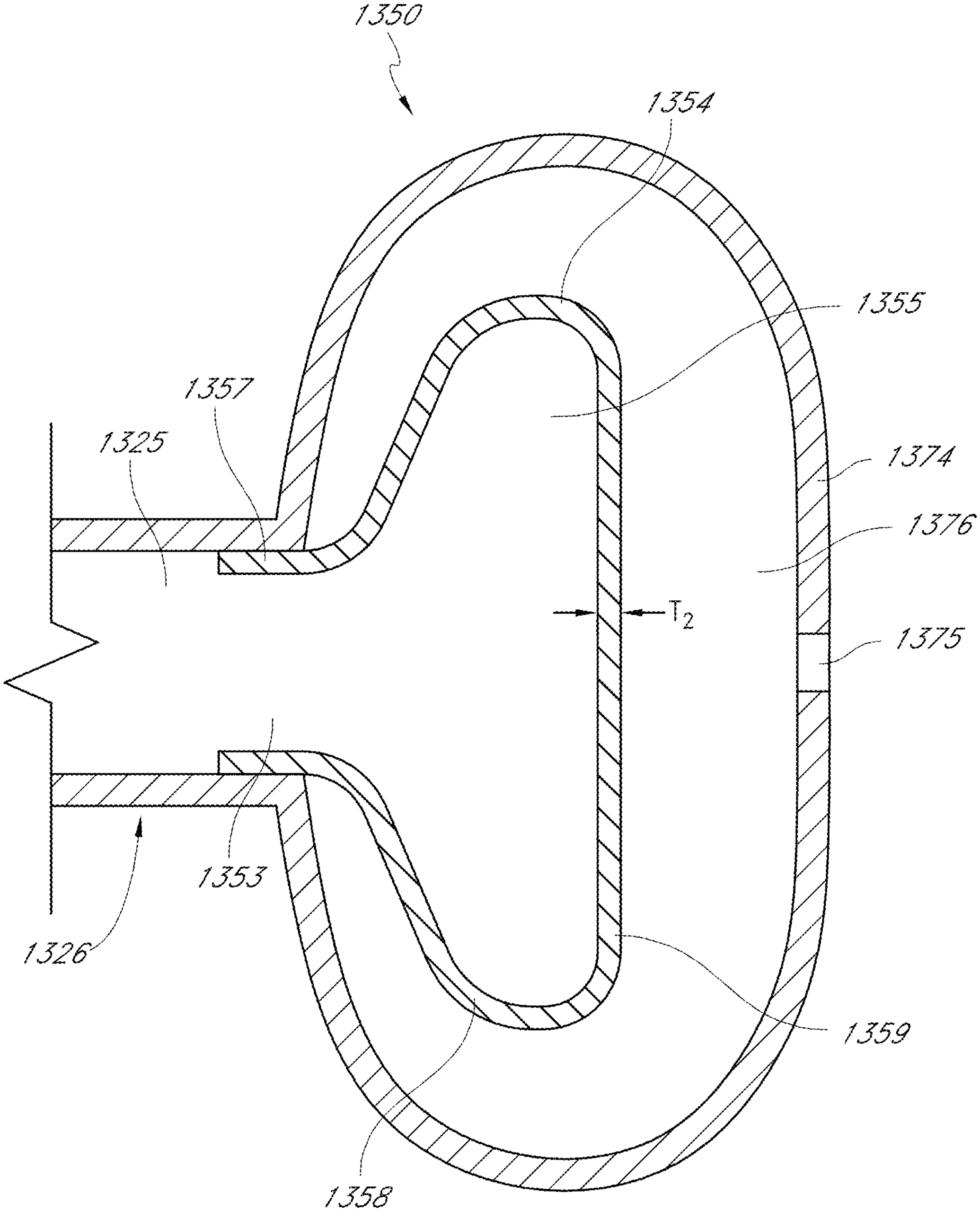
FIG. 25A illustrates a partial cross-sectional view of a reservoir, the reservoir including a bag and a rigid enclosure.

FIG. 25A illustrates an embodiment of a reservoir 1350 which can be attached to a lumen 1326 of a vial adaptor. As illustrated, a bag 1354 includes an interior chamber 1355. The bag 1354 is generally configured to stretch, flex, unfold, or otherwise expand and contract or cause a change in interior volume within an inner chamber 1355. In some cases, the bag 1354 includes one or more folds, pleats, or the like. In certain embodiments, the bag 1354 connects with a lumen 1326 of the vial adaptor, such as with an adhesive, pipe clamp, snap ring or otherwise. In certain arrangements, the interior chamber 1355 of the bag 1354 is in fluid communication with a regulator channel 1325, thereby allowing fluid to pass from the regulator channel 1325 into the interior chamber 1355 and/or from the interior chamber 1355 into the regulator channel 1325. Furthermore, in some embodiments, the bag 1354 includes an interior filler. The filler can be constructed to inhibit the bag 1354 from fully deflating at ambient pressure. In some embodiments, the filler can occupy a portion of or substantially the entire interior volume of the inner chamber 1355.

According to some embodiments, at least a majority, or the entirety or nearly the entirety, of the bag 1354 is contained within a rigid enclosure 1374. As illustrated, the bag 1354 is virtually entirely surrounded by the rigid enclosure 1374. In some configurations, the rigid enclosure 1374 has substantially the same shape as the bag 1354. In some embodiments, the rigid enclosure 1374 includes one or more vents 1375. As illustrated, the vents 1375 can be smaller than the outer diameter of the lumen 1326. In the illustrated embodiment, the rigid enclosure 1374 and lumen 1326 are a unitary part. In some embodiments, the rigid enclosure 1374 can be fixedly or removably attached to the lumen 1326.

In some embodiments, the reservoir 1350 includes an intermediate chamber 1376 defined by the space between the outer surface of the bag 1354 and the inner surface of the rigid enclosure 1374. According to some configurations, the intermediate chamber 1376 is in fluid or non-fluid communication with the ambient surroundings of the reservoir 1350. In some embodiments, the connection between the bag aperture 1357 and the lumen 1326 creates a hermetic seal which can prevent fluid communication between the regulator channel 1325 and the intermediate chamber 1376.

In some embodiments, the bag 1354 can be configured to expand when regulator fluid moves from the regulator channel 1325 to the interior volume 1355 of the bag 1354 in response to injection of fluid into a container 10 via an exchange device 40. In some configurations, the expansion of the bag 1354 is limited by the size of the rigid enclosure 1374. In some embodiments, the bag 1354 is configured to contract when regulator fluid is moved from the interior volume 1355 of the bag 1354 to the regulator channel 1325 in response to withdrawal of fluid from a container 10 via an exchange device 40. In some embodiments, the expansion and contraction of the bag 1354 can help maintain substantially constant pressure within the container 10. In some embodiments, the one or more vents 1375 in the rigid enclosure 1374 can help inhibit pressure increase and decrease within the intermediate enclosure 1376 when the bag 1354 expands and contracts.

In certain embodiments, the bag 1354 has a generally constant wall thickness T2. In some embodiments, the wall thickness T2 of the bag 1354 varies from a first side 1358 to a second side 1359 of the bag. In some embodiments, variable thickness of the bag 1354 can cause the bag 1354 to expand in one or more controlled directions. For example, thinner walls on the first side 1358 as compared to the second side 1359 can cause the first side 1358 to expand at a higher rate than the second side 1359. This variable rate of expansion can facilitate, upon expansion of the bag 1354, translation of the second side 1359 of the bag 1354 away from the bag aperture 1357.

Figure 25B:
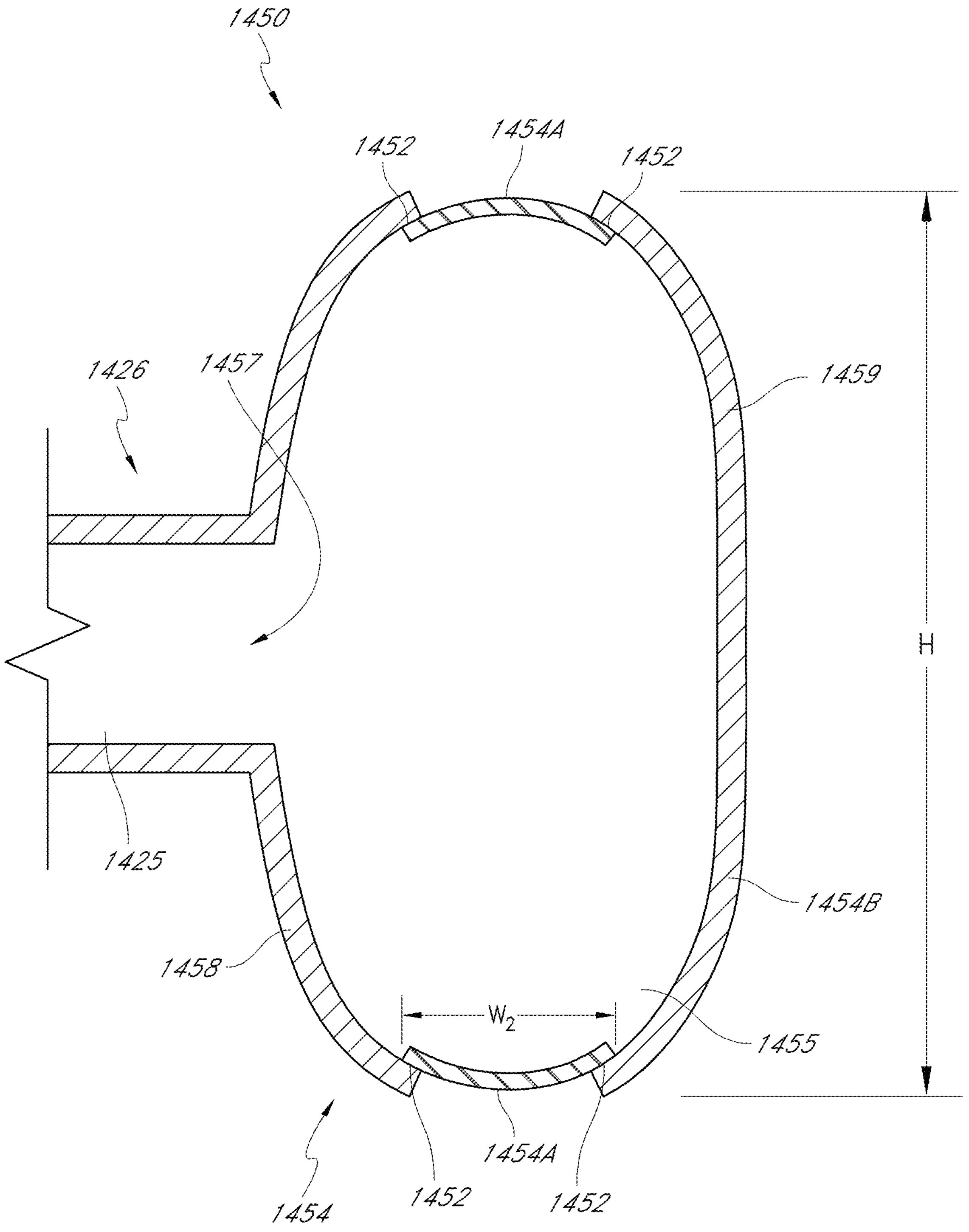
FIG. 25B illustrates a partial cross-sectional view of another reservoir, the reservoir including a partially-rigid enclosure with a flexible annular ring.

FIG. 25B illustrates an embodiment of a reservoir 1450 which can be attached to a lumen 1426 of a vial adaptor. As illustrated, the reservoir 1450 can include an enclosure 1454. In some embodiments, an enclosure includes a first side 1458 and a second side 1450 connected to each other via an annular ring 1454A. The annular ring 1454A can be constructed of a flexible material which can, for example, be crumpled, folded and/or stretched. The first side 1458 and second side 1459 of the enclosure 1454 can be constructed of a rigid or semi-rigid material. The enclosure 1454 can include an interior chamber 1455.

In some embodiments, the interior chamber 1455 is in fluid or non-fluid communication with a regulator channel 1425. In such embodiments, fluid can be permitted to pass between the regulator channel 1425 and the interior chamber 1455 via an aperture 1457 in the enclosure 1454. Furthermore, in some embodiments, the enclosure 1454 includes an interior filler. The filler can be constructed to inhibit the enclosure 1454 from fully collapsing at ambient pressure. In some embodiments, the filler occupies a portion of or substantially the entire interior volume of the inner chamber 1455.

According to some embodiments, the annular ring 1454A of the enclosure is configured to stretch, unfold, uncrumple and/or deform in some other manner so as to increase the volume within the inner chamber 1455 in response to injection of fluid into a container 10 via an exchange device 40. In some embodiments, the annular ring 1454A is configured to crumple, fold, compress and/or deform in some other manner as to decrease the volume within the inner chamber 1455 in response to a withdrawal of fluid from the container 10 via an exchange device 40. According to some embodiments, the expansion and contraction of the enclosure 1454 can help maintain substantially constant pressure within the container 10 and inner chamber 1455.

In some embodiments, as illustrated, the first side 1458 of the enclosure 1454 is a unitary part with the lumen 1426. In some embodiments, the first side 1458 of the enclosure 1454 can be fixedly or removably attached to the lumen 1426. The first side 1458 of the enclosure 1454 can be attached to the lumen 1426 in a hermetically sealed fashion, thus inhibiting the escape of fluid from the connection point between the first side 1458 and the lumen 1426. According to some embodiments, the annular ring 1454A of the enclosure 1454 is attached to the first and second sides 1458, 1459 of the enclosure 1454 at connection points 1452 via an adhesive or some other means which can provide a hermetic seal between the inner chamber 1455 and the surrounding ambient. In some configurations, the width W2 of the annular ring 1454A and the height H of the enclosure 1454 can vary depending on the desired volume displacement in the inner chamber 1455 when the enclosure 1454 expands and/or contracts.

Figure 25C:
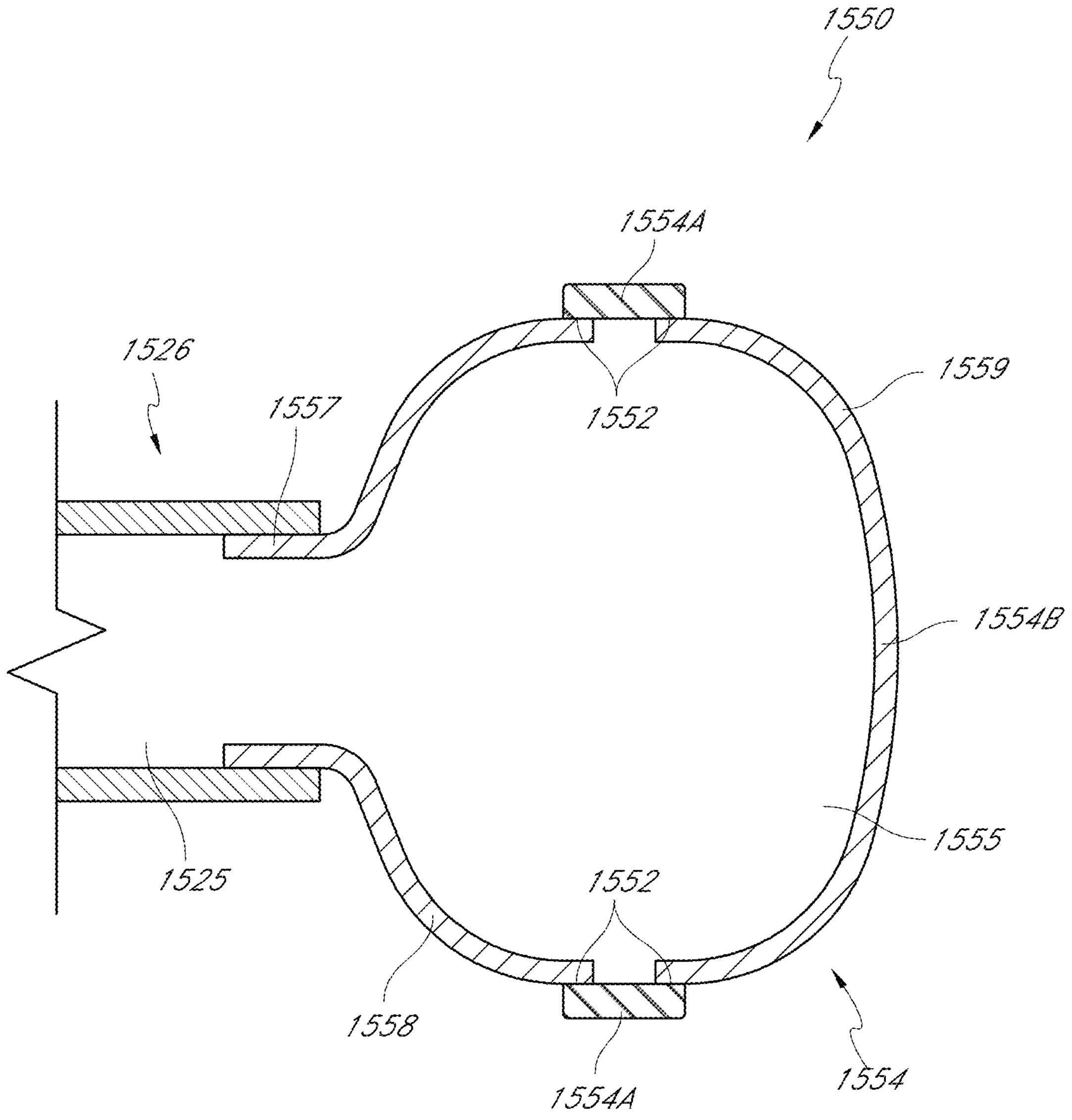
FIG. 25C illustrates a partial cross-sectional view of another reservoir, the reservoir including a partially-rigid enclosure with a rigid annular ring.

FIG. 25C illustrates an embodiment of a reservoir 1550 which can be attached to a lumen 1526 of a vial adaptor. As illustrated, the reservoir 1550 includes an enclosure 1554. In some embodiments, the enclosure 1554 includes a first side 1558 and a second side 1559. According to some configurations, the first side 1558 and/or second side 1559 of the enclosure 1554 are constructed of a flexible material which can, for example, be crumpled, folded, stretched and/or otherwise deformed. In some embodiments, the first and second sides 1558, 1559 of the enclosure 1554 are attached to each other via an annular ring 1554A. In some embodiments, the annular ring 1554A is constructed of a rigid or semi-rigid material. Furthermore, the enclosure 1554 can include an inner chamber 1555.

In some embodiments, the first side 1558 of the enclosure 1554 connects with a lumen 1526 of the vial adaptor, such as with an adhesive, pipe clamp, snap ring or otherwise. In certain arrangements, the inner chamber 1555 of the enclosure 1554 is in fluid or non-fluid communication with a regulator channel 1525, thereby allowing fluid to pass between the regulator channel 1525 and the inner chamber 1555. In some embodiments, the enclosure 1554 includes an interior filler. The filler can be constructed to inhibit the enclosure 1554 from fully collapsing at ambient pressure. In some embodiments, the filler occupies a portion of or substantially the entire interior volume of the inner chamber 1555.

According to some embodiments, the annular ring 1554A of the enclosure 1554 is attached to the first and second sides 1558, 1559 of the enclosure 1554 at connection points 1552 via an adhesive or some other means which can provide a hermetic seal between the inner chamber 1555 and the surrounding ambient. In some arrangements, the first and second sides 1558, 1559 of the inner chamber 1555 are configured to stretch, unfold, uncrumple and/or deform in some other manner, so as to increase the volume within the inner chamber 1555 in response to an injection of fluid into a container 10 via an exchange device 40. In some embodiments, the first and second sides 1558, 1559 of the inner chamber 1555 are configured to crumple, fold, compress and/or deform in some other manner, so as to decrease the volume within the inner chamber 1555 in response to withdrawal of fluid from the container 10 via an exchange device 40. According to some embodiments, the expansion and contraction of the enclosure 1554 can help maintain substantially constant pressure within the container 10.

Figure 25D:
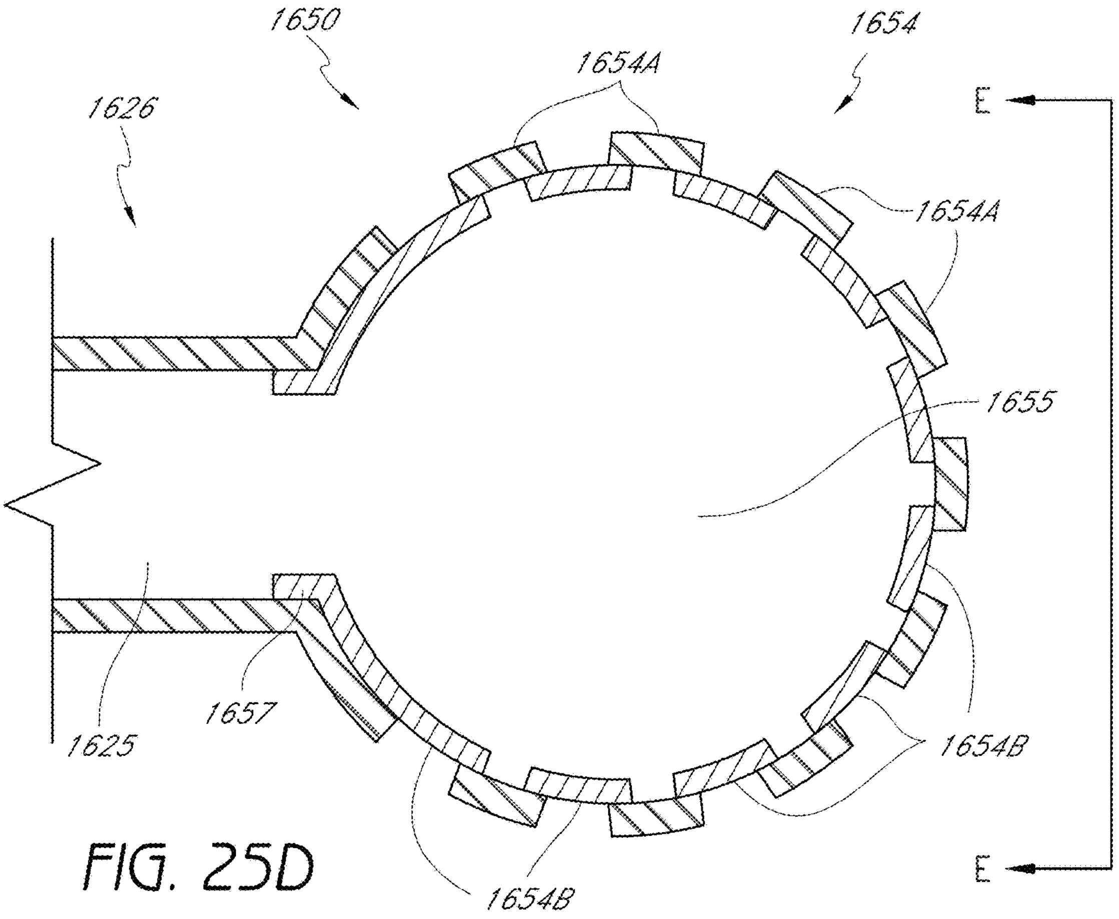
FIG. 25D illustrates a partial cross-sectional view of another reservoir, the reservoir including a series of rigid and flexible rings.
Figure 25E:
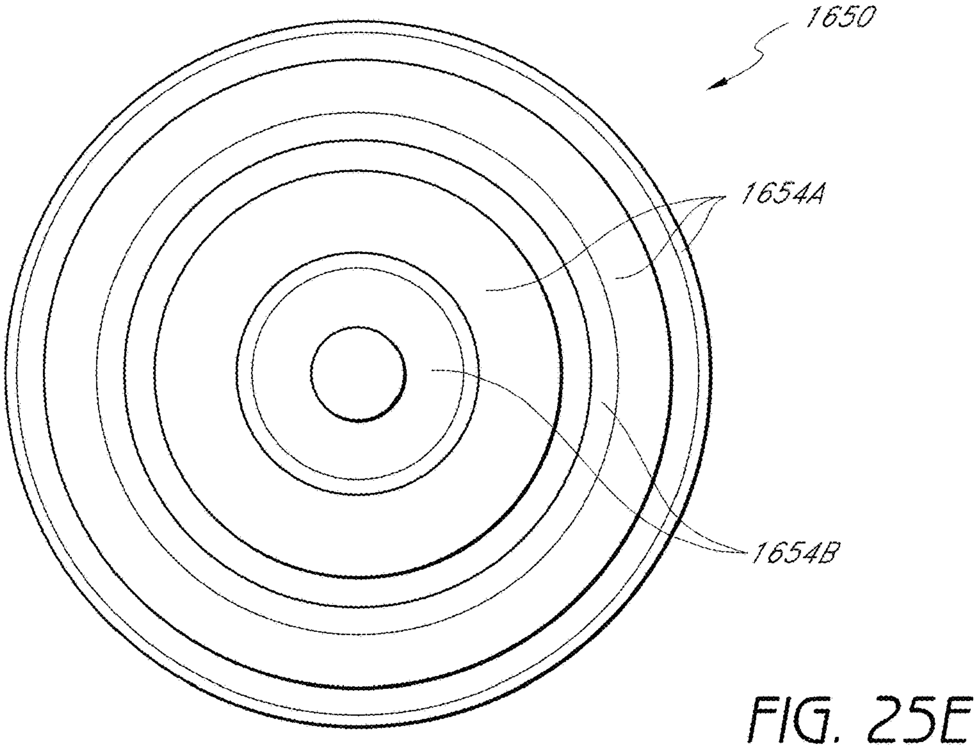
FIG. 25E shows a side view of the reservoir shown in FIG. 25D.

FIGS. 25D-25E illustrate an embodiment of a reservoir 1650 which can be attached to a lumen 1626 of a vial adaptor. In certain embodiments, the reservoir 1650 includes an enclosure 1654. The enclosure 1654 can also include an inner chamber 1655. In some configurations, the enclosure 1654 includes a plurality of openings, such as are formed by a series of generally concentric rings 1654A, 1654B, as illustrated. In some embodiments, the enclosure 1654 includes an aperture 1657 which can connect with the lumen 1626 of the vial adaptor, such as with an adhesive, pipe clamp, snap ring or otherwise. In certain arrangements, the inner chamber 1655 of the enclosure 1654 is in fluid or non-fluid communication with a regulator channel 1625, thereby allowing fluid to pass between the regulator channel 1625 and the inner chamber 1655.

In some embodiments, the region between the openings (e.g., the concentric rings 1654A) is constructed of a rigid or semi-rigid material. Furthermore, in some embodiments, the rings 1654B are constructed of a flexible material. According to some embodiments, the rings 1654A are attached to the adjacent rings 1654B via an adhesive or some other means which can provide a hermetic seal between the inner chamber 1655 and the surrounding ambient. In some configurations, the enclosure 1554 includes an interior filler. The filler can be constructed to inhibit the enclosure 1654 from fully collapsing at ambient pressure. In some embodiments, the filler occupies a portion of or substantially the entire interior volume of the inner chamber 1655.

According to some configurations, the rings 1654B are configured to stretch, unfold, uncrumple and/or deform in some other manner, so as to increase the volume within the inner chamber 1655 in response to an injection of fluid into a container 10 via an exchange device 40. In some embodiments, the rings 1654B of the inner chamber 1655 are configured to crumple, fold, compress and/or deform in some other manner as to decrease the volume within the inner chamber 1655 in response to withdrawal of fluid from the container 10 via an exchange device 40. According to some embodiments, the expansion and contraction of the enclosure 1654 can help maintain substantially constant pressure within the container 10.

Figure 26A:
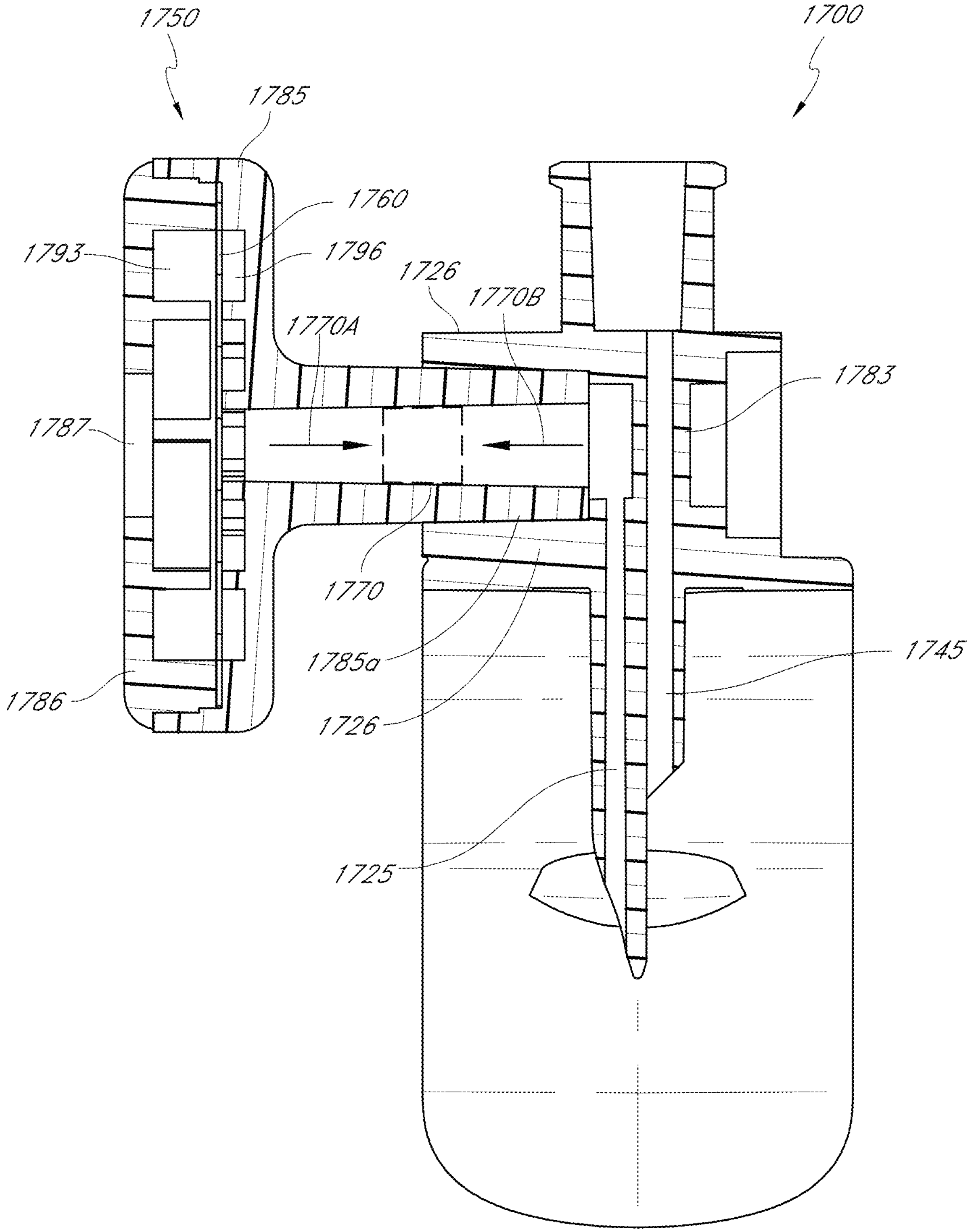
FIG. 26A illustrates a cross-sectional view of a vial adaptor.

FIG. 26A illustrates an embodiment of an adaptor 1700 that can have components or portions that are the same as or similar to the components or portions of other vial adaptors disclosed herein, and also includes a valve 1770. The adaptor 1700 is configured to engage with a vial 10. In some embodiments, the adaptor 1700 includes a regulator assembly 1750. In some configurations, the regulator assembly 1750 includes a protrusion 1785*a* which can be substantially sealingly attached to (e.g., received within or around the outer perimeter of) a lumen 1726 of the regulator assembly 1750. The protrusion 2085*a* can facilitate fluid communication between two or more features (e.g., a filter, enclosure, bag and/or valve) of the regulator assembly. In some embodiments, the protrusion 2085*a* can generally define a regulator path. The regulator path can be in fluid communication with the regulator channel a regulator channel 1725 of the regulator assembly 1750. The longitudinal axis of the protrusion 1785*a* and/or the lumen 1726 can be at least partially, substantially, or wholly perpendicular to the axial centerline of the adaptor 1700. In some embodiments, the longitudinal axis of the protrusion 1785*a* and/or the lumen 1726 is at least partially, substantially, or wholly parallel to the axial centerline of the adaptor 1700. In some embodiments, the angle between the longitudinal axis of the protrusion 1785 and the axial centerline of the adaptor 1700 is greater than or equal to about 5° and/or less than or equal to about 85°. In some embodiments, the angle is about 60°. In certain embodiments, the angle between the longitudinal axis of the protrusion 1785 and the axial centerline of the adaptor 1700 can be any angle between 0° and 90° or a variable angle that is selected by the user. Many variations are possible.

In some embodiments, the regulatory assembly includes a filter 1760. The filter 1760 can include a hydrophobic filter. In some embodiments, the valve 1770 or a portion thereof is located within a lumen 1726 of the adaptor 1700. In some embodiments, the valve 1770 or a portion thereof is located outside the lumen 1726 of the adaptor 1700 within the protrusion 1785*a* of the regulator assembly 1750.

According to some embodiments, the valve 1770 is configured to permit air or other fluid that has passed through the filter 1760 to pass into the container 10. In some embodiments, the valve 1770 is configured to selectively inhibit fluid from passing through the valve 1770 from the container 10 to the filter 1760.

In some configurations, the valve 1770 is selectively opened and/or closed depending on the orientation of the adaptor 1700. For example, the valve 1770 can be configured to allow fluid flow between the container 10 and the filter 1760 without restriction when the adaptor 1700 is positioned above (e.g., further from the floor than) a vial 10 to which the adaptor is attached. In some embodiments, the valve 1770 can be configured to prevent fluid flow from the container 10 to the filter 1760 when the vial 10 is positioned above the adaptor 1700.

In some embodiments, the valve 1770 can open and/or close in response to the effect of gravity upon the valve 1770. For example, the valve 1770 can include components that move in response to gravity to open and/or close channels within the valve 1770. In some embodiments, channels within the valve 1770 can be constructed such that the effect of gravity upon fluid within the adaptor 1700 can prevent or allow the fluid to pass through the channels within the valve 1770.

For example, the valve 1770 can comprise an orientation-sensitive or orientation-dependent roll-over valve. In some embodiments, a roll-over valve 1770 can comprise a weighted sealing member. In some embodiments, the weighted sealing member can be biased to seal and/or close the valve 1770 when the vial 10 is positioned above the adaptor 1700. In some embodiments, the sealing member can be biased to seal the valve 1770 by the force of gravity. In some embodiments, the sealing member can be biased to seal the valve 1770 through the use of a compression spring. The sealing member can be constructed such that it can transition to open the valve 1770 when the adaptor 1700 is positioned above the vial 10. For example, the weight of the sealing member can be high enough that it overcomes the force of the compression spring and moves to an open position when the adaptor 1700 is positioned above the vial 10.

In some embodiments, the valve 1770 can comprise a swing check valve. In some embodiments, the valve 1770 can comprise a weighted panel rotatably connected to the wall of the regulator channel 1925. The weighted panel can be oriented such that, when the adaptor 1700 is positioned above the vial 10, the weighted panel is rotated to an open position wherein the weighted panel does not inhibit the flow of fluid through the regulator channel 1925. In some embodiments, the weighted panel can be configured to rotate to a closed position wherein the weighted panel inhibits the flow of fluid through the regulator channel 1925 when the vial 10 is positioned above the adaptor 1700.

According to some configurations, the valve 1770 can be a check valve which can transition between two or more configurations (e.g., an open and closed configuration). In some embodiments, the valve 1770 can change configurations based on user input. For example, the valve 1770 and/or regulator assembly 1750 can include a user interface (e.g., a button, slider, knob, capacitive surface, switch, toggle, keypad, etc.) which the user can manipulate. The user interface can communicate (e.g., mechanically, electronically, and/or electromechanically) with the valve 1770 to move the valve 1770 between an opened configuration and a closed configuration. In some embodiments, the adaptor 1700 and/or regulator assembly 1750 can include a visual indicator to show whether the valve 1770 is in an open or closed configuration.

According to some embodiments, the valve 1770 is configured to act as a two-way valve. In such configurations, the valve 1770 can allow for the passage of fluid through the valve 1770 in a first direction 1770A at one pressure differential while allowing for the passage of fluid in a second direction 1770B at a different pressure differential. For example, the pressure differential required for fluid to pass in a first direction 1770A through the filter 1770 can be substantially higher than the pressure differential required for fluid to pass through the filter 1770 in a second direction 1770B.

Figure 26B:
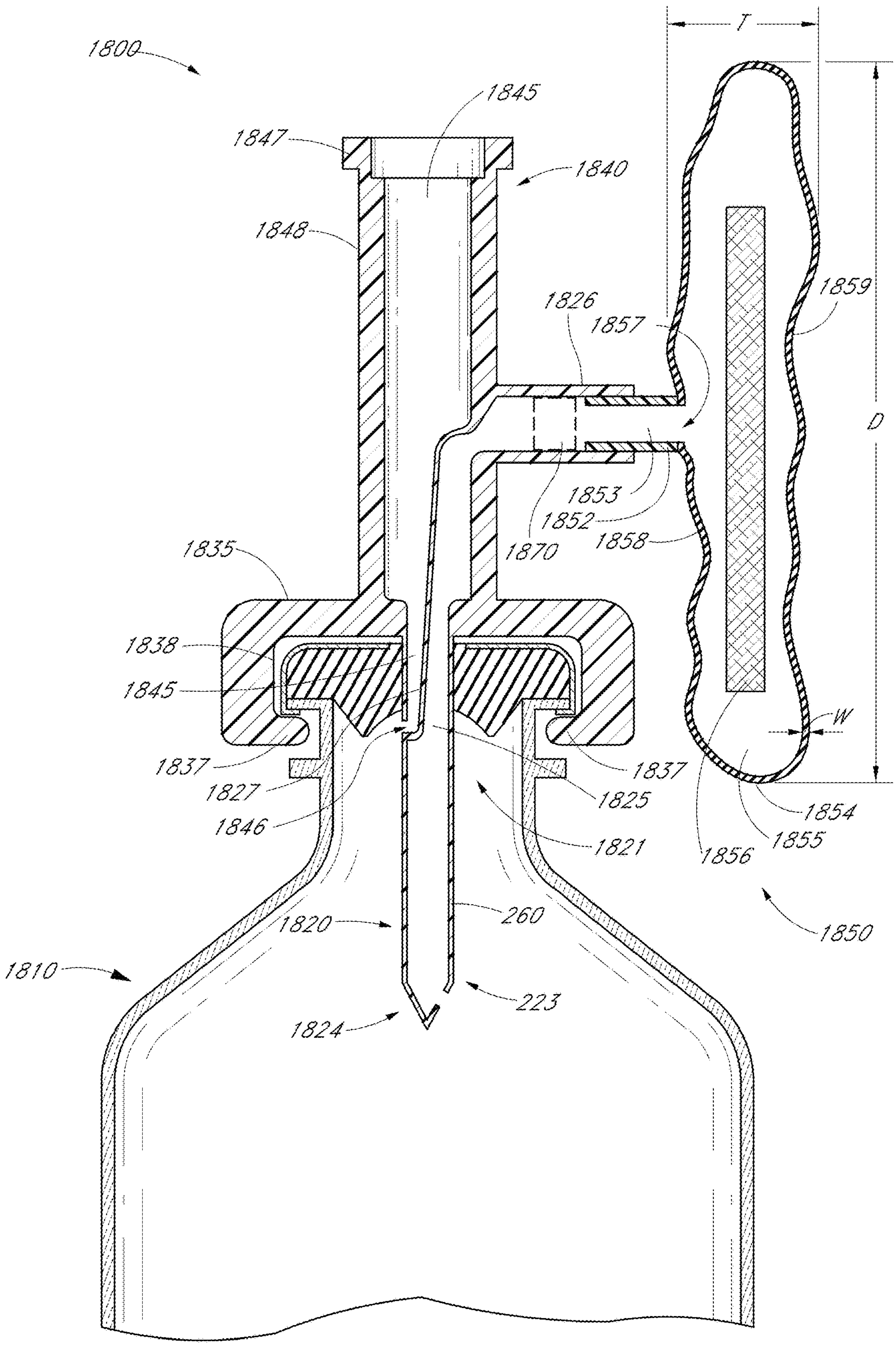
FIG. 26B illustrates a partial cross-sectional view of a vial adaptor coupled with a vial, the vial adaptor including a valve.

FIG. 26B illustrates an embodiment of an adaptor 1800 that can have components or portions that are the same as or similar to the components or portions of other vial adaptors disclosed herein. The adaptor 1800 includes a regulator assembly 1850 which, in some embodiments, can include a valve 1870. The valve 1870 can be located in a regulator channel 1825 within a lumen 1826 of the adaptor 1800 between a container 10 and a bag or other enclosure 254. In some embodiments, the valve 1879, or a portion thereof, is located outside of the lumen 1826 and within a coupling 1852 of the regulator assembly 1850. In some embodiments, the valve 1870 is configured to permit regulator fluid and/or other fluid to pass from the enclosure 1854 to the container

10. In some embodiments, the valve 1870 is configured to inhibit or prevent the passage of fluid from the container 10 to the enclosure 1854.

In some configurations, the valve 1870 is selectively opened and/or closed depending on the orientation of the adaptor 1800. For example, the valve 1870 can be configured to allow fluid flow between the container 10 and the enclosure 1854 without restriction when the adaptor 1800 is oriented above a vial 10 to which the adaptor is attached. In some embodiments, the valve 1870 is configured to prevent fluid flow from the container 10 to the enclosure 1854 when the vial 10 is positioned above the adaptor 1800. Furthermore, in some embodiments, the valve 1870 is configured to act as a two-way valve in substantially the same manner as described above with regard to the valve 1770.

Figure 26C:
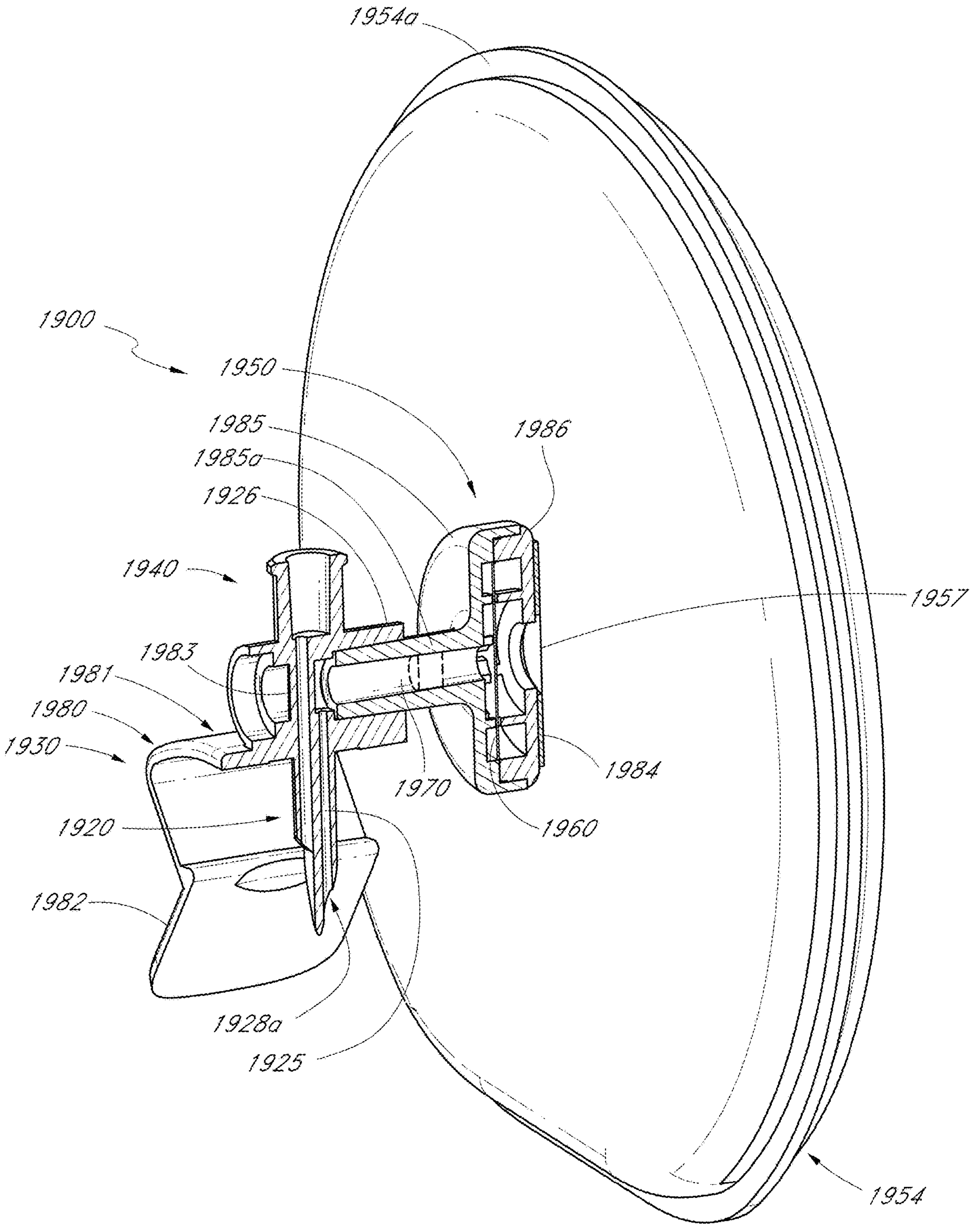
FIG. 26C illustrates an assembled perspective view of the vial adaptor of FIG. 7, the vial adaptor including a valve.

FIG. 26C illustrates an embodiment of an adaptor 1900 that can have components or portions that are the same as or similar to the components or portions of other vial adaptors disclosed herein. The adaptor 1900 can include a valve 1970 situated in a regulator channel 1925 within a protrusion **1985*a* of a regulator assembly 1950 between a container 10 and a filter 1960. In some embodiments, the valve 1970, or some portion thereof, is located in the regulator channel 1925 outside the protrusion 1985*a*. The regulator assembly 1950 can include an enclosure 1954. In some embodiments, the valve 1970 restricts the flow of fluid through the regulator channel 1925 in substantially the same way as other valves (e.g., 1770, 1870**) described herein.

Figure 27A:
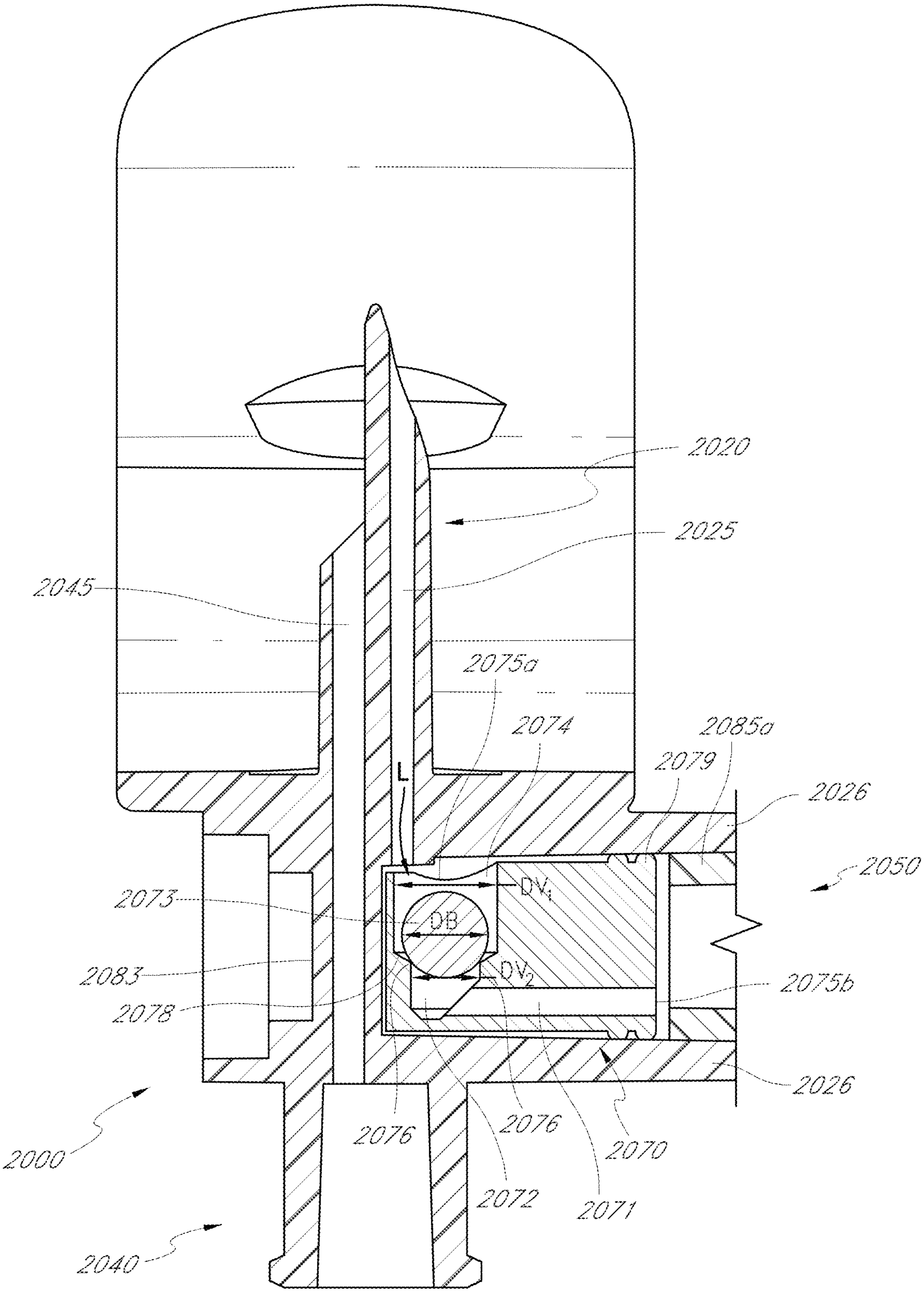
FIG. 27A illustrates a partial cross-sectional view of a portion of an inverted vial adaptor, the vial adaptor including a ball check valve.
Figure 27B:
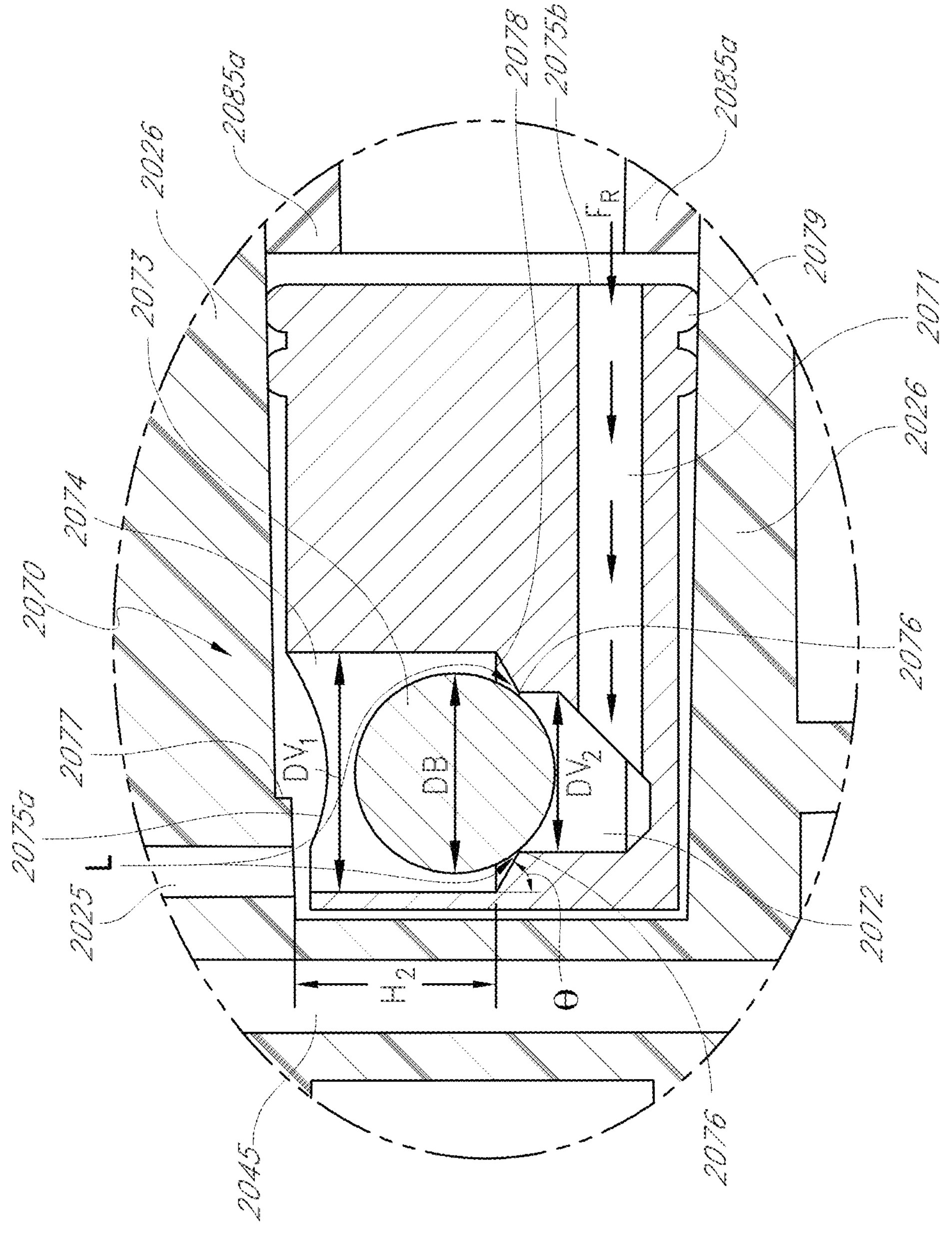
FIG. 27B illustrates a close-up cross-sectional view of the ball check valve of FIG. 27A.
Figure 27C:
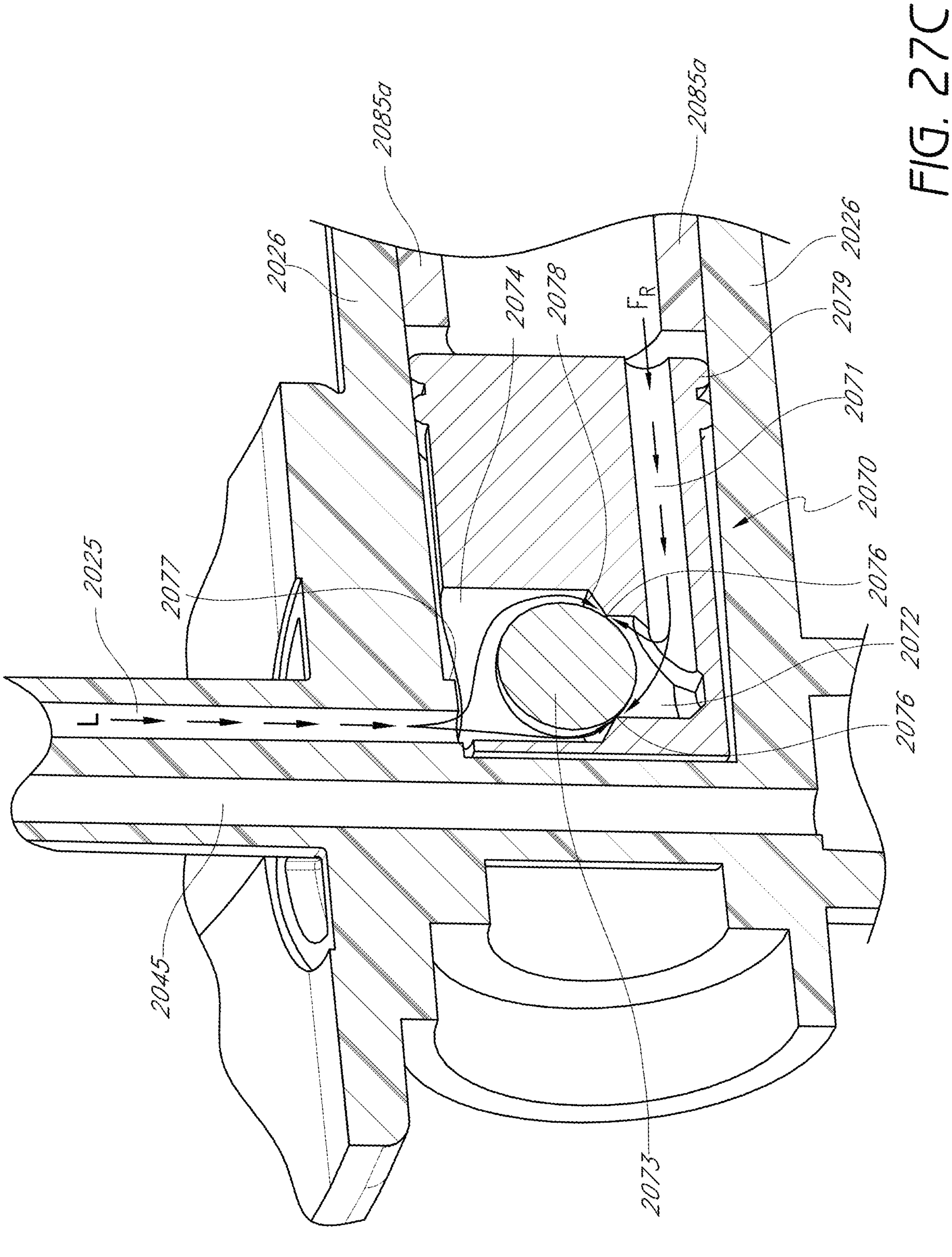
FIG. 27C illustrates a perspective cross-sectional view of the ball check valve of FIG. 27A.

FIGS. 27A-27C illustrate an embodiment of a vial adaptor 2000 that can have components or portions that are the same as or similar to the components or portions of other vial adaptors disclosed herein. In some embodiments, the vial adaptor 2000 includes a connector interface 2040 and a piercing member 2020 in partial communication with the connector interface 2040. In some embodiments, the vial adaptor 2000 includes a regulator assembly 2050.

The regulator assembly 2050 can include an orientation-actuated or orientation-dependent or orientation-sensitive occluder valve, such as a ball check valve 2070. In some embodiments, the occluder valve can be removably inserted into one or more lumens of the regulator assembly 2050 via an installation path. The installation path can be defined by the axial centerline of the lumen or portion thereof into which the occluder valve is inserted. In some embodiments, the occluder valve is configured to transition between an open configuration and a closed configuration based upon the orientation of the vial adaptor 2000 (e.g., the orientation of the vial adaptor 2000 with respect to the floor). In some such embodiments, the occluder valve is configured to transition from a first configuration corresponding with a first orientation of the vial adaptor 2000 to a second configuration corresponding with a second orientation of the vial adaptor 2000. The occluder valve can be configured to transition from the first orientation to the second orientation independent of the path of rotation of the vial adaptor 2000. In some embodiments, the occluder valve can include an occluding member configured to move about within a valve chamber. For example, the occluding member could be configured to engage with and disengage from a valve seat within the valve chamber depending on the configuration of the occluder valve and the orientation of the vial adaptor 2000. The occluding member can have an ellipsoidal shape, a spherical shape, a generally cylindrical shape with a tapered end, or any other appropriate shape.

In some configurations, the ball check valve 2070 is located in a lumen of the regulator assembly and/or in a lumen of the connector interface 2040. For example, the ball check valve 2070 can be located in a regulator channel 2025 within a lumen 2026 of the regulator assembly 2050. In some embodiments, the ball check valve 2070 is removable from the regulator channel 2025. In certain variants, the ball check valve 2070 includes a retaining member that prevents or impedes the ball 2073 from falling out of the ball check valve 2070 when it is removed from the regulator channel 2025. The ball check valve 2070 can be rotatable about its axial centerline within the regulator channel 2025. In some embodiments, the ball check valve 2070 can be installed in other lumens of the vial adaptor 2000. In some configurations, the regulator assembly 2050 includes a lumen or appendage or protrusion **2085*a* which can be substantially sealingly attached to (e.g., received within or around the outer perimeter of) the lumen 2026 of the regulator assembly 2050. The protrusion 2085*a* can facilitate fluid communication between two or more features (e.g., a filter, enclosure, bag and/or valve) of the regulator assembly. According to some configurations, the ball check valve 2070, or some portion thereof, can be located in the regulator channel 2025 within the protrusion 2085*a*. In some embodiments, the ball check valve 2070 and protrusion 2085*a* form a unitary part. In some embodiments, the ball check valve 2070 and lumen 2026** form a unitary part.

In some embodiments, the ball check valve 2070 includes a first chamber 2074 in fluid communication with the vial 10 via the regulator channel 2025. The ball check 2070 can include a second chamber 2072 in selective fluid communication with the first chamber 2074. According to some configurations, the first chamber 2074 has a substantially circular cross section with a diameter or cross-sectional distance DV1 and height H2. In some embodiments, the longitudinal axis of the first chamber 2074 is parallel to the axial centerline of the vial adaptor 2000. In some embodiments, the longitudinal axis of the first chamber 2074 is positioned at an angle away from the axial centerline of the vial adaptor 2000. The angle between the longitudinal axis of the first chamber 2074 and the axial centerline of the vial adaptor 2000 can be greater than or equal to about 15° and/or less than or equal to about 60°. In some embodiments, the angle between the longitudinal axis of the first chamber 2074 and the axial centerline of the vial adaptor 2000 is approximately 45°. Many variations are possible. In some embodiments, the second chamber 2072 also has a substantially circular cross section with a diameter or cross-sectional distance DV2. Many other variations in the structure of the first and second chambers are possible. For example, other cross-sectional shapes may be suitable.

In some embodiments, the ball check valve 2070 can include a shoulder 2078 between the first chamber 2074 and second chamber 2072. The shoulder 2078 can comprise a sloped or tapering surface configured to urge a ball 2073 to move toward an occluding position under the influence of gravity when the vial adaptor is oriented such that the vial is above the vial adaptor. In some embodiments, the angle θ between the shoulder 2078 and the wall of the first chamber 2074 is less than or equal to about 90°. In some embodiments the angle θ is less than or equal to about 75° and/or greater than or equal to about 30°. In some embodiments, the second chamber 2072 is in fluid communication with the first chamber 2074 when the ball check valve 2070 is in an open configuration. In some embodiments, the inner wall of the first chamber 2074 can gradually taper into the inside wall of the second chamber 2072 such that the first and second chambers 2074, 2072 constitute a single generally frustoconical chamber.

In some embodiments, the ball 2073 can rest on a circular seat when in the occluding position. In some embodiments, the circular seat is formed by the shoulder 2078. In some embodiments, the longitudinal axis of the circular seat is parallel to the longitudinal axis of the first chamber 2074. In some embodiments, the longitudinal axis of the first chamber 2074 can define a general movement path for the ball 2073 or other occluding member (e.g., the ball 2073 can generally move to and/or from the occluding position in a direction generally parallel to the longitudinal axis of the first chamber 2074). In some embodiments, the movement path of the occluding member is not substantially parallel to the installation path of the ball check valve 2070. For example, the movement path of the occluding member can be substantially perpendicular to the installation path of the ball check valve 2070. In certain variations, the longitudinal axis of the circular seat forms an angle with the respect to the longitudinal axis of the first chamber 2074. The angle formed between the longitudinal axis of the circular seat and the longitudinal axis of the first chamber 2074 can be greater than or equal to about 5° and/or less than or equal to about 30°. In some embodiments, the angle is approximately 10°. Many variations are possible. In some embodiments, the longitudinal axes of the first chamber 2074 and the circular seat are parallel to the axial centerline of the adaptor 2000. Such a configuration can reduce the likelihood that the ball 2073 will "stick to" the circular seat or to the inner walls of the first chamber 2074 when the ball check valve 2070 is transitioned between the opened and closed configurations, as will be explained below.

In certain configurations, the longitudinal axis of the first chamber 2074 can be substantially parallel to the axial centerline of the ball check valve 2070. In some embodiments, the longitudinal axis of the first chamber 2074 can define the movement path of the ball 2073. As illustrated in FIG. 27C, the longitudinal axis of the first chamber 2074 can be perpendicular to the axial centerline of the ball check valve 2070. In some embodiments, the angle between the longitudinal axis of the first chamber 2074 and the axial centerline of the ball check valve 2070 is greater than or equal to about 5° and/or less than or equal to about 90°. In some embodiments, the angle is about 60°. Many variations are possible. In some embodiments, the angle between the longitudinal axis of the first chamber 2074 and axial centerline of the ball check valve 2070 is the same as the angle between the axial centerline of the ball check valve 2070 and the axial centerline of the vial adaptor 2000. In some such embodiments, the longitudinal axis of the first chamber 2074 can be aligned with the axial centerline of the vial adaptor 2000.

The ball check valve 2070 can also include a valve channel 2071. According to some embodiments, the valve channel 2071 is in fluid communication with the second chamber 2072. In some embodiments, the valve channel 2071 generally defines a flow path between the second chamber 2072 and a portion of the regulator channel 2025 opposite the second chamber 2072 from the first chamber 2074. As illustrated in FIGS. 27A-27C, the ball check valve 2070 can include one or more sealing portions 2079. The one or more sealing portions 2079 can resist movement of the ball check valve 2070 within the regulator channel 2025. In some embodiments, the one or more sealing portions 2079 inhibit fluid from flowing around and bypassing the ball check valve 2070. In some embodiments, the one or more sealing portions 2079 include one or more annular protrusions that extend from the valve channel 2071. Many variations are possible.

As illustrated in FIG. 27A, the ball check valve 2070 has a distal opening 2075*a*. In some embodiments, the ball check valve 2070 has a plurality of distal openings. The distal opening 2075*a* defines the fluid boundary (e.g., the interface) between the first chamber 2074 and the regulator channel 2025. In some embodiments, the ball check valve 2070 includes a first valve channel in fluid communication with both the regulator channel 205 and the first chamber 2074. In such embodiments, the distal opening 2075*a* defines the fluid boundary (e.g., the interface) between the first valve channel and the regulator channel 2025. The ball check valve 2070 further includes a proximal opening 2075*b* that defines the fluid boundary (e.g., the interface) between the valve channel 2071 and the regulator channel 2025.

The ball check valve 2070 can be configured such that fluids that enter and exit the ball check valve 2070 through the distal opening 2075*a* and the proximal opening 2075*b* flow through the interfaces defined by each opening in a direction generally perpendicular to the interfaces. For example, as illustrated in FIG. 27B, regulator fluid FR that enters and/or exits the ball check valve 2070 through the proximal opening 2075*b* has a flow direction (horizontal with respect to FIG. 27B) that is generally perpendicular to the interface (vertical with respect to FIG. 27B) defined by the proximal opening 2075*b*. Similarly, the flow of liquid into and out of the ball check valve 2070 through the distal opening 2075*a* is in a direction generally perpendicular to the interface defined by the proximal opening 2075*a*. In some embodiments, the direction of flow through one or more of the distal opening 2075*a* and the proximal opening 2075*b* is oblique or perpendicular to the movement path of the ball 2073 or other occluding member. The angle formed between either interface and the movement path of the ball 2073 can be the same as the angle formed between the same interface and the insertion axis of the adaptor 2000.

According to some embodiments, the occluder valve 2070 includes a moveable occluder, such as a ball 2073. All references herein to a ball can apply to an occluder of any other shape, such as a generally cubic occluder, a generally cylindrical occluder, a generally conical occluder, combinations of these shapes, etc. In some embodiments, the ball 2073 is generally spherical or has another suitable shape. The ball 2073 can be constructed of a material with a higher density than the liquid L or other fluid within the vial 10. The ball 2073 can have a diameter DB. In some configurations, the diameter DB of the ball 2073 is less than the diameter DV1 and height H2 of the first chamber 2074. For example, in some embodiments the ratio of the diameter DB of the ball 2073 to the diameter DV1 of the first chamber 2074 is less than or equal to about 9:10 and/or greater than or equal to about 7:10. In some configurations, the diameter DB of the ball 2073 is greater than the diameter DV2 of the second chamber 2072. For example, in some embodiments the ratio of the diameter DV2 of the second chamber 2072 to the diameter DB of the ball 2073 is less than or equal to about 9:10 and/or greater than or equal to about 7:10. In some embodiments, the ball 2073 is can move between at least two positions within the first chamber 2074. For example, movement of the ball 2073 can be governed by gravity, external forces on the vial adapter, fluids within the regulator channel, other forces, or a combination of forces.

As illustrated in FIGS. 27A-27C, the ball 2073 in the ball check valve 2070 can be configured to rest upon the shoulder 2078 at the opening of the second chamber 2072 when the adaptor 2000 and vial 10 are oriented such that the force of gravity is influencing the fluid contained within the vial to be urged toward the vial adaptor (e.g., when at least some portion of the vial 10 is above the connector interface 2040). The ball check valve 2070 can be oriented such that the longitudinal axis of the first chamber 2074 and the longitudinal axis of the circular seat are substantially parallel to the axial centerline of the vial adaptor 2000. In such embodiments, the ball 2073 can be configured to transition to the occluding position (e.g., resting on the circular seat) in a substantially consistent manner independent of the direction of rotation of the vial 10 and the connector interface 2040. For example, in such embodiments, the manner in which the ball 2073 moves toward the shoulder 2078 or circular seat when the vial 10 is rotated from below connector interface 2040 to above the connector interface 2040 would be substantially consistent and independent of whether the vial 10 and connector interface 2040 were rotated about the longitudinal axis of the lumen 2026, about an axis perpendicular to the longitudinal axis of the lumen 2026 and to the axial centerline of the vial adaptor 2000, or about any other axis of rotation therebetween. Furthermore, in such embodiments, parallel alignment between the longitudinal axis of the first chamber 2074 and the axial centerline of the adaptor 2000 can assist the user of the adaptor 2000 in visualizing the alignment of the ball check valve 2070. In some configurations, the contact between the ball 2073 and the shoulder 2078 can form a seal 2076. The seal 2076 can put the ball check valve 2070 in a closed configuration and inhibit passage of liquid L and/or other fluid from the vial 10 through the ball check valve 2070 when the vial 10 is oriented above the connector interface 2040.

In some embodiments, the ball 2073 can be configured to move away from the shoulder 2078 when the adaptor 2000 and vial 10 are oriented such that fluid within the vial is urged away from the vial adaptor under the force of gravity (e.g., when at least a portion of the connector interface 2040 is positioned above the vial 10). In some embodiments (such as, for example, embodiments in which the longitudinal axes of the first chamber 2074 and the circular seat are parallel to the axial centerline of the vial adaptor 2000), the ball 2073 can be configured to move away from the shoulder 2078 in a substantially consistent manner independent of the direction of rotation of the vial 10 and the connector interface 2040. For example, in such embodiments, the manner in which the ball 2073 moves away from the shoulder 2078 when the vial 10 is rotated from above connector interface 2040 to below the connector interface 2040 would be substantially consistent and independent of whether the vial 10 and connector interface 2040 were rotated about the longitudinal axis of the lumen 2026, about an axis perpendicular to the longitudinal axis of the lumen 2026 and to the axial centerline of the vial adaptor 2000, or about any other axis of rotation therebetween. Movement of the ball 2073 away from the shoulder 2078 can open or break the seal 2076 and put the ball check valve 2070 in an open configuration such that the first chamber 2074 and second chamber 2072 are in fluid communication. In some embodiments, the ball check valve 2070 includes a resilient biasing member which can bias the ball 2073 toward the shoulder 2078 and thus bias the ball check valve 2070 to a closed configuration. In some configurations, the biasing member can be a spring. In some configurations, the biasing member can be a flexible member. In some embodiments, the biasing force provided by the resilient biasing member can be less than the weight of the ball 2073.

In some embodiments, the ball 2073 can move about the first chamber 2074 under the influence of gravity. In some configurations, gravity can cause the ball 2073 to move toward the second chamber 2072 and rest upon the shoulder 2078 at the opening of the second chamber 2072. As explained above, the resting of the ball 2073 upon the shoulder 2078 can create a seal 2076 which can put the ball check valve 2070 in a closed configuration and inhibit passage of liquid L and/or other fluid from the vial 10 through the ball check valve 2070. In some configurations, gravity can cause the ball 2073 to move away from the shoulder 2078. Movement of the ball 2073 away from the shoulder 2078 under the influence of gravity can open or break the seal 2076 and put the ball check valve 2070 in an open configuration such that the first chamber 2074 and second chamber 2072 are in fluid communication. Since the diameter or cross-section of the first chamber DV1 is greater than the diameter or cross-section DB of the ball 2073, fluid can flow through the first chamber, around the outside surface of the ball 2073.

Certain aspects of the operation of the ball check valve 2070 while the ball check valve 2070 is in a closed configuration will now be described. For example, in some embodiments when no fluid is being introduced to or withdrawn from the vial 10 via the access channel 2045, the pressure within the vial 10 is substantially the same as the pressure in the valve channel 2071. In such a situation, the pressure in the first chamber 2074 can be substantially the same as the pressure in the second chamber 2072. In some embodiments, positioning of the vial 10 above the connector interface 2040 can cause liquid L or other fluid to move from the vial 10 to the first chamber 2074. In some embodiments, the ball 2073 will remain at rest on the shoulder 1078 and create a seal 2076 when there is equilibrium in the pressure between the first chamber 2074 and the second chamber 2072. The seal 2076 can inhibit passage of liquid L and/or other fluid from the vial 10 through the ball check valve 2070.

In some embodiments, withdrawal of fluid from the vial 10 through the access channel 2045 can create lower pressure in the vial 10 and first chamber 2074 than the pressure within the second chamber 2072. The pressure differential can cause the ball 2073 to move away from the shoulder 2078 into the first chamber 2074. The movement of the ball 2073 away from the shoulder 2078 can break the seal 2076 and permit regulator fluid FR to pass from through the second chamber 2072 and around the ball 2073. The regulator fluid FR can then pass through the first chamber 2074 and through the regulator channel 2025 into the vial 10. In some embodiments, the regulator fluid FR is fluid which has passed through a filter in the regulator assembly 2050. In some embodiments, the regulator fluid FR is a fluid contained in the inner volume of an enclosure of the regulator assembly 2050. Passage of regulator fluid FR into the vial 10 can offset, reduce, substantially eliminate, or eliminate the pressure differential between the first chamber 2074 and the second chamber 2072 and allow the ball 2073 to return to a resting position on the shoulder 2078. In some embodiments, the passage of regulator fluid FR into the vial 10 helps to maintain equilibrium between the interior of the vial 10 and the interior of the regulator assembly 2050. The return of the ball 2073 to a resting position on the shoulder 2078 can recreate or produce the seal 2076 and prevent passage of liquid L or other fluid from the vial 10 through the ball check valve 2070.

In some embodiments, introduction of fluid to the vial 10 through the access channel 2045 (e.g., when diluents, mixing fluids, or overdrawn fluids are injected into the vial 10 via an exchange device 40) can create higher pressure in the vial 10 and first chamber 2074 than the pressure within the second chamber 2072. This difference in pressure can cause the ball 2073 to be pushed onto the shoulder 2078 and thus tighten the seal 2076. Tightening of the seal 2076 can inhibit the passage through the ball check valve 2070 of fluid L from the vial 10. In some embodiments, the tightening of the seal 2076 can cause the internal pressure within the vial 10 and first chamber 2074 to continue to increase as more fluid is introduced into the vial 10 via the access channel 2045. In some embodiments, a continual increase in pressure within the vial 10 and first chamber 2074 can dramatically increase the force required to introduce more fluid to a prohibitive level, and eventually increase the likelihood of fluid leaks from the vial 10 and adaptor 2000 or between these components. It can therefore be desirable for the ball check valve 2070 to be in an open position when fluids are injected into the vial 10.

Movement of the ball 2073 away from the shoulder 2078 can open or break the seal 2076 and put the ball check valve 2070 in an open configuration. Certain aspects of the operation of the ball check valve 2070 while the ball check valve 2070 is in an open configuration will now be described. For example, in some embodiments when no fluid is being introduced to or withdrawn from the vial 10 via the access channel 2045, the pressure within the vial 10 remains substantially constant. In some embodiments, the vial 10 is in fluid communication with and has the same substantially constant internal pressure as the first and second chambers 2074, 2072 and valve channel 2071 of the ball check valve 2070.

In some embodiments, withdrawal of fluid from the vial 10 through the access channel 2045 can lower the pressure in the vial 10 and subsequently lower the pressure in the first chamber 2074. This lowering of pressure in the vial 10 and first chamber 2074 can create a pressure differential between the first chamber 2074 and second chamber 2072 of the ball check valve 2070. The pressure differential can cause regulator fluid FR to pass through the first chamber 2074 and through the regulator channel 2025 into the vial 10. In some embodiments, the regulator fluid FR is fluid which has passed through a filter in the regulator assembly 2050. In some embodiments, the regulator fluid FR is a fluid contained in the inner volume of an enclosure of the regulator assembly 2050. Passage of regulator fluid FR into the vial 10 can offset, reduce, substantially eliminate, or eliminate the pressure differential between the first chamber 2074 and the second chamber 2072. In some embodiments, the passage of regulator fluid FR into the vial 10 helps to maintain equilibrium between the interior of the vial 10 and the interior of the regulator assembly 2050.

In some embodiments, introduction of fluid to the vial 10 through the access channel 2045 (e.g., when diluents, mixing fluids, or overdrawn fluids are injected into the vial 10 via an exchange device 40) can create higher pressure in the vial 10 and first chamber 2074 than the pressure within the second chamber 2072. This differential in pressure can cause fluid from the vial 10 to pass from the vial 10, through the ball check valve 2070 and into the regulator assembly 2050. In some embodiments, the fluid from the vial 10 can pass through the check valve 2070 and through a filter. In some embodiments, the fluid from the vial 10 passes through the check valve 2070 and into a bag or other enclosure. Passage of fluid from the vial 10 through the ball check valve 2070 can lower the pressure within the vial 10 and maintain equilibrium between the interior of the vial 10 and the interior of the regulator assembly 2050. In some embodiments, regulator fluid FR is ambient air or sterilized gas, or filtered air or gas.

In some embodiments, especially those in which portions of the vial adaptor are modular or interchangeable, the internal and/or external cross section of the lumen 2026 can include one or more alignment features. For example, the internal and/or external cross section of the lumen can be keyed or otherwise specially shaped. Some examples of potential shapes and their benefits are illustrated in FIGS. 20A-20F and discussed above. The protrusion 2085*a* and/or ball check valve 2070 can include a corresponding alignment feature (e.g. corresponding keying or other special shaping). Such a configuration can be useful to signal, control, or restrict the regulatory assembly 2050 that can be connected with, or made integral with, the adaptor 2000. For example, keying of or shaping of the ball check valve 2070 and/or the channel in which it is placed could provide a user of the adaptor 2000 with confirmation that the ball check valve 2070 is properly aligned (e.g., aligning the first chamber 2074 on the side of the vial 10) within the regulator assembly 2050. This alignment of ball check valve 2070 can allow for proper and/or predictable functioning of the regulatory assembly 2050.

In some embodiments, the exterior of the regulator assembly 2050 can include one or more visual indicators to show the alignment of the ball check valve 2070. In some embodiments, the visual indicators include notches, words (e.g., top and/or bottom), arrows or other indicators of alignment. In some embodiments, the protrusion 2085*a*, lumen 2026, and/or body of the valve 2070 are constructed of a substantially transparent material to provide the user of the adaptor 2000 with visual confirmation of the configuration of the valve (e.g., to permit viewing the position of the ball to indicate whether the valve is in an open or closed configuration).

In some embodiments, the regulator assembly 2050 can include one or more indicators (e.g., visual or audible) to indicate when the ball 2073 is in the occluding position. For example, the regulator assembly 2050 could include one or more light sources (e.g., LED lights, chemiluminescent lights, etc.) that can be configured to emit light when the ball 2073 is in the occluding position. In some embodiments, the adaptor 2000 can include a power source (e.g., one or more batteries, AC input, DC input, photovoltaic cells, etc.) configured to supply power to at least one of the one or more indicators. In some embodiments, the ball 2073 is constructed of an electrically conductive material. In such embodiments, the ball check valve 2070 can be configured such that the ball 2073 completes a circuit between the power source and the light source when the ball 2073 is in the occluding position. In some embodiments, the adaptor 2000 can include a gyroscopic sensor configured to sense when the ball 2073 is in the occluding position. In certain such embodiments, a controller to which the sensor is connected can direct power to activate the one or more indicators when the vial 10 is held above the adaptor 2000.

Figure 28:
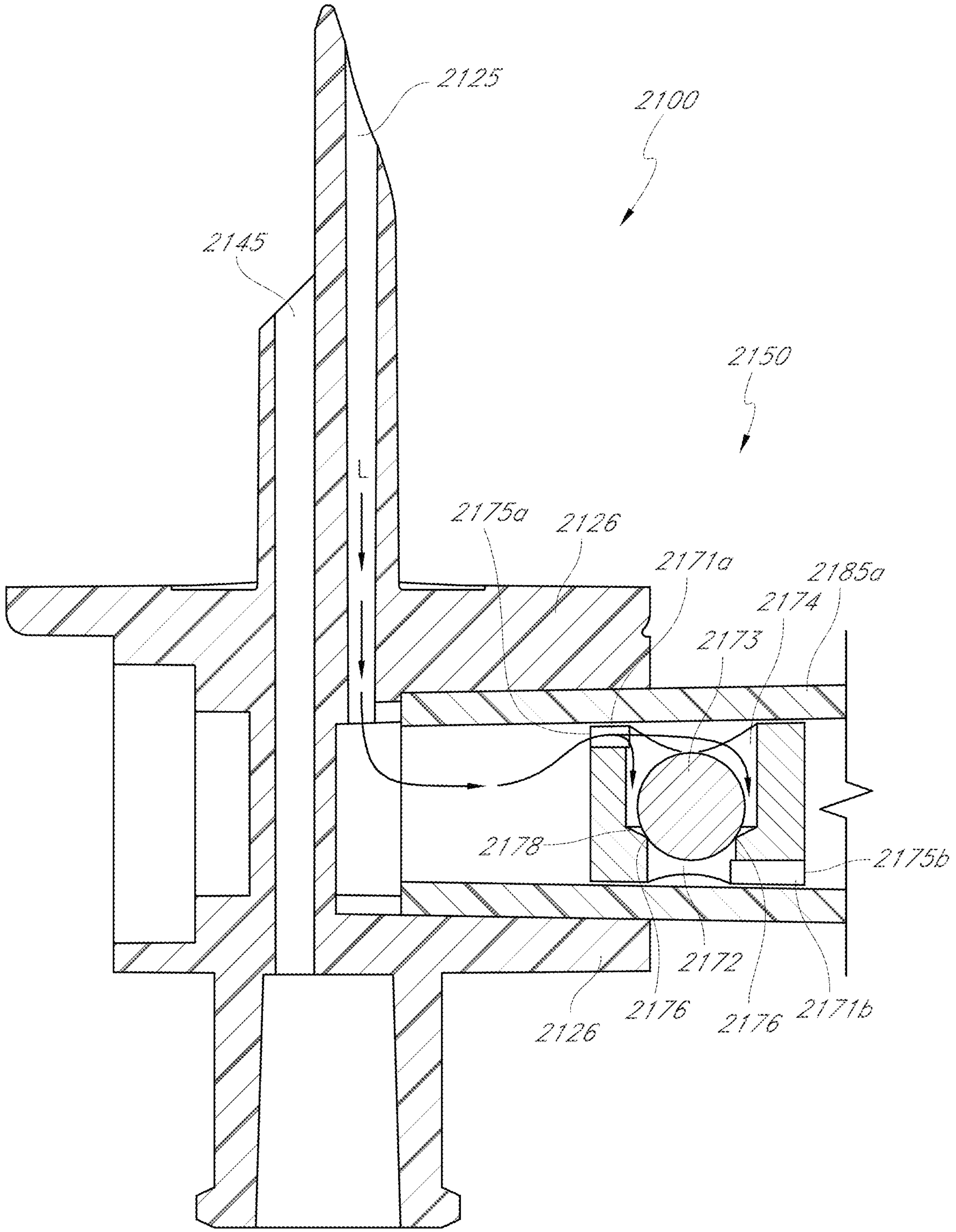
FIG. 28 illustrates a partial cross-sectional view of another vial adaptor, the vial adaptor including a ball check valve.

FIG. 28 illustrates an embodiment of an adaptor 2100 that can have components or portions that are the same as or similar to the components or portions of other vial adaptors disclosed herein. In some embodiments, a ball check valve 2170 includes a first valve channel 2171A in fluid communication with both a regulator channel 2125 and a first chamber 2174 of the ball check valve 2170. The ball check valve 2100 can include a second valve channel 2171B in fluid communication with a second chamber 2172 of the ball check valve 2170. In some embodiments, the ball check valve 2170, or some portion thereof, is positioned in the regulator channel 2125 within a protrusion 2185*a*. In some embodiments, the ball check valve 2170, or some portion thereof, is positioned in the regulator channel 2125 within a lumen 2126 of the adaptor 2100. In some embodiments, the ball check valve 2170, or some portion thereof, is positioned in the regulator channel 2125 outside a protrusion 2185*a*. In some embodiments, the ball check valve 2170, or some portion thereof, is positioned in the regulator channel 2125 outside a lumen 2126 of the adaptor 2100. In some embodiments, the ball check valve 2170 and protrusion 2185*a* form a unitary part. In some embodiments, the ball check valve 2170 and lumen 2126 form a unitary part.

Figure 29:
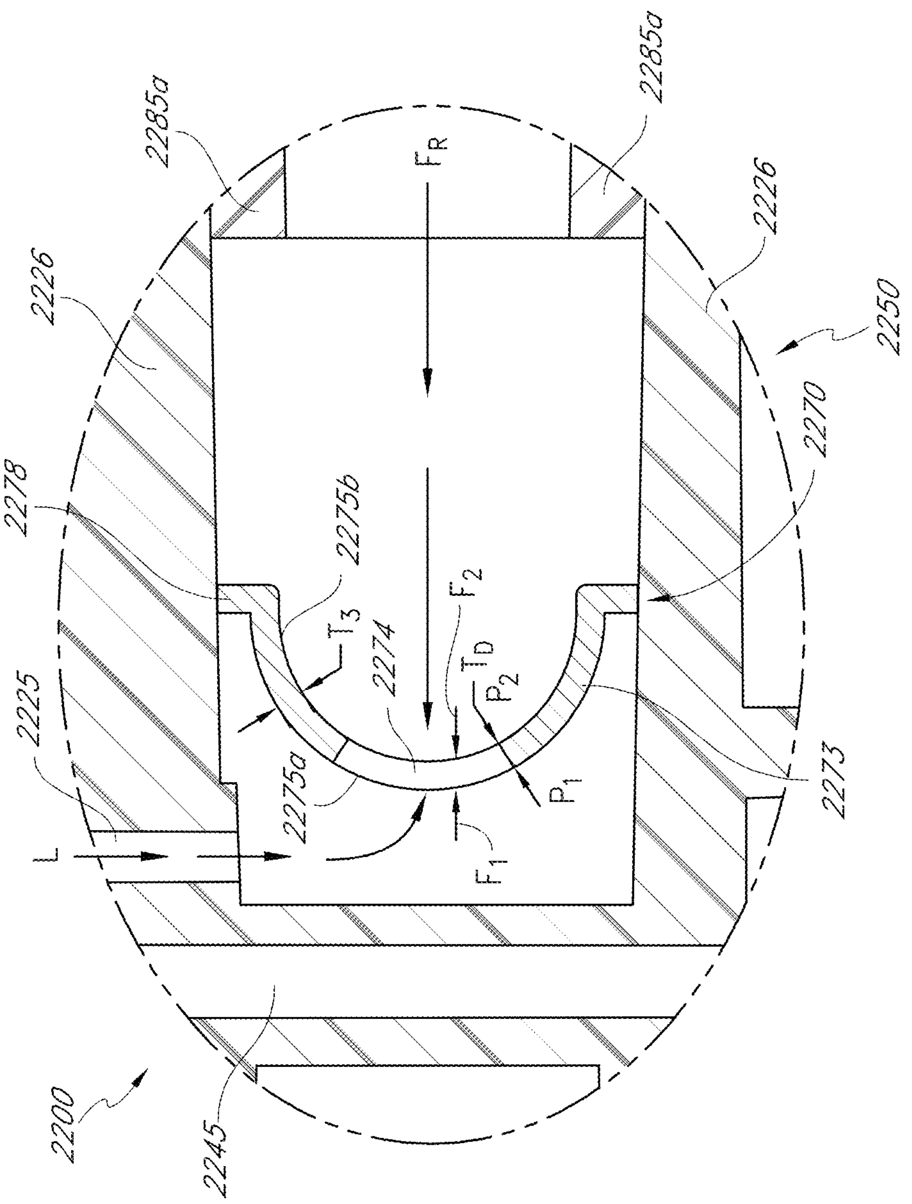
FIG. 29 illustrates a close-up cross-sectional view of a domed valve.

FIG. 29 illustrates an embodiment of an adaptor 2200 that can have components or portions that are the same as or similar to the components or portions of other vial adaptors disclosed herein. In some embodiments, a regulator assembly 2250 includes a flexible valve, such as a domed valve 2270. The domed valve 2270 can include a domed portion 2273. The domed portion 2273 can include a concave side 2275B and a convex side 2275A. In some embodiments, the domed valve 2270 can include an annular flange 2278 attached to the domed portion 2273. In some embodiments, the annular flange 2278 and domed portion 2273 constitute a unitary part. The domed portion 2273 can have a wall thickness T3. The wall thickness T3 can be substantially constant throughout the domed portion 2273. In some embodiments, the thickness T3 of the domed portion 2273 can vary across the domed valve 2270.

In some embodiments, the domed valve 2270, or some portion thereof, is positioned in a regulator channel 2225 within a lumen 2226 of the adaptor 2200. In some embodiments, the domed valve 2270, or some portion thereof, is positioned in the regulator channel 2225 outside a protrusion 2285*a*. In some embodiments, the domed valve 2270, or some portion thereof, is positioned in the regulator channel 2225 outside a lumen 2226 of the adaptor 2200. In some embodiments, the domed valve 2270 is fixed within the regulator channel 2225. The domed valve 2270 can be fixed within the regulator channel 2225 via, for example, adhesives, welding, fitted channels within the regulator channel 2225 or otherwise.

In some embodiments, the domed portion 2273 includes one or more slits 2274 or some other opening. In some embodiments, the one or more slits 2274 are biased to a closed position by the domed portion 2273 and/or annular flange 2278. The domed valve 2270 can inhibit and/or prevent the passage of fluid through the regulator channel 2225 when the one or more slits 2274 are in a closed position. In some embodiments, the one or more slits 2274 are configured to open in response to one or more cracking pressures and allow fluid to flow through the one or more slits 2274. In some embodiments, the geometry and/or material of the domed valve 2270 can cause the cracking pressure required to allow fluid to flow through the one or more slits 2274 in a first direction F1 to be substantially higher than the cracking pressure required to allow fluid to flow through the one or more slits 2274 in a second direction F2.

Certain aspects of the operation of the domed valve 2270 will now be described. For example, in some embodiments when no fluid is being introduced to or withdrawn from a vial 10 via an access channel 2245 of the adaptor 2200, the pressure within the vial 10 remains substantially constant. In some embodiments, the vial 10 is in fluid communication with and has the same substantially constant internal pressure as the pressure P1 in the regulator channel 2225 in the region of the convex side 2275A of the domed valve 2270. In some embodiments, the pressure P2 in the region of the concave side 2275B of the domed valve 2270 is substantially the same as the pressure P1 when no fluid is being introduced to or withdrawn from the vial 10. In such a configuration, the one or more slits 2274 of the domed valve 2270 can be biased closed by the domed portion 2273 of the domed valve 2270.

In some embodiments, withdrawal of fluid from the vial 10 through the access channel 2045 can lower the pressure in the vial 10 and subsequently lower the pressure P1 in the region of the convex side 2275A. This lowering of the pressure P1 can create a pressure differential between the convex side 2275A and concave side of 2275B of the domed valve 2270. In some embodiments, withdrawal of fluid from the vial 10 can create a pressure differential across the domed valve 2270 high enough to overcome the cracking pressure of the domed valve 2270 and open the one or more slits 2274 to allow fluid to flow in a second direction F2 through the domed valve 2270. In some configurations, regulator fluid FR flows in a second direction F2 through the domed valve 2270 when the one or more slits 2274 are opened and the pressure P2 on the concave side 2275B of the valve 2270 is higher than the pressure P1 on the convex side 2275A of the valve 2270. Passage of regulator fluid FR through the domed valve 2270 and/or into the vial 10 can raise the pressure within the vial 10. Raising of the pressure within the vial 10 can raise the pressure P1 in the region of the convex surface 2275A of the domed valve 2270. Raising of the pressure P1 in the region of the convex surface 2275A can lower the pressure differential across the valve 2270 below the cracking pressure and cause the one or more slits 2274 to shut. In some embodiments, the passage of regulator fluid FR in a second direction F2 through domed valve 2270 helps maintain equilibrium between the interior of the vial 10 and interior of the regulator assembly 2050 when fluid is withdrawn from the vial 10 via the access channel 2245. In some embodiments, the regulator fluid FR is fluid which has passed through a filter in the regulator assembly 2250. In some embodiments, the regulator fluid FR is a fluid contained in the inner volume of an enclosure of the regulator assembly 2250.

In some embodiments, introduction of fluid to the vial 10 through the access channel 2245 (e.g., when diluents, mixing fluids, or overdrawn fluids are injected into the vial 10 via an exchange device 40) can raise the pressure in the vial 10. Raising the pressure within the vial 10 can raise the pressure P1 in the region of the convex surface 2275A of the domed valve 2273. Raising of the pressure P1 in the region of the convex surface 2275A can create a pressure differential across the domed valve 2273. In some embodiments, introduction of fluid into the vial 10 can create a pressure differential across the domed valve 2270 high enough to overcome the cracking pressure of the domed valve 2270 and open the one or more slits 2274 to allow fluid to flow in a first direction F1 through the domed valve 2270. In some configurations, as explained above, the cracking pressure required to permit fluid to flow in the first direction F1 is substantially higher than the cracking pressure required to permit fluid to flow in a second direction F2 through the domed valve 2270. In some embodiments, flow of fluid from the vial 10 through the domed valve 2270 in a first direction F1 can lower the pressure in the vial 10. Lowering of the pressure within the vial 10 can lower the pressure P1 in the region of the convex surface 2275A and can lower the pressure differential across the valve 2270 below the cracking pressure and cause the one or more slits 2274 to shut. In some embodiments, passage of fluid through the domed valve 2270 in a first direction F1 helps maintain equilibrium between the interior of the vial 10 and the interior of the regulator assembly 2250.

Figure 30B:
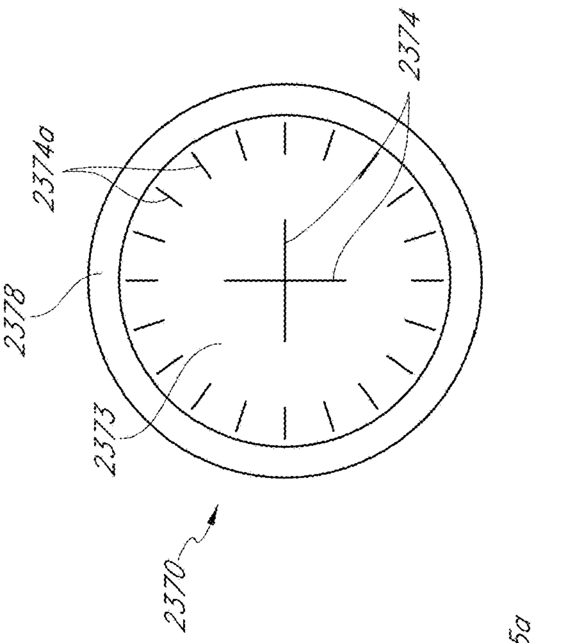
FIG. 30B illustrates an elevated view of the showerhead domed valve taken through the line B-B in FIG. 30A.
Figure 30A:
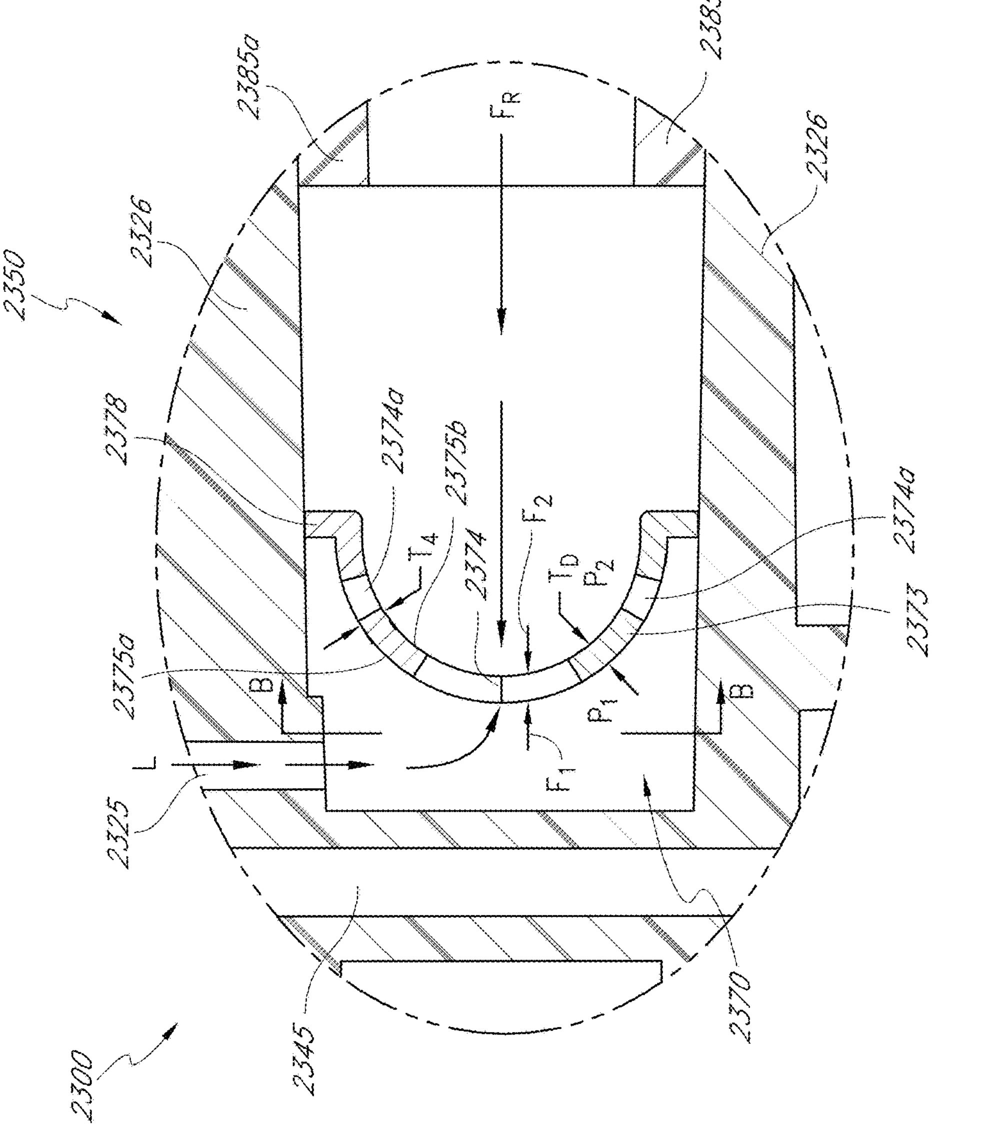
FIG. 30A illustrates a close-up cross-sectional view of a showerhead domed valve.

FIGS. 30A-30B illustrate an embodiment of an adaptor 2300 and a valve with multiple openings, such as a showerhead domed valve 2370. The adaptor 2300 can have components or portions that are the same as or similar to the components or portions of other vial adaptors disclosed herein. The showerhead domed valve 2370 can include a domed portion 2373. The domed portion 2373 can include a concave side 2375B and a convex side 2375A. In some embodiments, the showerhead domed valve 2370 can include an annular flange 2378 attached to the domed portion 2373. In some embodiments, the annular flange 2378 and domed portion 2373 constitute a unitary part. The domed portion 2373 can have a wall thickness T4. The wall thickness T4 can be substantially constant throughout the domed portion 2373. In some embodiments, the thickness T4 of the domed portion 2373 can vary across the showerhead domed valve 2370.

In some embodiments, the showerhead domed valve 2370, or some portion thereof, is positioned in a regulator channel 2325 within a lumen 2326 of the adaptor 2300. In some embodiments, the showerhead domed valve 2370, or some portion thereof, is positioned in the regulator channel 2325 outside a protrusion 2385*a*. In some embodiments, the showerhead domed valve 2370, or some portion thereof, is positioned in the regulator channel 2325 outside a lumen 2326 of the adaptor 2300. In some embodiments, the showerhead domed valve 2370 is fixed within the regulator channel 2325. The showerhead domed valve 2370 can be fixed within the regulator channel 2325 via, for example, adhesives, welding, fitted channels within the regulator channel 2325 or otherwise.

In some embodiments, the domed portion 2373 includes one or more openings or central slits 2374. In some embodiments, the one or more central slits 2374 are arranged in a generally crisscross configuration. In some embodiments, the one or more central slits 2374 are generally parallel to each other. In some embodiments, the domed portion 2373 includes one or more outer slits 2374A. In some embodiments the number of outer slits 2374A is less than or equal to about 30 and/or greater than or equal to about 4.

In some embodiments, the one or more central slits 2374 and/or outer slits 2374A are biased to a closed position by the domed portion 2373 and/or annular flange 2378. The showerhead domed valve 2370 can inhibit and/or prevent the passage of fluid through the regulator channel 2325 when the slits 2374, 2374A are in a closed position. In some embodiments, the slits 2374, 2374A are configured to open in response to one or more cracking pressures and allow fluid to flow through the slits 2374, 2374A. In some embodiments, the geometry and/or material of the showerhead domed valve 2370 can cause the cracking pressure required to allow fluid to flow through the slits 2374, 2374A in a first direction F1 to be substantially higher than the cracking pressure required to allow fluid to flow through the slits 2374, 2374A in a second direction F2. In some embodiments, the cracking pressures required to allow fluid to flow through the showerhead domed valve 2370 in a first direction F1 and second direction F2 are less than the cracking pressures required to allow fluid to flow through the domed valve 2270 in a first direction F1 and second direction F2, respectively. In some embodiments, the showerhead domed valve 2370 functions in substantially the same way as the domed valve 2270 when fluid is introduced to or removed from the vial 10 via the access channel 2345.

Figure 31A:
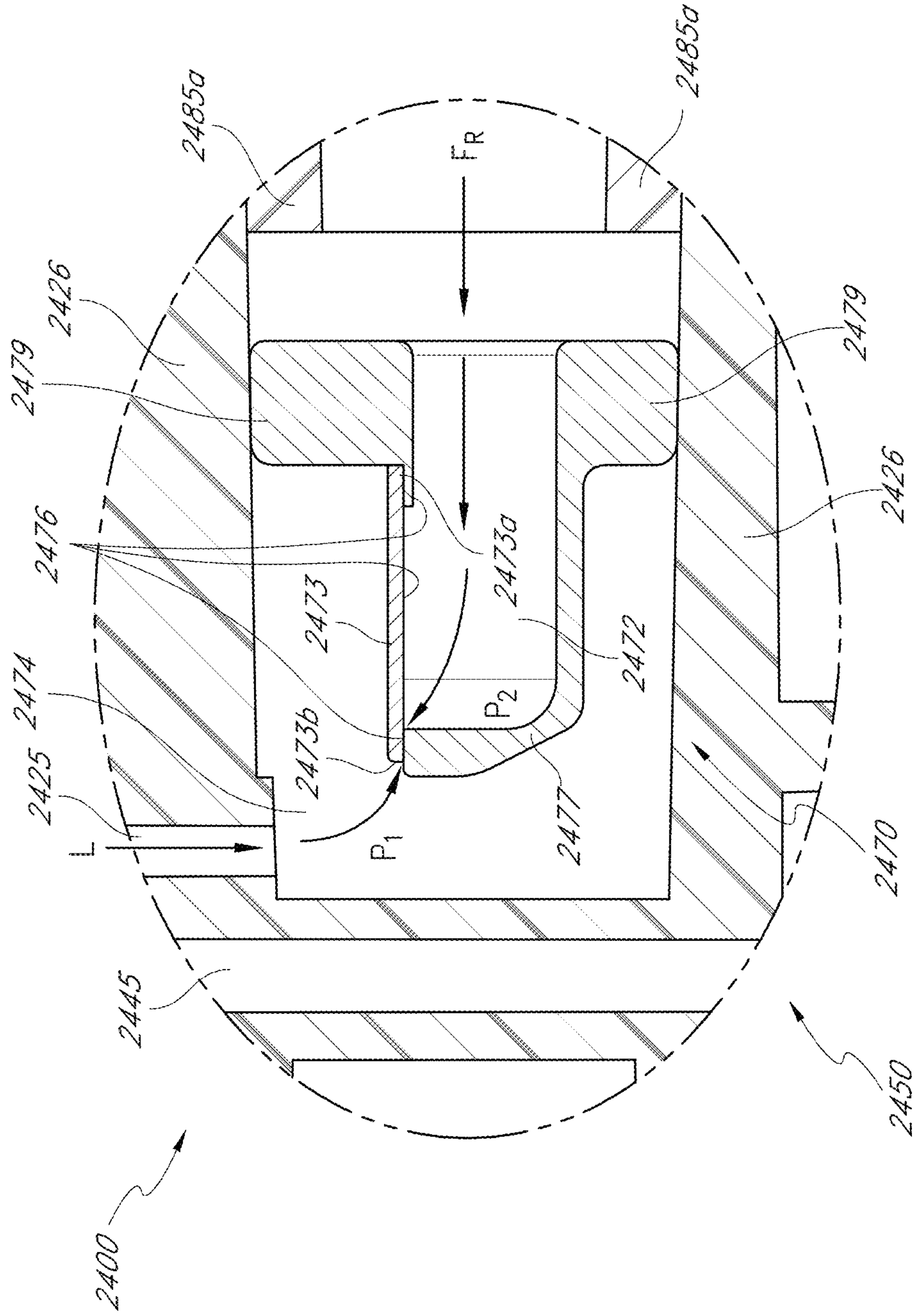
FIG. 31A illustrates a close-up cross-sectional view of a flap check valve.
Figure 31B:
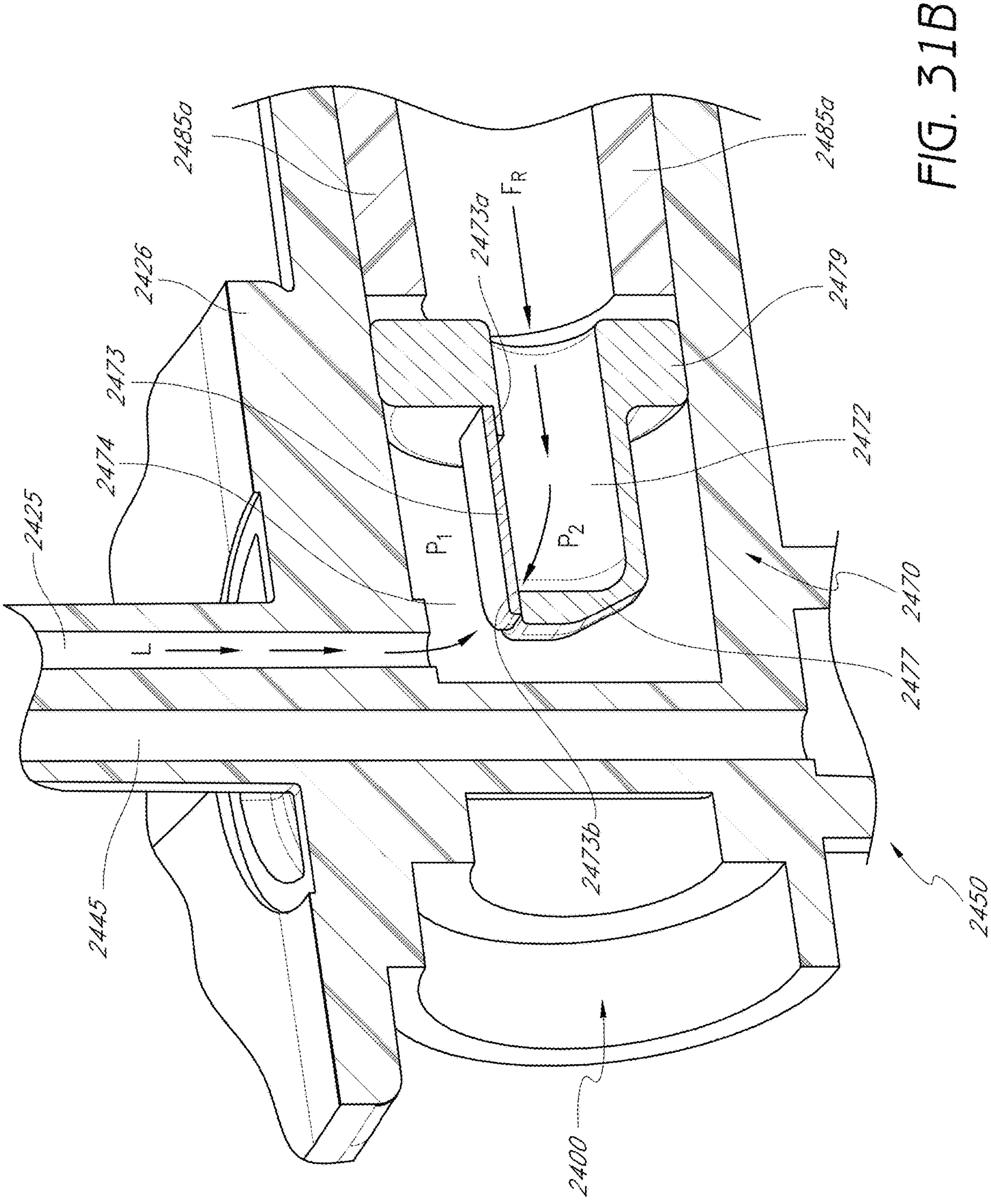
FIG. 31B illustrates a perspective cross-sectional view of the flap check valve of FIG. 31A.

FIGS. 31A-31B illustrate an embodiment of an adaptor 2400 that can have components or portions that are the same as or similar to the components or portions of other vial adaptors disclosed herein. In some embodiments, a regulator assembly 1450 includes an opening and closing occluder valve 2470, such as a flap check valve 2470, with a portion of the occluding component remaining affixed to structure within the vial adaptor 2400 as the occluder valve 2470 transitions between the open and closed states. The flap check valve 2470 can include a sealing portion 2479. The sealing portion 2479 can comprise, for example, a hollow stopper shaped to fit snugly in a regulator channel 2425 of a regulator assembly 2450, one or more annular protrusion or some other feature suitable for fixing the flap check valve 2470 in place within the regulator channel 2425. In some embodiments, flap check valve 2470, or some portion thereof, is positioned in a regulator channel 2425 within a lumen 2426 of the adaptor 2400. In some embodiments, the flap check valve 2470, or some portion thereof, is positioned in the regulator channel 2425 outside a protrusion 2485*a*. In some embodiments, the flap check valve 2470, or some portion thereof, is positioned in the regulator channel 2425 outside a lumen 2426 of the adaptor 2400. In some embodiments, the flap check valve 2470 is fixed within the regulator channel 2425.

According to some configurations, the flap check valve 2470 can include a seat portion 2477 attached to the sealing portion 2479. In some embodiments, the seat portion 2477 and sealing portion 2479 form a unitary part. In some embodiments, the seat portion 2477 and sealing portion 2479 are separate parts. The flap check valve 2470 can include a flap 2473. The flap 2473 can have a first end 2473A and a second end 2473B. The first end 2473A of the flap 2473 can be rotatably attached to the sealing portion 2479 and/or seat portion 2477.

In some embodiments, the flap 2473 can be configured to rest upon the seat portion 2477 when the adaptor 2400 and vial 10 are oriented such that the vial 10 is above the connector interface of the adaptor 2400. In some configurations, contact between the flap 2437 and the seat portion 2477 can form a seal 2476 between the interior 2472 and the exterior 2474 of the flap check valve 2470. The seal 2476 can put the flap check valve 2470 in a closed configuration and inhibit passage of liquid L and/or other fluid from the vial 10 through the flap check valve 2470. In some embodiments, the flap 2473 can be configured to rotate away from the seat portion 2477 when the adaptor 2400 and vial 10 are oriented such that the connector interface of the adaptor 2400 is above the vial 10. Movement of the flap 2473 away from the seat member 2477 can eliminate the seal 2476 and put the flap check valve 2470 in an open configuration such that the interior 2472 and exterior 2474 of the flap check valve 2470 are in fluid communication.

In some embodiments, the flap 2473 can move toward and away from the seat portion 2477 under the influence of gravity. As explained above, contact between the flap 2473 and the seat portion 2477 can form a seal 2476 between the interior 2472 and exterior 2474 of the flap check valve 2470, putting the flap check valve 2470 in a closed configuration and inhibiting passage of liquid L and/or other fluid from the vial 10 through the flap check valve 2470. In some configurations, gravity can cause the flap 2473 to move away from the seat portion 2477 and break the seal 2476. Movement of the flap 2473 away from the seat portion 2477 under the influence of gravity can eliminate the seal 2476 and put the flap check valve 2470 in an open configuration such that the exterior 2474 and interior 2472 are in fluid communication.

In some embodiments, the flap 2473 is biased to the closed position. The biasing force can be provided by, for example, one or more torsion springs, or another feature suitable for biasing the flap 2473 toward the seat portion 2477 (e.g., tensile force, memory materials, magnets, etc.). In some embodiments, the biasing torque upon the flap 2473 at the first end 2473A is less than the torque created at the first end 2437A when the weight of flap 2473 is pulled away from the seat portion 2477 due to the force of gravity (e.g., when the seat portion 2477 is positioned above the flap 2473).

Certain aspects of the operation of the flap check valve 2470 while the flap check valve 2470 is in a closed configuration will now be described. For example, in some embodiments when no fluid is being introduced to or withdrawn from the vial 10 via an access channel 2445, the pressure within the vial 10 is substantially the same as the pressure in the interior 2472 of the flap check valve 2470. In such a situation, the pressure P2 in the interior 2472 of the flap check valve 2470 can be substantially the same as the pressure P1 in the exterior 2474 of the flap check valve 2470. In some embodiments, positioning of the vial 10 above the flap check valve 2470 can cause liquid L or other fluid to move from the vial 10 to the exterior 2474 of the flap check valve 2470. In some embodiments, the flap 2473 will remain at rest on the seat portion 2477 and create a seal 2476 when there is equilibrium in the pressure between the exterior 2474 and interior 2472 of the flap check valve. The seal 2476 can inhibit passage of liquid L and/or other fluid from the vial 10 through the flap check valve 2470.

In some embodiments, withdrawal of fluid from the vial 10 through the access channel 2445 can create lower pressure in the vial 10 and exterior 2474 of the flap check valve 2470 than the pressure in the interior 2472 of the flap check valve 2470. The pressure differential can cause the flap 2473 to move away from the seat portion 2477. The movement of the flap 2473 away from the seat portion 2477 can break the seal 2476 and permit regulator fluid FR to pass from through the interior 2472 of the flap check valve 2470 to the exterior 2474 of the flap check valve 2470. The regulator fluid FR can then pass through the regulator channel 2425 into the vial 10. In some embodiments, the regulator fluid FR is fluid which has passed through a filter in the regulator assembly 2450. In some embodiments, the regulator fluid FR is a fluid contained in the inner volume of an enclosure of the regulator assembly 2450. Passage of regulator fluid FR into the vial 10 can offset, reduce, substantially eliminate, or eliminate the pressure differential between the first exterior 2474 and interior 2472 of the flap check valve 2470 and allow the flap 2473 to return to a resting position on the seat portion 2477. In some embodiments, the passage of regulator fluid FR into the vial 10 helps to maintain equilibrium between the interior of the vial 10 and the interior of the regulator assembly 2450. The return of the flap 2473 to a resting position on the seat portion 2477 can recreate the seal 2476 and prevent passage of liquid L or other fluid from the vial 10 through the flap check valve 2470.

In some embodiments, introduction of fluid to the vial 10 through the access channel 2445 (e.g., when diluents, mixing fluids, or overdrawn fluids are injected into the vial 10 via an exchange device 40) can create higher pressure in the vial 10 and exterior 2474 of the flap check valve 2470 than the pressure within the interior 2472 of the flap check valve 2470. This difference in pressure can cause the flap 2473 to be pushed onto the seat portion 2477 and thus tighten the seal 2476. Tightening of the seal 2476 can inhibit the passage through the flap check valve 2470 of fluid L from the vial 10. In some embodiments, the tightening of the seal 2476 can cause the internal pressure within the vial 10 and the pressure P1 in the region of the exterior 2474 of the flap check valve 2470 to continue to increase as more fluid is introduced into the vial 10 via the access channel 2445. In some embodiments, a continual increase in pressure within the vial 10 can dramatically increase the force required to introduce more fluid to a prohibitive level, and eventually increase the likelihood of fluid leaks from the vial 10 and adaptor 2400 or between these components. It can therefore be desirable for the flap check valve 2470 to be in an open position when fluids are injected into the vial 10.

Movement of the flap 2473 away from the seat portion 2477 can eliminate the seal 2476 and put the flap check valve 2470 in an open configuration. In some embodiments, the opened flap check valve 2470 functions in much the same way as the opened ball check valve 2070 described above with regard to the passage of fluids through the flap check valve 2470 upon the introduction of fluid to or withdrawal of fluid from the vial 10 via the access channel 2445. In some embodiments, the regulator assembly 2450 can have many of the same keying, shaping, and/or alignment features described above with respect to the ball check valve 2070 (e.g., transparent materials, visual alignment indicators, shaped channels and/or a shaped valve).

Figure 32:
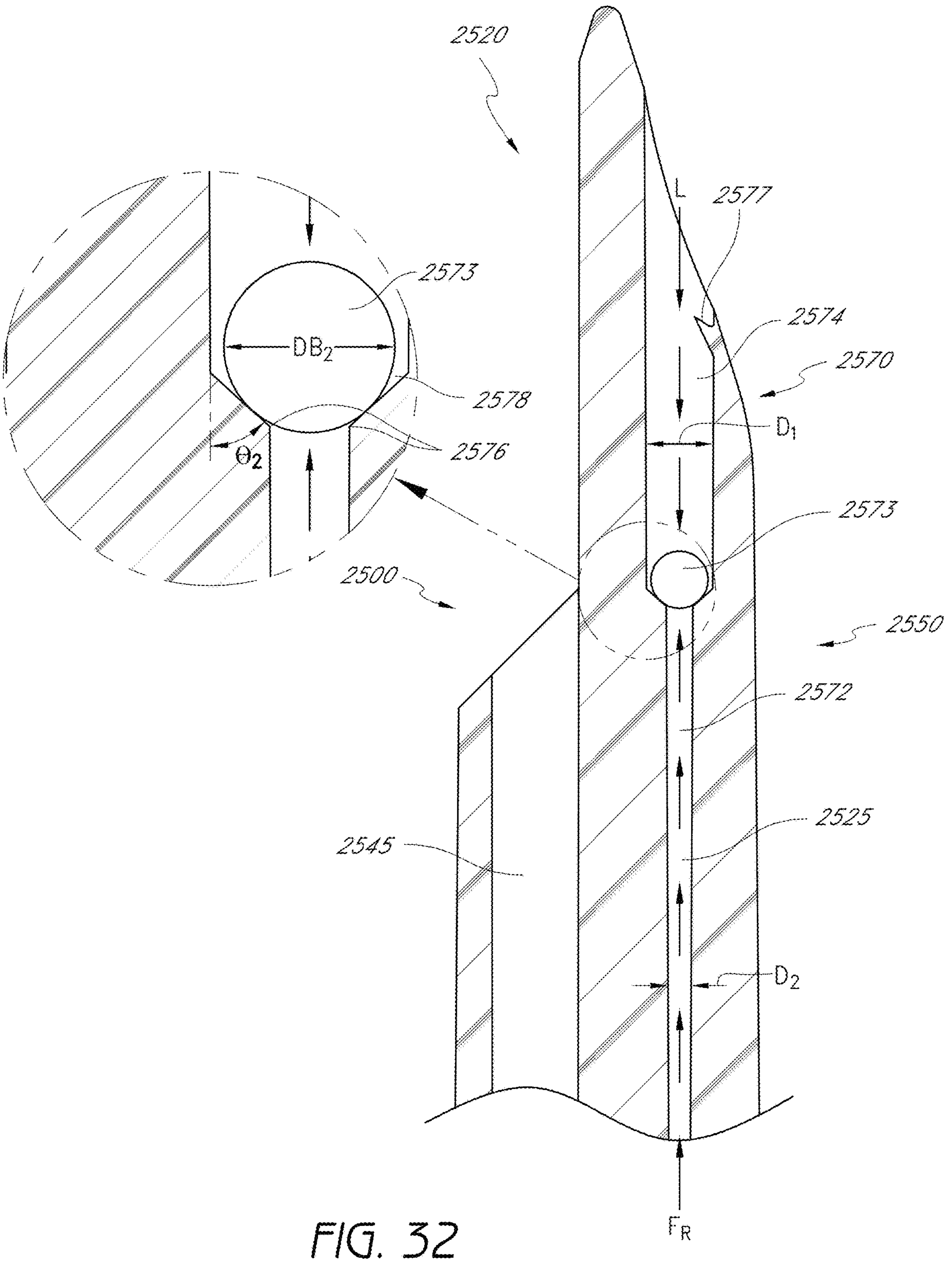
FIG. 32 illustrates a close-up cross-sectional view of a ball check valve in the piercing member of an adaptor.

FIG. 32 illustrates an embodiment of an adaptor 2500. The adaptor 2500 can include a piercing member 2520. In some embodiments, the piercing member 2520 is disposed within a vial 10. The piercing member 2520 can include an access channel 2545 in communication with an exchange device 40. In some embodiments, the piercing member 2530 includes a regulator channel 2525 which includes a gravity or orientation occluder valve, such as a ball check valve 2520. The ball check valve 2570 can include a first channel 2574 with a substantially circular cross section and a diameter D1 in fluid communication with the vial 10. In some embodiments, the ball check valve 2570 includes a second channel 2572 with a substantially circular cross section and diameter D2 in selective fluid communication with the first channel 2574. Many other variations in the structure of the first and second chambers are possible. For example, other cross-sectional shapes may be suitable.

The ball check valve 2570 can include a shoulder 2578 between the first channel 2574 and second channel 2572. In some embodiments, the angle θ2 between the shoulder 2578 and the wall of the first channel 2574 can be about 90°. In some embodiments, the angle θ2 can be less than or greater than 90°. For example, in some embodiments the angle θ2 is less than or equal to about 75° and/or greater than or equal to about 30°. In some embodiments, the second channel 2572 is in fluid communication with the first channel 2574 when the ball check valve 2570 is in an open configuration. In some embodiments, the inner wall of the first channel 2574 can gradually taper into the inside wall of the second channel 2572 such that the first and second channels 2574, 2572 constitute a single frustoconical channel.

The occluder valve can include an occluder, such as a ball 2573. In some embodiments, the ball 2573 is constructed of a material which has a higher density than the liquid L and/or other fluids within the vial 10. The ball 2573 can be spherical or some other suitable shape. In some embodiments, the ball 2573 has a diameter DB2. The diameter DB2 could be less than the diameter D1 of the first channel 2574 and more than the diameter D2 of the second channel 2572. For example, in some embodiments the ratio of the diameter DB2 of the ball 2573 to the diameter D1 of the first channel 2574 is less than or equal to about 9:10 and/or greater than or equal to about 7:10. In some embodiments the ratio of the diameter D2 of the second channel 2572 to the diameter DB2 of the ball 2573 is less than or equal to about 9:10 and/or greater than or equal to about 7:10. In some embodiments, the ball check valve 2570 can include a capture member 2577. The capture member 2577 can inhibit the ball 2570 from moving out of the first channel 2574.

In some configurations, the ball 2573 can behave in much the same way as the ball 2073 of the ball check valve 2070. For example, the ball 2573 can move within the first channel 2574 under the influence of forces in much the same way the ball 2073 can move around the first chamber 2074 of the ball check valve 2070. Resting of the ball 2573 against the shoulder 2578 of the ball check valve 2570 can create a seal 2560 which can inhibit the passage of liquid L and/or other fluids within the vial into the regulator channel 2525. In many respects, the ball check valve 2570 behaves in the same or substantially the same manner as the ball check valve 2070 under the influence of gravity, alignment of the adaptor 2570 and/or other forces.

The following list has example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure:

1. An adaptor configured to couple with a sealed vial, the adaptor comprising:
   a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus;
   a regulator enclosure in fluid communication with the regulator channel, wherein the regulator enclosure is configured to move between a first orientation in which at least a portion of the regulator enclosure is at least partially expanded or unfolded and a second orientation in which at least a portion of the regulator enclosure is at least partially unexpanded or folded when a fluid is withdrawn from the sealed vial via the extractor channel; and
   a filler disposed within the regulator enclosure, the filler configured to ensure an initial volume of regulator fluid within the regulator enclosure, thereby permitting the adaptor to supply regulator fluid to the sealed vial from the regulator enclosure when fluid is withdrawn from the sealed vial via the extractor aperture.
2. The adaptor of embodiment 1, wherein the adaptor is configured such that the regulator enclosure is outside the sealed vial when the adaptor is coupled with the sealed vial.
3. The adaptor of embodiment 1, wherein at least a substantial portion of the regulator enclosure is not within a rigid housing.
4. The adaptor of embodiment 1, wherein the housing apparatus comprises a medical connector interface in fluid communication with the extractor channel and configured to couple with a syringe configured to hold a defined volume of fluid within a barrel, and wherein the filler is configured to ensure that the initial volume of regulator fluid is greater than or equal to the defined volume of fluid.
5. The adaptor of embodiment 4, wherein the initial volume of regulator fluid within the regulator enclosure is greater than or equal to about 60 mL.
6. The adaptor of embodiment 1, wherein the regulator enclosure is configured to hold a maximum volume of regulator fluid when the regulator enclosure is fully expanded or unfolded, and wherein the maximum volume is greater than or equal to about 180 mL.
7. The adaptor of embodiment 1, wherein the regulator enclosure is constructed from a material system including a polyethylene terephthalate film.
8. The adaptor of embodiment 7, wherein the polyethylene terephthalate film includes a metalized coating.
9. The adaptor of embodiment 8, wherein the metalized coating comprises aluminum.
10. The adaptor of embodiment 1, wherein the pressure regulating vial adaptor comprises a piercing member connected to the housing apparatus, and the enclosure is at least partially disposed within the piercing member.
11. The adaptor of embodiment 1, wherein the pressure within the sealed vial is regulated by permitting the regulator enclosure to contract or fold in order to substantially equilibrate pressure on opposite sides of the regulator enclosure as the medicinal fluid is withdrawn from the sealed vial.
12. The adaptor of embodiment 1, wherein the regulator enclosure comprises a layer that is substantially impermeable to a medicinal fluid disposed within the vial, thereby impeding the passage of the medicinal fluid between an outer surface and an inner surface of the regulator enclosure.
13. The adaptor of embodiment 1, further comprising a hydrophobic filter disposed between the regulator enclosure and a distal regulator aperture configured to permit regulator fluid to flow between the regulator enclosure and the vial when the adaptor is coupled with the vial.
14. The adaptor of embodiment 13, wherein the hydrophobic filter is disposed within the regulator channel.
15. The adaptor of embodiment 1, wherein the filler comprises a foamed material.
16. The adaptor of embodiment 15, wherein the filler comprises a polyurethane-ether foam.
17. A method of withdrawing fluid from a sealed vial, the method comprising:
   connecting a pressure regulating vial adaptor to the sealed vial, wherein the pressure regulating vial adaptor comprises:
      a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus;
      a regulator enclosure in fluid communication with the regulator channel, wherein the regulator enclosure is configured to move between a first orientation in which at least a portion of the regulator enclosure is at least partially expanded or unfolded and a second orientation in which at least a portion of the regulator enclosure is at least partially unexpanded or folded when a fluid is withdrawn from the sealed vial via the extractor channel; and
      a filler disposed within the regulator enclosure, the filler configured to ensure an initial volume of regulator fluid within the regulator enclosure, thereby permitting the adaptor to supply regulator fluid to the sealed vial from the regulator enclosure when fluid is withdrawn from the sealed vial via the extractor aperture;

and withdrawing fluid from the sealed vial through the pressure regulating vial adaptor.

18. A method of manufacturing an adaptor for coupling with a sealed vial, the method comprising:

providing a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus;

disposing a filler within a regulator enclosure, the filler configured to ensure an initial volume of regulator fluid within the regulator enclosure, thereby permitting the adaptor to supply regulator fluid to the sealed vial from the regulator enclosure when fluid is withdrawn from the sealed vial via the extractor aperture; and placing the regulator enclosure in fluid communication with the regulator channel, such that the regulator enclosure is configured to move between a first orientation in which at least a portion of the regulator enclosure is at least partially expanded or unfolded and a second orientation in which at least a portion of the regulator enclosure is at least partially unexpanded or folded when a fluid is withdrawn from the sealed vial via the extractor channel.

19. The method of embodiment 18, wherein disposing a filler within a regulator enclosure comprises:

forming a fill opening in the regulator enclosure configured to allow the filler to pass therethrough;

filling the regulator enclosure with the filler through the fill opening; and closing the fill opening.

20. The method of embodiment 18, wherein placing the regulator enclosure in fluid communication with the regulator channel comprises:

aligning an enclosure opening in the regulator enclosure with a proximal regulator aperture of the housing apparatus; and fastening the regulator enclosure to the housing apparatus.

21. An adaptor configured to couple with a sealed vial, the adaptor comprising:

a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus; and a regulator enclosure in fluid communication with the regulator channel, wherein the regulator enclosure is configured to move between a first orientation in which at least a portion of the regulator enclosure is at least partially expanded or unfolded and a second orientation in which at least a portion of the regulator enclosure is at least partially unexpanded or folded when a fluid is withdrawn from the sealed vial via the extractor channel;

wherein a rigid housing does not contain a substantial volume of the regulator enclosure.

22. The adaptor of embodiment 21, wherein the regulator enclosure comprises a first side and a second side opposite the first side, and wherein each of the first and second sides is configured to expand, contract, fold, or unfold as regulator fluid flows between the regulator channel and the regulator enclosure.

23. The adaptor of embodiment 22, wherein the second side is configured to move away from the housing apparatus or towards the housing apparatus when regulator fluid passes through the regulator channel.

24. The adaptor of embodiment 22, wherein the first side comprises an inner surface forming a portion of the regulator enclosure interior and an outer surface forming a portion of the regulator enclosure exterior, and wherein the outer surface of the first side is oriented towards the housing apparatus.

25. The adaptor of embodiment 21, wherein pressure within the sealed vial is regulated by allowing the regulator enclosure to contract or fold in order to substantially equilibrate pressure on opposite sides of the regulator enclosure as the medicinal fluid is withdrawn from the sealed vial.

26. The adaptor of embodiment 21, wherein the regulator enclosure comprises a layer that is substantially impermeable to a medicinal fluid disposed within the vial, thereby impeding the passage of the medicinal fluid between an outer surface and an inner surface of the enclosure.

27. The adaptor of embodiment 21, further comprising a hydrophobic filter disposed between the regulator enclosure and a distal regulator aperture configured to permit regulator fluid to flow between the regulator enclosure and the vial when the adaptor is coupled with the vial.

28. The adaptor of embodiment 21, further comprising a filler disposed within the regulator enclosure, the filler configured to ensure an initial volume of regulator fluid within the regulator enclosure, thereby permitting the adaptor to supply regulator fluid to the sealed vial from the regulator enclosure when fluid is withdrawn from the sealed vial via the extractor aperture.

29. A vial adaptor configured to couple with a sealed vial, the vial adaptor comprising:

a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus;

a regulator enclosure in fluid communication with the regulator channel, wherein the regulator enclosure is configured to move between a first orientation in which at least a portion of the regulator enclosure is at least partially expanded or unfolded and a second orientation in which at least a portion of the regulator enclosure is at least partially unexpanded or folded when a fluid is withdrawn from the sealed vial via the extractor channel; and wherein the regulator enclosure has a first side and a second side opposite the first side, wherein the first side comprises an inner surface forming a portion of the regulator enclosure interior and an outer surface forming a portion of the regulator enclosure exterior, and wherein the outer surface of the first side is oriented towards the housing apparatus;

wherein each of the first and second sides is configured to expand, contract, fold, or unfold when regulator fluid passes through the regulator channel;

wherein the second side is configured to move away from the housing apparatus or towards the housing apparatus when regulator fluid passes through the regulator channel; and wherein the regulator enclosure is not entirely contained within a rigid housing.

30. A vial adaptor configured to couple with a sealed vial, the vial adaptor comprising:

a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus;

a regulator enclosure in fluid communication with the regulator channel and configured to receive a volume of regulating fluid, wherein the regulator enclosure is configured to move between a first orientation in which at least a portion of the regulator enclosure is at least partially expanded or unfolded and a second orientation in which at least a portion of the regulator enclosure is at least partially unexpanded or folded when a fluid is withdrawn from the sealed vial via the extractor channel; and wherein the regulator enclosure has a first layer connected with a second layer opposite the first layer, the first and second layers being configured to receive the volume of regulating fluid therebetween;

wherein each of the first and second sides is configured to expand, contract, fold, or unfold when regulator fluid passes through the regulator channel;

wherein the second side is configured to move away from the housing apparatus or towards the housing apparatus when regulator fluid passes through the regulator channel; and wherein the regulator enclosure is not entirely contained within a rigid housing.

31. The vial adaptor of embodiment 30, wherein the first layer is made of a first sheet of material, and the second layer is made of a second sheet of material.

32. The vial adaptor of embodiment 30, wherein the first and second layers are connected at a periphery of the first and second layers.

33. The vial adaptor of embodiment 30, wherein the first and second layers each comprise a central portion, and the first and second layers are not connected at the central portions.

34. A modular vial adaptor configured to couple with a sealed vial, the vial adaptor comprising:

a pressure regulating vial adaptor module comprising:

a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus; and a proximal regulator aperture in fluid communication with the regulator channel, wherein the proximal regulator aperture is configured to permit ingress or egress of regulator fluid therethrough when the vial adaptor module is coupled with the sealed vial and fluid is withdrawn from the vial; and a regulator fluid module configured to couple with the proximal regulator aperture, the regulator fluid module comprising:

a regulator enclosure configured to move between a first orientation in which at least a portion of the regulator enclosure is at least partially expanded or unfolded and a second orientation in which at least a portion of the regulator enclosure is at least partially unexpanded or folded when regulator fluid passes through an enclosure opening in the regulator enclosure; and a fastener configured to couple the regulator enclosure with the proximal regulator aperture;

wherein the regulator enclosure is not entirely contained within a rigid housing.

35. The adaptor of embodiment 34, wherein the fastener comprises a bonding member having first and second surfaces coated with adhesive.

36. The adaptor of embodiment 35, wherein the bonding member is constructed from a material system comprising resilient material.

37. A method of manufacturing a vial adaptor configured to couple with a sealed vial, the method comprising:

providing a pressure regulating vial adaptor module comprising:

a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus; and a proximal regulator aperture in fluid communication with the regulator channel, wherein the proximal regulator aperture is configured to permit ingress or egress of regulator fluid therethrough when the vial adaptor module is coupled with the sealed vial and fluid is withdrawn from the vial;

providing a regulator fluid module configured to couple with the proximal regulator aperture, the regulator fluid module comprising:

a regulator enclosure configured to move between a first orientation in which at least a portion of the regulator enclosure is at least partially expanded or unfolded and a second orientation in which at least a portion of the regulator enclosure is at least partially unexpanded or folded when regulator fluid passes through an enclosure opening in the regulator enclosure; and a fastener configured to couple the regulator enclosure with the proximal regulator aperture;

wherein the regulator enclosure is not entirely contained within a rigid housing;

aligning the enclosure opening of the regulator enclosure with the proximal regulator aperture of the pressure regulating vial adaptor module; and fastening the regulator fluid module to the pressure regulating vial adaptor module.

38. The method of embodiment 37, wherein the fastener comprises a bonding member having first and second surfaces coated with adhesive.

39. The method of embodiment 38, wherein the bonding member is constructed from a material system comprising resilient material.

40. The method of embodiment 39, wherein the bonding member has a thickness greater than or equal to about 0.01 inches and less than or equal to about 0.03 inches.

41. A regulator fluid module configured to fasten to a pressure regulating vial adaptor module to form a vial adaptor for coupling with a sealed vial, the pressure regulating vial adaptor module comprising a housing apparatus including a distal extractor aperture configured to permit withdrawal of fluid from the sealed vial when the adaptor is coupled to the sealed vial, wherein at least a portion of an extractor channel and at least a portion of a regulator channel pass through the housing apparatus; and a proximal regulator aperture in fluid communication with the regulator channel, wherein the proximal regulator aperture is configured to permit ingress or egress of regulator fluid therethrough when the vial adaptor module is coupled with a sealed vial and fluid is withdrawn from the vial, the regulator fluid module comprising:

a regulator enclosure configured to move between a first orientation in which at least a portion of the regulator enclosure is at least partially expanded or unfolded and a second orientation in which at least a portion of the regulator enclosure is at least partially unexpanded or folded when regulator fluid passes through an enclosure opening in the regulator enclosure;

a filler within the regulator enclosure, the filler configured to ensure an initial volume of regulator fluid within the regulator enclosure, thereby permitting the adaptor to supply regulator fluid to the sealed vial from the regulator enclosure when fluid is withdrawn from the sealed vial via the extractor aperture; and a fastener configured to couple the regulator enclosure with the proximal regulator aperture such that the regulator fluid module is permitted to move small distances with respect to the pressure regulating vial adaptor module without causing the fastener to become ripped, torn, or otherwise damaged during routine manipulation of the vial adaptor;

wherein the regulator enclosure is not entirely contained within a rigid housing.

42. A method of manufacturing a modular adaptor for coupling with and regulating the pressure in a sealed vial, the method comprising:

forming a housing apparatus including a distal access aperture configured to permit transfer of fluid between a medical device and the sealed vial when the adaptor is coupled to the sealed vial, wherein at least a portion of an access channel and at least a portion of a regulator channel pass through the housing apparatus, the regulator channel being in fluid communication with the sealed vial when the adaptor is coupled to the sealed vial;

connecting a coupling assembly such that the coupling assembly is in fluid communication with the regulator channel, the coupling assembly including a membrane and a cover, the cover including an aperture, the coupling assembly configured to allow a flow of regulating fluid between the aperture and the regulator channel, the flow of regulating fluid passing through the membrane; and providing a regulator enclosure configured to be positioned in fluid communication with the aperture, such that the regulator enclosure is configured to move between a first orientation in which at least a portion of the regulator enclosure is at least partially expanded or unfolded and a second orientation in which at least a portion of the regulator enclosure is at least partially unexpanded or folded when a regulator fluid passes through an opening in the regulator enclosure.

43. The method of embodiment 42, further comprising selecting the regulator enclosure from a variety of sizes of regulator enclosures, the selection being based on the volume of the medicinal fluid to be withdrawn from the sealed vial.

44. The method of embodiment 42, wherein the flow of regulating fluid passes between the aperture and the sealed vial when the medicinal fluid is withdrawn from the sealed vial via the access channel.

45. The method of embodiment 42, wherein the aperture is in fluid communication with ambient air prior to the regulator enclosure being positioned in fluid communication with the aperture.

46. A vial adaptor having an insertion axis, the vial adaptor configured to be used in an area with a floor and configured to couple with a sealed vial, the vial adaptor comprising:

a housing assembly comprising a piercing member capable of piercing a septum of a sealed vial when the piercing member is urged against the septum of the vial;

an extractor channel, wherein the extractor channel extends between a proximal extractor aperture and a distal extractor aperture and is configured to permit withdrawal of fluid from the sealed vial when the vial adaptor is coupled to the sealed vial, and wherein at least a portion of the extractor channel passes through at least a portion the housing assembly;

a regulator channel, wherein the regulator channel extends between a proximal regulator aperture and a distal regulator aperture, and wherein at least a portion of the regulator channel passes through at least a portion of the housing assembly; and an occluder valve housed in the regulator channel and configured to transition between a closed configuration and an opened configuration in response to rotation of the vial adaptor about an axis of rotation between an upright position and an upside down position, wherein the proximal extractor aperture is further from the floor than the distal extractor aperture when the vial adaptor is in the upright position and the proximal extractor aperture is closer to the floor than the distal extractor aperture when the vial adaptor is in the upside down position;

wherein the occluder valve inhibits passage of fluid past the occluder valve toward the proximal regulator aperture when the occluder valve is in the closed configuration and wherein the axis of rotation is perpendicular to the insertion axis of the vial adaptor and the occluder valve consistently transitions between the closed configuration and the opened configuration substantially independent of the axis of rotation about which the vial adaptor is rotated.

47. The vial adaptor of embodiment 46, wherein occluder valve transitions to the closed configuration when the vial adaptor is rotated to the upside down position.

48. The vial adaptor of embodiment 46, wherein the occluder valve transitions to the opened configuration when the vial adaptor is rotated to the upright position.

49. The vial adaptor of embodiment 46, wherein the occluder valve comprises a valve chamber in fluid communication with the regulator channel, an occluding member within the valve chamber, and a valve seat, wherein the occluder valve is configured to transition to the closed configuration upon engagement between the occluding member and the valve seat, and wherein the occluder valve is configured to transition to the opened configuration upon disengagement of the occluding member from the valve seat.

50. The vial adaptor of embodiment 49, wherein the occluding member moves within the valve chamber under the influence of gravity.
51. The vial adaptor of embodiment 49, wherein the occluding member is a spherical ball.
52. The vial adaptor of embodiment 49, wherein the occluding member has a cylindrical body with a tapered end.
53. The vial adaptor of embodiment 49, wherein the occluding member has an ellipsoidal shape.
54. The vial adaptor of embodiment 46, wherein the occluder valve has a generally cylindrical shape and an axial centerline.
55. The vial adaptor of embodiment 54, wherein the occluder valve is rotatable about the axial centerline of the occluder valve with respect to the regulator channel.
56. The vial adaptor of embodiment 46, wherein the vial adaptor further comprises a filter positioned in the regulator channel between the occluder valve and the proximal regulator aperture.
57. The vial adaptor of embodiment 56, wherein the filter is a hydrophobic filter.
58. A vial adaptor configured to couple with a sealed vial, the vial adaptor having an insertion axis and comprising:
   - a housing assembly comprising a piercing member capable of piercing a septum of a sealed vial when the piercing member is urged against the septum of the vial;
   - an extractor channel, wherein at least a portion of the extractor channel passes through at least a portion of the housing assembly;
   - a regulator channel, wherein the regulator channel defines a regulator fluid flow path and extends between a proximal regulator aperture and a distal regulator aperture, and wherein at least a portion of the regulator channel passes through at least a portion of the housing assembly; and
   - an occluder valve located in at least a portion of the regulator channel and having a proximal opening nearest the proximal regulator aperture and a distal opening nearest the distal regulator aperture, the occluder valve further configured to transition between a closed configuration and an opened configuration, wherein the occluder valve comprises:
     - a valve chamber in fluid communication with the regulator channel and the regulator fluid flow path, the valve chamber having an occluding member, a movement path for the occluding member, and a valve seat;
     - a valve channel in fluid communication with the valve chamber and the regulator channel and the regulator fluid flow path;
     - a proximal interface defining the fluid boundary between the proximal opening and the regulator channel; and
     - a distal interface defining the fluid boundary between the distal opening and the regulator channel;
   - wherein the occluder valve is configured to transition to the closed configuration when the occluding member is engaged with the valve seat, the occluder valve is configured to transition to the opened configuration when the occluding member is disengaged from the valve seat, and wherein an angle formed between the movement path for the occluding member and the regulator fluid flow path at one or more of the proximal interface and the distal interface is oblique or perpendicular.
59. The vial adaptor of embodiment 58, wherein the movement path for the occluding member is oblique or perpendicular to an installation path of the occluder valve.
60. The vial adaptor of embodiment 59, wherein the angle formed between the movement path and the installation path is greater than about 45° and less than about 135°.
61. The vial adaptor of embodiment 58, wherein the occluding member is a spherical ball.
62. The vial adaptor of embodiment 58, wherein the occluding member has a cylindrical body with one tapered end.
63. The vial adaptor of embodiment 58, wherein the occluding member has an ellipsoidal shape.
64. The vial adaptor of embodiment 60, wherein the angle formed between the movement path and the installation path is about 90°.
65. The vial adaptor of embodiment 58, wherein the angle formed between the movement path and the installation path is substantially the same as the angle formed between the insertion axis of the vial adaptor and the installation path.
66. The vial adaptor of embodiment 58, wherein the movement path is substantially parallel to the insertion axis of the vial adaptor.
67. The vial adaptor of embodiment 58, wherein the vial adaptor further comprises a filter in the regulator channel between the occluder valve and the proximal regulator aperture.
68. The vial adaptor of embodiment 67, wherein the filter is a hydrophobic filter.
69. A method of manufacturing a modular vial adaptor configured to couple with a sealed vial, the method comprising:
   - selecting a connector interface having an insertion axis, the connector interface comprising:
     - a housing assembly comprising a piercing member capable of piercing a septum of a sealed vial when the piercing member is urged against the septum of the vial;
     - an extractor channel, wherein at least a portion of the extractor channel passes through at least a portion of the housing assembly;
     - a regulator channel, wherein the regulator channel extends between a proximal regulator aperture and a distal regulator aperture, and wherein at least a portion of the regulator channel passes through at least a portion of the housing assembly; and
   - coupling a regulator assembly with the proximal regulator aperture of the connector interface, wherein the regulator assembly comprises a regulator path configured to be in fluid communication with the regulator channel when the regulator assembly is coupled with the connector interface and the regulator channel and regulator path define a regulator fluid flow path, and wherein the regulator assembly further comprises an occluder valve installed at least partially within one or more of the regulator channel and the regulator path via an installation path and having a proximal opening nearest the proximal regulator aperture and a distal opening nearest the distal regulator aperture, the occluder valve configured to transition between a closed configuration and an opened configuration, wherein the occluder valve comprises:

a valve chamber in fluid communication with the regulator fluid flow path, the valve chamber having an occluding member, a movement path for the occluding member, and a valve seat;

a valve channel in fluid communication with the valve chamber and the regulator fluid flow path, the valve channel having a flow path;

a proximal interface defining the fluid boundary between the proximal opening and the regulator channel; and a distal interface defining the fluid boundary between the distal opening and the regulator channel;

wherein the occluder valve is configured to transition to the closed configuration when the occluding member is engaged with the valve seat, the occluder valve is configured to transition to the opened configuration when the occluding member is disengaged from the valve seat, and wherein an angle formed between the movement path for the occluding member and the regulator fluid flow path at one or more of the proximal interface and the distal interface is oblique or perpendicular.

70. The method of embodiment 69, wherein the method further comprises installing the occluder valve at least partially into one or more of the regulator channel and the regulator path via an installation path.

71. The method of embodiment 70, wherein the method further includes selecting an occluder valve wherein the angle between the movement path in the occluder valve and the installation path of the occluder valve is substantially the same as the angle between the installation path and the insertion axis of the coupling interface.

72. The method of embodiment 69, wherein the method further comprises selecting an occluder valve wherein the movement path in the occluder valve is substantially parallel to insertion axis of the coupling interface.

73. The method of embodiment 69, wherein the method further includes matching a protrusion of the regulator assembly with the proximal regulator aperture of the connector interface, wherein the protrusion and proximal regulator aperture are keyed.

74. The method of embodiment 73, method further includes matching an alignment feature on the occluder valve with an alignment feature of the regulator channel.

75. The method of embodiment 74, wherein the matching the alignment feature of the occluder valve with the alignment feature of the regulator channel orients the occluder valve such that the movement path is substantially parallel to the insertion axis of the connector interface when the regulator assembly is coupled to the connector interface and the occluder valve is at least partially installed in one or more of the regulator channel and the regulator path.

Although the vial adaptor has been disclosed in the context of certain embodiments and examples, it will be understood by those skilled in the art that the vial adaptor extends beyond the specifically disclosed embodiments to other alternative embodiments and/or uses of the embodiments and certain modifications and equivalents thereof. For example, some embodiments are configured to use a regulating fluid that is a liquid (such as water or saline), rather than a gas. As another example, in certain embodiments the bag comprises a bellows. It should be understood that various features and aspects of the disclosed embodiments can be combined with or substituted for one another in order to form varying modes of the vial adaptor. For example, the annular bag shape of FIG. 24 can be incorporated into the embodiment of FIGS. 13-15. Accordingly, it is intended that the scope of the vial adaptor herein-disclosed should not be limited by the particular disclosed embodiments described above, but should be determined only by a fair reading of the claims that follow.

The following is claimed:

1. A pressure-regulating vial adapter comprising:

a housing having an interface, a cap connector, and a lumen, the interface configured to connect to a syringe, the cap connector configured to connect to a vial having a septum;

a piercing member configured to be inserted through the septum of the vial;

an access channel configured to convey liquid between the syringe and the vial;

a regulator enclosure comprising a flexible first side and a flexible second side, the regulator enclosure positioned outside the vial;

a regulator channel configured to convey regulating fluid, the regulator channel extending between the regulator enclosure and the vial;

a coupling located intermediate the regulator enclosure and the lumen, wherein the regulator channel passes through the coupling;

a first valve configured to open to allow ambient air to enter the regulator channel; and a second valve configured to control regulating fluid flow in the regulator channel, the second valve comprising a two-way valve;

wherein the flexible first and second sides are configured to receive regulating fluid therebetween and wherein the flexible first and second sides are each configured to unfold in response to an introduction of liquid into the vial via the access channel.

2. The pressure-regulating vial adapter of claim 1, wherein the first valve comprises a check valve.

3. The pressure-regulating vial adapter of claim 1, wherein the first valve comprises a diaphragm check valve.

4. The pressure-regulating vial adapter of claim 1, wherein the first valve is on the coupling.

5. The pressure-regulating vial adapter of claim 1, wherein the second valve comprises an orientation-sensitive valve.

6. The pressure-regulating vial adapter of claim 1, wherein the second valve comprises a dome valve.

7. The pressure-regulating vial adapter of claim 1, wherein the regulator enclosure comprises a bag.

8. The pressure-regulating vial adapter of claim 1, wherein the regulator enclosure is configured to expand laterally outward from the housing.

9. The pressure-regulating vial adapter of claim 1, further comprising a rigid housing, wherein the regulator enclosure is configured to expand out of the rigid housing.

10. The pressure-regulating vial adapter of claim 1, wherein the flexible second side is positioned laterally outward of the flexible first side.

11. The pressure-regulating vial adapter of claim 1, wherein the flexible first side comprises a first sheet and the flexible second side comprises a second sheet, the first and second sheets bonded together at a periphery of the first and second sheets.

12. The pressure-regulating vial adapter of claim 1, further comprising a filter configured to filter ambient air that enters the pressure-regulating vial adapter.

13. The pressure-regulating vial adapter of claim 1, wherein the interface is on a top of the housing, the cap connector is on a bottom of the housing, and the lumen on a lateral side of the housing.

14. The pressure-regulating vial adapter of claim 1, further comprising a center of mass and a central axis, the center of mass being is sufficiently near the central axis such that the pressure-regulating vial adapter is inhibited from tipping-over when connected to the vial.

15. The pressure-regulating vial adapter of claim 1, wherein the first valve comprises a diaphragm check valve and the second valve comprises a dome valve.

16. The pressure-regulating vial adapter of claim 1, wherein the first valve is on the coupling and the second valve is within the regulator channel.

17. The pressure-regulating vial adapter of claim 1, wherein the first valve comprises a diaphragm check valve on the coupling and the second valve comprises a dome valve within the regulator channel.

18. A pressure-regulating vial adapter comprising:

a housing having an interface, a cap connector, and a lumen, the interface configured to connect to a syringe, the cap connector configured to connect to a vial having a septum;

a piercing member configured to be inserted through the septum of the vial;

an access channel configured to convey liquid between the syringe and the vial;

a regulator comprising a mouth, a flexible first side, and a flexible second side, the regulator positioned outside the vial;

a regulator channel configured to convey regulating fluid between the regulator and the vial; and a rigid enclosure comprising an inner surface and an outer surface, the regulator positioned at least partly within the rigid enclosure, the mouth of the regulator connected to the inner surface of the rigid enclosure;

wherein the flexible first and second sides are configured to unfold in response to an introduction of liquid into the vial such that regulating fluid is received between the flexible first and second sides; and wherein the flexible first and second sides are further configured to crumple in response to withdrawal of liquid from the vial.

19. The pressure-regulating vial adapter of claim 18, wherein the regulator is further configured to unfold laterally outward with respect to a longitudinal axis of the pressure-regulating vial adapter.

20. The pressure-regulating vial adapter of claim 18, further comprising a coupling connected with the lumen, the regulator channel passing through at least the coupling and the lumen.

21. The pressure-regulating vial adapter of claim 20, wherein the lumen and the coupling extend laterally outward with respect to a longitudinal axis of the pressure-regulating vial adapter.

22. The pressure-regulating vial adapter of claim 20, wherein the coupling is received partially inside the lumen.

23. The pressure-regulating vial adapter of claim 18, wherein, with the pressure-regulating vial adapter connected with the vial right-side-up, the interface is oriented upward, the cap connector is oriented downward, and the lumen is oriented sideways.

24. The pressure-regulating vial adapter of claim 18, wherein the flexible first side comprises a first sheet and the flexible second side comprises a second sheet, the first and second sheets connected at a periphery of the first and second sheets.

25. The pressure-regulating vial adapter of claim 18, wherein the mouth of the regulator is positioned within a chamber bounded by the inner surface of the rigid enclosure.

* * * * *